(12) United States Patent
Tane et al.

(10) Patent No.: US 10,513,220 B2
(45) Date of Patent: Dec. 24, 2019

(54) DISPLAY DEVICE WITH BACKLIGHT

(71) Applicant: DENSO CORPORATION, Kariya, Aichi-pref. (JP)

(72) Inventors: Seigo Tane, Kariya (JP); Katsumi Fujita, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 315 days.

(21) Appl. No.: 15/504,662

(22) PCT Filed: Aug. 28, 2015

(86) PCT No.: PCT/JP2015/004367
§ 371 (c)(1),
(2) Date: Feb. 17, 2017

(87) PCT Pub. No.: WO2016/035304
PCT Pub. Date: Mar. 10, 2016

(65) Prior Publication Data
US 2017/0253178 A1    Sep. 7, 2017

(30) Foreign Application Priority Data

Sep. 5, 2014  (JP) .................................. 2014-181584
Sep. 5, 2014  (JP) .................................. 2014-181585
(Continued)

(51) Int. Cl.
*B60Q 3/14*     (2017.01)
*B60K 35/00*    (2006.01)
(Continued)

(52) U.S. Cl.
CPC ............... *B60Q 3/14* (2017.02); *B60K 35/00* (2013.01); *G01D 7/06* (2013.01); *G02F 1/1336* (2013.01);
(Continued)

(58) Field of Classification Search
CPC .... B60Q 3/14; B60K 35/00; B60K 2370/682; B60K 2370/1531; B60K 2370/31;
(Continued)

(56) References Cited

U.S. PATENT DOCUMENTS

2002/0109808 A1    8/2002  Sekiguchi et al.
2004/0174774 A1    9/2004  Tasaka et al.
(Continued)

FOREIGN PATENT DOCUMENTS

JP    08184683 A      7/1996
JP    H11020507 A     1/1999
(Continued)

OTHER PUBLICATIONS

English translation of JP 2012-117894 (Jun. 21, 2012).*

*Primary Examiner* — Anh T Mai
*Assistant Examiner* — Hana S Featherly
(74) *Attorney, Agent, or Firm* — Harness, Dickey & Pierce, P.L.C.

(57) ABSTRACT

A display device includes a liquid crystal panel providing a display surface where an image is displayed, a backlight emitting light to the liquid crystal panel from behind, a real object placed between the liquid crystal panel and the backlight and visible through the liquid crystal panel, and a controller controlling the liquid crystal panel such that a specific pixel region of the display surface behind which the real object is positioned is higher in light transmittance than another pixel region of the display surface.

40 Claims, 66 Drawing Sheets

(30) Foreign Application Priority Data

| Sep. 5, 2014 | (JP) | 2014-181586 |
|---|---|---|
| Sep. 5, 2014 | (JP) | 2014-181587 |
| Oct. 8, 2014 | (JP) | 2014-207414 |
| Dec. 3, 2014 | (JP) | 2014-245280 |
| Mar. 6, 2015 | (JP) | 2015-045147 |

(51) Int. Cl.
| *G02F 1/13357* | (2006.01) |
|---|---|
| *G09G 3/36* | (2006.01) |
| *G01D 7/06* | (2006.01) |
| G09G 3/00 | (2006.01) |
| G09G 3/34 | (2006.01) |
| G02F 1/1333 | (2006.01) |
| B60K 37/02 | (2006.01) |
| G01D 7/00 | (2006.01) |
| G01D 11/28 | (2006.01) |
| G02F 1/133 | (2006.01) |
| G09F 9/35 | (2006.01) |

(52) U.S. Cl.
CPC ............. *G09G 3/36* (2013.01); *G09G 3/3611* (2013.01); *B60K 37/02* (2013.01); *B60K 2370/154* (2019.05); *B60K 2370/155* (2019.05); *B60K 2370/1531* (2019.05); *B60K 2370/1868* (2019.05); *B60K 2370/20* (2019.05); *B60K 2370/23* (2019.05); *B60K 2370/31* (2019.05); *B60K 2370/332* (2019.05); *B60K 2370/334* (2019.05); *B60K 2370/336* (2019.05); *B60K 2370/341* (2019.05); *B60K 2370/347* (2019.05); *B60K 2370/52* (2019.05); *B60K 2370/682* (2019.05); *B60K 2370/695* (2019.05); *B60K 2370/698* (2019.05); *G01D 7/002* (2013.01); *G01D 11/28* (2013.01); *G02F 1/133* (2013.01); *G02F 2001/133374* (2013.01); *G02F 2201/44* (2013.01); *G09F 9/35* (2013.01); *G09G 3/003* (2013.01); *G09G 3/3406* (2013.01); *G09G 2320/0686* (2013.01)

(58) Field of Classification Search
CPC ........ B60K 2370/695; B60K 2370/336; B60K 2370/332; B60K 2370/52; B60K 2370/154; B60K 2370/1868; B60K 2370/20; B60K 2370/23; B60K 2370/334; B60K 2370/347; B60K 2370/155; B60K 2370/698; B60K 37/02; G01D 7/06; G01D 7/002; G01D 11/28; G02F 1/1336; G02F 1/133; G02F 2001/133374; G02F 2201/44; G09G 3/36; G09G 3/3611; G09G 3/003; G09G 3/3406; G09G 2320/0686; G09F 9/35
USPC ....................................................... 362/489
See application file for complete search history.

(56) References Cited

U.S. PATENT DOCUMENTS

| 2006/0092098 | A1 | 5/2006 | Yokota et al. |
| 2014/0063718 | A1 | 3/2014 | Yasumoto et al. |

FOREIGN PATENT DOCUMENTS

| JP | 2002328187 A | 11/2002 |
|---|---|---|
| JP | 2004271259 A | 9/2004 |
| JP | 2005009957 A | 1/2005 |
| JP | 2006256754 A | 9/2006 |
| JP | 2007230297 A | 9/2007 |
| JP | 2007278709 A | 10/2007 |
| JP | 2009179183 A | 8/2009 |
| JP | 2009192434 A | 8/2009 |
| JP | 2010107267 A | 5/2010 |
| JP | 4637546 B2 | 2/2011 |
| JP | 4787102 B2 | 10/2011 |
| JP | 2012061874 A | 3/2012 |
| JP | 2012117894 A | 6/2012 |
| JP | 5180150 B2 | 4/2013 |
| JP | 2014066696 A | 4/2014 |
| KR | 1020070065265 A | 6/2007 |

\* cited by examiner

REAL OBJECT DISPLAY MODE

US 10,513,220 B2

DISPLAY DEVICE WITH BACKLIGHT

CROSS REFERENCE TO RELATED APPLICATIONS

This application is a U.S. National Phase Application under 35 U.S.C. 371 of International Application No. PCT/JP2015/004367 filed on Aug. 28, 2015 and published in Japanese as WO 2016/035304 Al on Mar. 10, 2016. This application is based on and claims the benefit of priority from Japanese Patent Applications No. 2014-181584 filed on Sep. 5, 2014, No. 2014-1 81 585 filed on Sep. 5, 2014, No. 2014-181586 filed on Sep. 5, 2014, No. 2014-181587 filed on Sep. 5, 2014, No. 2014-207414 filed on Oct. 8, 2014, No. 2014-245280 filed on Dec. 3, 2014, and No. 2015-045147 filed on Mar. 6, 2015. The entire disclosures of all of the above applications are incorporated herein by reference.

TECHNICAL FIELD

The present disclosure relates to a display device including a liquid crystal panel.

BACKGROUND ART

In some display devices according to the related art, a displayed content is changed by movement of a real object such as a pointer to point at a scale. In the display devices disclosed in Patent Documents 1 and 2, in contrast, various changes in displayed content are realized with ease by an image imitating the real object being displayed on a liquid crystal panel.

The liquid crystal panel entails physical limitations in terms of the three-dimensional visual recognition of the displayed image, which results in a disadvantage in the form of a planar appearance in comparison to the display devices using the real object. In the display devices disclosed in Patent Documents 1 and 2, a decorative ring as a real object is placed on a viewing direction near side with respect to the liquid crystal panel for this disadvantage to be tackled. The decorative ring is visually recognized in a three-dimensional form, and thus is capable of giving a sense of depth to the planar appearance of the liquid crystal panel. Accordingly, the entire display device can be given a three-dimensional appearance based on a combination between the liquid crystal panel and the decorative ring.

However, the placement of the decorative ring (real object) on the near side of the liquid crystal panel described above causes a part of the image on the liquid crystal panel to be blocked by the real object and become invisible, and thus the entire display surface of the liquid crystal panel cannot be effectively used in some cases.

When the real member is simply placed on the near side of the liquid crystal panel as described above, the sense of depth can be given to only two stages, one being the content displayed on the liquid crystal panel and the other one being the real member on the near side of the liquid crystal panel. Accordingly, the three-dimensional appearance is insufficient in some cases.

PRIOR ART DOCUMENT

Patent Document

Patent Document 1: JP 5180150 B2
Patent Document 2: JP 4787102 B2

SUMMARY

An object of the present disclosure is to provide a display device in which the entire display surface of a liquid crystal panel can be effectively used while a sense of depth is given to the display device by the liquid crystal panel being combined with a real object.

Another object of the present disclosure is to provide a display device that has an enhanced three-dimensional appearance based on an enhanced sense of depth.

According to a first aspect of the present disclosure, a display device includes a liquid crystal panel providing a display surface where an image is displayed, a backlight emitting light to the liquid crystal panel from behind, a real object being placed between the liquid crystal panel and the backlight and visible through the liquid crystal panel, and a controller controlling the liquid crystal panel such that a specific pixel region of the display surface behind which the real object is positioned is higher in light transmittance than another pixel region of the display surface.

According to the first aspect, the real object is placed between the liquid crystal panel and the backlight, and thus a part of the image on the liquid crystal panel being blocked by the real object and becoming invisible can be avoided. Accordingly, the entire display surface of the liquid crystal panel can be effectively used while a sense of depth is given by the liquid crystal panel being combined with the real object.

According to the first aspect, the transmittance of the specific pixel region behind which the real object is positioned is higher than the transmittance of the other pixel region, and thus the real object is easily visible through the specific pixel region. On the other hand, in the other pixel region, an object present behind the liquid crystal panel is hardly visible. Accordingly, the real object visible through the specific pixel region stands out and attraction of attention to the real object is promoted. In other words, the visual attractiveness of the real object can be improved.

According to a second aspect of the present disclosure, a display device includes a liquid crystal panel providing a display surface where an image is displayed, a backlight emitting light to the liquid crystal panel from behind, a decorative member decorating the image, the decorative member being a real object placed between the liquid crystal panel and the backlight and visible through the liquid crystal panel, and a controller controlling the liquid crystal panel such that a specific pixel region of the display surface behind which the decorative member is positioned is higher in light transmittance than another pixel region of the display surface.

According to the second aspect, the decorative member decorating the image displayed on the liquid crystal panel is placed between the liquid crystal panel and the backlight, and thus a part of the image on the liquid crystal panel being blocked by the real object and becoming invisible can be avoided. Accordingly, the entire display surface of the liquid crystal panel can be effectively used while a sense of depth is given by the liquid crystal panel being combined with the real object.

According to the second aspect, the transmittance of the specific pixel region behind which the decorative member is positioned is higher than the transmittance of the other pixel region, and thus the real object is easily visible through the specific pixel region. On the other hand, in the other pixel region, an object present behind the liquid crystal panel is hardly visible. Accordingly, the decorative member visible through the specific pixel region stands out and attraction of attention to the decorative member is promoted. In other words, the visual attractiveness of the decorative member can be improved.

According to a third aspect of the present disclosure, a display device includes a liquid crystal panel displaying an image, a backlight emitting light to the liquid crystal panel from behind, a real object being placed between the liquid crystal panel and the backlight and visible through the liquid crystal panel, and a reflecting surface visualizing a virtual image at a position overlapped with the liquid crystal panel by reflecting a light used for displaying the virtual image. The reflecting surface is provided on a surface of the liquid crystal panel.

According to the third aspect, the real object is placed between the liquid crystal panel and the backlight, and thus a part of the image on the liquid crystal panel being blocked by the real object and becoming invisible can be avoided. Accordingly, the entire display surface of the liquid crystal panel can be effectively used while a sense of depth is given by the liquid crystal panel being combined with the real object.

According to the third aspect, not only the real object but also the virtual image is visible on the far side of the image displayed on the liquid crystal panel, and thus the display mode by the display device can be enriched in terms of variation. In addition, the reflecting surface for the display of the virtual image is provided on the surface of the liquid crystal panel, and thus a reflecting surface separate from the liquid crystal panel does not have to be provided and the display device can be compact in size.

According to a fourth aspect of the present disclosure, a display device includes a liquid crystal panel providing a display surface where an image is displayed, a backlight emitting light to the liquid crystal panel from behind, a real object being placed between the liquid crystal panel and the backlight and visible through the liquid crystal panel, an actuator moving the real object between the liquid crystal panel and the backlight, and a controller controlling the liquid crystal panel such that a specific pixel region of the display surface behind which the real object is positioned is higher in light transmittance than another pixel region of the display surface.

According to the fourth aspect, the real object moved by the actuator is placed between the liquid crystal panel and the backlight, and thus a part of the image on the liquid crystal panel being blocked by the real object and becoming invisible can be avoided. Accordingly, the entire display surface of the liquid crystal panel can be effectively used while a sense of depth is given by the liquid crystal panel being combined with the movable real object.

According to the fourth aspect, the transmittance of the specific pixel region behind which the real object is positioned is higher than the transmittance of the other pixel region, and thus the real object is easily visible through the specific pixel region. On the other hand, in the other pixel region, an object present behind the liquid crystal panel is hardly visible. Accordingly, the real object visible through the specific pixel region stands out and attraction of attention to the real object is promoted. In other words, the visual attractiveness of the movable real object can be improved.

According to a fifth aspect of the present disclosure, a display device includes a liquid crystal panel providing a display surface where an image is displayed, a backlight emitting light to the liquid crystal panel from its back side that is an opposite side from the display surface, a back-side real member being placed between the liquid crystal panel and the backlight and visible through the liquid crystal panel, and a display surface real member visible on a front side of the display surface of the liquid crystal panel.

According to the fifth aspect, a sense of depth can be given by three types of members and images, that is, the display surface real member, the images displayed on the liquid crystal panel, and the back-side real member. Accordingly, the display device has an enhanced three-dimensional appearance.

According to a sixth aspect of the present disclosure, a display device includes a liquid crystal panel providing a display surface where an image is displayed, a backlight emitting light to the liquid crystal panel from its back side that is an opposite side from the display surface, a back-side real member placed between the liquid crystal panel and the backlight and visible through the liquid crystal panel, and a magnifying lens unit positioned on a front side of the display surface of the liquid crystal panel. The magnifying lens unit enlarges the back-side real member through the liquid crystal panel.

According to the sixth aspect, the back-side real member is expanded by the magnifying lens unit. As a result, an increased far-direction distance is visually recognized between the back-side real member and the images displayed on the liquid crystal panel. Accordingly, a sense of depth can be enhanced and the display device has an enhanced three-dimensional appearance.

DESCRIPTION OF EMBODIMENTS

Figure 1:
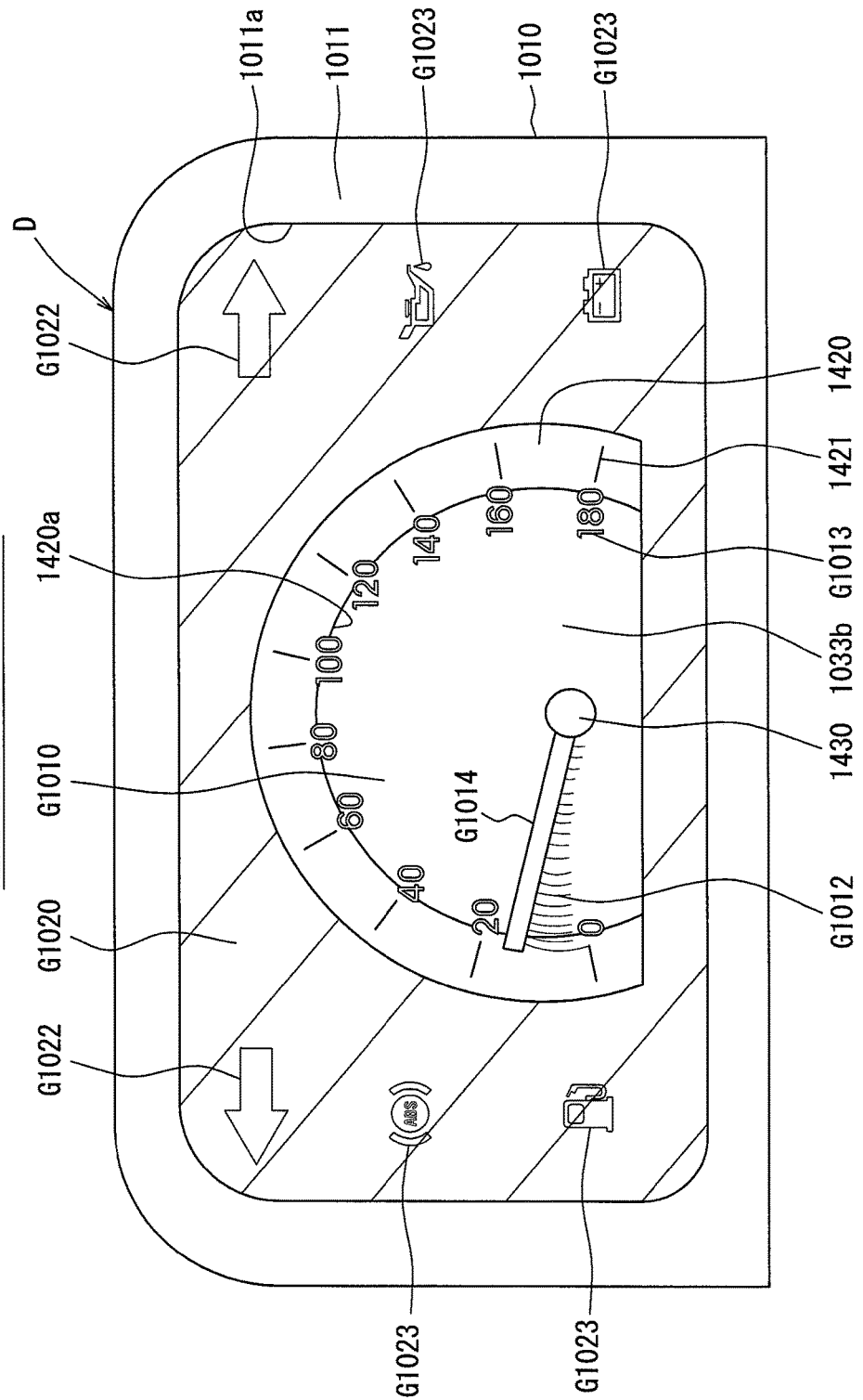
FIG. 1 is a front view of a display device according to a first embodiment of the present disclosure, in which content displayed in a real object display mode is illustrated.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A display device D illustrated in FIG. 1 is a vehicular display device assembled in an instrument panel in a vehicle. The display device D displays changes in various physical quantities showing states of the vehicle, such as a traveling speed of the vehicle and electric power remaining in an automotive battery, displays the occurrence of various abnormalities in the case of such abnormalities, and displays an effect image.

Figure 2:
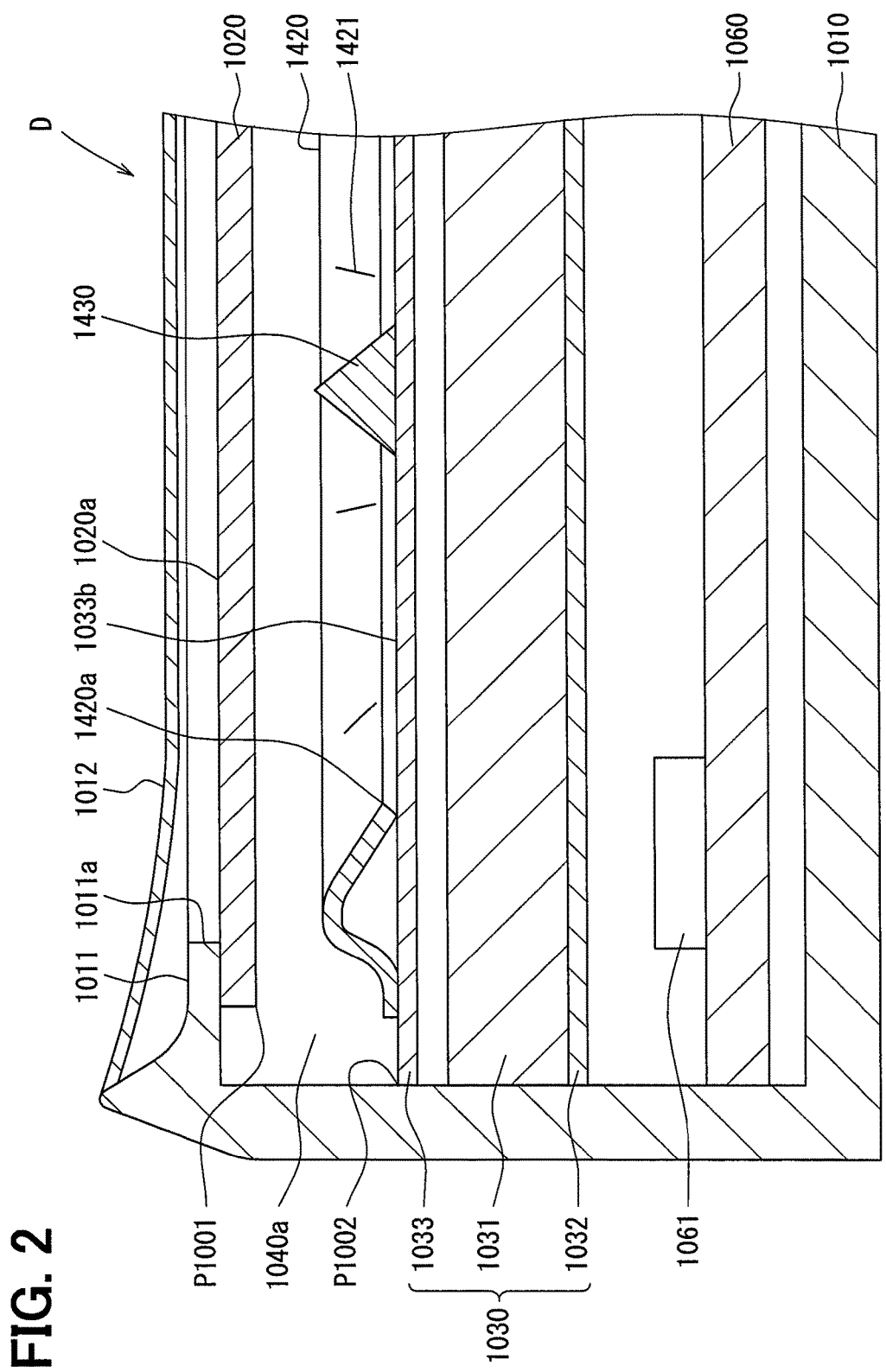
FIG. 2 is a cross-sectional view illustrating a part of the display device according to the first embodiment.

As illustrated in FIG. 2, the display device D is configured to be mainly provided with a case 1010, a liquid crystal panel 1020, a backlight 1030, a decorative ring 1420, a decorative boss member 1430, and a circuit board 1060. The liquid crystal panel 1020, the backlight 1030, the circuit board 1060, and the like are accommodated and held in the case 1010, which is a resinous case that has a light shielding property.

The liquid crystal panel 1020 is a TFT liquid crystal panel that is configured to have a liquid crystal layer in which a liquid crystal is held, a pair of electrodes placed on both sides of the liquid crystal layer, a color filter substrate, and a pair of polarizing films. The electrode is a matrix electrode in which a row electrode and a column electrode are combined with each other and is configured as a transparent electrode disposed for each pixel, and a voltage applied to the electrode is controlled by a thin film transistor. The color filter substrate has a red filter, a green filter, and a blue filter, and each of the filters is placed for each pixel (for each electrode). A thin film transistor (TFT, not illustrated) turning ON and OFF each pixel is provided as well. The polarizing film is a filter through which light vibrating in a predetermined direction is transmitted to be given a predetermined regulated vibration direction. The pair of polarizing films are placed such that the vibration directions have a deviation of 90°. This TFT liquid crystal panel is a known structure.

Figure 3:
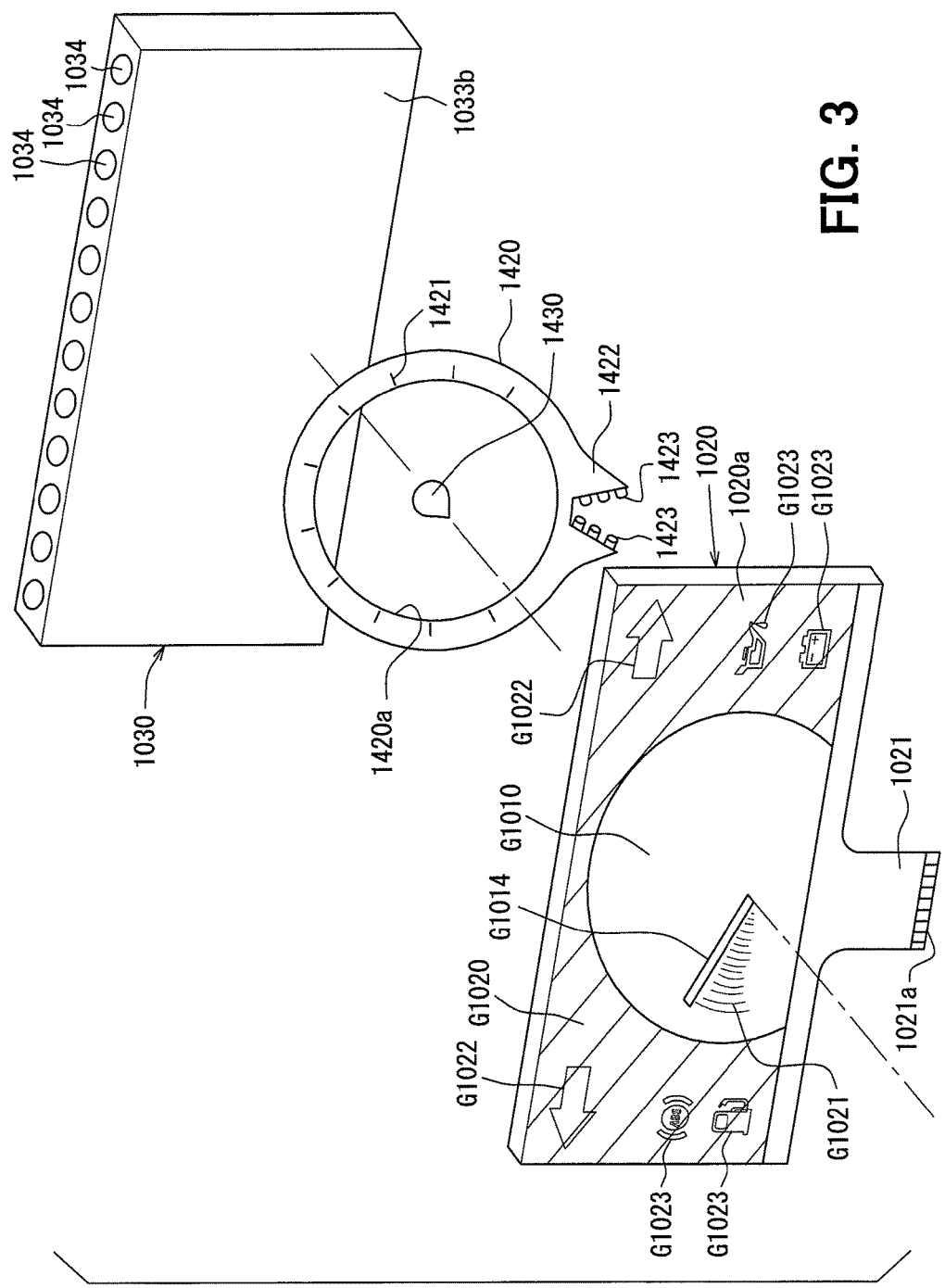
FIG. 3 is an exploded view of the display device according to the first embodiment.

The backlight 1030 is configured to have a light guide plate 1031, a reflecting plate 1032, a diffusion plate 1033, and light sources 1034 (refer to FIG. 3). The light source 1034 emits white light with a light emitting diode adopted, and the multiple light sources 1034 are placed at positions facing a side surface of the light guide plate 1031. The light that is emitted from the light sources 1034 is incident upon the light guide plate 1031 from the side surface, moves into the light guide plate 1031 while being reflected by the reflecting plate 1032, and then is emitted from the front face side of the light guide plate 1031 (upper side in FIG. 2). The light emitted from the light guide plate 1031 is transmitted while being diffuse-reflected by the diffusion plate 1033. This results in a state where the entire diffusion plate 1033 performs surface emission, and light that is uniform and has little unevenness with respect to the entire surface of the liquid crystal panel 1020 is emitted from the backlight 1030 to the liquid crystal panel 1020.

The diffusion plate 1033 is placed such that a predetermined gap is formed between the diffusion plate 1033 and the front face side of the light guide plate 1031 whereas the reflecting plate 1032 is placed in close contact with the back side of the light guide plate 1031. This gap is optional though. The liquid crystal panel 1020 is placed such that a predetermined gap 1040a is formed between the front face side of the diffusion plate 1033 and the liquid crystal panel 1020, and the decorative ring 1420 and the decorative boss member 1430, which are real objects, are placed in this gap 1040a. The decorative ring 1420 and the decorative boss member 1430 are fixed in a state where the decorative ring 1420 and the decorative boss member 1430 are in contact with the front face-side surface of the diffusion plate 1033.

As illustrated in FIG. 3, the decorative boss member 1430, which has a conical shape and is placed to protrude toward the liquid crystal panel 1020 side, is a resinous member that has a plated conical surface. The plating is reflection-colored in the same color as a pointer image G1014 (described later). For example, the plating is reflection-colored in LED light red emitted from an inner peripheral side edge 1420a of the decorative ring 1420. The decorative boss member 1430 is placed at the center of the decorative ring 1420.

The decorative ring 1420 is formed of light transmissive resin and has a ring shape (annular shape), and the decorative ring 1420 according to the present embodiment has a circular ring shape. The decorative ring 1420 is shaped such that the decorative ring 1420 is raised to the front face side from a surface of the decorative ring 1420 that is in contact with the diffusion plate 1033. Multiple grooves are provided in the front face-side surface of the decorative ring 1420, and these grooves, which have a stripe shape and extend in the radial direction of the decorative ring 1420, function as scales 1421 pointed at by the pointer image G1014.

The decorative ring 1420 has a light guide portion 1422, and the decorative ring 1420 and the light guide portion 1422 are integrally formed of resin. Light emitting diode-based light sources 1423 are attached to a side surface of the light guide portion 1422. Light emitted from the light sources 1423 is incident from the side surface of the light guide portion 1422, moves into the light guide portion 1422 and the decorative ring 1420, is reflected by the grooves forming the scales 1421, and then is emitted from the front face side of the decorative ring 1420 (upper side in FIG. 2). The light reflected by the scales 1421 is transmitted through a specific pixel region G1010 (described later) of the liquid crystal panel 1020 and is visually recognized by a user.

Accordingly, the scale 1421 parts appear to be shining once the light sources 1423 are turned on. The light sources 1423 consist of three types of light sources, red, green, and blue to be specific, and the color of the light that is emitted from the decorative ring 1420 can be adjusted by a microcomputer 1061 controlling the luminance of each of the light sources 1423. In other words, the scales 1421 can be visually recognized in a desired color.

The liquid crystal panel 1020 has a flexible wiring board 1021, and a terminal 1021a provided at a tip of the flexible wiring board 1021 is connected to the circuit board 1060 on which a microcomputer (microcomputer 1061) is mounted. The microcomputer 1061 has a central processing unit, a memory, and the like, and executes various types of calculation processing in accordance with a program stored in advance. An image signal that is output from the circuit board 1060 to the liquid crystal panel 1020 is transmitted to the electrode of the liquid crystal panel 1020 via the flexible wiring board 1021. In other words, content of an image that is displayed on a display surface 1020a of the liquid crystal panel 1020 is controlled by the microcomputer 1061.

The circuit board 1060 acquires various types of information from electronic controllers mounted outside the display device D among electronic controllers mounted in the vehicle and controls the content displayed on the liquid crystal panel 1020 based on the acquired information. Specific examples of the information include information showing the changes in the various physical quantities that show the states of the vehicle, such as the traveling speed of the vehicle and the electric power remaining in the automotive battery, and information showing the occurrence of the various abnormalities.

As illustrated in FIG. 2, the case 1010 has a facing plate 1011 that is positioned on the front face side of the liquid crystal panel 1020, and an opening portion 1011a is provided in the facing plate 1011. As a result, the part of the display surface 1020a of the liquid crystal panel 1020 that is positioned inside the opening portion 1011a becomes a visible region, and this visible region is identified by being partitioned by the facing plate 1011. An outer edge part P1001 (refer to FIG. 2) of the liquid crystal panel 1020 is covered and hidden by the facing plate 1011. A cover 1012, which covers the facing plate 1011 from the front face side, is attached to the case 1010. The cover 1012 is a resinous cover that has a light transmissive property.

Once the light source 1034 of the backlight 1030 is turned on, the light that is emitted from the front face-side surface of the diffusion plate 1033 (light emitting surface 1033b) is transmitted through the liquid crystal panel 1020 and is emitted to the front face side of the display device D through the opening portion 1011a and the cover 1012. As a result, the liquid crystal panel 1020 is subjected to transmitted illumination and the image displayed on the display surface 1020a is visually recognized by the user. Specifically, the transmittance (light transmission property) of the light with respect to each corresponding pixel changes in accordance with the applied voltage to the electrode placed for each pixel in the liquid crystal panel 1020.

When the applied voltage is controlled such that the transmittance is maximized for each of the electrodes corresponding to the red filter, the green filter, and the blue filter, for example, the luminance of the light transmitted through each of the filters is maximized. As a result, the corresponding pixel is visually recognized as a white pixel. In other words, the corresponding pixel is visually recognized in the luminescent color of the diffusion plate 1033. When the applied voltage is controlled such that the transmittance is minimized for each of the electrodes corresponding to the respective filters, the luminance of the light transmitted through each of the filters is minimized. As a result, the corresponding pixel is visually recognized as a black pixel.

Among the region of the display surface 1020a, in the region where the transmittance is increased as described above (specific pixel region G1010), the object that is positioned on the back side of the region, that is, the decorative ring 1420, the decorative boss member 1430, or the diffusion plate 1033, is visible through the liquid crystal panel 1020. Specifically, the light that is emitted from the backlight 1030 and reflected by the plated part of the decorative boss member 1430 and the light that is emitted from the backlight 1030 and emitted from the inner peripheral side edge 1420a of the decorative ring 1420 are transmitted through the specific pixel region G1010 and are visually recognized by the user. In addition, the light that is emitted from the light sources 1423 and reflected by the scales 1421 is transmitted through the specific pixel region G1010 and is visually recognized. Furthermore, the light that is emitted from the part of the backlight 1030 which is positioned on the inner peripheral side of the decorative ring 1420 is transmitted through the specific pixel region G1010 and is visually recognized by the user as a background image.

In a region (another pixel region G1020) of the display surface 1020a where the transmittance is controlled such that the transmittance is lower than in the specific pixel region G1010, an object that is positioned on the back side of the region cannot be visually recognized. In other words, the light that is directed toward the liquid crystal panel 1020 from the decorative ring 1420 or the decorative boss member 1430, which is a real object, is not transmitted through the other pixel region G1020 and thus is invisible to the user. The oblique lines that are illustrated in FIGS. 1, 3, 4, and 5 mean the range of the other pixel region G1020, another pixel region G1400, or a pixel region G1410 and do not mean cross-sectional hatching.

As the transmittance is controlled such that the transmittance increases, the degree to which the light from the real object is transmitted through the liquid crystal panel 1020 increases and the decorative boss member 1430, the inner peripheral side edge 1420a, and the scales 1421 become more and more clearly visible. As the transmittance is reduced, the degree to which the light from the decorative boss member 1430, the inner peripheral side edge 1420a, and the scales 1421 is transmitted through the liquid crystal panel 1020 decreases and the decorative boss member 1430, the inner peripheral side edge 1420a, and the scales 1421 become increasingly blurry during visual recognition.

In other words, switching can be performed between a real object display mode in which the real object is visually recognized (refer to FIGS. 1 and 4) and a real object hidden mode in which the real object is invisible (refer to FIG. 5) by the transmittance of the liquid crystal panel 1020 being controlled. In the real object display mode, the display device D can be visually recognized in the following manner as well. For example, the degree to which the real object is visually recognized in a blurry form can be adjusted based on transmittance adjustment because the definition of the real object (degree of the blur) can be controlled in accordance with the degree of transmittance of the liquid crystal panel 1020. In addition, an image displayed in the specific pixel region G1010 and the real object can be visually recognized with the image and the real object overlapped with each other. Furthermore, when the part of the specific pixel region G1010 with which the real object is overlapped is displayed in a different color from the other part, an illusion can be created as if the real object had that display color.

In the real object display mode that is illustrated in FIG. 1, the region of the display surface 1020a that includes the entire decorative ring 1420 and the entire decorative boss member 1430 is set as the specific pixel region G1010 and the entire outside of the specific pixel region G1010 is set as the other pixel region G1020. The pointer image G1014 pointing at the scales 1421, number images G1013 showing numerical values corresponding to the scales 1421, and a shadow image G1012 are displayed in the specific pixel region G1010. The shadow image G1012 is an image showing an afterimage of a pointer in the form of imaged radar. A vehicle speed is displayed based on a combination between the pointer image G1014 and the scale 1421 by the display position of the pointer image G1014 being controlled in accordance with the vehicle speed.

The shadow image G1012 is an image imitating a shadow that extends from the pointer image G1014 to the side opposite in its rotational direction. Accordingly, the shadow image G1012 has a display position varying with the display position of the pointer image G1014. The shadow image G1012 has a rotational-direction length set to increase as the rotation speed of the pointer image G1014 increases.

In the real object display mode that is illustrated in FIG. 1, a black image displayed in the other pixel region G1020 is a background and the diffusion plate 1033, the decorative ring 1420, the decorative boss member 1430, the pointer image G1014, the number images G1013 and the shadow image G1012 are visually recognized in combination. In addition, parallax attributable to a difference in focal length occurs among the display surface 1020a, the real object, and the diffusion plate 1033 because of a difference in optical path length in a viewing direction. In other words, the real object is visually recognized as being present on the viewing direction far side (back side) of the display surface 1020a and the diffusion plate 1033 is visually recognized as being present further on the far side of the real object.

The black background image is displayed in the other pixel region G1020. In addition, direction indication images G1022 displaying a blinker operation direction and warning images G1023 for display of warning against the various abnormalities are displayed in the other pixel region G1020 with the background image forming the background. Each of the images that are displayed in the other pixel region G1020, that is, the direction indication images G1022, the warning images G1023, and the black background image, has a transmittance set such that the images are non-transmissive (RGB being OFF without exception). A white background image displayed in the specific pixel region G1010 has a transmittance set such that the image is fully transmissive (RGB being ON without exception).

Figure 4:
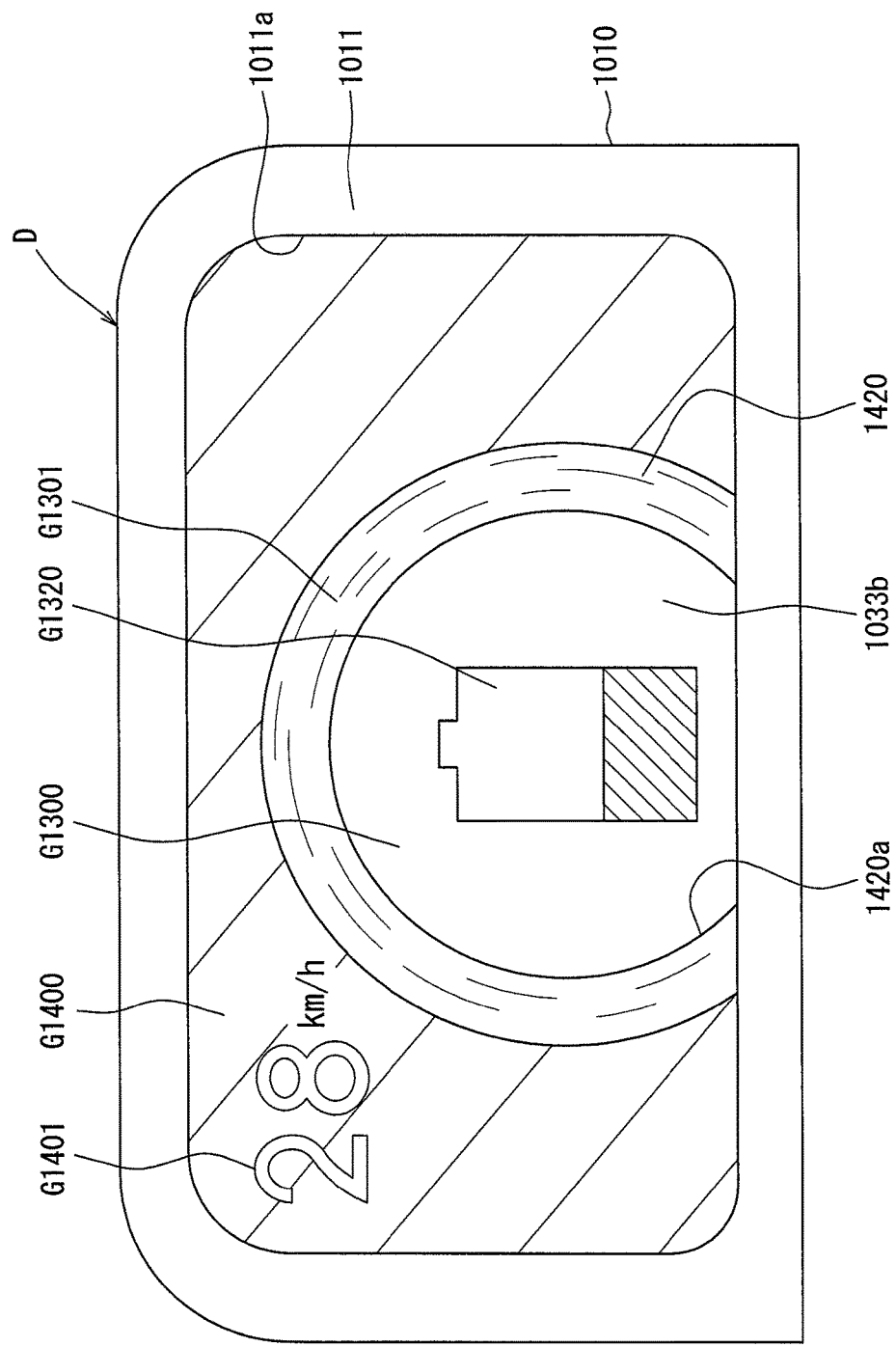
FIG. 4 is a front view of the display device according to the first embodiment, in which content displayed in another real object display mode is illustrated.

In the real object display mode that is illustrated in FIG. 4, the region of the display surface 1020a that includes the decorative ring 1420 and the decorative boss member 1430 is set as a specific pixel region G1300 and the entire outside of the specific pixel region G1300 is set as the other pixel region G1400. A remaining electric power image G1320 that shows the amount of the electric power remaining in the battery and a ring image G1301 that has the same shape as the decorative ring 1420 are displayed in the specific pixel region G1300. When rotation of the ring image G1301 about the decorative boss member 1430 is displayed, an illusion is created as if the decorative ring 1420 actually rotated. In this manner, the user can recognize that charging is in progress.

A black background image is displayed in the other pixel region G1400. In addition, a vehicle speed image G1401 showing the vehicle speed in the form of a numerical value is displayed in the other pixel region G1400 with the background image forming the background. The transmittance of the background image and the transmittance of the vehicle speed image G1401 are set to be lower than a predetermined value. The ring image G1301 that is displayed in the specific pixel region G1300 has a transmittance set to be equal to or higher than a predetermined value. In the example that is illustrated in FIG. 4, the decorative boss member 1430 is invisible because the transmittance of the remaining electric power image G1320 is set to be lower than a predetermined value. Accordingly, the region where the remaining electric power image G1320 is displayed is a part of the other pixel region where the real object is invisible.

Figure 5:
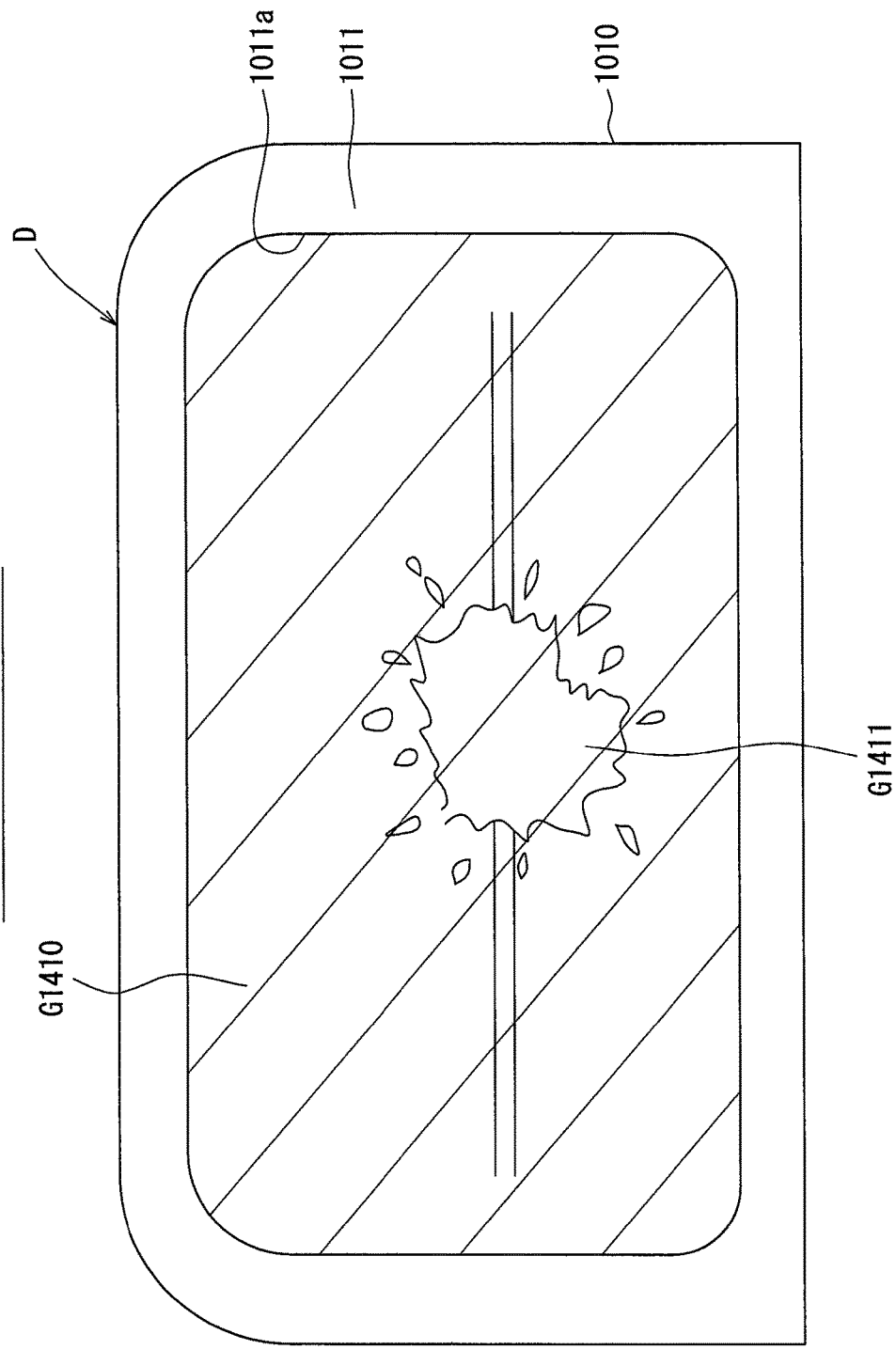
FIG. 5 is a front view of the display device according to the first embodiment, in which content displayed in a real object hidden mode is illustrated.

In the real object hidden mode that is illustrated in FIG. 5, the entire display surface 1020a is set in the pixel region G1410 that is displayed at a transmittance which is so low that the real object is invisible. An effect image G1411 is displayed in the pixel region G1410 and the effect image G1411 has a low transmittance set to be lower than a predetermined value. Accordingly, a state arises where neither the decorative ring 1420 nor the decorative boss member 1430 can be visually recognized by the user. The real object hidden mode that is illustrated in FIG. 5 is an example of a termination effect mode or an initiation effect mode.

Figure 6:
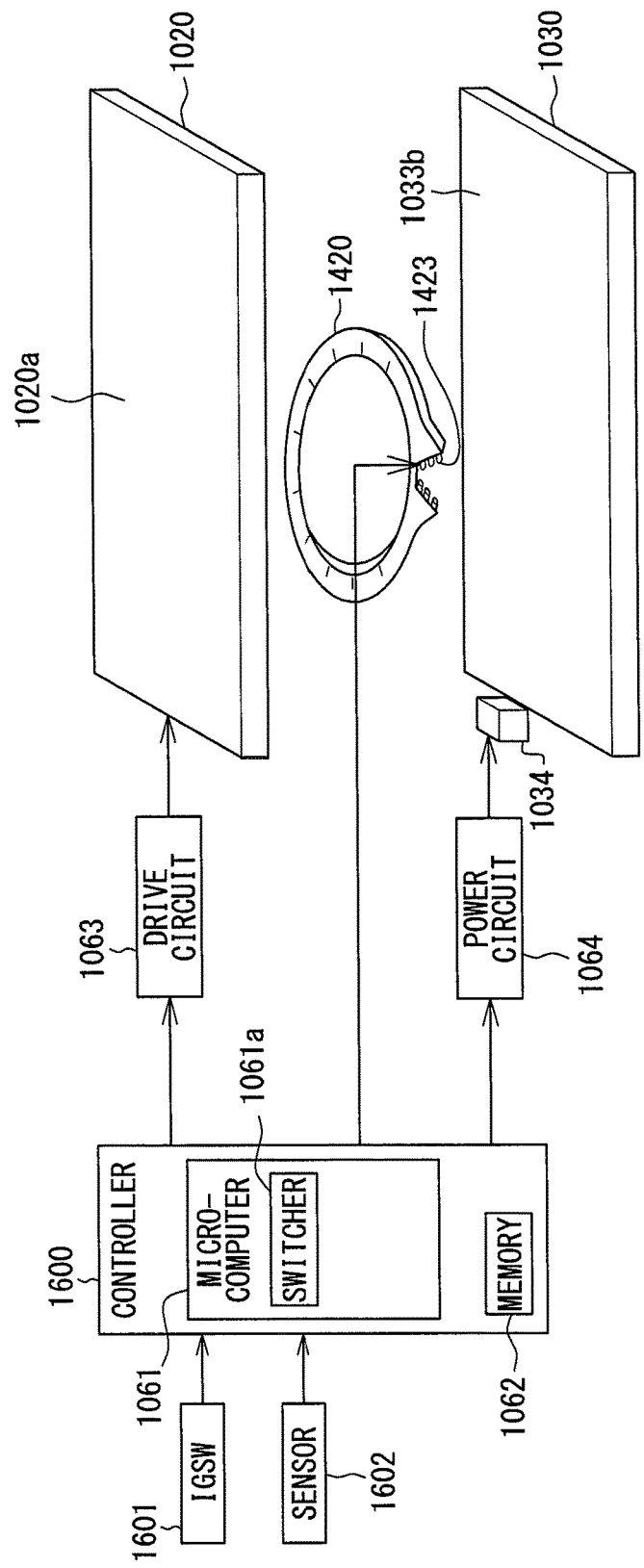
FIG. 6 is a schematic diagram illustrating a microcomputer and a control target of the microcomputer according to the first embodiment.

A drive circuit 1063 illustrated in FIG. 6, which is mounted on the circuit board 1060, controls driving of the thin film transistor of the liquid crystal panel 1020 described above in accordance with a command signal output from the microcomputer 1061. A power circuit 1064, which is mounted on the circuit board 1060, controls the amount of electric power supply to the light sources 1034 of the backlight 1030 in accordance with a command signal output from the microcomputer 1061. Specifically, the power circuit 1064 controls ON and OFF of the electric power supply to the light sources 1034.

The microcomputer 1061, a memory 1062, an input processing circuit, an output processing circuit, and the like are mounted on the circuit board 1060 and constitute a controller 1600. It can be said that this controller 1600 controls the display image on the liquid crystal panel 1020 by controlling the drive circuit 1063 and controls ON and OFF of the backlight 1030 by controlling the power circuit 1064.

Image data representing various images displayed on the liquid crystal panel 1020 is stored in the memory 1062. The microcomputer 1061 functions also as a switcher 1061a that performs display mode switching in response to the states of the vehicle. Once an ignition switch (IGSW 1601) is operated to be turned ON, for example, the electric power supply to the backlight 1030 is initiated and the liquid crystal panel 1020 is caused to perform displaying in the initiation effect mode, in which the effect image is displayed with visual recognition of the real object blocked. In a case where the IGSW 1601 is operated to be turned OFF, the liquid crystal panel 1020 is caused to perform displaying in the termination effect mode, in which the effect image is displayed with visual recognition of the real object blocked, and then the electric power supply to the backlight 1030 is terminated.

In a period between initiation effect mode termination and an OFF operation of the IGSW 1601, the display position of the pointer image G1014 is usually controlled based on the physical quantity such as the vehicle speed detected by a sensor 1602 and such that the physical quantity is pointed at. Specifically, the liquid crystal panel 1020 is caused to perform displaying in the real object display mode illustrated in FIG. 1. In this case, the user can change a display layout of the liquid crystal panel 1020 to suit his or her preference. Still, the transmittance of the other pixel region G1020 is lower than a predetermined value.

Switching to the real object display mode illustrated in FIG. 4 occurs when an event satisfying a predetermined condition occurs, examples thereof including a case where the amount of the electric power remaining in the automotive battery is less than a predetermined value and a case where the display switching is requested by the user. In the example that is illustrated in FIG. 4, the part of the display surface 1020a of the liquid crystal panel 1020 where the decorative boss member 1430 is positioned on its back side is subjected to display control to become the other pixel region so that the decorative boss member 1430 becomes invisible. The vehicle speed image G1401 is controlled to become an image showing the vehicle speed detected by the sensor 1602. Switching to the real object hidden mode illustrated in FIG. 5 occurs when another event occurs. In the example illustrated in FIG. 5, the entire surface of the display surface 1020a is subjected to display control to be reduced in transmittance so that both the decorative ring 1420 and the decorative boss member 1430 become invisible.

Figure 7:
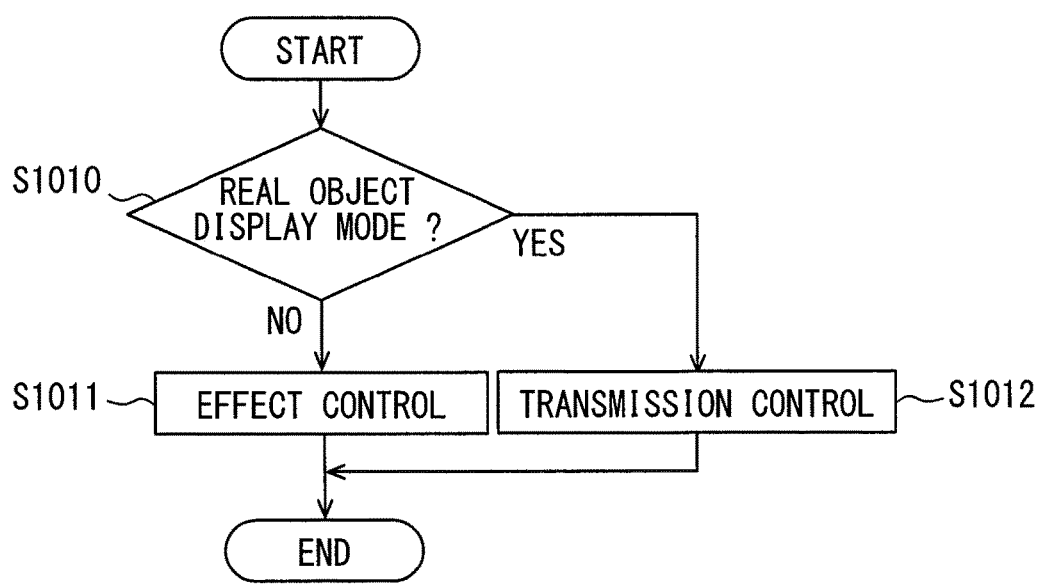
FIG. 7 is a flowchart illustrating a procedure of display control that is executed by the microcomputer according to the first embodiment.

FIG. 7 is a flowchart illustrating a procedure of processing that is repeatedly executed at a predetermined cycle by the central processing unit of the microcomputer 1061, in which it is first determined in Step S1010 whether or not the real object display mode has been requested. Examples in which the real object display mode in which the real object is allowed to be visually recognized by the user is requested include a case where the physical quantity is displayed by the scale 1421 of the decorative ring 1420 being pointed at by the pointer image G1014 and, specifically, those examples include a case where the vehicle speed is displayed as illustrated in FIG. 1. The specific examples of the real object display mode also include a case where the decorative ring 1420 is allowed to be visually recognized without the decorative boss member 1430 being allowed to be visually recognized as illustrated in FIG. 4.

Examples in which the real object hidden mode in which neither the decorative ring 1420 nor the decorative boss member 1430 is allowed to be visually recognized by the user is requested include a case where a focus is laid on the image displayed on the liquid crystal panel 1020. Specifically, those examples include a case where a focus is laid on an opening image (refer to FIG. 5) displayed when the display device D is started, an ending image displayed at the termination of the operation of the display device D, or the like.

In a case where it is determined in Step S1010 that the requested display mode is the hidden mode, the processing proceeds to the following Step S1011, in which effect control is executed for every real object to become invisible by the liquid crystal panel 1020 being caused to perform displaying as follows. During the effect control, an image that has a transmittance which is so low that the real object cannot be visually recognized is displayed on the entire surface of the display surface 1020a. In other words, the background image and the effect image G1411 described above are displayed. In the hidden mode, the entire surface of the display surface 1020a does not have to have a low transmittance and at least the display region at the part where the real object is positioned on its back side may have a low transmittance.

In a case where it is determined in Step S1010 that the requested display mode is the display mode, the processing proceeds to the following Step S1012, in which the transmittance of the specific pixel region G1010 is controlled for at least some of all of the real objects to become visible by the liquid crystal panel 1020 being caused to perform displaying as follows. The specific pixel region G1010 is set to include the decorative ring 1420 and the decorative boss member 1430. In addition, the pointer image G1014, the number images G1013, and the shadow image G1012 are displayed in the specific pixel region G1010. As a result, the pointer image G1014 points at the scale 1421 and the physical quantity such as the vehicle speed is displayed.

The diffusion plate 1033 is visually recognized in the region of the specific pixel region G1010 where no real object is present and the pointer image G1014, the number images G1013, and the shadow image G1012 are hidden. When this region has a transmittance of 100%, the diffusion plate 1033 in that case is visually recognized as performing surface emission in the color of the light sources 1034. In other words, the real object, the pointer image G1014, the number images G1013, and the shadow image G1012 are visually recognized with the diffusion plate 1033 forming the background. The other pixel region G1020 is controlled such that its transmittance is lower than that of the specific pixel region G1010. The microcomputer 1061 during the execution of the processing of Step S1010 is corresponding to a "switcher" that performs switching between the real object display mode and the real object hidden mode.

According to the present embodiment described above, the decorative ring 1420 and the decorative boss member 1430 as decorative members (real objects) decorating the image displayed on the liquid crystal panel 1020 are placed between the liquid crystal panel 1020 and the backlight 1030. Accordingly, a problem in the form of "a part of the image on the liquid crystal panel 1020 being blocked by the real object and becoming invisible", which occurs in a case where the real object is placed on the front face side of the liquid crystal panel 1020, can be avoided. Accordingly, the entire display surface 1020a of the liquid crystal panel 1020 can be effectively used while a sense of depth is given to the display device D by the liquid crystal panel 1020 being combined with the decorative member as a real object.

According to the present embodiment, the real object is visually recognized on the far side of the image on the liquid crystal panel 1020 and the diffusion plate 1033 is visually recognized on the far side of the real object. Accordingly, a layer display that has at least three layers can be realized and a depth-provided appearance can be improved.

According to the present embodiment, the specific pixel region G1010 at the part where the real object is positioned on its back side is higher in transmittance than the other pixel region G1020, and thus the real object is easily visible through the specific pixel region G1010. On the other hand, in the other pixel region G1020, the object (diffusion plate 1033) that is present on the back side of the liquid crystal panel 1020 is hardly visible. Accordingly, the real object visually recognized through the specific pixel region G1010 stands out and attraction of attention to the real object can be promoted.

In the present embodiment, the light sources 1423, which illuminate the decorative ring 1420 (decorative member), are provided in addition to the backlight 1030. Accordingly, the scales 1421 can be clearly visible when a sense of floating is generated based on the parallax between the scales 1421 of the decorative ring 1420 and the various images displayed on the liquid crystal panel 1020, and thus the sense of floating can be improved with the parallax highlighted.

According to the present embodiment, the scale 1421 as a real object is pointed at by the pointer image G1014. Accordingly, the scale 1421 is visually recognized on the far side of the pointer image G1014 and the depth-provided appearance can be improved. In addition, the sense of depth can be improved since the diffusion plate 1033, which is the background of the pointer image G1014, is visually recognized on the far side of the scale 1421.

According to the present embodiment, the liquid crystal panel 1020 is controlled such that the other pixel region G1020 becomes a black image. Accordingly, the diffusion plate 1033 is invisible in the other pixel region G1020, and the visual attractiveness of the decorative ring 1420 and the decorative boss member 1430 can be further improved since the luminance of the specific pixel region G1010 is higher than the luminance of the other pixel region G1020.

According to the present embodiment, switching occurs between the hidden mode (refer to FIG. 5) in which neither the decorative ring 1420 nor the decorative boss member 1430 is displayed and the display mode (refer to FIG. 4) in which the decorative ring 1420 is displayed while the decorative boss member 1430 is hidden. Since the real object is placed on the back side of the liquid crystal panel 1020 as described above, hiding of a desired real object can be realized with ease when a low luminance region (the other region) attributable to the liquid crystal panel 1020 is changed.

(Second Embodiment)

Figure 8:
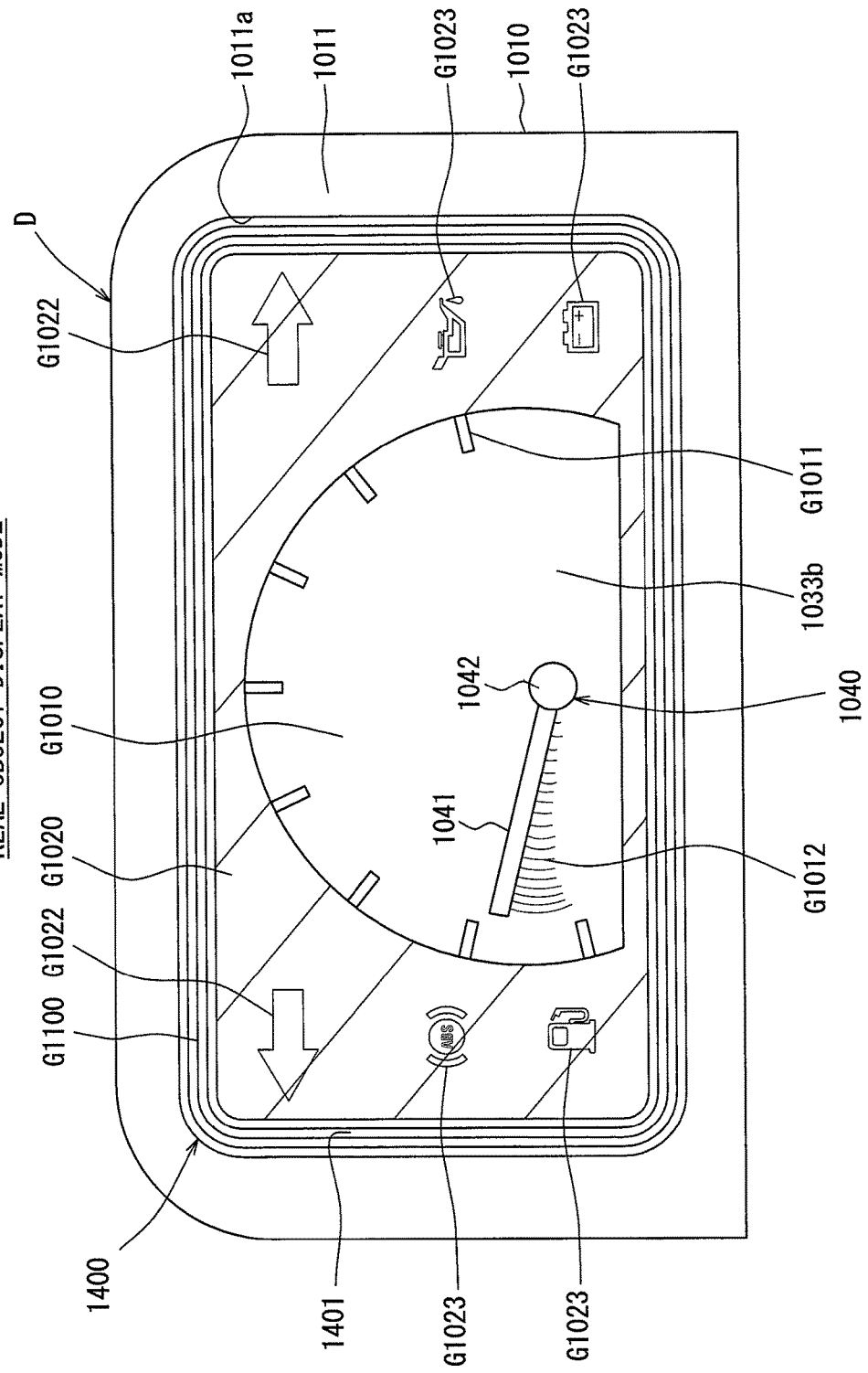
FIG. 8 is a front view of a display device according to a second embodiment of the present disclosure, in which content displayed in a real object display mode is illustrated.
Figure 9:
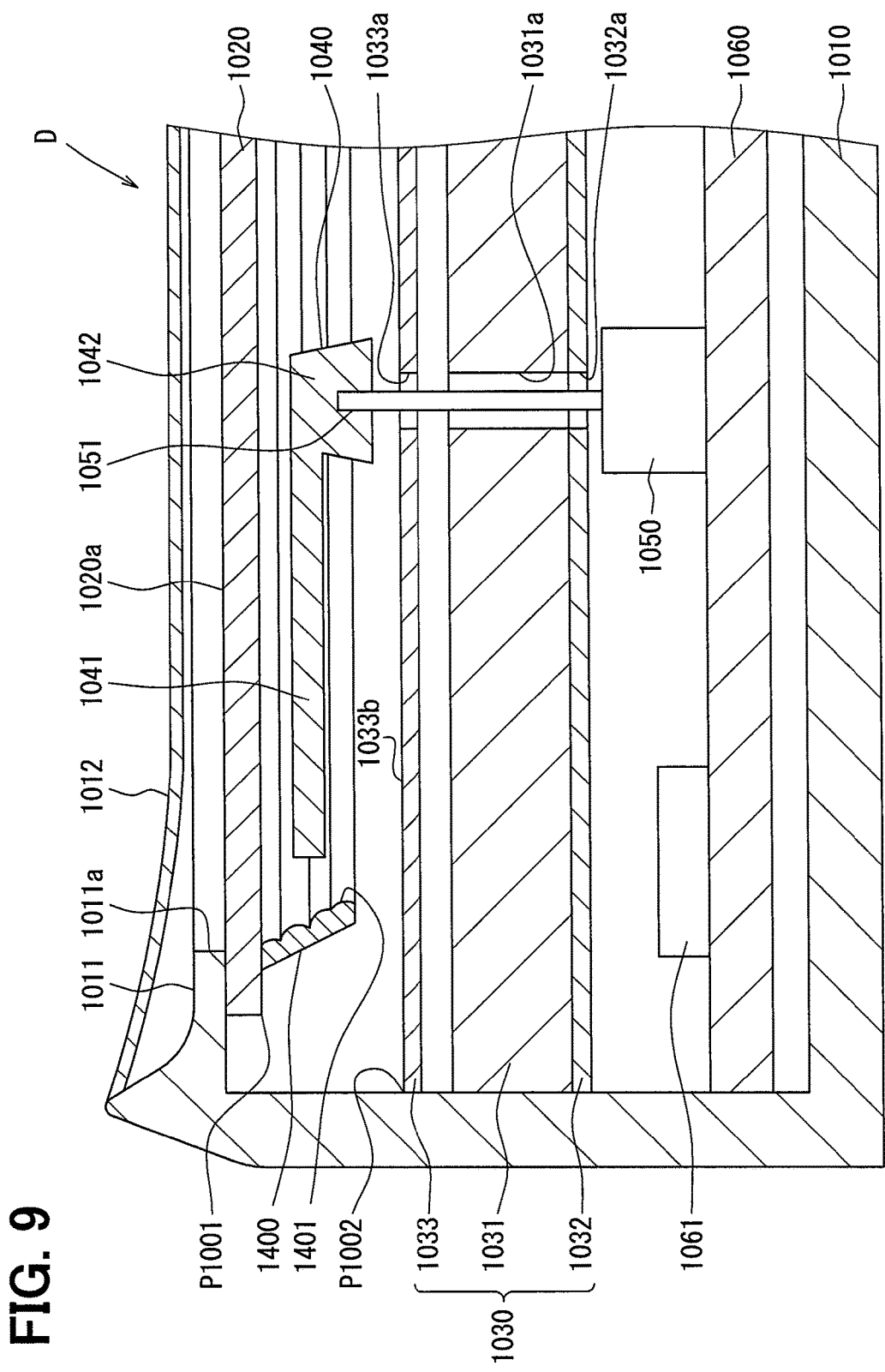
FIG. 9 is a cross-sectional view illustrating a part of the display device according to the second embodiment.

In the present embodiment, real objects include a pointer 1040 and a wall member 1400 extending along an outer edge of a visible region of a display surface 1020a as illustrated in FIGS. 8 and 9. The outer edge of the visible region is identified by a wall surface of an opening portion 1011a of a facing plate 1011. The wall member 1400 has a tubular shape, extends in an annular shape along the outer edge, and is shaped such that its opening area increases in a direction toward a liquid crystal panel 1020. The pointer 1040 is positioned in the tubular shape of the wall member 1400. The wall member 1400 is a resinous member that has a light transmissive property.

The pointer 1040 has a pointer portion 1041 and a boss portion 1042.

The pointer portion 1041 and the boss portion 1042 are integrally formed of light transmissive resin. A rotating shaft 1051 is fixed to the boss portion 1042. The rotating shaft 1051 is placed to be inserted into through holes 1031a, 1032a, and 1033a, which are provided in a light guide plate 1031, a reflecting plate 1032, and a diffusion plate 1033, and is rotated by an electric motor 1050. The electric motor 1050 is attached to a circuit board 1060. The rotational position of the pointer 1040 is controlled by a microcomputer 1061 controlling driving of the electric motor 1050.

The inner peripheral surface of the wall member 1400 has an uneven shape, and light refracted in accordance with the unevenness is visually recognized through the liquid crystal panel 1020. Specifically, four convex portions 1401 extending in an annular shape are aligned on the inner peripheral surface of the wall member 1400 as illustrated in FIG. 9. A pixel region at the part of the display surface 1020a of the liquid crystal panel 1020 where the wall member 1400 is positioned on its back side is set as a specific pixel region G1100 higher in transmittance than the other pixel region G1020. Accordingly, the wall member 1400 is visually recognized through the specific pixel region G1100 as illustrated in FIG. 8. In a hidden mode, the transmittance of the positions of the liquid crystal panel 1020 that face the wall member 1400 and the pointer 1040 is lowered and the real objects are invisible.

According to the present embodiment described above, the pointer 1040 and the wall member 1400 are visually recognized on the far side of the liquid crystal panel 1020. Accordingly, a problem in the form of "a part of the image on the liquid crystal panel 1020 being blocked by the wall member and becoming invisible", which occurs in a case where the wall member and the pointer are placed on the front face side of the liquid crystal panel 1020, can be avoided. Accordingly, the entire display surface 1020a of the liquid crystal panel 1020 can be effectively used while a sense of depth is given to a display device D by the liquid crystal panel 1020 being combined with the wall member 1400 and the pointer 1040 as real objects.

(Third Embodiment)

Figure 10:
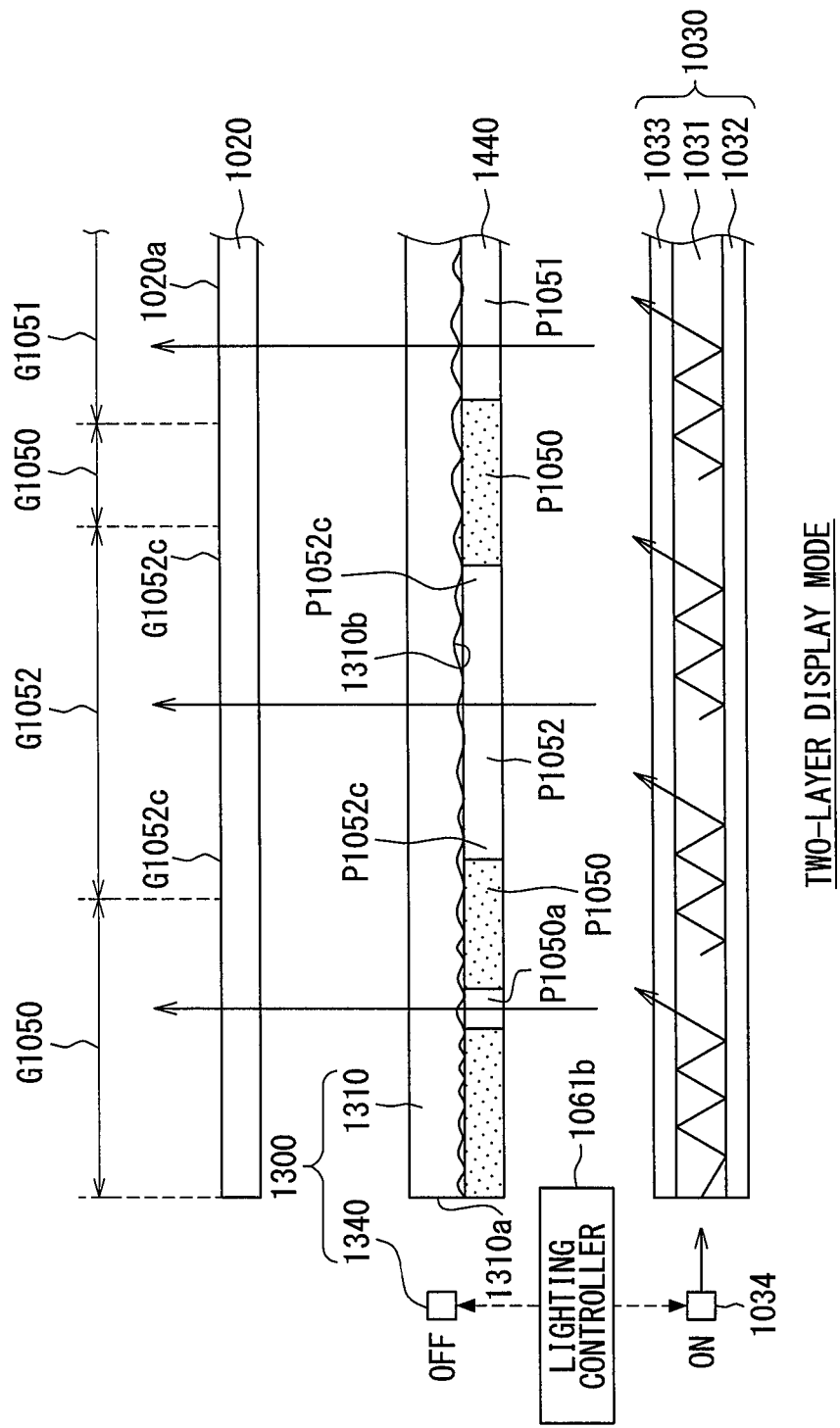
FIG. 10 is a cross-sectional view of a display device according to a third embodiment of the present disclosure, in which a state of lighting in a real object display mode is illustrated.

In the present embodiment, a decorative plate 1440 is placed between a backlight 1030 (first backlight) and a liquid crystal panel 1020 as illustrated in FIG. 10. The decorative plate 1440 is a resinous plate that has a light transmissive property, and shade regions P1050 blocking light transmission are disposed in predetermined regions of the decorative plate 1440. Halftone dots in the drawing represent the shade regions P1050. The shade regions P1050 are provided by, for example, a non-light transmissive paint such as a black non-light transmissive paint being applied to the predetermined regions of the decorative plate 1440, and the parts to which the paint is not applied are corresponding to light transmissive regions P1050a, P1050b, P1051, and P1052.

The decorative plate 1440 is placed in parallel to the backlight 1030, and is subjected to transmitted illumination by the backlight 1030 once a light source 1034 is turned on. Then, the shapes of the light transmissive regions P1050a, P1050b, P1051, and P1052 are visually recognized from the front face side (upper side in FIG. 10) by transmitted light emitted from the light transmissive regions P1050a, P1050b, P1051, and P1052 being viewed from the front face side. For example, the light transmissive region illustrated by Sign P1050a has a shape representing the numerical value, character, symbol, or the like of a meter-displayed physical quantity. The light transmissive region illustrated by Sign P1050b has a shape representing a scale indicated by a pointer image G1052a, which will be described later (refer to FIG. 12). The parts of the decorative plate 1440 that are occupied by the light transmissive regions P1050a and P1050b and the shade regions P1050 are corresponding to real objects (decorative members) visually recognized through the liquid crystal panel 1020.

A second backlight 1300, which emits light from the back side to the liquid crystal panel 1020, is placed between the decorative plate 1440 and the liquid crystal panel 1020. The second backlight 1300 is configured to have a light guide plate 1310 and second light sources 1340. The second light source 1340 emits white light with a light emitting diode adopted, and the multiple second light sources 1340 are placed at positions facing a side surface 1310a of the light guide plate 1310.

The light guide plate 1310 is provided in the shape of a plate and is formed of light transmissive resin. The light guide plate 1310 is placed between the decorative plate 1440 and the liquid crystal panel 1020 and is placed in parallel to the decorative plate 1440 and the liquid crystal panel 1020. The back face of the light guide plate 1310 is in contact with the decorative plate 1440, and the light guide plate 1310 has a surface separated from the liquid crystal panel 1020.

A reflecting surface 1310b, which reflects light guided into the light guide plate 1310 toward the liquid crystal panel 1020, is provided on the back face of the light guide plate 1310. The reflecting surface 1310b has an uneven shape, which causes the light to be diffused by diffuse reflection. The reflecting surface 1310b is provided by, for example, crimp processing being performed on the light guide plate 1310.

Figure 13:
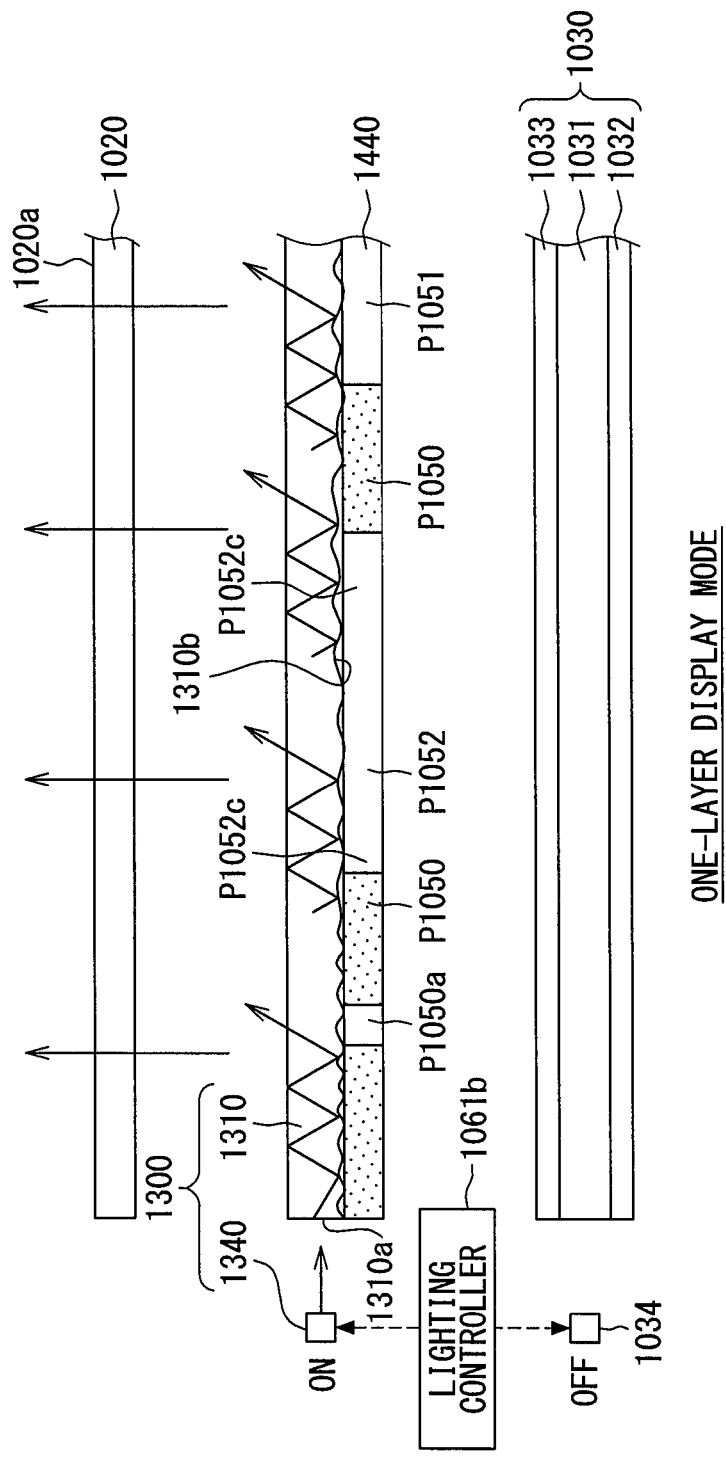
FIG. 13 is a cross-sectional view of the display device according to the third embodiment, in which a state of lighting in a real object hidden mode is illustrated.

Once the second light source 1340 is turned on as illustrated in FIG. 13, the light that is emitted from the second light source 1340 is incident from the side surface 1310a of the light guide plate 1310 and then moves into the light guide plate 1310 while being reflected by the back face (reflecting surface 1310b) of the light guide plate 1310 and the surface of the light guide plate 1310. Then, some of the light diffuse-reflected by the reflecting surface 1310b is emitted from the light guide plate 1310 toward the liquid crystal panel 1020. This results in a state where the entire light guide plate 1310 performs surface emission, and light that is uniform and has little unevenness with respect to the entire surface of the liquid crystal panel 1020 is emitted from the second backlight 1300 to the liquid crystal panel 1020.

In the present embodiment, the operation of the light source 1034 is controlled by a microcomputer 1061 of a controller 1600 as in the first embodiment illustrated in FIG. 6. The second light sources 1340 are controlled by the microcomputer 1061 as well. The microcomputer 1061 during the control of the operations of the second light sources 1340 and the light source 1034 is corresponding to a "lighting controller 1061b". The lighting controller 1061b controls the backlight 1030 such that the backlight 1030 is turned on when the second backlight 1300 is turned off (refer to FIG. 10) and controls the backlight 1030 such that the backlight 1030 is turned off when the second backlight 1300 is turned on (refer to FIG. 13). Hereinafter, the display mode that is illustrated in FIG. 10 will be referred to as a two-layer display mode and the display mode that is illustrated in FIG. 13 will be referred to as a one-layer display mode.

Figure 11:
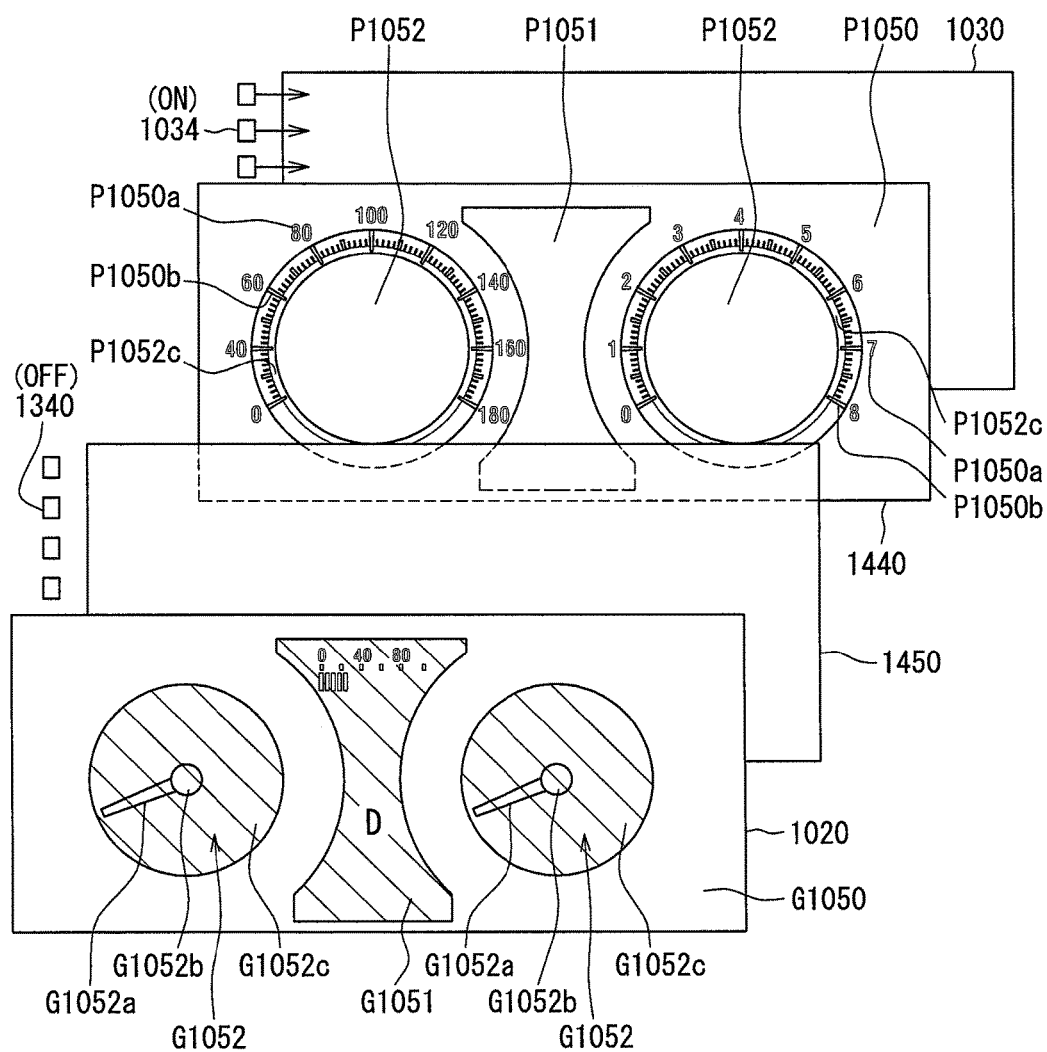
FIG. 11 is an exploded view schematically illustrating the display device in the real object display mode according to the third embodiment.
Figure 12:
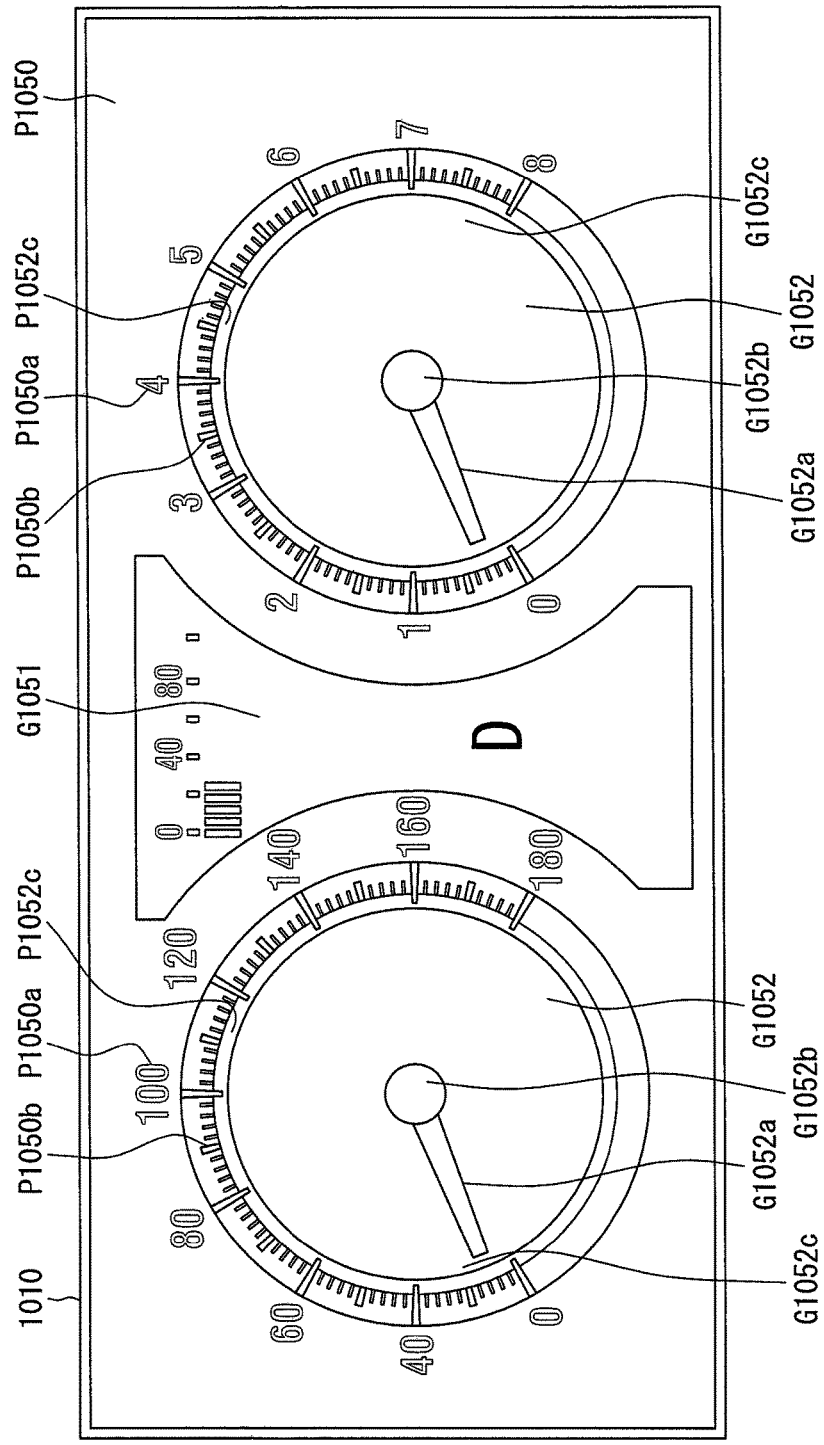
FIG. 12 is a front view of the display device according to the third embodiment, in which content displayed in the real object display mode is illustrated.

In the two-layer display mode, a display image illustrated in FIG. 11 is displayed on the liquid crystal panel 1020 and is visually recognized as illustrated in FIG. 12 by the decorative plate 1440 illuminated by the backlight 1030 and the display image on the liquid crystal panel 1020 being combined with each other.

In the two-layer display mode, pixel regions at the parts of a display surface 1020a of the liquid crystal panel 1020 where the parts of the decorative plate 1440 that are occupied by the shade regions P1050 and the light transmissive regions P1050a and P1050b (decorative members) are positioned on their back sides are corresponding to a specific pixel region G1050. Pixel regions at the parts of the display surface 1020a that are illustrated by the oblique lines illustrated in FIG. 11, that is, pixel regions at the parts of the display surface 1020a where the parts of the decorative plate 1440 occupied by the light transmissive regions P1051 and P1052 are positioned on their back sides are corresponding to other pixel regions G1051 and G1052. In the two-layer display mode, the controller 1600 controls the liquid crystal panel 1020 such that the specific pixel region G1050 is higher in light transmittance than the other pixel regions G1051 and G1052.

Specifically, in the specific pixel region G1050, the light transmittance of a red filter, a green filter, and a blue filter of the liquid crystal panel 1020 is maximized. As a result, the parts of the decorative plate 1440 subjected to transmitted illumination by the backlight 1030 that are occupied by the shade regions P1050 and the light transmissive regions P1050a and P1050b are visually recognized through the specific pixel region G1050.

In the other pixel regions G1051 and G1052, the light that is emitted from the backlight 1030 and is incident upon the liquid crystal panel 1020 through the light transmissive regions P1051 and P1052 is liquid crystal-displayed as a backlight light source. In the other pixel region G1051, images of various numbers, characters, symbols, scales, and the like are displayed with a black background image. The image displayed in the other pixel region G1051 is visually recognized with the shade regions P1050 of the decorative plate 1440 being its background (refer to FIG. 12).

In the other pixel regions G1052, the pointer images G1052a and boss images G1052b are displayed with the black background image. The pointer image G1052a is displayed in the form of rotation about the boss image G1052b such that the pointer image G1052a points at the scale visible by the light transmissive region P1050b of the decorative plate 1440. In other words, the scales and the numbers attributable to the light transmissive regions P1050a and P1050b of the decorative plate 1440 and the other pixel regions G1052 of the liquid crystal panel 1020 are combined with each other and are visually recognized as a speedometer and a tachometer (refer to FIG. 12). These meters are visually recognized with the shade regions P1050 of the decorative plate 1440 forming their background.

Gradation regions P1052c are provided at the parts of the light transmissive region P1052 that are adjacent to the shade regions P1050 and the light transmittance of the gradation regions P1052c gradually decreases in a direction toward the shade regions P1050. In addition, the controller 1600 controls the liquid crystal panel 1020 such that, in pixel regions G1052c at the parts of the liquid crystal panel 1020 that face the gradation regions P1052c, display luminance gradually decreases in a direction toward the shade regions P1050.

In a case where the display device is viewed directly from the front, a part of the gradation region P1052c and the pixel region G1052c, which is the other pixel region, are overlapped with each other and a part of the gradation region P1052c and the specific pixel region G1050 are overlapped with each other. Accordingly, a part of the gradation region P1052c and the pixel region G1052c are visually recognized as being adjacent to each other, and the range in which the gradation region P1052c is viewed changes when a viewer moves his or her viewpoint position by moving his or her head.

In the two-layer display mode, the specific pixel region G1050 that has a light transmittance set at a high level needs to be disposed for the shade regions P1050 of the decorative plate 1440 to be visually recognized. In other words, in the specific pixel region G1050, light from the backlight 1030 is blocked by the shade regions P1050 and thus liquid crystal display cannot be performed as a result of the lack of light source.

In the one-layer display mode, in contrast, liquid crystal display can be performed by the entire display surface 1020a since light from the second backlight 1300 is incident upon the entire surface of the liquid crystal panel 1020. The decorative plate 1440 is placed on the back side of the second backlight 1300, and thus is not subjected to transmitted illumination. In addition, since the backlight 1030 is off, the decorative plate 1440 is not illuminated by the backlight 1030, either. Accordingly, the decorative plate 1440 is invisible, as illustrated in FIG. 14, despite the presence of the decorative plate 1440 on the back side of the liquid crystal panel 1020.

Figure 14:
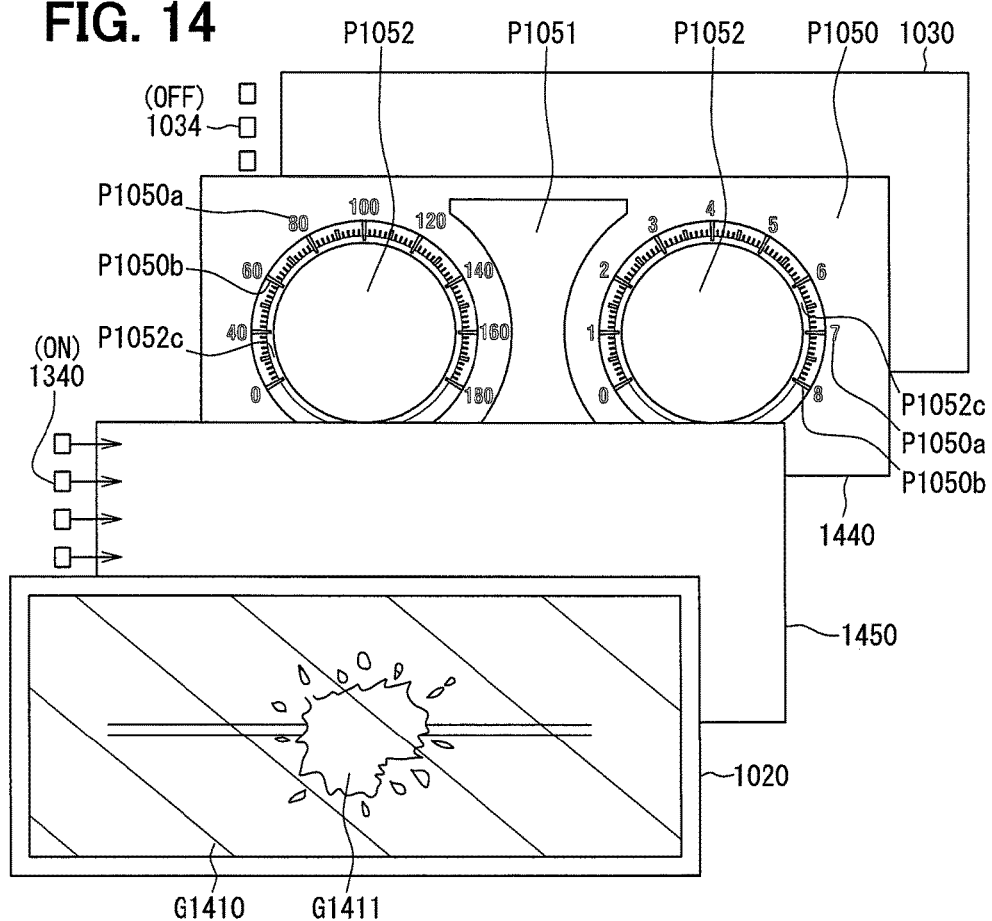
FIG. 14 is an exploded view schematically illustrating the display device in the real object hidden mode according to the third embodiment.
Figure 15:
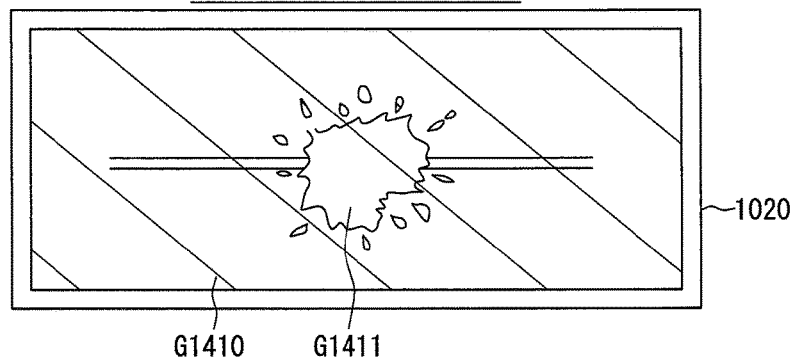
FIG. 15 is a front view of the display device according to the third embodiment, in which content displayed in the real object hidden mode is illustrated.

In the example of the display by the liquid crystal panel 1020 that is illustrated in FIGS. 14 and 15, an effect image G1411 is displayed with a pixel region G1410 forming its background, which is similar to FIG. 5 according to the first embodiment. In the first embodiment, the entire display surface 1020a is displayed at a transmittance that is so low that the real object cannot be visually recognized. In the present embodiment, in contrast, this type of transmittance setting is unnecessary, and the decorative plate 1440 (real object) is invisible as described above even if a high transmittance is set.

In other words, switching can be performed between the real object display mode (two-layer display mode) in which the real object is visually recognized and the real object hidden mode (one-layer display mode) in which the real object is invisible by operation states of the second backlight 1300 and the backlight 1030 being controlled.

As described above, the present embodiment is provided with the second backlight 1300 that is placed between the liquid crystal panel 1020 and the decorative plate 1440 (decorative member) and the decorative plate 1440 is subjected to transmitted illumination by the backlight 1030. The second backlight 1300 has the light guide plate 1310 that is provided with the reflecting surface 1310b which reflects the light moved into the light guide plate 1310 toward the liquid crystal panel 1020. According to this configuration, the decorative plate 1440 (real object) can be illuminated by the backlight 1030 and can be visually recognized through the light guide plate 1310. In addition, the liquid crystal panel 1020 can perform full display as described below with the liquid crystal panel 1020 illuminated by the second backlight 1300.

Since the decorative plate 1440 (real object) is present between the backlight 1030 and the liquid crystal panel 1020, illumination of the liquid crystal panel 1020 by the backlight 1030 results in a place that becomes the shadow of the decorative plate 1440 and cannot be sufficiently illuminated. In the present embodiment, in contrast, the second backlight 1300 is provided between the liquid crystal panel 1020 and the decorative plate 1440, and thus the shadowy place does not arise when the liquid crystal panel 1020 is illuminated by the second backlight 1300. Accordingly, the entire surface of the display surface 1020a of the liquid crystal panel 1020 can perform the full display in the real object hidden mode.

In the present embodiment, the decorative plate 1440 is provided with the light transmissive regions P1051 and P1052, and the pixel regions G1051 and G1052 are displayed at the parts of the liquid crystal panel 1020 that face the light transmissive regions P1051 and P1052. Accordingly, a sense of depth can be given based on a combination between the liquid crystal panel 1020 and the real object.

In the present embodiment, the lighting controller 1061b is provided that controls the backlight 1030 such that the backlight 1030 is turned on when the second backlight 1300 is turned off and the backlight 1030 is turned off when the second backlight 1300 is turned on. According to this configuration, switching between the real object display mode (two-layer display mode) and the real object hidden mode (one-layer display mode) can be facilitated. In addition, wasteful electric power consumption can be reduced since the backlight 1030 is turned off in the real object hidden mode.

In the present embodiment, the decorative plate 1440 has the light transmissive regions P1050a, P1050b, P1051, and P1052 through which the light from the backlight 1030 is transmitted and the shade regions P1050 blocking the light from the backlight 1030. The gradation regions P1052c are provided at the parts of the light transmissive region that are adjacent to the shade regions P1050 and the light transmittance of the gradation regions P1052c gradually changes in a direction toward the shade regions P1050. In addition, the liquid crystal panel 1020 is subjected to display control such that, in the pixel regions G1052c at the parts of the display surface 1020a that face the gradation regions P1052c, the display luminance gradually changes in a direction toward the shade regions P1050. According to this configuration, gradation attributable to the decorative plate 1440 and gradation attributable to the liquid crystal panel 1020 are visually recognized as an overlapped form of the near side and the far side as seen from the viewer. In a case where the viewer sees a boundary between the two gradations by moving his or her head position and changing the viewpoint position, a highlighted parallax between the near side and the far side can be visually recognized and a highlighted three-dimensional effect can be achieved.

(Fourth Embodiment)

In the third embodiment described above, the backlight 1030 is turned off when the second backlight 1300 is turned on. In the present embodiment, in contrast, a backlight 1030 is turned on even when a second backlight 1300 is turned on. Still, the color of the backlight 1030 differs from the color of the second backlight 1300.

Figure 16:
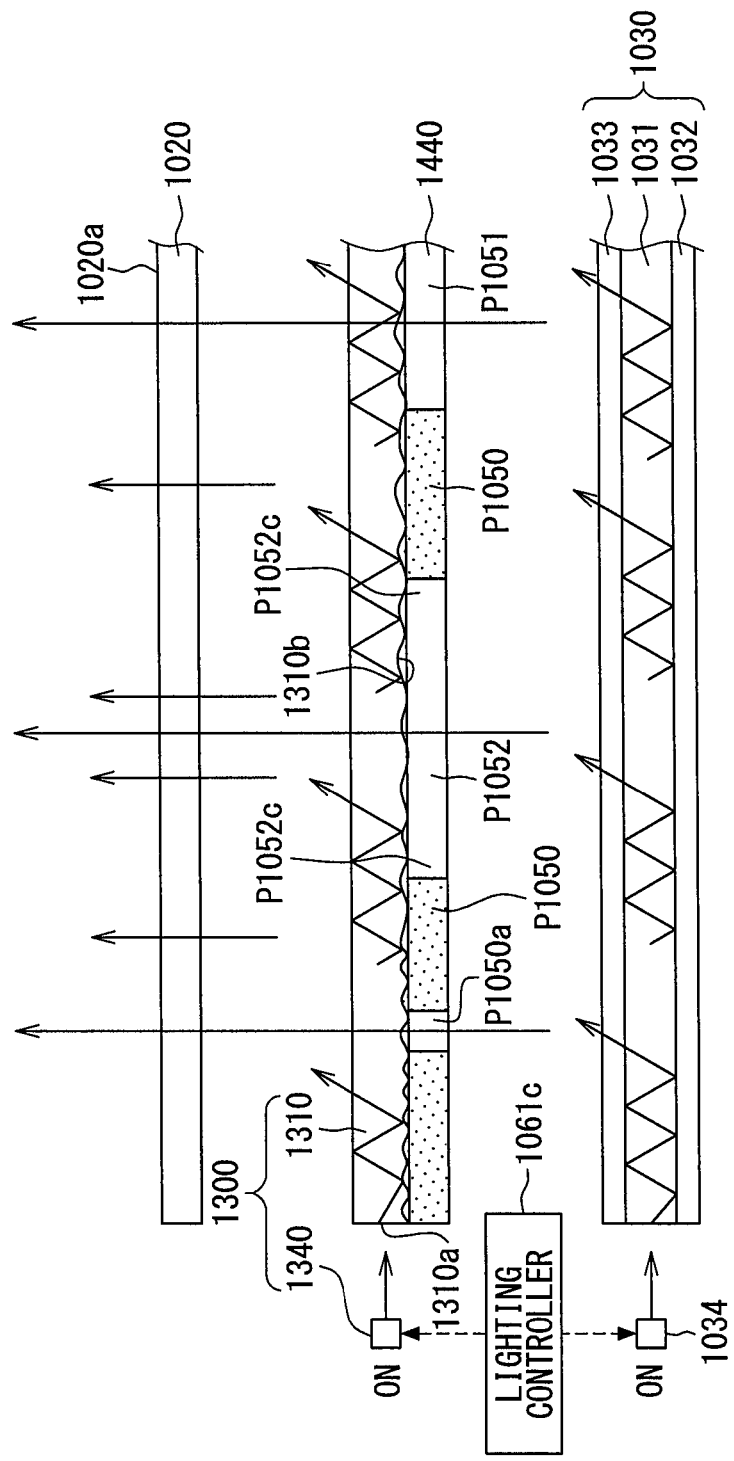
FIG. 16 is a cross-sectional view of a display device according to a fourth embodiment of the present disclosure, in which a state of lighting in a real object display mode is illustrated.

More specifically, a lighting controller 1061c illustrated in FIG. 16 turns on the backlight 1030 when the second backlight 1300 is turned off. Accordingly, a decorative plate 1440 illuminated by the backlight 1030 and a display image displayed on a liquid crystal panel 1020 are visually recognized in combination as in the third embodiment.

The lighting controller 1061c turns on the backlight 1030 as well when the second backlight 1300 is turned on (refer to FIG. 16). Second light sources 1340 of the second backlight 1300 emit red light and a light source 1034 of the backlight 1030 emits white light. As a result, the white light from the light source 1034 is incident upon the liquid crystal panel 1020 through light transmissive regions P1050a, P1050b, P1051, and P1052 of the decorative plate 1440. The red light from the second light sources 1340 is incident upon the liquid crystal panel 1020 from the entire surface of a light guide plate 1310.

Accordingly, the parts (light red parts) of the liquid crystal panel 1020 that face the light transmissive regions P1050a, P1050b, P1051, and P1052 are illuminated with both the white light and the red light, and the rest (red part) of the liquid crystal panel 1020 is illuminated with the red light. In other words, the entire liquid crystal panel 1020 shows a reddish display and the red part, in particular, is displayed in a vivid red color in comparison to the light red part.

According to the present embodiment described above, the lighting controller 1061c is provided that controls the operations of the backlight 1030 and the second backlight 1300 such that the backlight 1030 is turned on both when the second backlight 1300 is turned off and when the second backlight 1300 is turned on. According to this configuration, the following effects are achieved in addition to those similar to the effects achieved by the third embodiment. That is, in the part of the display device that is visually recognized in the color of the backlight 1030, color expression can be performed with light from the backlight 1030. Accordingly, a more vivid color can be expressed than in the case of color expression based on a color filter of the liquid crystal panel 1020.

The invention is not at all limited to the preferred embodiments of the invention described above and can be carried out in various modified forms, examples of which will be described below. Not only combination between the parts explicitly specified in each of the embodiments to be capable of being combined with each other but also partial combination between the embodiments can be conducted even without explicit expression insofar as the combination is not particularly hindered.

It is desirable that the light emitting surface 1033b of the backlight 1030 is larger than the display surface 1020a of the liquid crystal panel 1020. According to this configuration, the possibility of a part P1002 (refer to FIG. 2) of the backlight 1030 outside the light emitting surface 1033b being visually recognized through the liquid crystal panel 1020 in a case where the entire surface of the display surface 1020a is given a low transmittance can be reduced. Accordingly, the possibility of an impaired appearance of the display device D can be reduced.

Although a scale image G1011 is displayed in the specific pixel region G1010 in the embodiment that is illustrated in FIG. 1, the scale image G1011 may be displayed in the other pixel region G1020 as well.

The light sources 1423 according to the embodiment that is illustrated in FIG. 3 may be discarded although the light sources 1423 are attached to the decorative ring 1420 in the embodiment that is illustrated in FIG. 3. In the embodiment that is illustrated in FIG. 9, a light source may be attached to the pointer 1040 and the light source may illuminate the pointer 1040. The specific pixel regions G1010, G1100, and G1300 may be set such that the real objects are visible in their entirety or may be set such that the real objects are visible in part.

It is desirable that boundaries between the specific pixel regions G1010, G1100, and G1300 and the other pixel regions G1020 and G1400 take the form of a gradation display image with a gradually changing luminance The display device D may be provided with any form of combination between the real objects according to the respective embodiments described above. For example, the display device D may be provided with both the decorative ring 1420 and the pointer 1040, and the decorative boss member 1430 and the wall member 1400 may be combined with each other in any form.

Although the wall member 1400 according to the embodiment that is illustrated in FIG. 8 is annular in shape, the shape of the wall member 1400 is not limited to the annular shape. Although the real object according to each of the embodiments is formed of transparent resin, colored resin may be adopted instead. The reflecting plate 1032 may be allowed to function as a character plate with printing or a concave portion representing a character or a figure provided in the reflecting plate 1032 of the backlight 1030.

Although the decorative member according to the first embodiment described above is the ring-shaped decorative ring 1420, the decorative members according to the present disclosure are not limited to ring-shaped ones and may be, for example, arc-shaped ones extending in the directions of rotation of the pointer image G1014 and the pointer 1040.

Although the background image that is displayed in the other pixel region G1020 is controlled such that the background image is black in each of the embodiments described above, the color of the background image is not limited to black, and any color and luminance may be set as the color and the luminance of the background image insofar as its transmittance is lower than that of the specific pixel region G1010.

A monochrome-type liquid crystal panel may take the place of the full color-type liquid crystal panel 1020 according to each of the embodiments. The present disclosure can also be applied to a segment liquid crystal panel that is provided with a segment electrode which has a predetermined shape instead of the matrix-type electrode provided with the row electrode and the column electrode and displays an image resulting from a pixel corresponding thereto.

In each of the embodiments described above, control is performed such that the light transmittance of the specific pixel region, which is the pixel region at the part of the display surface 1020a of the liquid crystal panel 1020 where the decorative member is positioned on its back side, is higher than that of the other pixel region. In addition, the range and the light transmittance of the specific pixel region are controlled such that the entire decorative member is visible from the specific pixel region. However, it is a matter of course that the range and the light transmittance of the specific pixel region may be controlled such that the decorative member is visible in part.

Although the present disclosure is applied to the display device D that is assembled in the instrument panel in the vehicle in each of the embodiments described above, the present disclosure is not limited to that application and may be applied to, for example, an electron mirror mounted in a vehicle. The electron mirror is a mirror that is attached to a front windshield and a door trim, displays an image imitating an image reflected in the mirror, and displays an image showing a space behind the vehicle. The present disclosure is not limited to a display device mounted in a vehicle and may be applied to, for example, display devices mounted on game machines and home appliances such as pachinko machines and throttles.

The third embodiment described above is configured such that the light transmissive regions P1051 and P1052 are provided in the decorative plate 1440 and the light from the backlight 1030 can be incident upon the liquid crystal panel 1020 in the real object display mode. Alternatively, a configuration may be adopted in which through holes are provided at the parts of the decorative plate 1440 that are corresponding to the light transmissive regions P1051 and P1052 and the light from the backlight 1030 can be incident upon the liquid crystal panel 1020 through the through holes.

In the gradation regions P1052c according to the third embodiment described above, the light transmittance is gradually lowered in a direction toward the shade regions P1050. Alternatively, the light transmittance may be gradually increased in a direction toward the shade regions P1050.

(Fifth Embodiment)

Figure 17:
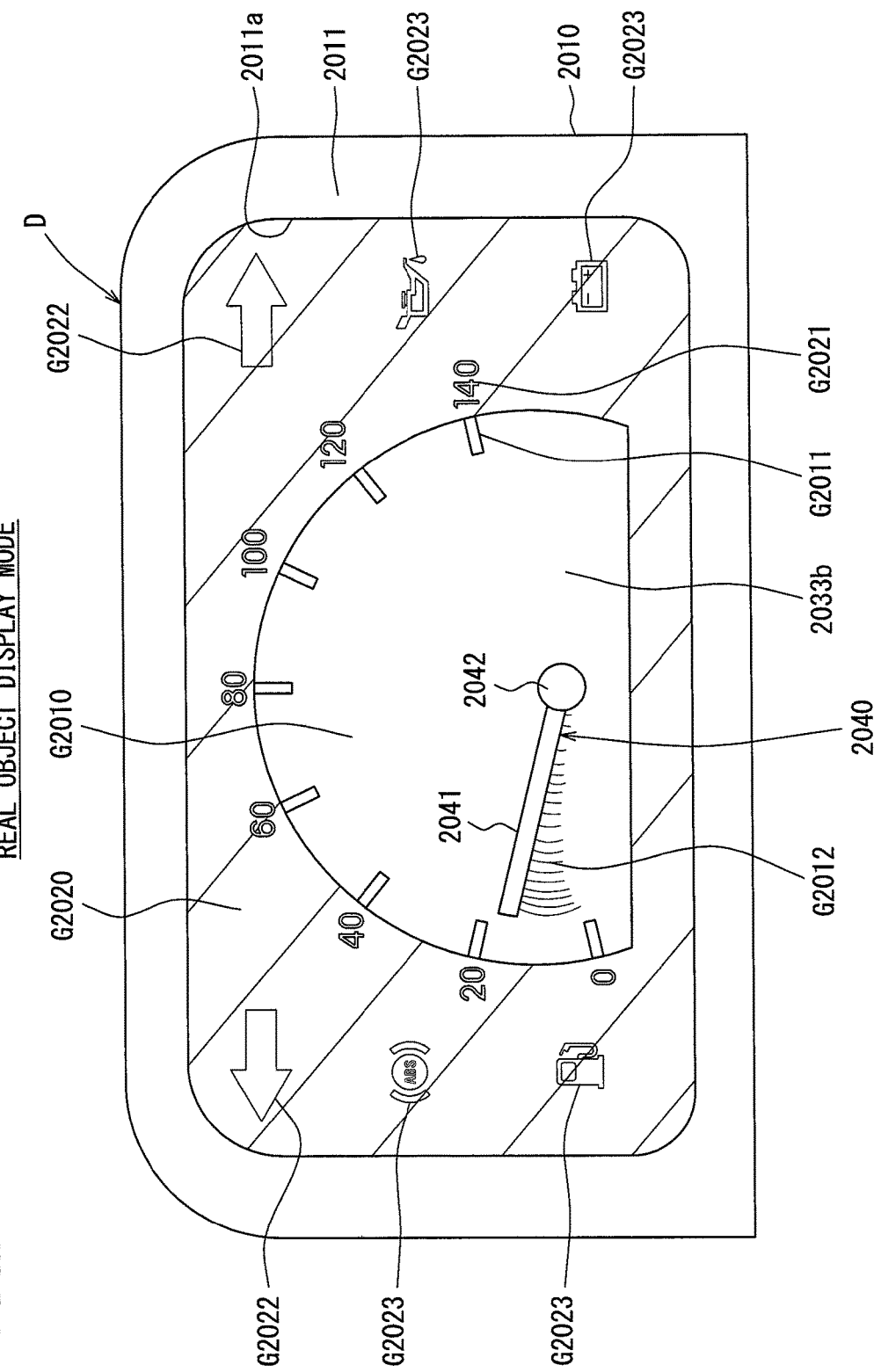
FIG. 17 is a front view of a display device according to a fifth embodiment of the present disclosure, in which content displayed in a real object display mode is illustrated.

A display device D illustrated in FIG. 17 is a vehicular display device assembled in an instrument panel in a vehicle. The display device D displays changes in various physical quantities showing states of the vehicle, such as a traveling speed of the vehicle and electric power remaining in an automotive battery, displays the occurrence of various abnormalities in the case of such abnormalities, and displays an effect image.

Figure 18:
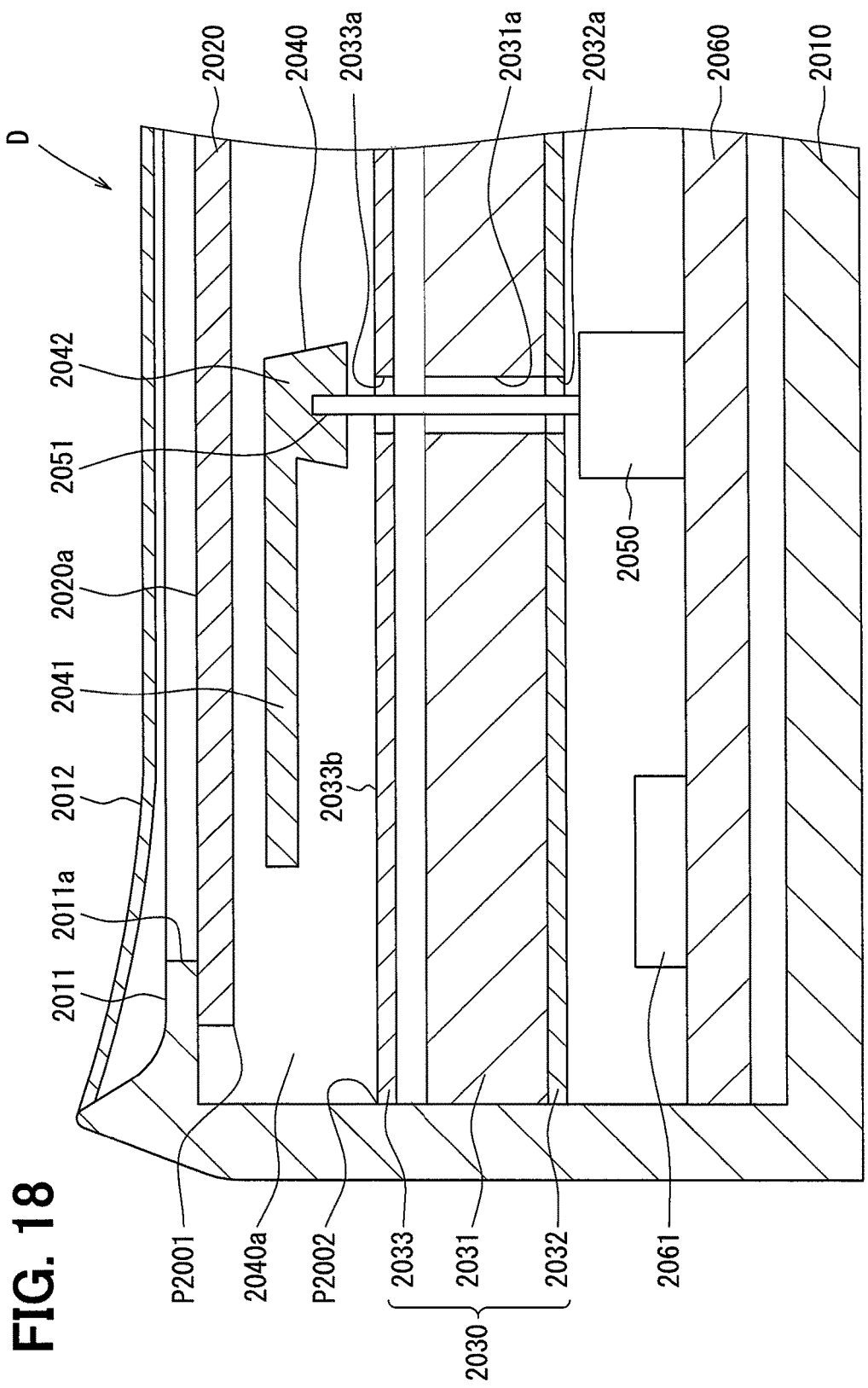
FIG. 18 is a cross-sectional view illustrating a part of the display device according to the fifth embodiment.

As illustrated in FIG. 18, the display device D is configured to be mainly provided with a case 2010, a liquid crystal panel 2020, a backlight 2030, a pointer 2040, an electric motor 2050, and a circuit board 2060. The liquid crystal panel 2020, the backlight 2030, the circuit board 2060, and the like are accommodated and held in the case 2010, which is a resinous case that has a light shielding property.

The liquid crystal panel 2020 is a TFT liquid crystal panel that is configured to have a liquid crystal layer in which a liquid crystal is held, a pair of electrodes placed on both sides of the liquid crystal layer, a color filter substrate, and a pair of polarizing films. The electrode is a matrix electrode in which a row electrode and a column electrode are combined with each other and is configured as a transparent electrode disposed for each pixel, and a voltage applied to the electrode is controlled by a thin film transistor. The color filter substrate has a red filter, a green filter, and a blue filter, and each of the filters is placed for each pixel (for each electrode). A thin film transistor (TFT, not illustrated) turning ON and OFF each pixel is provided as well. The polarizing film is a filter through which light vibrating in a predetermined direction is transmitted to be given a predetermined regulated vibration direction. The pair of polarizing films are placed such that the vibration directions have a deviation of 90°.

Figure 19:
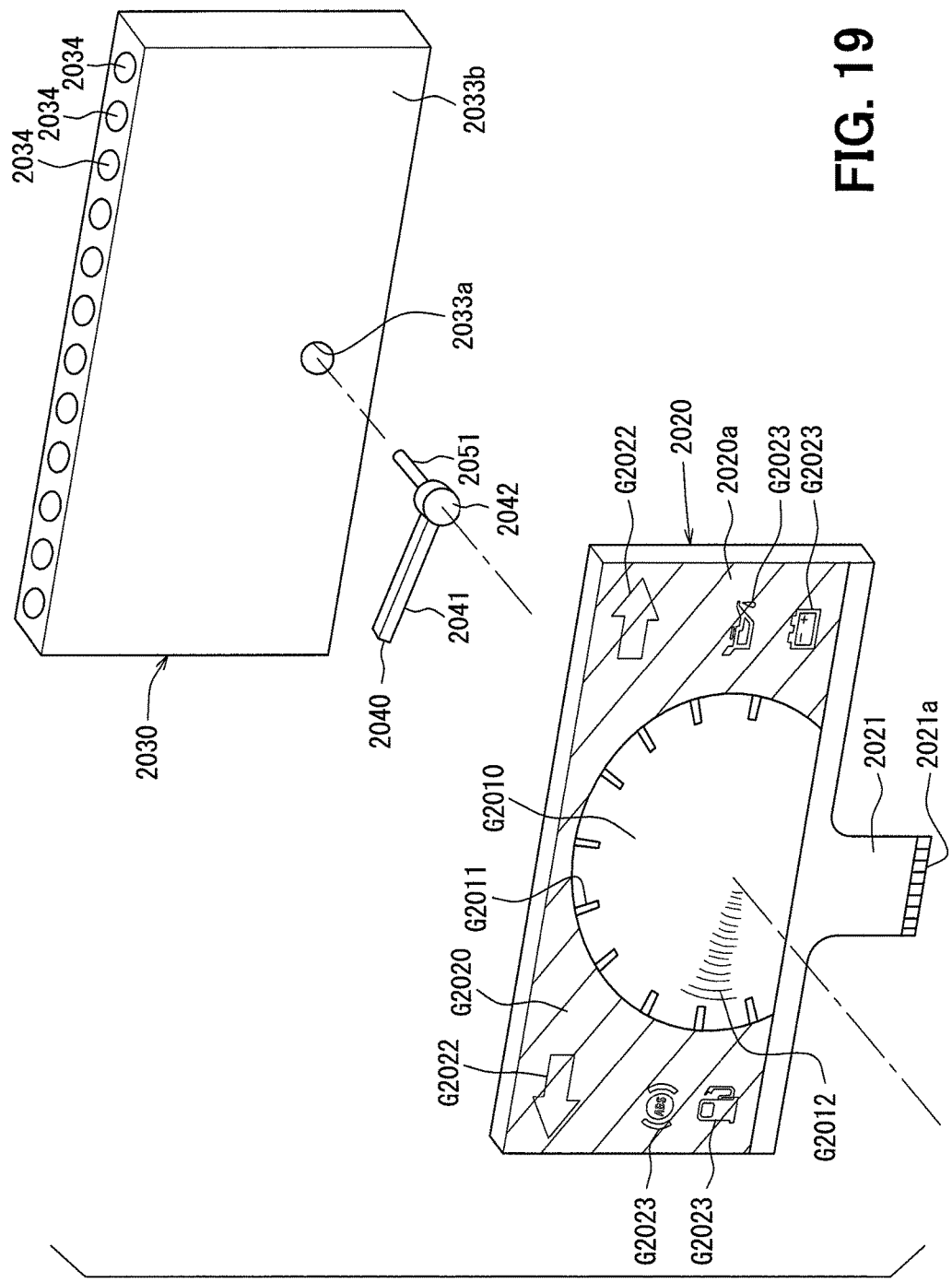
FIG. 19 is an exploded view of the display device according to the fifth embodiment.

The backlight 2030 is configured to have a light guide plate 2031, a reflecting plate 2032, a diffusion plate 2033, and light sources 2034 (refer to FIG. 19). The light source 2034 emits white light with a light emitting diode adopted, and the multiple light sources 2034 are placed at positions facing a side surface of the light guide plate 2031. The light that is emitted from the light sources 2034 is incident upon the light guide plate 2031 from the side surface, moves into the light guide plate 2031 while being reflected by the reflecting plate 2032, and then is emitted from the front face side of the light guide plate 2031 (upper side in FIG. 18). The light emitted from the light guide plate 2031 is transmitted while being diffuse-reflected by the diffusion plate 2033. This results in a state where the entire diffusion plate 2033 performs surface emission, and light that is uniform and has little unevenness with respect to the entire surface of the liquid crystal panel 2020 is emitted from the backlight 2030 to the liquid crystal panel 2020.

The diffusion plate 2033 is placed such that a predetermined gap is formed between the diffusion plate 2033 and the front face side of the light guide plate 2031 whereas the reflecting plate 2032 is placed in close contact with the back side of the light guide plate 2031. This gap is optional though. The liquid crystal panel 2020 is placed such that a predetermined gap 2040*a* is formed between the front face side of the diffusion plate 2033 and the liquid crystal panel 2020, and the pointer 2040, which is a movable real object, is placed in this gap 2040*a*.

The pointer 2040 has a pointer portion 2041 and a boss portion 2042. The pointer portion 2041 and the boss portion 2042 are integrally formed of light transmissive resin. A rotating shaft 2051 is fixed to the boss portion 2042. The rotating shaft 2051 is placed to be inserted into through holes 2031*a*, 2032*a*, and 2033*a*, which are provided in the light guide plate 2031, the reflecting plate 2032, and the diffusion plate 2033, and is rotated by the electric motor 2050. The electric motor 2050 is attached to the circuit board 2060. The rotational position of the pointer 2040 is controlled by a microcomputer (microcomputer 2061), which is mounted on the circuit board 2060, controlling driving of the electric motor 2050. The microcomputer 2061 has a central processing unit, a memory, and the like, and executes various types of calculation processing in accordance with a program stored in advance.

The liquid crystal panel 2020 has a flexible wiring board 2021, and a terminal 2021*a* provided at a tip of the flexible wiring board 2021 is connected to the circuit board 2060. An image signal that is output from the circuit board 2060 to the liquid crystal panel 2020 is transmitted to the electrode of the liquid crystal panel 2020 via the flexible wiring board 2021. In other words, content of an image that is displayed on a display surface 2020*a* of the liquid crystal panel 2020 is controlled by the microcomputer 2061.

The circuit board 2060 acquires various types of information from electronic controllers mounted outside the display device D among electronic controllers mounted in the vehicle and controls the content displayed on the liquid crystal panel 2020 and the rotational position of the pointer 2040 based on the acquired information. Specific examples of the information include information showing the changes in the various physical quantities that show the states of the vehicle, such as the traveling speed of the vehicle and the electric power remaining in the automotive battery, and information showing the occurrence of the various abnormalities.

As illustrated in FIG. 18, the case 2010 has a facing plate 2011 that is positioned on the front face side of the liquid crystal panel 2020, and an opening portion 2011*a* is provided in the facing plate 2011. As a result, the part of the display surface 2020*a* of the liquid crystal panel 2020 that is positioned inside the opening portion 2011*a* becomes a visible region, and this visible region is identified by being partitioned by the facing plate 2011. An outer edge part P2001 (refer to FIG. 18) of the liquid crystal panel 2020 is covered and hidden by the facing plate 2011. A cover 2012, which covers the facing plate 2011 from the front face side, is attached to the case 2010. The cover 2012 is a resinous cover that has a light transmissive property.

Once the light source 2034 of the backlight 2030 is turned on, light is emitted to the liquid crystal panel 2020 from its back side. Specifically, the light that is emitted from the front face-side surface of the diffusion plate 2033 (light emitting surface 2033*b*) is transmitted through the liquid crystal panel 2020 and is emitted to the front face side of the display device D through the opening portion 2011*a* and the cover 2012. As a result, the liquid crystal panel 2020 is subjected to transmitted illumination and the image displayed on the display surface 2020*a* is visually recognized by a user. Specifically, the transmittance (light transmission property) of the light with respect to each corresponding pixel changes in accordance with the applied voltage applied to the electrode placed for each pixel in the liquid crystal panel 2020.

When the applied voltage is controlled such that the transmittance is maximized for each of the electrodes corresponding to the red filter, the green filter, and the blue filter, for example, the luminance of the light transmitted through each of the filters is maximized. As a result, the corresponding pixel is visually recognized as a white pixel. In other words, the corresponding pixel is visually recognized in the luminescent color of the diffusion plate 2033. When the applied voltage is controlled such that the transmittance is minimized for each of the electrodes corresponding to the respective filters, the luminance of the light transmitted through each of the filters is minimized. As a result, the corresponding pixel is visually recognized as a black pixel.

Among the region of the display surface 2020*a*, in the region where the transmittance is controlled such that the transmittance is high as described above (specific pixel region G2010), the object that is positioned on the back side of the region, that is, the pointer 2040 or the diffusion plate 2033, is visible through the liquid crystal panel 2020. In other words, the light (white light) that is emitted from the backlight 2030, reflected by the pointer 2040, and directed toward the liquid crystal panel 2020 is transmitted through the specific pixel region G2010 and is visually recognized by the user.

Figure 20:
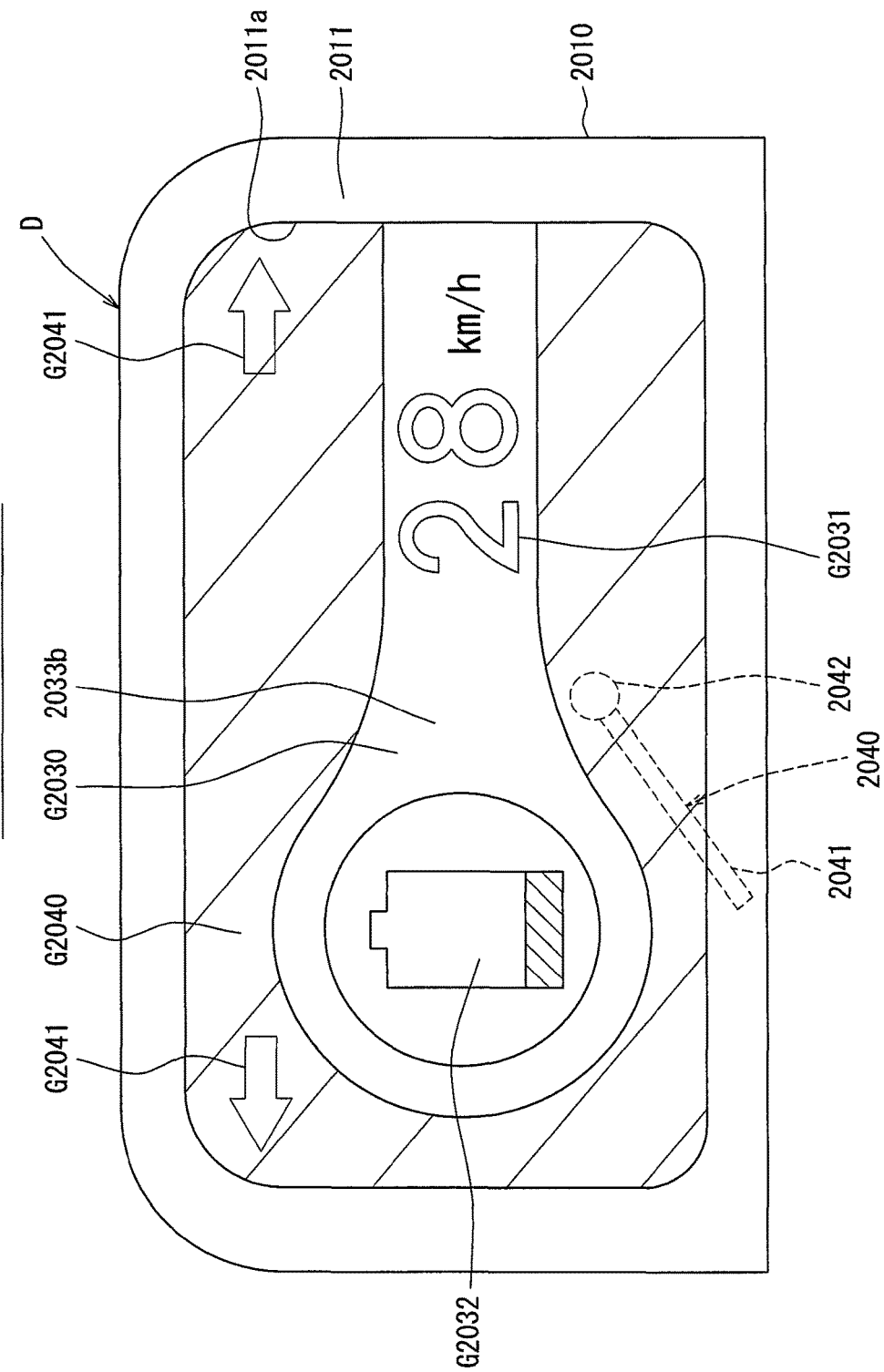
FIG. 20 is a front view of the display device according to the fifth embodiment, in which content displayed in a real object hidden mode is illustrated.

Among the display surface 2020a, in a region (another pixel region G2020) where the transmittance is controlled such that the transmittance is lower than that of the specific pixel region G2010, an object that is positioned on the back side of the region cannot be visually recognized. In other words, the light that is reflected by the pointer 2040 and directed toward the liquid crystal panel 2020 is not transmitted through the other pixel region G2020 and thus is invisible to the user. The oblique lines that are illustrated in FIGS. 17, 19, and 20 mean the range of the other pixel region G2020 or a second pixel region G2040 and do not mean cross-sectional hatching.

As the transmittance is increased, the degree to which the reflected light from the pointer 2040 is transmitted through the liquid crystal panel 2020 increases and the pointer 2040 becomes more and more clearly visible. As the transmittance is reduced, the degree to which the reflected light from the pointer 2040 is transmitted through the liquid crystal panel 2020 decreases and the pointer 2040 becomes increasingly blurry during visual recognition.

In other words, switching can be performed between a real object display mode in which the pointer 2040 is visually recognized (refer to FIG. 17) and a real object hidden mode in which the pointer 2040 is invisible (refer to FIG. 20) by the transmittance of the liquid crystal panel 2020 being controlled. In the real object display mode, the display device D can be visually recognized in the following manner as well. In other words, the degree to which the pointer 2040 is visually recognized in a blurry form can be adjusted based on transmittance adjustment because the definition of the pointer 2040 (degree of the blur) can be controlled in accordance with the degree of transmittance of the liquid crystal panel 2020. In addition, an image displayed in the specific pixel region G2010 and the pointer 2040 can be visually recognized with the image and the pointer 2040 overlapped with each other. Furthermore, when the part of the specific pixel region G2010 with which the pointer 2040 is overlapped is displayed in a different color from the other part, an illusion can be created as if the pointer 2040 had that display color.

In the real object display mode that is illustrated in FIG. 17, the region of the display surface 2020a that includes the entire rotation region of the pointer 2040 is set as the specific pixel region G2010 and the entire outside of the specific pixel region G2010 is set as the other pixel region G2020. Scale images G2011 pointed at by the pointer 2040 and a shadow image G2012 are displayed in the specific pixel region G2010. A vehicle speed is displayed based on a combination between the pointer 2040 and the scale image G2011 by the rotational position of the pointer 2040 being controlled in accordance with the vehicle speed. The shadow image G2012 is an image imitating a shadow that extends from the pointer portion 2041 to the side opposite in its rotational direction. Accordingly, the shadow image G2012 has a display position varying with the rotational position of the pointer 2040. The shadow image G2012 has a rotational-direction length set to increase as the rotation speed of the pointer 2040 increases.

In the real object display mode that is illustrated in FIG. 17, a black image displayed in the other pixel region G2020 is a background and the diffusion plate 2033, the pointer 2040, the scale images G2011, and the shadow image G2012 are visually recognized in combination. In addition, parallax attributable to a difference in focal length occurs among the display surface 2020a, the pointer 2040, and the diffusion plate 2033 because of a difference in optical path length in a viewing direction. In other words, the pointer 2040 is visually recognized as being present on the viewing direction far side (back side) of the display surface 2020a and the diffusion plate 2033 is visually recognized as being present further on the far side of the pointer 2040.

The black background image is displayed in the other pixel region G2020. In addition, direction indication images G2022 displaying a blinker operation direction and warning images G2023 for display of warning against the various abnormalities are displayed in the other pixel region G2020 with the background image forming the background. Each of the images that are displayed in the other pixel region G2020, that is, the direction indication images G2022, the warning images G2023, and the black background image, has a transmittance set to be lower than a predetermined value. A white background image displayed in the specific pixel region G2010 has a transmittance set to be equal to or higher than a predetermined value.

In the real object hidden mode that is illustrated in FIG. 20, the display surface 2020a is divided into a first pixel region G2030 that displays various types of information and the second pixel region G2040 that is a region outside the entire first pixel region G2030. The second pixel region G2040 has a transmittance which is set to be so low that the pointer 2040 cannot be visually recognized, and the rotational position of the pointer 2040 is controlled such that the rotational position of the pointer 2040 is at a position corresponding to the second pixel region G2040. Accordingly, the pointer 2040 is invisible to the user.

A vehicle speed image G2031 showing the vehicle speed in the form of a numerical value and a remaining electric power image G2032 showing the electric power remaining in the automotive battery are displayed in the first pixel region G2030. The part of the first pixel region G2030 that forms the background of the remaining electric power image G2032 periodically changes while being displayed. For example, charging being in progress can be expressed by the background image rotating about the remaining electric power image G2032.

A black background image is displayed in the second pixel region G2040. In addition, direction indication images G2041 displaying the blinker operation direction are displayed in the second pixel region G2040 with the background image forming the background.

Figure 21:
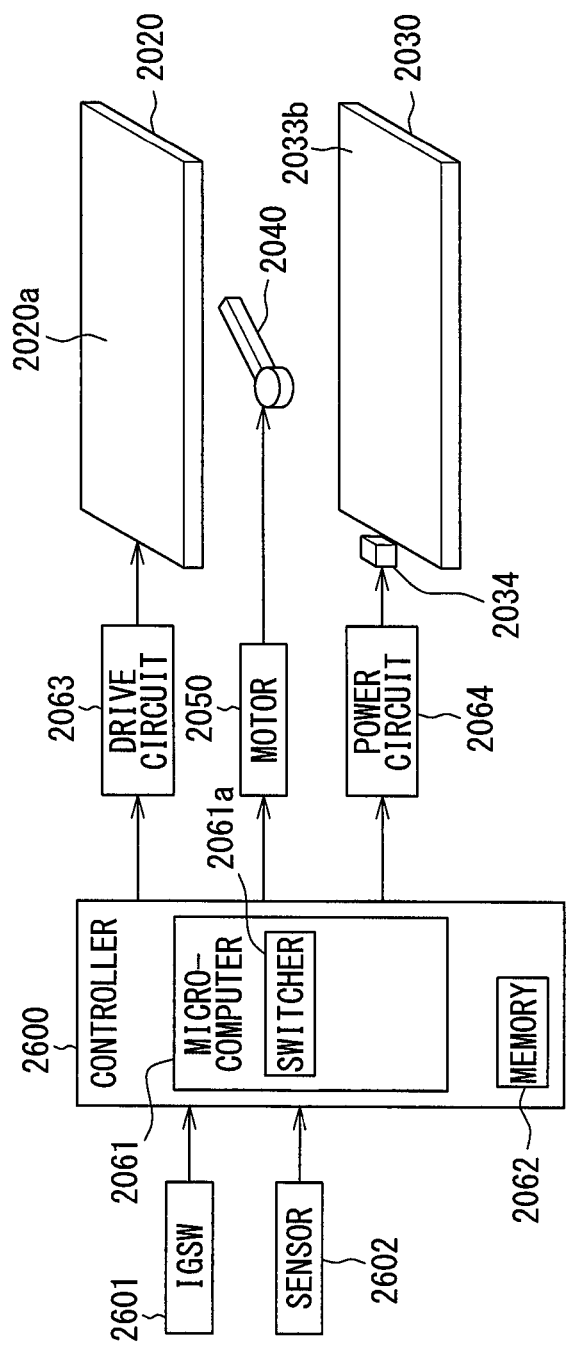
FIG. 21 is a schematic diagram illustrating a microcomputer and a control target of the microcomputer according to the fifth embodiment.

A drive circuit 2063 illustrated in FIG. 21, which is mounted on the circuit board 2060, controls driving of the thin film transistor of the liquid crystal panel 2020 described above in accordance with a command signal output from the microcomputer 2061. A power circuit 2064, which is mounted on the circuit board 2060, controls the amount of electric power supply to the light sources 2034 of the backlight 2030 in accordance with a command signal output from the microcomputer 2061. Specifically, the power circuit 2064 controls ON and OFF of the electric power supply to the light sources 2034.

The microcomputer 2061, a memory 2062, an input processing circuit, an output processing circuit, and the like are mounted on the circuit board 2060 and constitute a controller 2600. It can be said that this controller 2600 controls the display image on the liquid crystal panel 2020 by controlling the drive circuit 2063 and controls ON and OFF of the backlight 2030 by controlling the power circuit 2064. In addition, the controller 2600 controls the rotational position of the pointer 2040 by controlling the electric motor 2050.

Image data representing various images displayed on the liquid crystal panel 2020 is stored in the memory 2062. The microcomputer 2061 functions also as a switcher 2061a that performs display mode switching in response to the states of the vehicle. Once an ignition switch (IGSW 2601) is operated to be turned ON, for example, the electric power supply to the backlight 2030 is initiated and the liquid crystal panel 2020 is caused to perform displaying in an initiation effect mode, in which the effect image is displayed with visual recognition of the pointer 2040 blocked. In a case where the IGSW 2601 is operated to be turned OFF, the liquid crystal panel 2020 is caused to perform displaying in a termination effect mode, in which the effect image is displayed with visual recognition of the pointer 2040 blocked, and then the electric power supply to the backlight 2030 is terminated.

In a period between initiation effect mode termination and an OFF operation of the IGSW 2601, the rotational position of the pointer 2040 is usually controlled based on the physical quantity such as the vehicle speed detected by a sensor 2602 and such that the physical quantity is pointed at. In addition, the liquid crystal panel 2020 is caused to perform displaying in the real object display mode illustrated in FIG. 17. In this case, the user can change image content in the other pixel region G2020 into an image that suits his or her preference. Still, the transmittance of the other pixel region G2020 is lower than a predetermined value.

Switching from the real object display mode to the real object hidden mode illustrated in FIG. 20 occurs when an event satisfying a predetermined condition occurs, examples thereof including a case where the amount of the electric power remaining in the automotive battery is less than a predetermined value and a case where the display switching is requested by the user. In the example that is illustrated in FIG. 20, the rotational position of the pointer 2040 is controlled such that a part of the pointer 2040 is at a position deviating from a position facing the liquid crystal panel 2020. The part of the display surface 2020a of the liquid crystal panel 2020 where the pointer 2040 is positioned on its back side is subjected to display control to become the second pixel region G2040 so that the pointer 2040 becomes invisible. The vehicle speed image G2031 is controlled to become an image showing the vehicle speed detected by the sensor 2602.

Figure 22:
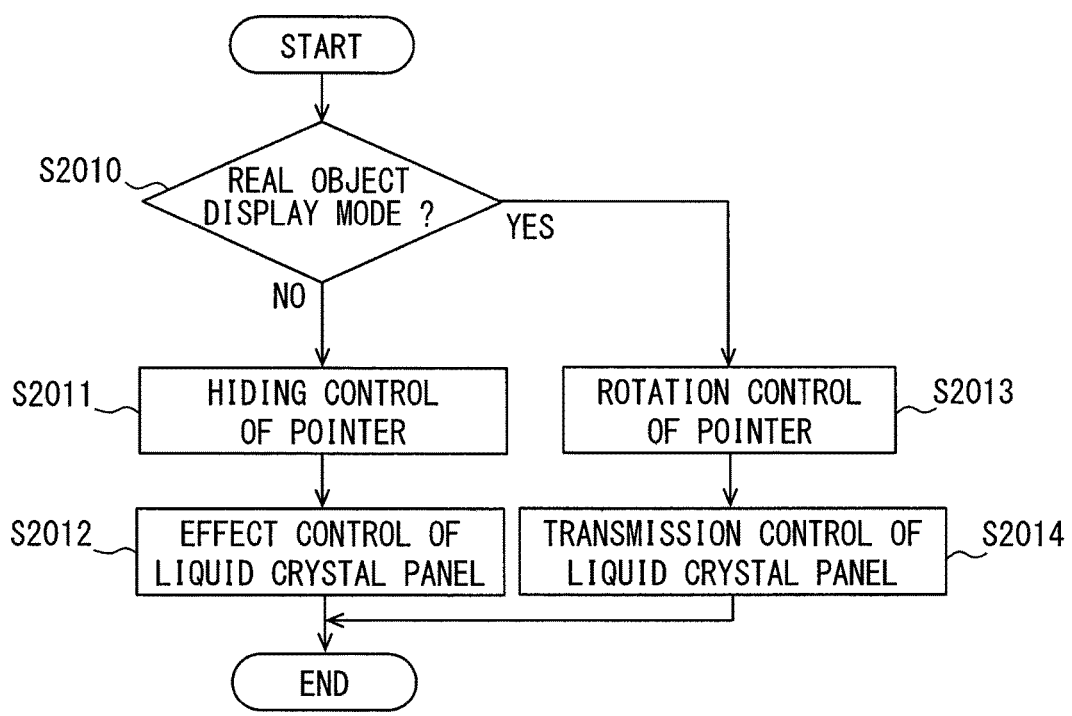
FIG. 22 is a flowchart illustrating a procedure of display control that is executed by the microcomputer according to the fifth embodiment.

FIG. 22 is a flowchart illustrating a procedure of processing that is repeatedly executed at a predetermined cycle by the central processing unit of the microcomputer 2061, in which it is first determined in Step S2010 whether or not the real object display mode has been requested. Examples in which the real object display mode in which the pointer 2040 is allowed to be visually recognized by the user is requested include a case where the physical quantity is displayed by the scale being pointed at by the pointer 2040 and, specifically, those examples include a case where the vehicle speed is displayed as illustrated in FIG. 17. Examples in which the real object hidden mode in which the pointer 2040 is not allowed to be visually recognized by the user is requested include a case where a focus is laid on the image displayed on the liquid crystal panel 2020. Specifically, those examples include a case where a focus is laid on the remaining electric power image G2032 illustrated in FIG. 20, an opening image displayed when the display device D is started, an ending image displayed at the termination of the operation of the display device D, and the like.

In a case where it is determined in Step S2010 that the requested display mode is the hidden mode, the processing proceeds to the following Step S2011, in which hiding control is executed for the pointer 2040 to be hidden to the back side of the second pixel region G2040 as illustrated by the dotted line in FIG. 20. Then, in Step S2012, effect control is executed for the pointer 2040 to become invisible by the liquid crystal panel 2020 being caused to perform displaying as follows. During the effect control, an image that has a transmittance which is so low that the pointer 2040 cannot be visually recognized is displayed in the second pixel region G2040. Images for the notification of the physical quantities such as the vehicle speed image G2031 and the remaining electric power image G2032 are displayed in the first pixel region G2030.

The transmittance of the first pixel region G2030 in the hidden mode does not have to be lowered to the degree that the diffusion plate 2033, which is an object positioned on the back side of the liquid crystal panel 2020, is invisible. Even if the first pixel region G2030 is given a high transmittance, for example, the pointer 2040 is still subjected to the hiding control and thus is invisible, and the diffusion plate 2033 positioned on the back side of the pointer 2040 is visually recognized. Assuming a transmittance of 100%, the diffusion plate 2033 in that case is visually recognized as performing surface emission in the color of the light sources 2034.

In a case where it is determined in Step S2010 that the requested display mode is the display mode, the processing proceeds to the following Step S2013, in which the electric motor 2050 is controlled such that the pointer 2040 rotates to a rotational position corresponding to the physical quantity to be provided by notification as illustrated in FIG. 17. Then, in Step S2014, the transmittance of the specific pixel region G2010 is controlled such that the rotation-controlled pointer 2040 is visually recognized by the liquid crystal panel 2020 being caused to perform displaying as follows. The specific pixel region G2010 is set to include the entire range of rotation of the pointer 2040 depending on the physical quantity. In addition, the scale images G2011 and the shadow image G2012 are displayed in the specific pixel region G2010. As a result, the pointer 2040 points at the scale image G2011 and the physical quantity such as the vehicle speed is displayed.

The diffusion plate 2033 is visually recognized in the region of the specific pixel region G2010 where the pointer 2040 is not present and the scale images G2011 and the shadow image G2012 are hidden. When this region has a transmittance of 100%, the diffusion plate 2033 in that case is visually recognized as performing surface emission in the color of the light sources 2034. In other words, the pointer 2040, the scale images G2011, and the shadow image G2012 are visually recognized with the diffusion plate 2033 forming the background. The other pixel region G2020 is controlled such that its transmittance is lower than that of the specific pixel region G2010. The microcomputer 2061 during the execution of the processing of Step S2010 is corresponding to a "switcher" that performs switching between the real object display mode and the real object hidden mode.

According to the present embodiment described above, the pointer 2040 (real object) is placed between the liquid crystal panel 2020 and the backlight 2030. Accordingly, a problem in the form of "a part of the image on the liquid crystal panel 2020 being blocked by the pointer and becoming invisible", which occurs in a case where the pointer is placed on the front face side of the liquid crystal panel 2020, can be avoided. Accordingly, the entire display surface 2020*a* of the liquid crystal panel 2020 can be effectively used while a sense of depth is given to the display device D by the liquid crystal panel 2020 being combined with the pointer 2040 as a real object.

According to the present embodiment, the pointer 2040 is visually recognized on the far side of the image on the liquid crystal panel 2020 and the diffusion plate 2033 is visually recognized on the far side of the pointer 2040. Accordingly, a layer display that has at least three layers can be realized and a depth-provided appearance can be improved.

According to the present embodiment, the specific pixel region G2010 at the part where the pointer 2040 is positioned on its back side is higher in transmittance than the other pixel region G2020, and thus the pointer 2040 is easily visible through the specific pixel region G2010. On the other hand, in the other pixel region G2020, the object (diffusion plate 2033) that is present on the back side of the liquid crystal panel 2020 is hardly visible. Accordingly, the pointer 2040 visually recognized through the specific pixel region G2010 stands out and attraction of attention to the pointer 2040 can be promoted. In other words, the visual attractiveness of the pointer 2040 can be improved.

In the present embodiment, the controller 2600 controls the liquid crystal panel 2020 such that the other pixel region G2020 becomes a black image. Accordingly, the diffusion plate 2033 is invisible in the other pixel region G2020, and the visual attractiveness of the pointer 2040 can be further improved since the luminance of the specific pixel region G2010 is higher than the luminance of the other pixel region G2020.

According to the present embodiment, an actuator (electric motor 2050) is provided that moves the real object (pointer 2040) between the liquid crystal panel 2020 and the backlight 2030. According to this configuration, various forms of display can be performed based on integration between a change in display by the liquid crystal panel 2020 and a change in the real object.

According to the present embodiment, real objects include the pointer 2040 driven to rotate by the actuator (electric motor 2050) and the multiple scale images G2011 pointed at by the pointer 2040 are displayed on the liquid crystal panel 2020. When the pointer 2040 is placed on the front face side of the liquid crystal panel 2020 unlike in the present embodiment, the pointer 2040 needs to be separated from the display surface 2020*a* to the same extent as the thickness of the boss portion 2042 of the pointer 2040. In the present embodiment, in contrast, the pointer 2040 is placed on the back side of the liquid crystal panel 2020, and thus the gap between the display surface 2020*a* and the pointer portion 2041 in the viewing direction can be reduced. Accordingly, the difference in distance between the scale image G2011 and the pointer portion 2041 in a line-of-sight direction, that is, a difference in focal length (parallax) can be reduced, and thus visibility can be improved with regard to pinpointing of the scale image G2011 being pointed at.

According to the present embodiment, the shadow image G2012, which represents the shadow of the pointer 2040, is displayed on the liquid crystal panel 2020 such that its display position is moved as the pointer 2040 is driven to rotate. According to the present embodiment, the parallax between the shadow image G2012 and the pointer portion 2041 can be reduced in a case where the shadow image G2012 is displayed since the parallax between the display surface 2020*a* and the pointer portion 2041 can be reduced as described above. Accordingly, the shadow image G2012 can appear to move completely in conjunction with the real object, and thus an illusion can be created as if the shadow image G2012 were an actual shadow and realistic display by the display device D can be improved.

According to the present embodiment, the switcher (Step S2010) is provided that performs switching between the real object display mode in which the transmittance of the specific pixel region G2010 is increased to the degree that the real object (pointer 2040) is visible and the real object hidden mode in which the transmittance of the specific pixel region G2010 is lowered to the degree that the real object is invisible. Accordingly, display in the form of the real object appearing and disappearing can be realized with ease by the display that is conducted on the liquid crystal panel 2020 being switched.

(Sixth Embodiment)

Figure 23:
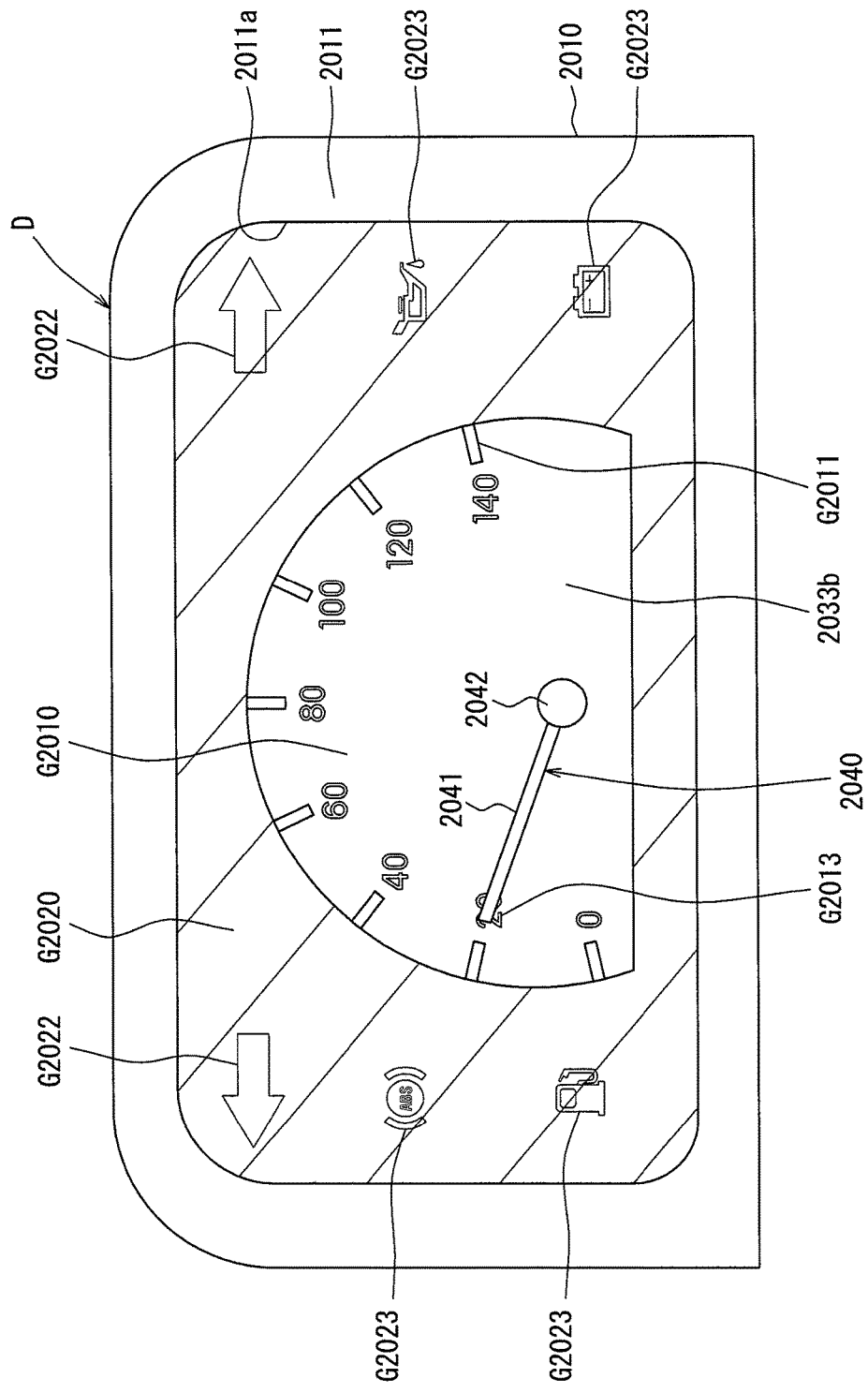
FIG. 23 is a front view of a display device according to a sixth embodiment of the present disclosure, in which content displayed in a real object display mode is illustrated.

In the present embodiment, number images G2013 are displayed in a specific pixel region G2010 as illustrated in FIG. 23. The number images G2013 are images that show numerical values corresponding to scale images G2011. When the number image G2013 and a pointer portion 2041 are partially overlapped with each other, the part of the number image G2013 that is overlapped with the pointer portion 2041 is hidden. For example, the number images that represent "0", "40", "60", "80", "100", "120", and "140" among the multiple number images G2013 illustrated in FIG. 23 are not overlapped with the pointer portion 2041, and thus the numbers are displayed as number images in their entirety. The number image that represents "20", in contrast, is partially overlapped with the pointer portion 2041 and the overlapped part displays no number image.

If the number image at the part overlapped with the pointer portion 2041 is displayed as well unlike in the present embodiment, the part of the pointer portion 2041 overlapped with the number image will become less visible, which is attributable to a pointer 2040 being placed on the back side of a liquid crystal panel 2020. Accordingly, visibility deteriorates with regard to pinpointing which one of the multiple scale images G2011 is being pointed at by the pointer portion 2041. According to the present embodiment, in contrast, the deterioration of the visibility of the pointer portion 2041 can be avoided since the number image G2013 is hidden in the part of the pointer portion 2041 overlapped with the number image.

(Seventh Embodiment)

Figure 24:
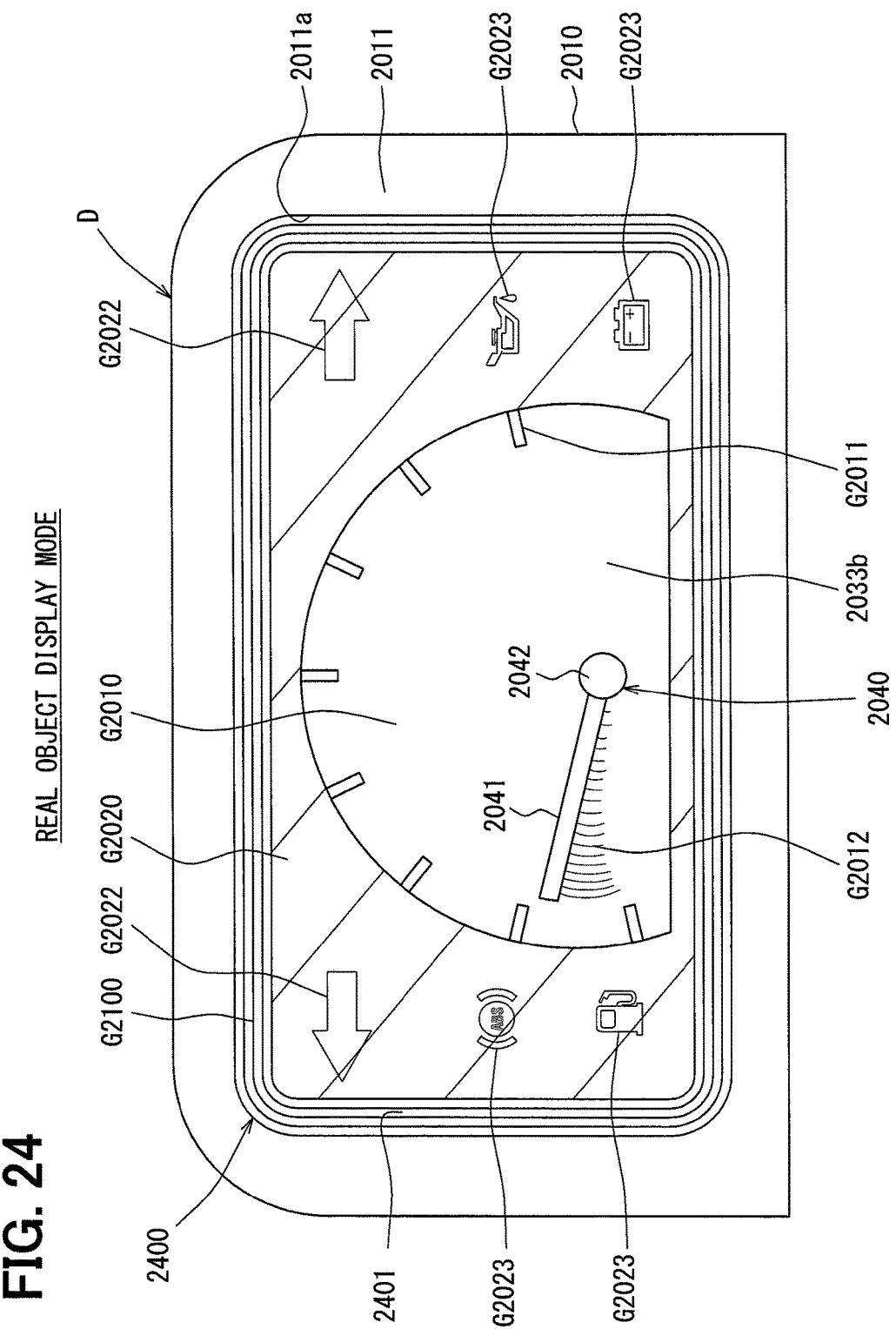
FIG. 24 is a front view of a display device according to a seventh embodiment of the present disclosure, in which content displayed in a real object display mode is illustrated.
Figure 25:
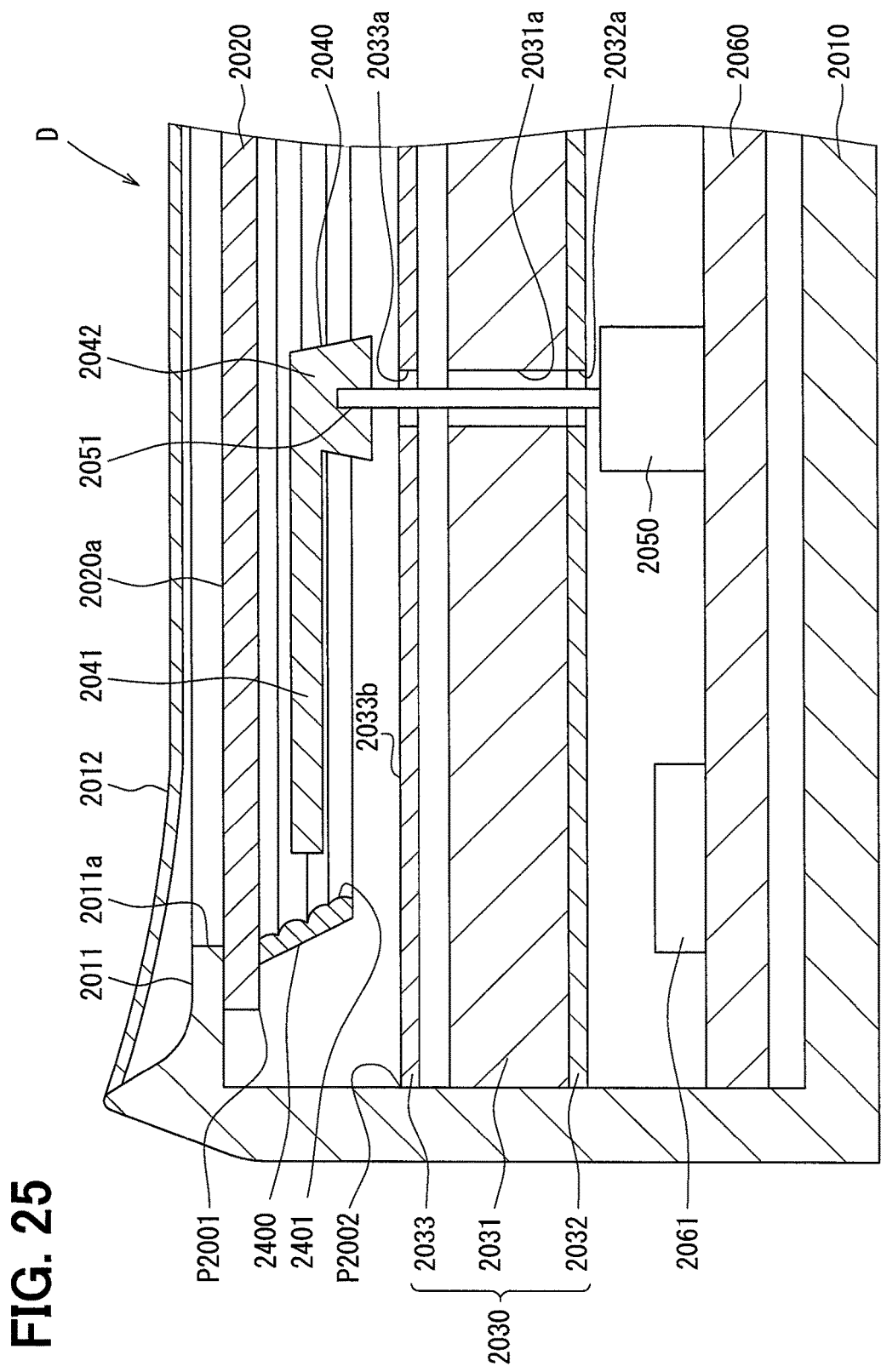
FIG. 25 is a cross-sectional view illustrating a part of the display device according to the seventh embodiment.

In the present embodiment, real objects include a wall member 2400 extending along an outer edge of a visible region of a display surface 2020*a* as illustrated in FIGS. 24 and 25. The outer edge of the visible region is identified by a wall surface of an opening portion 2011*a* of a facing plate 2011. The wall member 2400 has a tubular shape, extends in an annular shape along the outer edge, and is shaped such that its opening area increases in a direction toward a liquid crystal panel 2020. A pointer portion 2041 is positioned in the tubular shape of the wall member 2400. The wall member 2400 is a resinous member that has a light transmissive property.

The inner peripheral surface of the wall member 2400 has an uneven shape, and light refracted in accordance with the unevenness is visually recognized through the liquid crystal panel 2020. Specifically, four convex portions 2401 extending in an annular shape are aligned on the inner peripheral surface of the wall member 2400 as illustrated in FIG. 25. A pixel region at the part of the display surface 2020*a* of the liquid crystal panel 2020 where the wall member 2400 is positioned on its back side is set as a specific pixel region G2100 higher in transmittance than the other pixel region G2020. Accordingly, the wall member 2400 is visually recognized through the specific pixel region G2100 as illustrated in FIG. 24. In the hidden mode that is illustrated in FIG. 20, the wall member 2400 is positioned on the back side of a second pixel region G2040 and the wall member 2400 is invisible.

According to the present embodiment described above, the wall member 2400 is visually recognized, along with a pointer 2040, on the far side of the liquid crystal panel 2020. Accordingly, a problem in the form of "a part of the image on the liquid crystal panel 2020 being blocked by the wall member and becoming invisible", which occurs in a case where the wall member is placed on the front face side of the liquid crystal panel 2020, can be avoided. Accordingly, the entire display surface 2020a of the liquid crystal panel 2020 can be effectively used while a sense of depth is given to a display device D by the liquid crystal panel 2020 being combined with the wall member 2400 as a real object.

(Eighth Embodiment)

Figure 26:
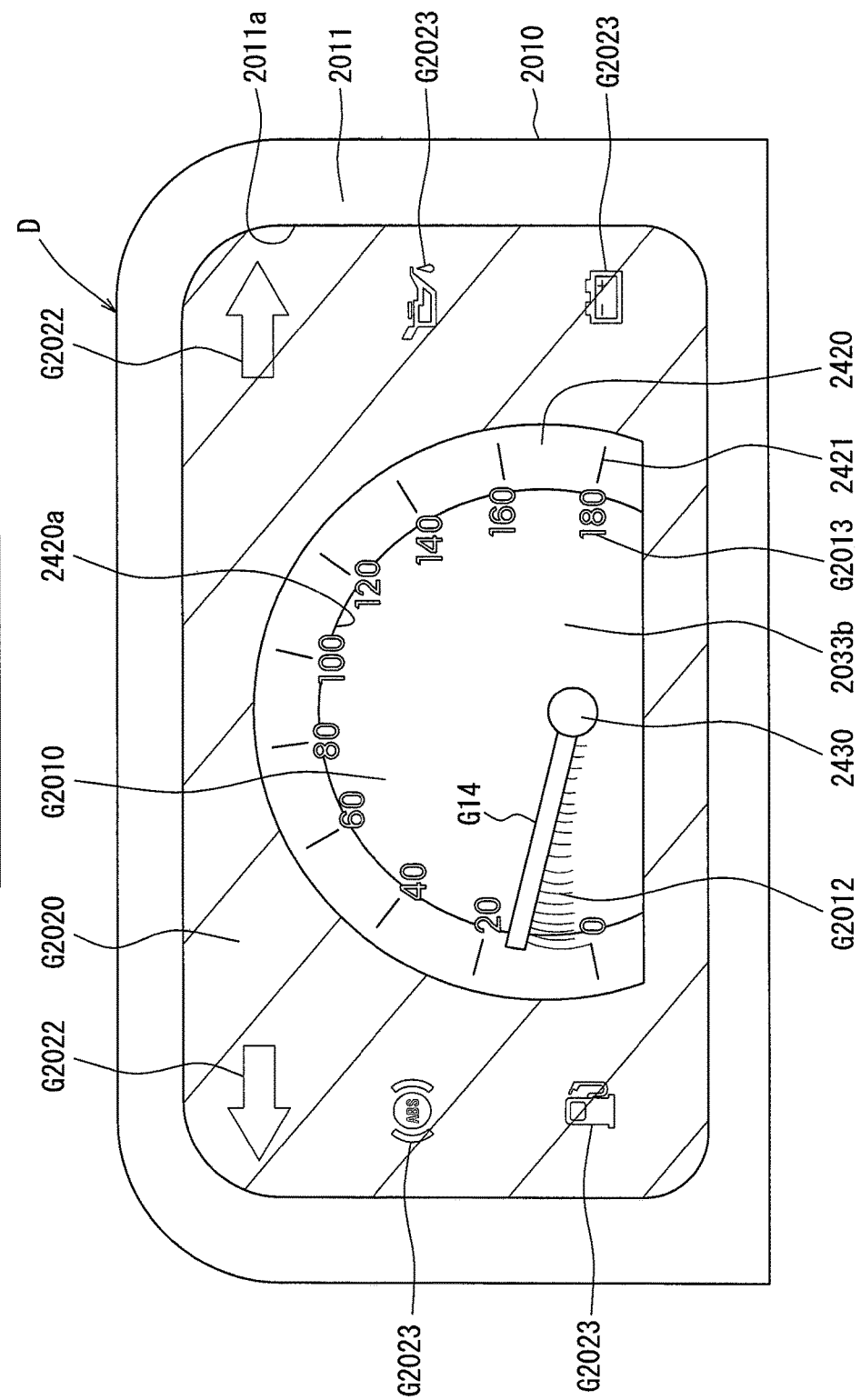
FIG. 26 is a front view of a display device according to an eighth embodiment of the present disclosure, in which content displayed in a real object display mode is illustrated.
Figure 27:
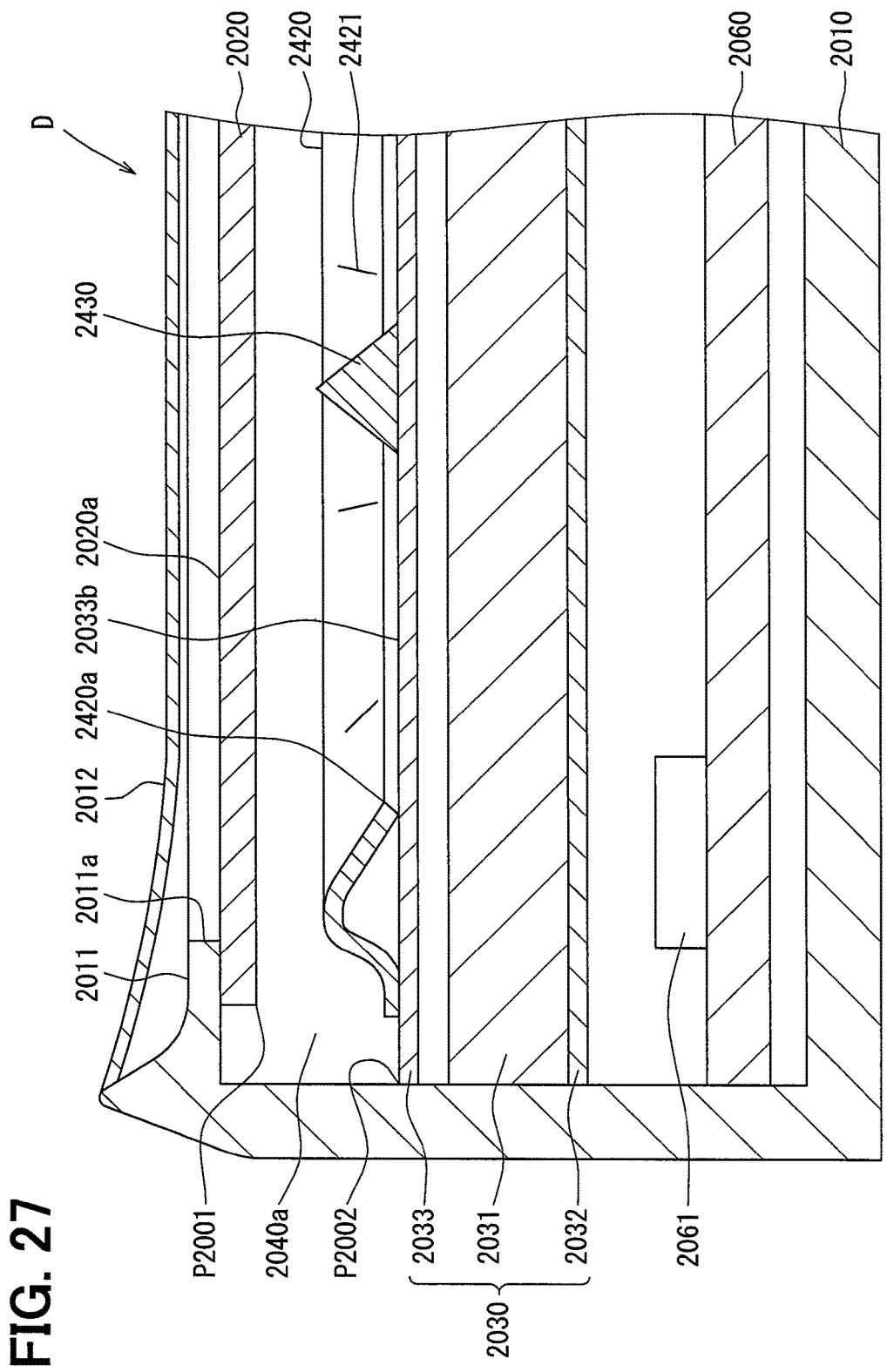
FIG. 27 is a cross-sectional view illustrating a part of the display device according to the eighth embodiment.
Figure 28:
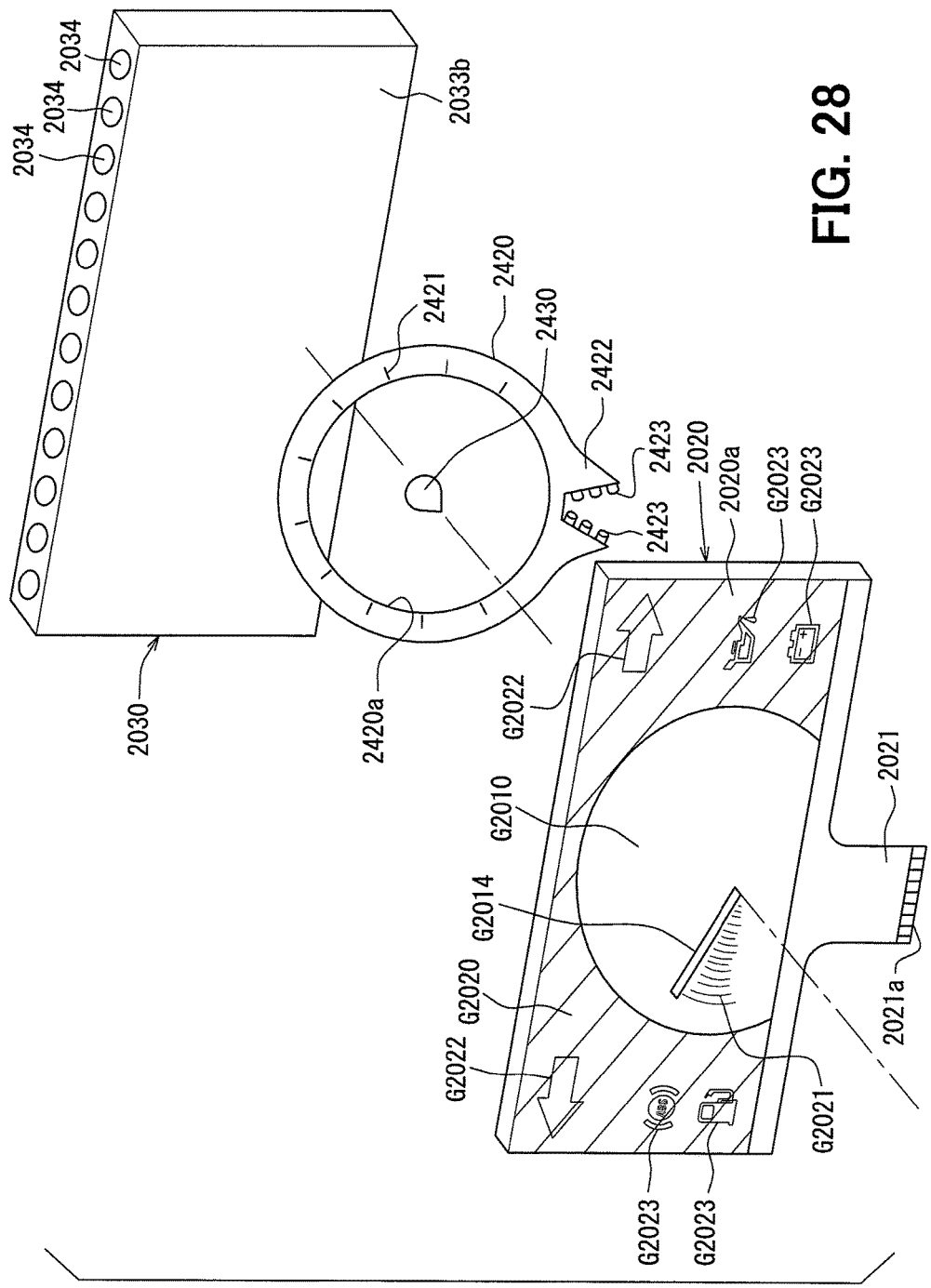
FIG. 28 is an exploded view of the display device according to the eighth embodiment.

In each of the embodiments described above, the pointer 2040 is placed on the back side of the liquid crystal panel 2020 as a real object. In the present embodiment, in contrast, a pointer is expressed by means of an image (pointer image G2014) on a liquid crystal panel 2020, as illustrated in FIGS. 26 to 28, with the pointer as a real object discarded. In addition, a decorative ring 2420 and a decorative boss member 2430 are placed in a gap 2040a between a backlight 2030 and the liquid crystal panel 2020 as real objects. The decorative ring 2420 and the decorative boss member 2430 are fixed in a state where the decorative ring 2420 and the decorative boss member 2430 are in contact with the front face-side surface of a diffusion plate 2033.

The decorative boss member 2430, which has a conical shape and is placed to protrude toward the liquid crystal panel 2020 side, is a resinous member that has a plated conical surface. The plating is reflection-colored in the same color as the pointer image G2014. For example, the plating is reflection-colored in LED light red emitted from an inner peripheral side edge 2420a of the decorative ring 2420. The decorative boss member 2430 is placed at the center of the decorative ring 2420.

The decorative ring 2420 is formed of light transmissive resin and has a ring shape (annular shape), and the decorative ring 2420 according to the present embodiment has a circular ring shape. The decorative ring 2420 is shaped such that the decorative ring 2420 is raised to the front face side from a surface of the decorative ring 2420 that is in contact with the diffusion plate 2033. Multiple grooves are provided in the front face-side surface of the decorative ring 2420, and these grooves, which have a stripe shape and extend in the radial direction of the decorative ring 2420, function as scales 2421 pointed at by the pointer image G2014.

The decorative ring 2420 has a light guide portion 2422, and the decorative ring 2420 and the light guide portion 2422 are integrally formed of resin. Light emitting diode-based light sources 2423 are attached to a side surface of the light guide portion 2422. Light emitted from the light sources 2423 is incident from the side surface of the light guide portion 2422, moves into the light guide portion 2422 and the decorative ring 2420, is reflected by the grooves forming the scales 2421, and then is emitted from the front face side of the decorative ring 2420 (upper side in FIG. 27). The light reflected by the scales 2421 is transmitted through a specific pixel region G2010 of the liquid crystal panel 2020 and is visually recognized by a user.

Accordingly, the scale 2421 parts appear to be shining once the light sources 2423 are turned on. The light sources 2423 consist of three types of light sources, red, green, and blue to be specific, and the color of the light that is emitted from the decorative ring 2420 can be adjusted by a microcomputer 2061 controlling the luminance of each of the light sources 2423. In other words, the scales 2421 can be visually recognized in a desired color.

Among a display surface 2020a, in the region where the transmittance is controlled such that the transmittance is high (specific pixel region G2010), the object that is positioned on the back side of the region, that is, the decorative ring 2420, the decorative boss member 2430, or the diffusion plate 2033, is visible through the liquid crystal panel 2020. In other words, the light (white light) that is emitted from the backlight 2030, reflected or refracted by the decorative ring 2420 and the decorative boss member 2430, and directed toward the liquid crystal panel 2020 is transmitted through the specific pixel region G2010 and is visually recognized by the user. Specifically, the light that is emitted from the backlight 2030 and reflected by the plated part of the decorative boss member 2430 and the light that is emitted from the backlight 2030 and emitted from the inner peripheral side edge 2420a of the decorative ring 2420 are transmitted through the specific pixel region G2010 and are visually recognized. In addition, the light that is emitted from the light sources 2423 and reflected by the scales 2421 is transmitted through the specific pixel region G2010 and is visually recognized. Furthermore, the light that is emitted from the part of the backlight 2030 which is positioned on the inner peripheral side of the decorative ring 2420 is transmitted through the specific pixel region G2010 and is visually recognized as a background image.

In the region (the other pixel region G2020) of the display surface 2020a where the transmittance is controlled such that the transmittance is low, an object that is positioned on the back side of the region cannot be visually recognized. In other words, the light that is reflected or refracted by the decorative ring 2420 and the decorative boss member 2430 and directed toward the liquid crystal panel 2020 is not transmitted through the other pixel region G2020 and thus is invisible to the user. The oblique lines that are illustrated in FIGS. 26, 28, 29, and 30 mean the range of a pixel region where its transmittance is set to be lower than a predetermined value and do not mean cross-sectional hatching.

As the transmittance is increased, the degree to which the light from the decorative ring 2420 and the decorative boss member 2430 is transmitted through the liquid crystal panel 2020 increases and the decorative boss member 2430, the inner peripheral side edge 2420a, and the scales 2421 become more and more clearly visible. As the transmittance is reduced, the degree to which the light from the decorative boss member 2430, the inner peripheral side edge 2420a, and the scales 2421 is transmitted through the liquid crystal panel 2020 decreases and the decorative boss member 2430, the inner peripheral side edge 2420a, and the scales 2421 become increasingly blurry during visual recognition.

In other words, switching can be performed between a real object display mode in which the real object is visually recognized (refer to FIGS. 26 and 29) and a real object hidden mode in which the real object is invisible (refer to FIG. 30) by the transmittance of the liquid crystal panel 2020 being controlled. In the real object display mode, the display device D can be visually recognized in the following manner as well. In other words, the definition of a pointer 2040 (degree of the blur) can be controlled in accordance with the degree of transmittance of the liquid crystal panel 2020. The degree to which the real object is visually recognized in a blurry form can be adjusted by the transmittance being adjusted. An image displayed in the specific pixel region G2010 and the real object can be visually recognized with the image and the real object overlapped with each other. When the part of the specific pixel region G2010 with which the real object is overlapped is displayed in a different color from the other part, an illusion can be created as if the real object had that display color.

In the real object display mode that is illustrated in FIG. 26, the region of the display surface 2020a that includes the entire decorative ring 2420 and the entire decorative boss member 2430 is set as the specific pixel region G2010 and the entire outside of the specific pixel region G2010 is set as the other pixel region G2020. The pointer image G2014 pointing at the scales 2421, number images G2013 showing physical quantities of the scales 2421, and a shadow image G2012 are displayed in the specific pixel region G2010. The shadow image G2012 is an image showing an afterimage of a pointer in the form of imaged radar. A vehicle speed is displayed based on a combination between the pointer image G2014 and the scale 2421 by the display position of the pointer image G2014 being rotated in accordance with the vehicle speed.

The pointer image G2014 is an image shaped to extend in the radial direction of the decorative boss member 2430 and is displayed in the form of rotation with the decorative boss member 2430 being its center of rotation. According to this configuration, an illusion is created as if the pointer that is displayed by the pointer image G2014 and the decorative boss member 2430 integrally rotated with each other. The shadow image G2012 is an image imitating a shadow that extends from the pointer image G2014 to the side opposite in its rotational direction. Accordingly, the shadow image G2012 has a display position varying with the rotational position of the pointer image. The shadow image G2012 has a rotational-direction length set to increase as the rotation speed of the pointer image G2014 increases.

In the real object display mode that is illustrated in FIG. 26, a black image displayed in the other pixel region G2020 is a background and the diffusion plate 2033, the decorative ring 2420, the decorative boss member 2430, the pointer image G2014, the number images G2013, and the shadow image G2012 are visually recognized in combination. In addition, parallax attributable to a difference in focal length occurs among the display surface 2020a, the real object, and the diffusion plate 2033 because of a difference in optical path length in a viewing direction. In other words, the real object is visually recognized as being present on the viewing direction far side (back side) of the display surface 2020a and the diffusion plate 2033 is visually recognized as being present further on the far side of the real object.

The black background image is displayed in the other pixel region G2020. In addition, direction indication images G2022 displaying a blinker operation direction and warning images G2023 for display of warning against the various abnormalities are displayed in the other pixel region G2020 with the background image forming the background. Each of the images that are displayed in the other pixel region G2020, that is, the direction indication images G2022, the warning images G2023, and the black background image, has a transmittance set such that the images are non-transmissive (RGB being OFF without exception). A white background image displayed in the specific pixel region G2010 has a transmittance set such that the image is fully transmissive (RGB being ON without exception).

Figure 29:
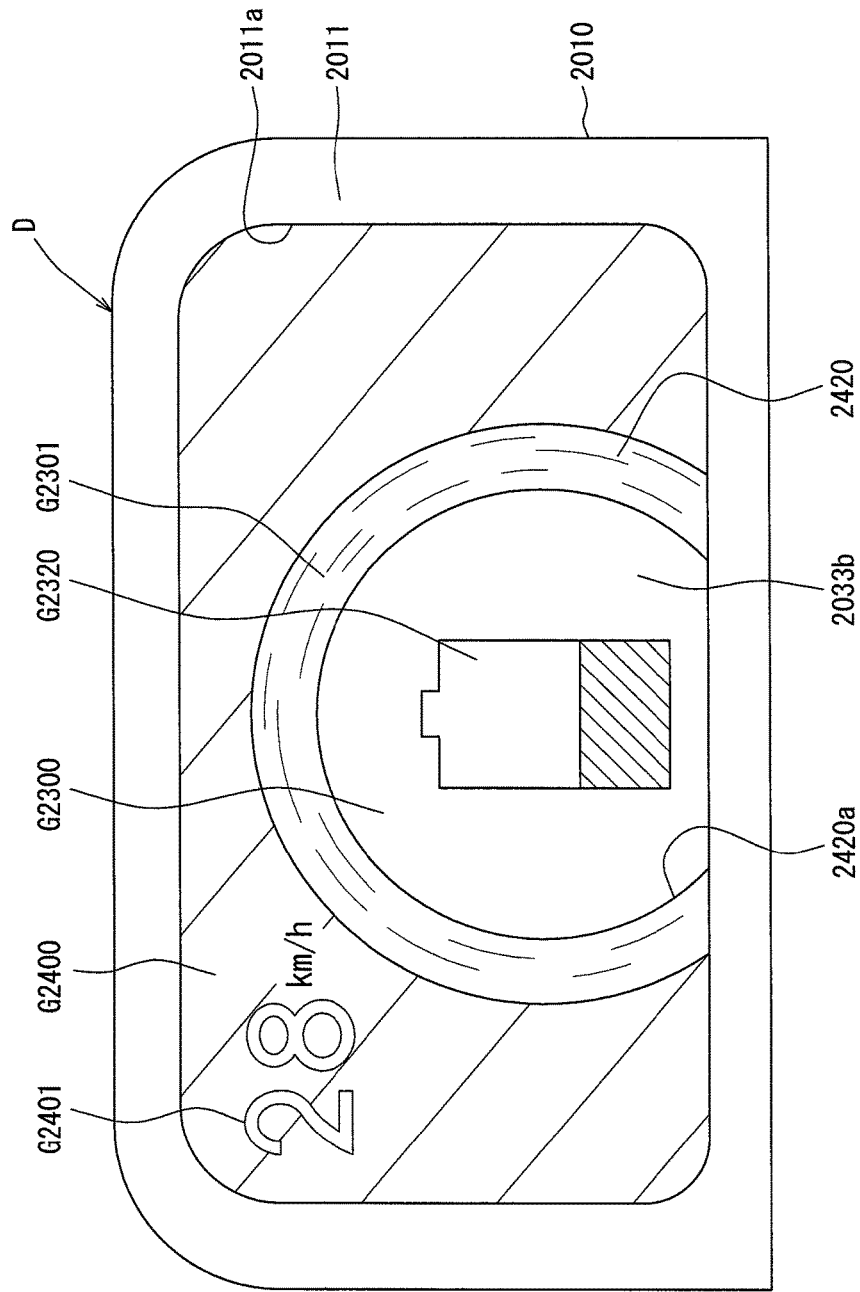
FIG. 29 is a front view of the display device according to the eighth embodiment, in which content displayed in another real object display mode is illustrated.

In the real object display mode that is illustrated in FIG. 29, the region of the display surface 2020a that includes the decorative ring 2420 is set as a specific pixel region G2300 and the entire outside of the specific pixel region G2300 is set as another pixel region G2400. A remaining electric power image G2320 that shows the amount of electric power remaining in a battery and a ring image G2301 that has the same shape as the decorative ring 2420 are displayed in the specific pixel region G2300. When rotation of the ring image G2301 about the decorative boss member 2430 is displayed, an illusion is created as if the decorative ring 2420 actually rotated. In this manner, the user can recognize that charging is in progress.

A black background image is displayed in the other pixel region G2400. In addition, a vehicle speed image G2401 showing the vehicle speed in the form of a numerical value is displayed in the other pixel region G2400 with the background image forming the background. The transmittance of the background image and the transmittance of the vehicle speed image G2401 are set to be lower than a predetermined value. The ring image G2301 that is displayed in the specific pixel region G2300 has a transmittance set to be equal to or higher than a predetermined value. In the example that is illustrated in FIG. 29, the decorative boss member 2430 is invisible because the transmittance of the remaining electric power image G2320 is set to be lower than a predetermined value. Accordingly, the region where the remaining electric power image G2320 is displayed is a part of the other pixel region where the real object is invisible.

Figure 30:
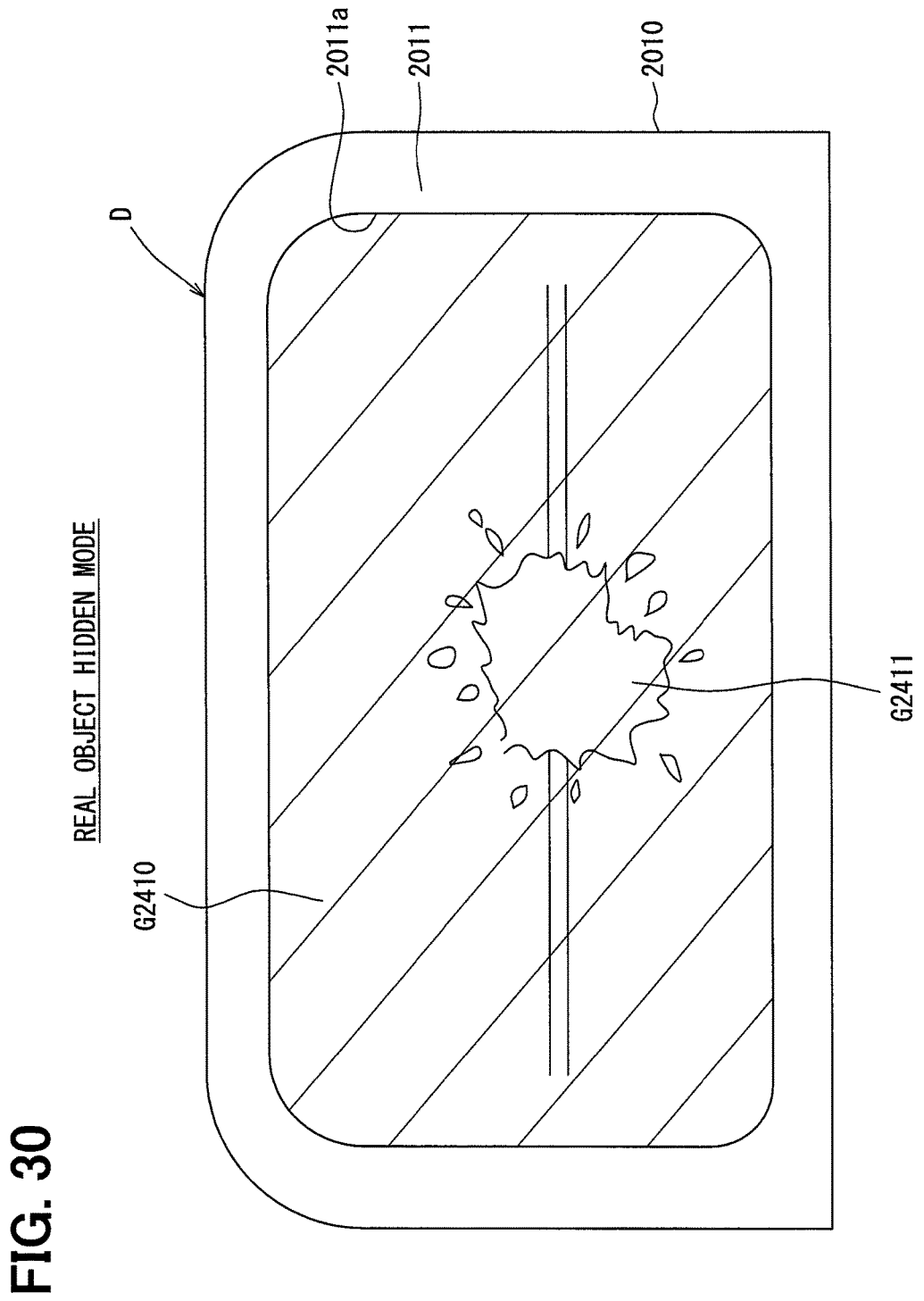
FIG. 30 is a front view of the display device according to the eighth embodiment, in which content displayed in a real object hidden mode is illustrated.

In the real object hidden mode that is illustrated in FIG. 30, the entire display surface 2020a is set in a pixel region G2410 that is displayed at a transmittance which is so low that the real object is invisible. An effect image G2411 is displayed in the pixel region G2410 and the effect image G2411 has a low transmittance set to be lower than a predetermined value. Accordingly, neither the decorative ring 2420 nor the decorative boss member 2430 is visually recognized by the user. The real object hidden mode that is illustrated in FIG. 30 is an example of a termination effect mode or an initiation effect mode.

According to the present embodiment described above, the decorative ring 2420 (real object) and the decorative boss member 2430 (real object) are placed between the liquid crystal panel 2020 and the backlight 2030. Accordingly, a problem in the form of "a part of the image on the liquid crystal panel 2020 being blocked by the real object and becoming invisible", which occurs in a case where these real objects are placed on the front face side of the liquid crystal panel 2020, can be avoided. Accordingly, the entire display surface 2020a of the liquid crystal panel 2020 can be effectively used while a sense of depth is given to the display device D by the liquid crystal panel 2020 being combined with the decorative ring 2420 and the decorative boss member 2430 as real objects.

In the real object display mode according to the present embodiment, the decorative ring 2420 and the decorative boss member 2430 are visually recognized on the far side of the image on the liquid crystal panel 2020 and the diffusion plate 2033 is visually recognized on the far side of the decorative ring 2420 and the decorative boss member 2430. Accordingly, a layer display that has at least three layers can be realized and a depth-provided appearance can be improved.

According to the present embodiment, the specific pixel region G2010 at the part where the real object is positioned on its back side is higher in transmittance than the other pixel region G2020, and thus the real object is easily visible through the specific pixel region G2010. On the other hand, in the other pixel region G2020, the object (diffusion plate 2033) that is present on the back side of the liquid crystal panel 2020 is hardly visible. Accordingly, the real object visually recognized through the specific pixel region G2010 stands out and attraction of attention to the real object can be promoted. In other words, the visual attractiveness of the real object can be improved.

According to the present embodiment, the light sources 2423, which illuminate the decorative ring 2420 (decorative member), is provided in addition to the backlight 2030. Accordingly, the scales 2421 can be clearly visible when a sense of floating is generated based on the parallax between the scales 2421 of the decorative ring 2420 and the various images displayed on the liquid crystal panel 2020, and thus the sense of floating can be improved with the parallax highlighted.

According to the present embodiment, the scale 2421 as a real object is pointed at by the pointer image G2014. Accordingly, the scale 2421 is visually recognized on the far side of the pointer image G2014 and the depth-provided appearance can be improved. In addition, the sense of depth can be improved since the diffusion plate 2033, which is the background of the pointer image G2014, is visually recognized on the far side of the scale 2421.

According to the present embodiment, the liquid crystal panel 2020 is controlled such that the other pixel region G2020 becomes a black image. Accordingly, the diffusion plate 2033 is invisible in the other pixel region G2020, and the visual attractiveness of the decorative ring 2420 and the decorative boss member 2430 can be further improved since the luminance of the specific pixel region G2010 is higher than the luminance of the other pixel region G2020.

According to the present embodiment, switching occurs between the hidden mode (refer to FIG. 30) in which neither the decorative ring 2420 nor the decorative boss member 2430 is displayed and the display mode (refer to FIG. 29) in which the decorative ring 2420 is displayed while the decorative boss member 2430 is hidden. Since the real object is placed on the back side of the liquid crystal panel 2020 as described above, hiding of a desired real object can be realized with ease when a low luminance region (the other region) attributable to the liquid crystal panel 2020 is changed.

(Ninth Embodiment)

Figure 33:
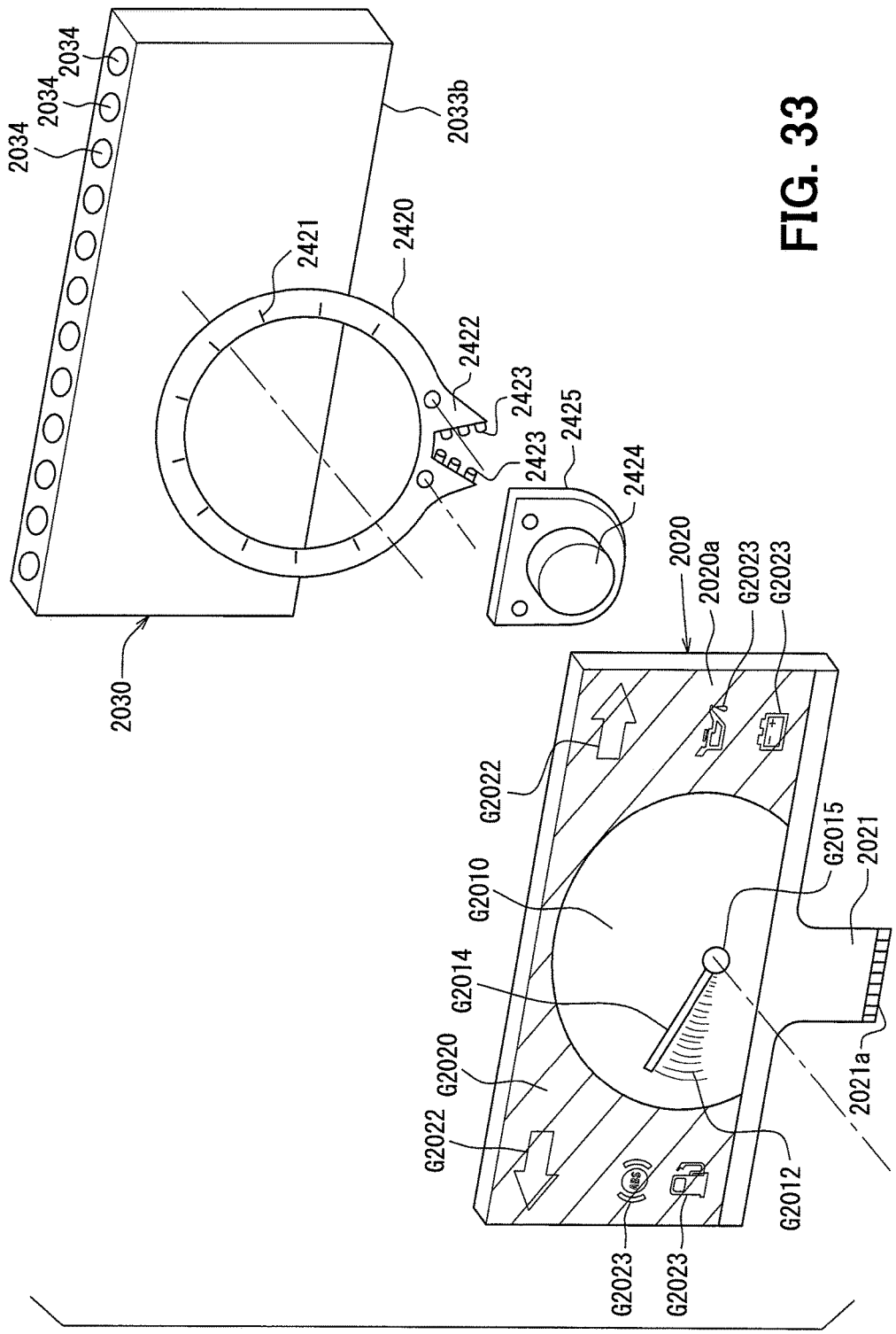
FIG. 33 is an exploded view of the display device according to the ninth embodiment.

In the embodiment illustrated in FIG. 26, the decorative ring 2420 is fixedly installed at a predetermined position. In the present embodiment that is illustrated in FIGS. 31 to 35, in contrast, a decorative ring 2420 is configured to be movable by an actuator (electric motor 2424). Specifically, a rotating shaft of the electric motor 2424 is attached to a bracket 2425 that is attached to the decorative ring 2420 as illustrated in FIG. 33. The bracket 2425 rotates once the rotating shaft of the electric motor 2424 is driven to rotate, and then the decorative ring 2420 rotates about the rotating shaft. In the present embodiment, a boss image G2015 imitating the decorative boss member 2430 is displayed on a liquid crystal panel 2020 (refer to FIG. 31) with the decorative boss member 2430 illustrated in FIG. 28 discarded (refer to FIG. 32). In this manner, the decorative boss member 2430 interfering with the rotating decorative ring 2420 is avoided.

The decorative ring 2420 moves back and forth between a position facing a display surface 2020a of the liquid crystal panel 2020 (refer to FIG. 34) and a position deviating from the facing position (refer to FIG. 35) by the controller 2600 illustrated in FIG. 21 controlling the electric motor 2424. The bracket 2425 is placed, along with light sources 2423, at the position deviating from the position facing the display surface 2020a (refer to FIGS. 34 and 35). Accordingly, the bracket 2425, the electric motor 2424, and the light sources 2423 are placed to be hidden on the back side of an instrument panel, and thus are invisible as illustrated in FIG. 31.

Figure 31:
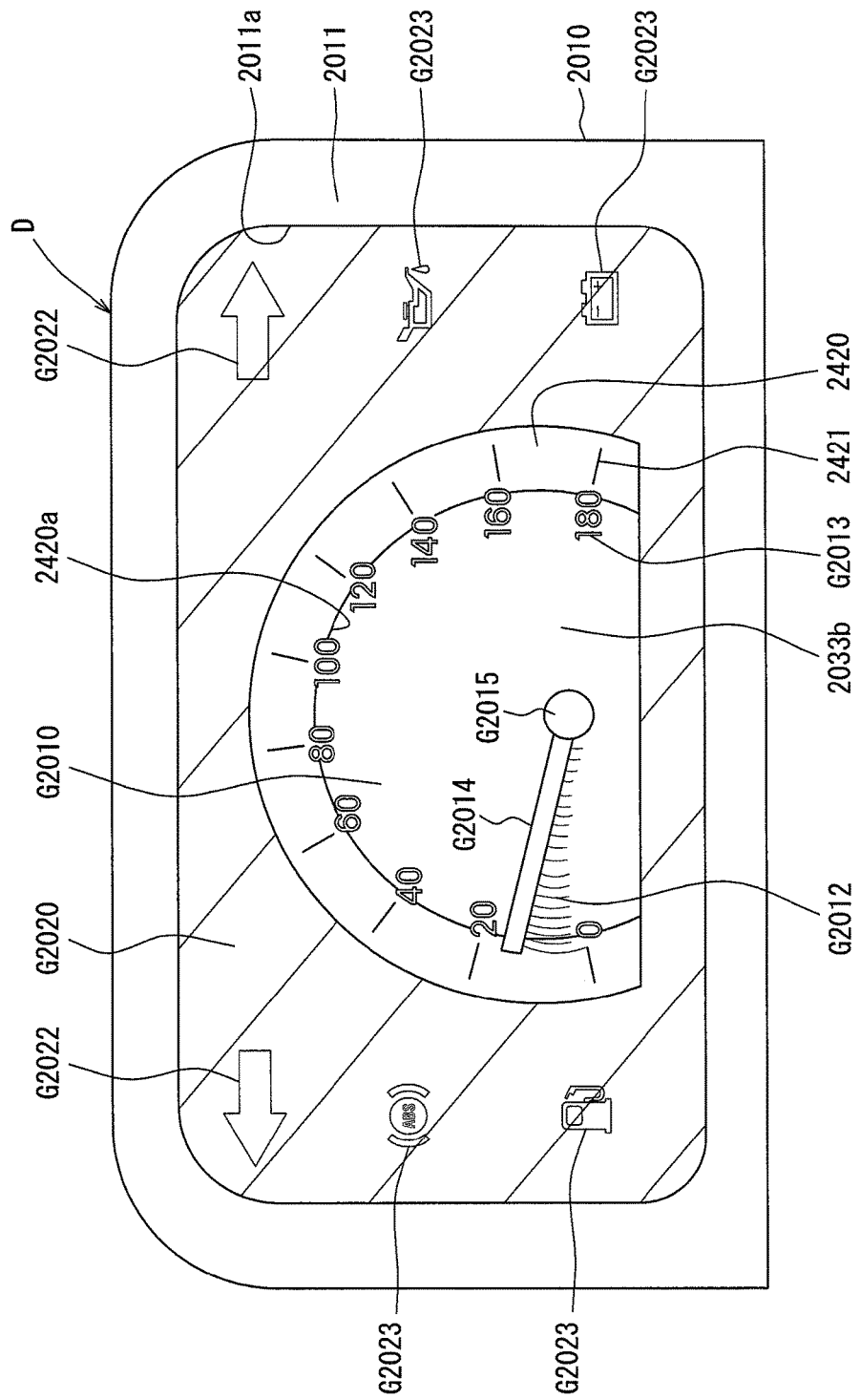
FIG. 31 is a front view of a display device according to a ninth embodiment of the present disclosure, in which content displayed in a real object display mode is illustrated.
Figure 32:
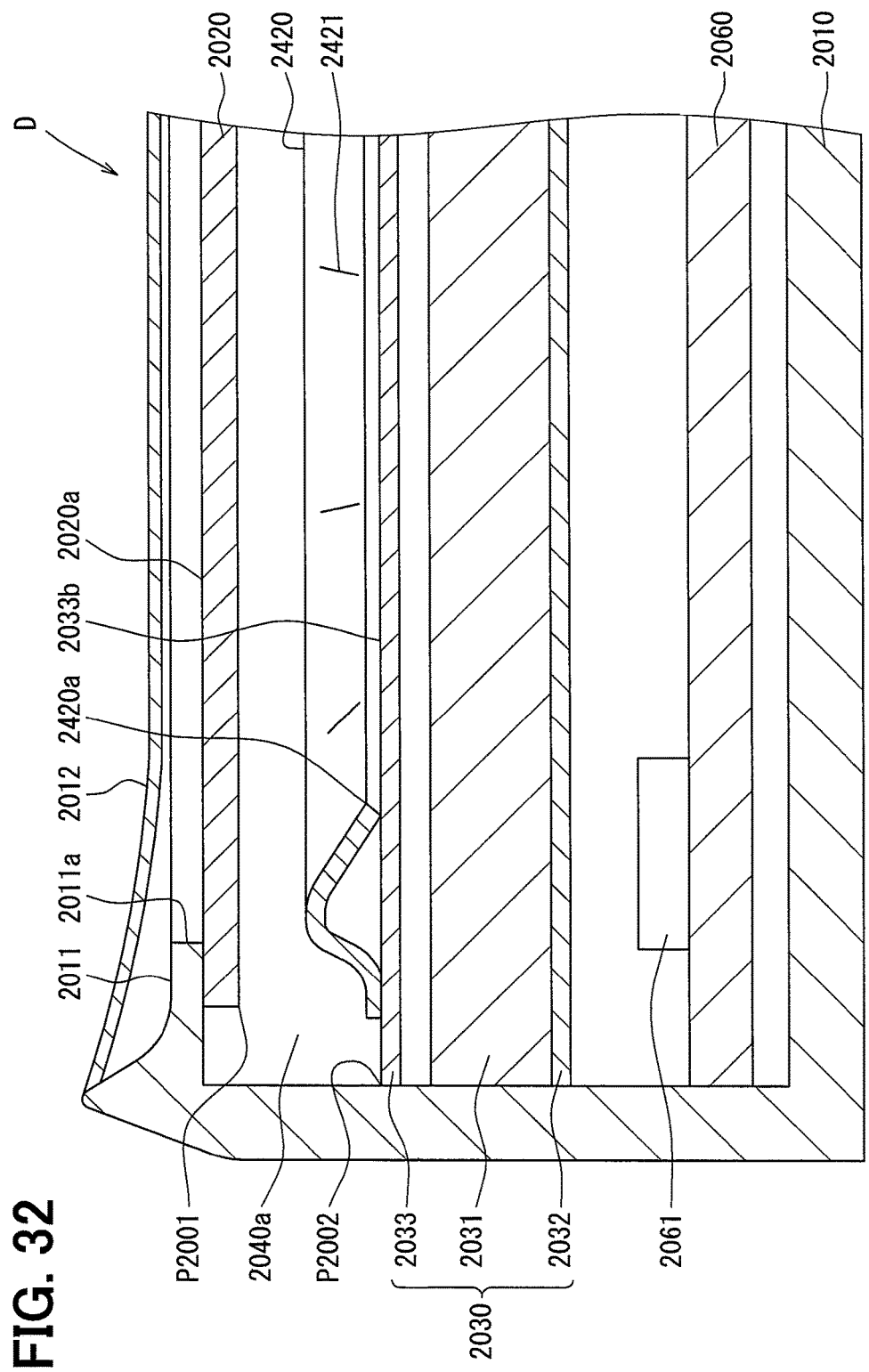
FIG. 32 is a cross-sectional view illustrating a part of the display device according to the ninth embodiment.
Figure 34:
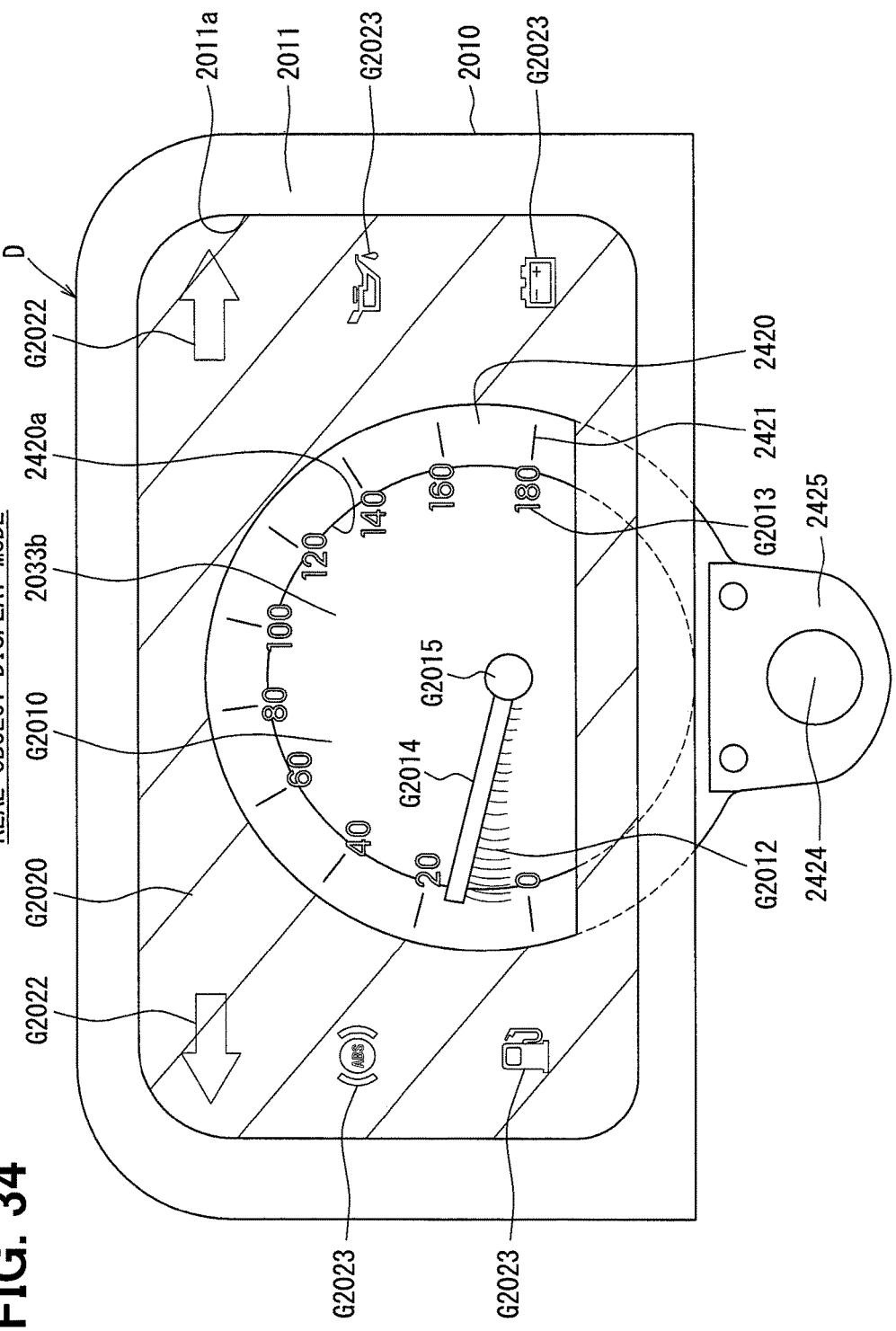
FIG. 34 is a diagram illustrating a state where an actuator according to the ninth embodiment has moved a real object to a position facing a liquid crystal panel.
Figure 35:
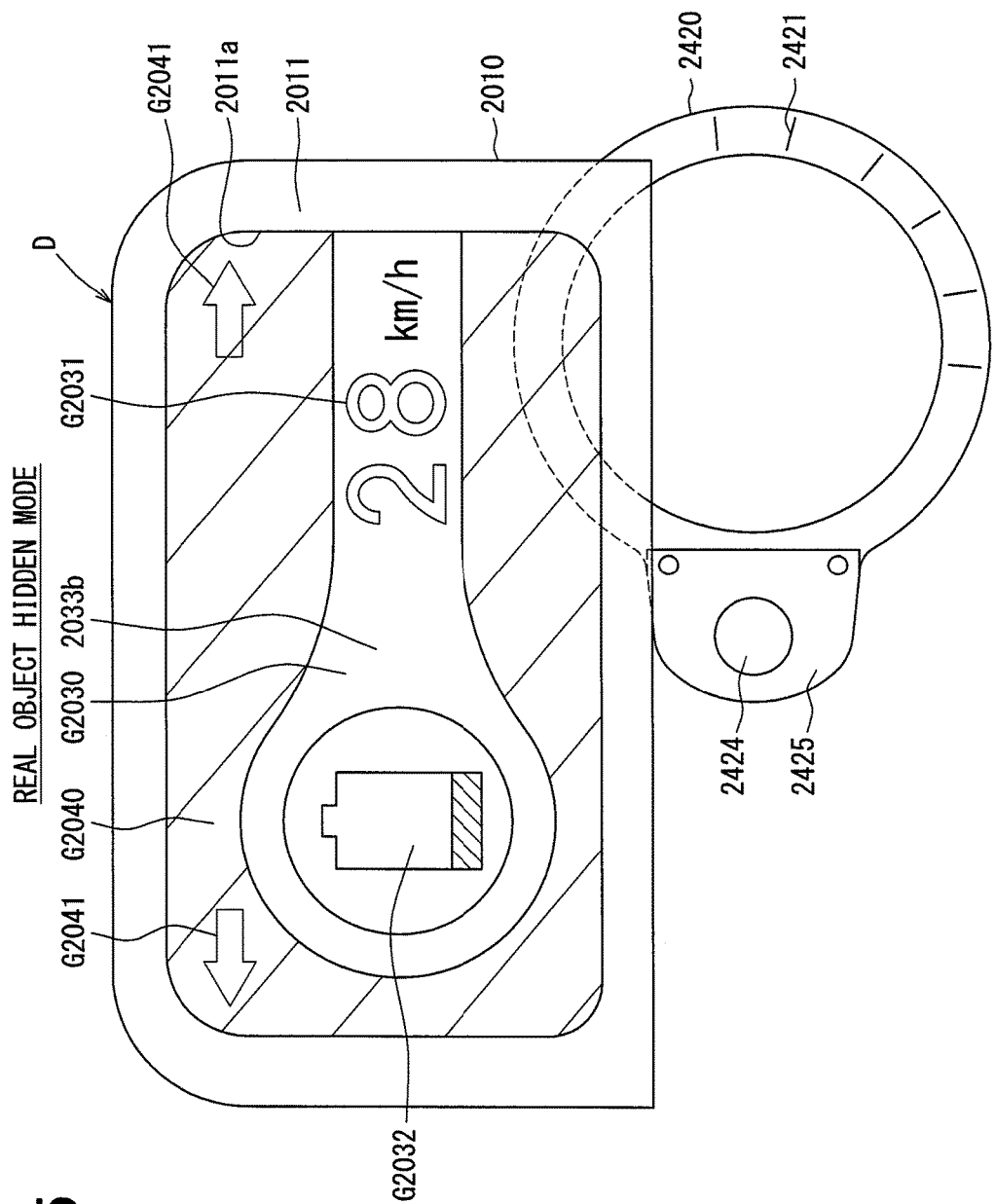
FIG. 35 is a diagram illustrating a state where the actuator according to the ninth embodiment has moved the real object to a position deviating from the position facing the liquid crystal panel.

Although a case 2010 being assembled in the instrument panel is as described above, the illustration of the instrument panel present around the case 2010 is omitted in FIG. 31. In FIGS. 34 and 35, a state is illustrated where a display device D has been removed from the instrument panel.

In the real object display mode that is illustrated in FIG. 34, a part of the decorative ring 2420 positioned in a specific pixel region G2010 is visually recognized through the liquid crystal panel 2020. In the real object hidden mode that is illustrated in FIG. 35, the decorative ring 2420 is hidden by a second pixel region G2040 and is invisible. The area of the part of the decorative ring 2420 that is present at the position facing the display surface 2020a is smaller in the real object hidden mode than in the real object display mode since the decorative ring 2420 is movable.

In the real object display mode that is illustrated in FIGS. 31 and 34, the region of the display surface 2020a that includes the decorative ring 2420 is set as the specific pixel region G2010 and the entire outside of the specific pixel region G2010 is set as the other pixel region G2020. A pointer image G2014 pointing at scales 2421, number images G2013 showing physical quantities of the scales 2421, a shadow image G2012, and the boss image G2015 are displayed in the specific pixel region G2010. In this real object display mode, a black image displayed in the other pixel region G2020 is a background and a diffusion plate 2033, the decorative ring 2420, the pointer image G2014, the number images G2013, the shadow image G2012, and the boss image G2015 are visually recognized in combination.

The black background image is displayed in the other pixel region G2020. In addition, direction indication images G2022 displaying a blinker operation direction and warning images G2023 for display of warning against the various abnormalities are displayed in the other pixel region G2020 with the background image forming the background. The images that are displayed in the other pixel region G2020 have a transmittance set to be lower than a predetermined value. A white background image displayed in the specific pixel region G2010 has a transmittance set to be equal to or higher than a predetermined value.

In the real object hidden mode that is illustrated in FIG. 35, the display surface 2020a is divided into a first pixel region G2030 and the second pixel region G2040 that is a region outside the entire first pixel region G2030. The second pixel region G2040 has a transmittance which is set to be so low that the decorative ring 2420 cannot be visually recognized, and the rotational position of the decorative ring 2420 is controlled such that the rotational position of the decorative ring 2420 is outside a position corresponding to the first pixel region G2030. Specifically, a part of the decorative ring 2420 is present at a position facing the second pixel region G2040 and the other part is present outside the position facing the display surface 2020a. Accordingly, the decorative ring 2420 is invisible to the user. In addition, direction indication images G2041 are displayed in the second pixel region G2040 with a black background image forming their background.

A vehicle speed image G2031 showing the vehicle speed in the form of a numerical value and a remaining electric power image G2032 showing the electric power remaining in the automotive battery are displayed in the first pixel region G2030. The background image of the first pixel region G2030 that represents the background of the vehicle speed image G2031 and the remaining electric power image G2032 has a high transmittance set to be higher than the transmittance of the background image of the second pixel region G2040.

According to the present embodiment described above, the decorative ring 2420 (real object) is placed between the liquid crystal panel 2020 and a backlight 2030. Accordingly, a problem in the form of "a part of the image on the liquid crystal panel 2020 being blocked by the real object and becoming invisible", which occurs in a case where the real object is placed on the front face side of the liquid crystal panel 2020, can be avoided. Accordingly, the entire display surface 2020a of the liquid crystal panel 2020 can be effectively used while a sense of depth is given to the display device D by the liquid crystal panel 2020 being combined with the decorative ring 2420 as a real object.

According to the present embodiment, switching occurs between a hidden mode (refer to FIG. 30) in which no real object is displayed, that is, neither the decorative ring 2420 nor the decorative boss member 2430 is displayed, and a hidden mode (refer to FIG. 29) in which one of the real objects, that is, the decorative boss member 2430, is hidden. Since the real object is placed on the back side of the liquid crystal panel 2020 as described above, hiding of a desired real object can be realized with ease when a low luminance region (the other region) attributable to the liquid crystal panel 2020 is changed.

According to the present embodiment, the electric motor 2424 moves the real object in parallel to the display surface 2020a. Accordingly, the real object can be moved while an increase in the size of the display device D in a viewing direction is avoided. The electric motor 2424 allows the real object to move back and forth between the position facing the display surface 2020a of the liquid crystal panel 2020 and the position deviating from the facing position. Accordingly, the area of the part of the real object that faces the display surface 2020a can be reduced in the real object hidden mode. Accordingly, the area of the second pixel region G2040 in the real object hidden mode, that is, a pixel region for hiding the real object, can be reduced. Accordingly, the area requiring a low luminance can be reduced and the degree of freedom of content displayed in the real object hidden mode can be improved.

(Tenth Embodiment)

Figure 36:
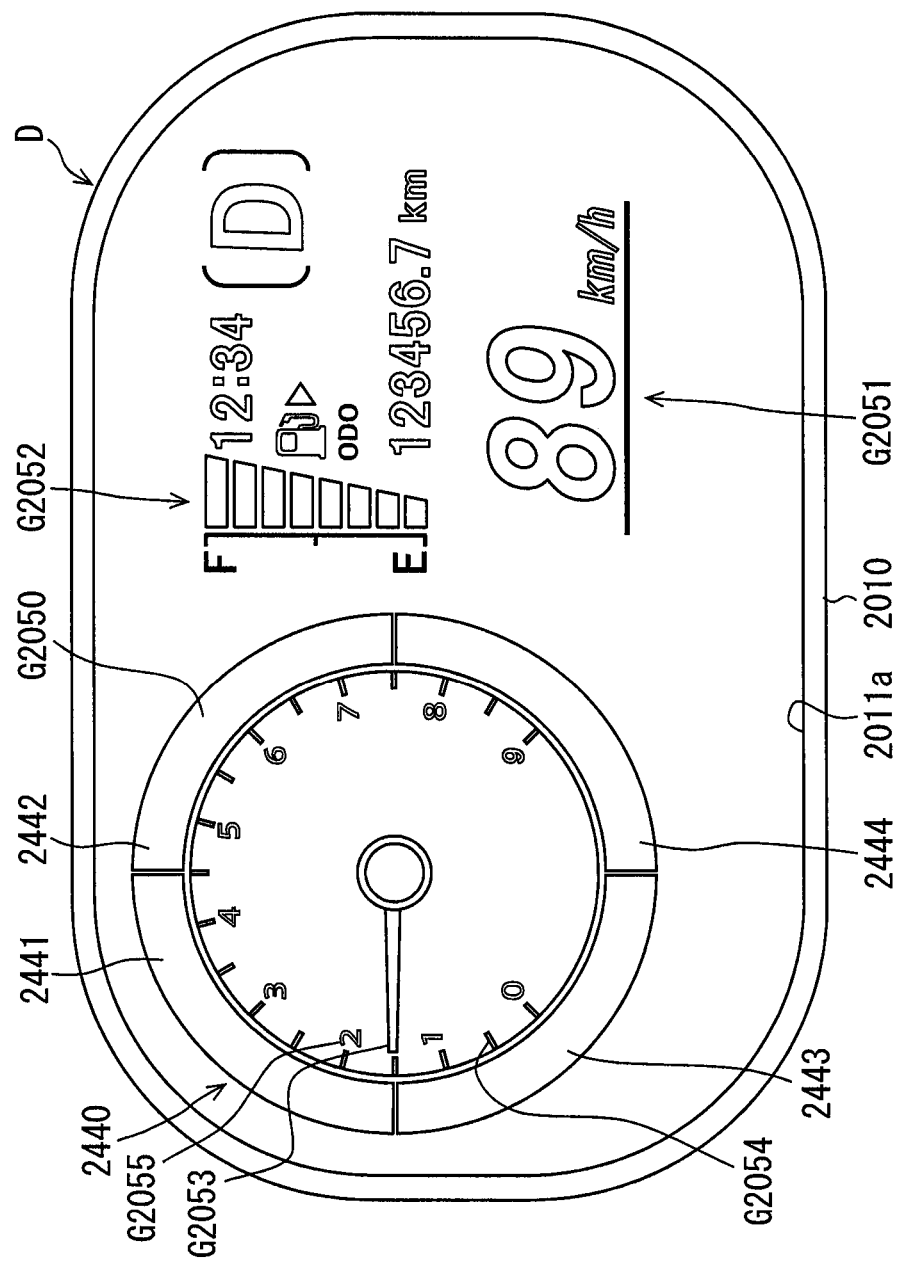
FIG. 36 is a front view of a display device according to tenth embodiment of the present disclosure, in which content displayed in a real object display mode is illustrated.
Figure 37:
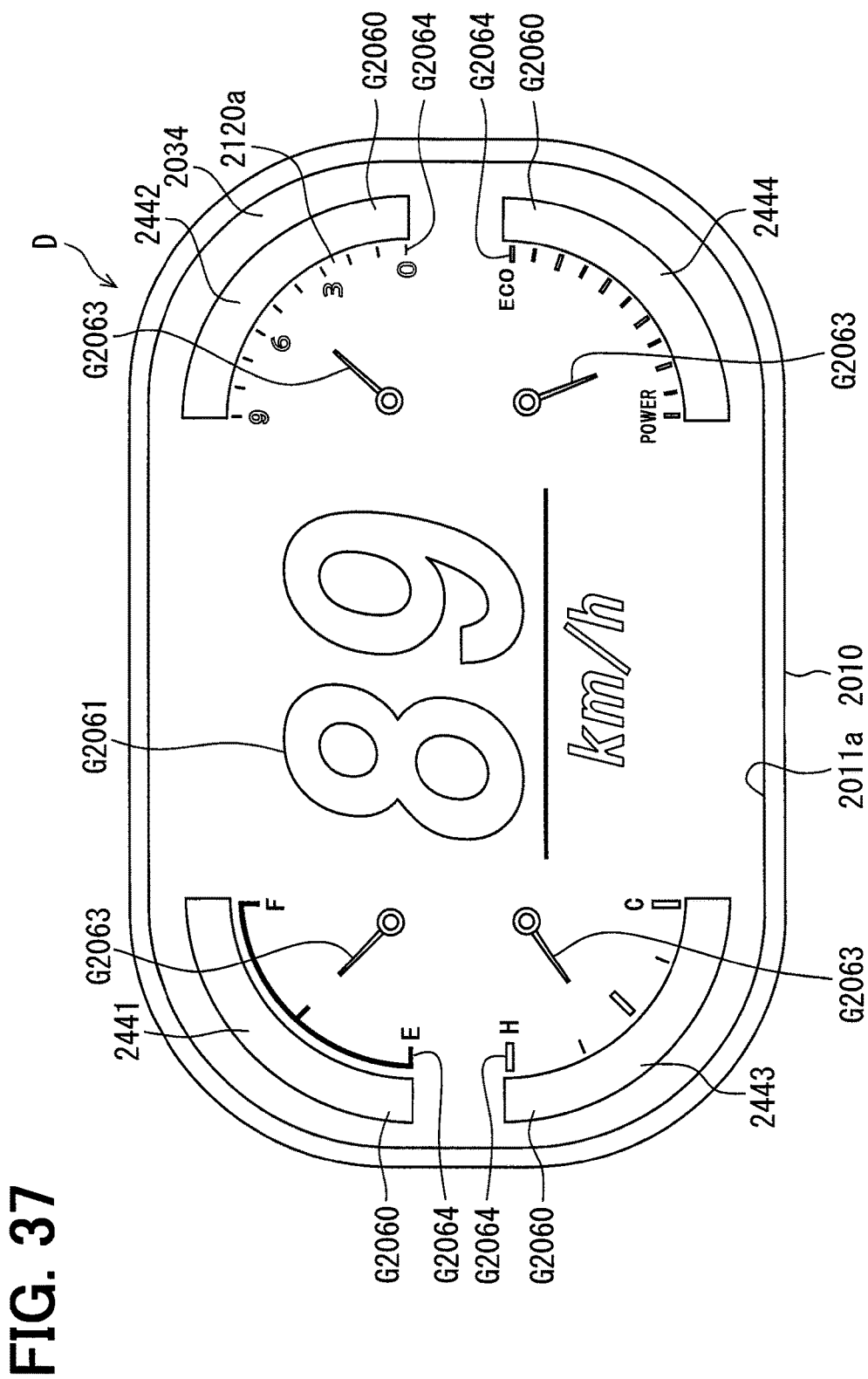
FIG. 37 is a diagram illustrating a state where a real object has been divided and moved according to the tenth embodiment.

In the ninth embodiment described above, the decorative ring 2420, which is a real object, is moved in a rotating manner. In the present embodiment, in contrast, a decorative ring 2440 is moved in parallel to a display surface 2020a without a change in direction. In addition, switching is performed between an integration mode illustrated in FIG. 36 (described later) and a separation mode illustrated in FIG. 37 (described later) based on a parallel movement of multiple divided pieces 2441, 2442, 2443, and 2444.

In the integration mode, the multiple divided pieces 2441 to 2444 are moved and combined such that the single decorative ring 2440 is provided. A decorative ring image G2050 is displayed at the part of a liquid crystal panel 2020 that faces the decorative ring 2440. A vehicle speed image G2051 showing a vehicle speed in the form of a numerical value and a remaining fuel level image G2052 showing the amount of remaining fuel are displayed at outside parts of the decorative ring image G2050. A pointer image G2053, scale images G2054, and numerical value images G2055 are displayed at inside parts of the decorative ring image G2050.

In the integration mode, the region of the liquid crystal panel 2020 where the decorative ring image G2050 is displayed is corresponding to a "specific pixel region". The region where none of the images G2050 to G2055 is displayed is corresponding to "another pixel region" where a background image is displayed. In other words, the decorative ring image G2050 is displayed at a position overlapped with the decorative ring 2440 and the light transmittance of the decorative ring image G2050 is set to be higher than the light transmittance of the background image. Accordingly, the decorative ring 2440 is visually recognized through the liquid crystal panel 2020. Accordingly, the decorative ring image G2050 is visually recognized as being overlapped with the decorative ring 2440, and an optical illusion can be created as if the decorative ring 2440 were a real object provided in, for example, the color of the decorative ring image G2050.

In the separation mode, the multiple divided pieces 2441 to 2444 are placed apart from one another. The divided pieces 2441 to 2444 decorate respective pointer images G2063 and scale images G2064, which will be described below. The four sets of the pointer images G2063 and the scale images G2064, which are positioned at the four corners of the liquid crystal panel 2020, display the amount of the remaining fuel level, an engine speed, an engine coolant temperature, and a fuel consumption pointer, respectively. A vehicle speed image G2061 showing the vehicle speed in the form of a numerical value is displayed at the central part of the liquid crystal panel 2020.

In the separation mode, the region of the liquid crystal panel 2020 where a decorative ring image G2060 is displayed is corresponding to a "specific pixel region" and the region where none of the images G2060 to G2064 is displayed is corresponding to "another pixel region" and is a background image. In other words, the decorative ring image G2060 has a light transmittance that is set to be higher than that of the background image, and the divided pieces 2441 to 2444 are visually recognized through the liquid crystal panel 2020. Accordingly, the decorative ring image G2060 is visually recognized as being overlapped with the divided pieces 2441 to 2444, and an optical illusion can be created as if the divided pieces 2441 to 2444 were real objects provided in, for example, the color of the decorative ring image G2060.

In short, it can be said that the liquid crystal panel 2020 is controlled such that the divided pieces 2441 to 2444 are moved based on switching between the integration mode and the separation mode and the position or shape of the specific pixel region changes as a result of the movement. The divided pieces 2441 to 2444 according to the present embodiment have a range of movement limited to a range facing the display surface 2020a (inside) whereas the decorative ring 2420 according to the ninth embodiment described above has a range of rotating movement expanded to cover even the outside of the display surface 2020a.

Effects similar to those achieved by the ninth embodiment described above are achieved in the case of the parallel movement of the decorative ring 2440 according to the present embodiment described above. In addition, the degree of freedom in terms of the position of the specific pixel region is higher than in a case where the decorative ring 2420 is rotated since the decorative ring 2440 is moved after being separated into the multiple divided pieces 2441 to 2444. Accordingly, the degree of freedom of displayed content can be improved in a real object display mode and a real object hidden mode alike.

(Eleventh Embodiment)

Figure 38:
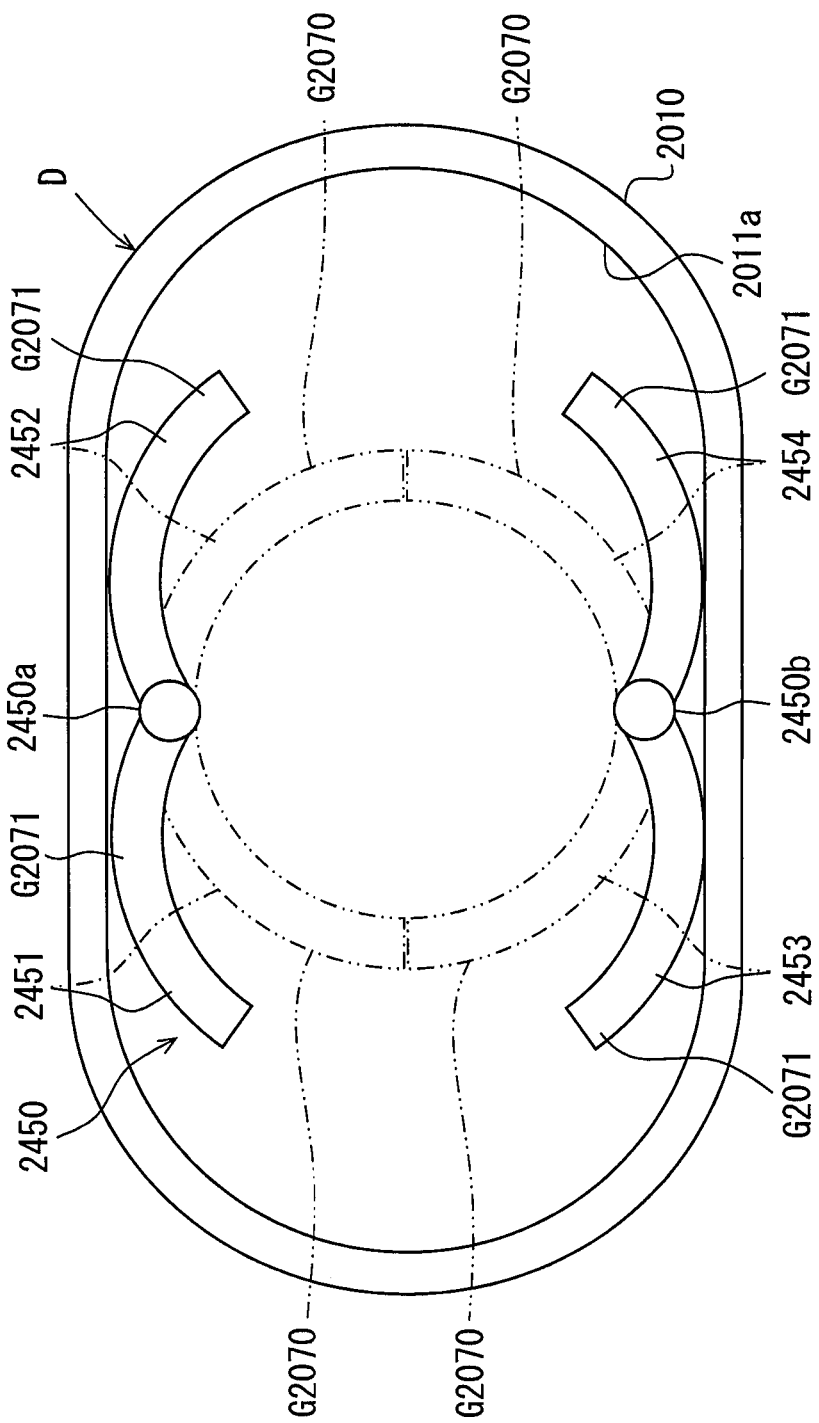
FIG. 38 is a diagram showing a state where a real object moves according to an eleventh embodiment of the present disclosure.

In the tenth embodiment described above, the multiple divided pieces 2441 to 2444 are subjected to a parallel movement without a change in direction. In the present embodiment that is illustrated in FIG. 38, in contrast, multiple divided pieces 2451 and 2452 and multiple divided pieces 2453 and 2454 that constitute a decorative ring 2450 are configured to rotate about multiple rotating shafts 2450a and 2450b, respectively. The two-dot chain lines that are illustrated in FIG. 38 represent an integration mode, in which the multiple divided pieces 2451 to 2454 have been moved to provide the single decorative ring 2450 in combination.

In the integration mode and a separation mode, the region of a liquid crystal panel 2020 where decorative ring images G2070 and G2071 are displayed is corresponding to a "specific pixel region". The region where the decorative ring images G2070 and G2071 are hidden is corresponding to "another pixel region" where a background image is displayed. In other words, the light transmittance of the decorative ring images G2070 and G2071 is set to be higher than the light transmittance of the background image, and the decorative ring 2450 or the divided pieces 2451 to 2454 are visually recognized through the liquid crystal panel 2020. Accordingly, the decorative ring images G2070 and G2071 are visually recognized as being overlapped with the divided pieces 2451 to 2454, and an optical illusion can be created as if the decorative ring 2450 were a real object provided in, for example, the color of the decorative ring images G2070 and G2071.

In short, it can be said that the liquid crystal panel 2020 is controlled such that the divided pieces 2451 to 2454 are moved based on switching between the integration mode and the separation mode and the position or shape of the specific pixel region changes as a result of the movement.

According to the present embodiment described above, a decorative ring 2440 is moved after being separated into the multiple divided pieces 2451 to 2454, and thus the degree of freedom in terms of the position of the specific pixel region is higher than in the case of the ninth embodiment, which lacks that type of separation. With the structure of the present embodiment, in which the divided pieces 2451 to 2454 are rotated, a mechanism rotating the divided pieces 2451 to 2454 can be simpler and more compact than in the above-described tenth embodiment, in which the respective divided pieces 2441 to 2444 are subjected to a parallel movement.

(Twelfth Embodiment)

Figure 39:
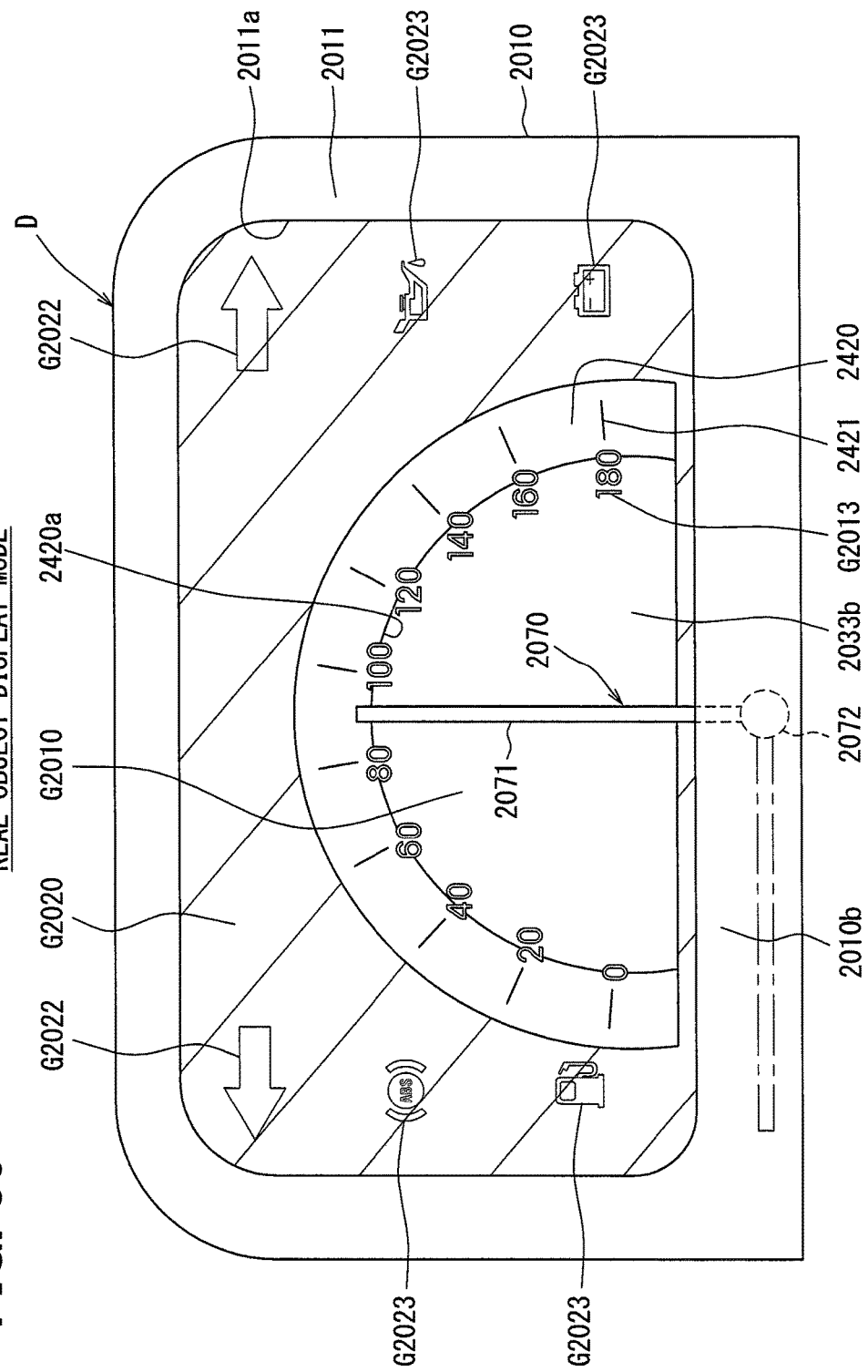
FIG. 39 is a front view of a display device according to a twelfth embodiment of the present disclosure, in which content displayed in a real object display mode is illustrated.
Figure 40:
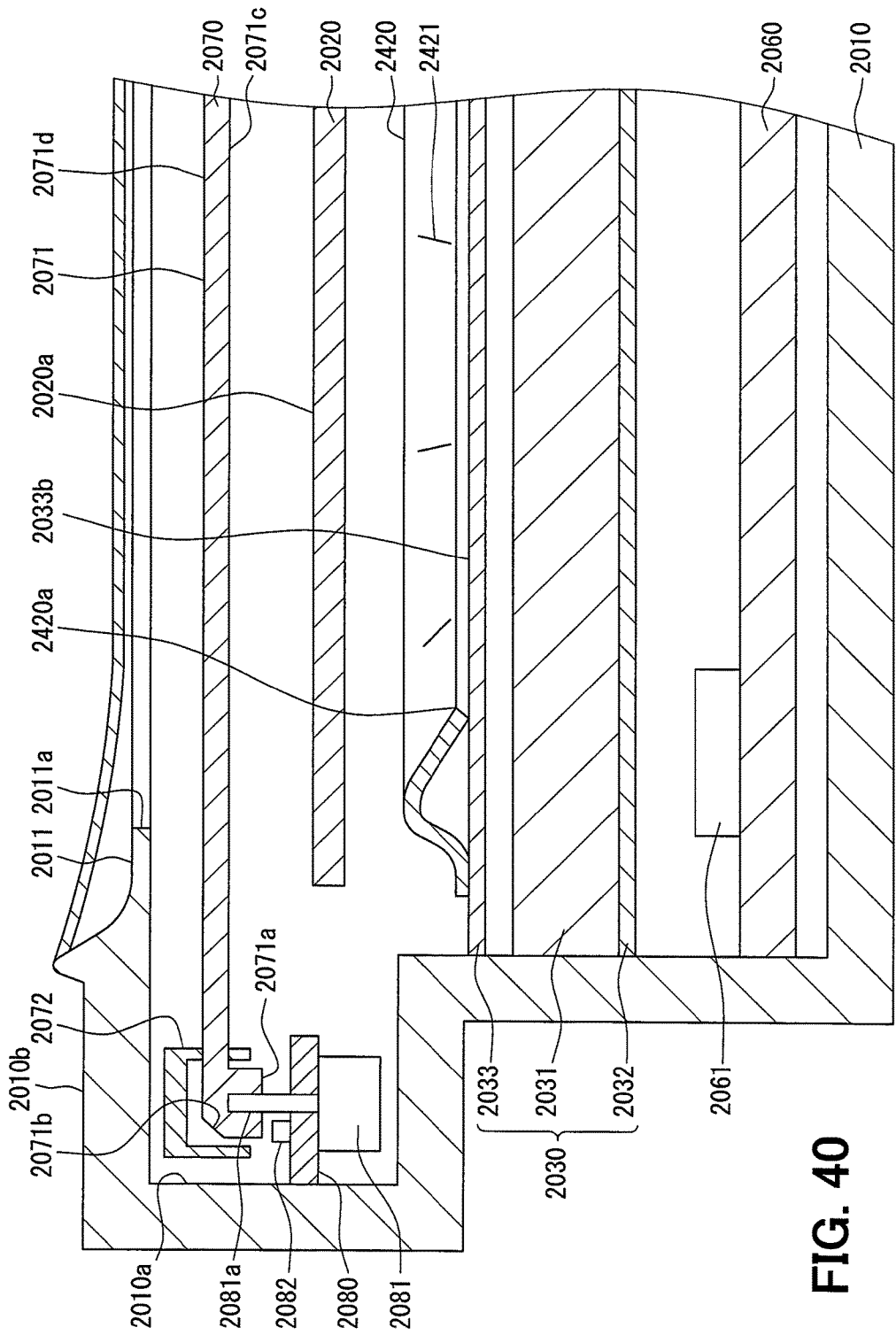
FIG. 40 is a cross-sectional view illustrating a part of the display device according to the twelfth embodiment.
Figure 41:
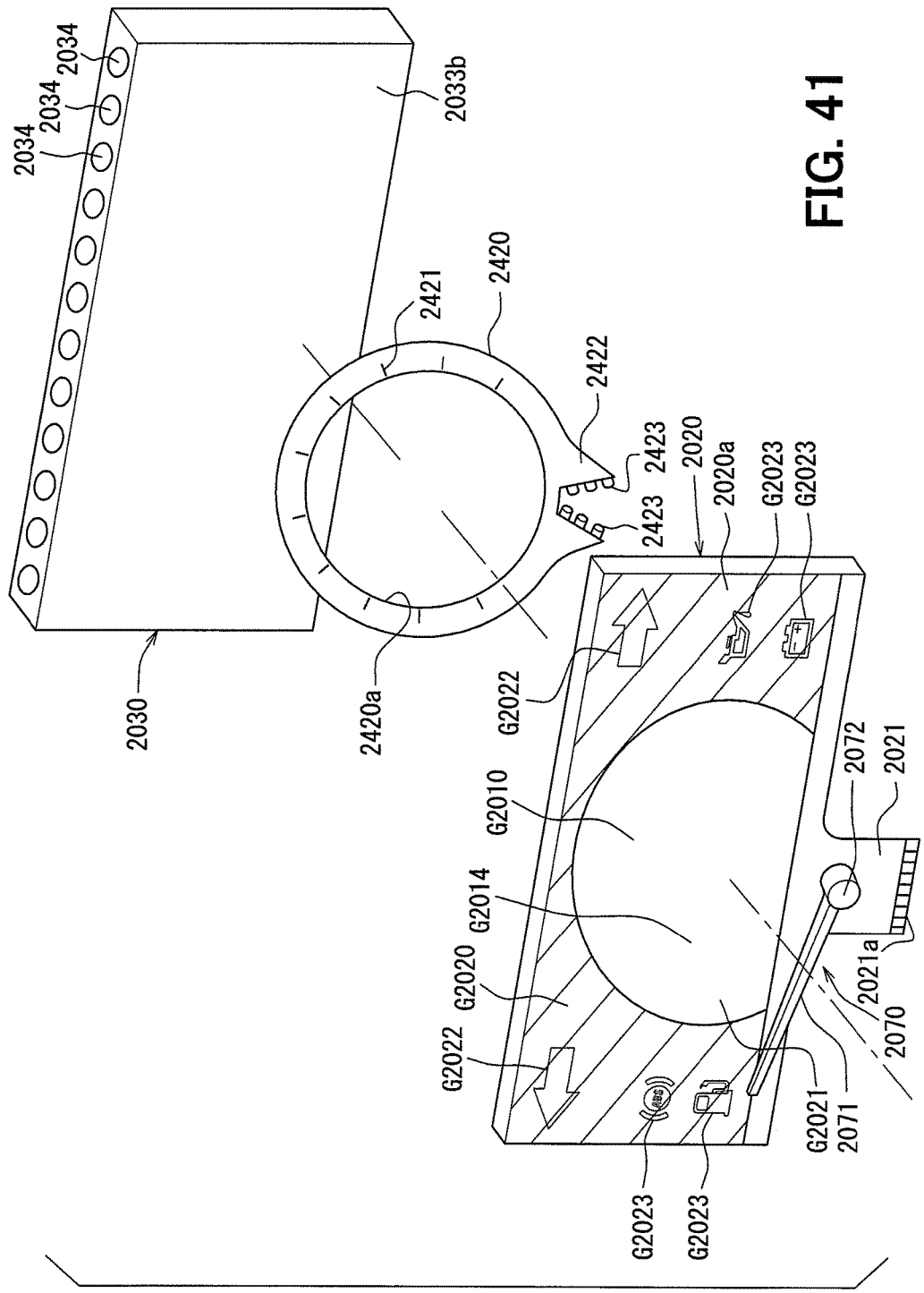
FIG. 41 is an exploded view of the display device according to the twelfth embodiment.

In the present embodiment, a pointer 2070 that is driven to rotate is provided on the side (front face side) opposite to a backlight 2030 with respect to a liquid crystal panel 2020 as illustrated in FIGS. 39, 40, and 41. The pointer 2070 has an indication unit 2071 and a cover portion 2072. A concave portion 2010a, which is recessed in a vertical direction with respect to a viewing direction, is provided in a case 2010. A substrate 2080, on which a motor 2081 and a light source 2082 are mounted, is placed in the concave portion 2010a. The substrate 2080 is connected to a circuit board 2060, and operations of the motor 2081 and the light source 2082 are controlled by a microcomputer 2061. The case 2010 supports the substrate 2080, the substrate 2080 supports the motor 2081, and the motor 2081 supports the pointer 2070.

A rotating shaft 2081a of the motor 2081 is fixed to the center-of-rotation part of the indication unit 2071, and the indication unit 2071 is rotated along a display surface 2020a along with the cover portion 2072 once driven by the motor 2081. The light source 2082 is, for example, a light emitting diode, and the light that is emitted from the light source 2082 is incident upon the inner portion of the indication unit 2071 from an incident surface 2071a of the indication unit 2071. The indication unit 2071 is a light-guiding resinous unit, and the light that is incident upon the inner portion is reflected by a reflecting surface 2071b and moves toward a tip part from the center-of-rotation part of the indication unit 2071.

The surface of the indication unit 2071 on the back side functions as a reflecting surface 2071c. The reflecting surface 2071c is provided by means of grain processing or the like. Alternatively, the reflecting surface 2071c is provided by means of white paint application. The light that moves into the indication unit 2071 while being reflected by the reflecting surface 2071c after being reflected by the reflecting surface 2071b is emitted from an emission surface 2071d, which is a near-side (viewer-side) surface of the indication unit 2071. As a result, the indication unit 2071 is subjected to transmitted illumination with the light from the light source 2082, and the entire emission surface 2071d is visually recognized as emitting light.

The part that is the center-of-rotation part of the indication unit 2071 and provides the rotating shaft 2081a and the incident surface 2071a is covered from its near side by the cover portion 2072. The cover portion 2072 is formed of non-light transmissive resin. Alternatively, a light-shielding paint is applied to the surface of the cover portion 2072. The cover portion 2072 is covered from its near side by the case 2010. The case 2010 is formed of resin not having light transmissive property, and thus the cover portion 2072 at the pointer 2070 is covered by the case 2010 and is hidden from sight not to be visible.

In a case where the liquid crystal panel 2020 is displayed in a real object display mode, the pointer 2070 rotates within a range (indication range) in which the pointer 2070 points at scales 2421 as illustrated in FIG. 39. In other words, the pointer 2070 rotates within a range in which the pointer 2070 is seen with the display surface 2020a overlapped therewith, that is, the range inside an opening portion 2011a. In a case where the liquid crystal panel 2020 is displayed in a real object hidden mode, the pointer 2070 is rotated and accommodated in a range (hiding range) in which the pointer 2070 is not overlapped with the display surface 2020a, that is, the range outside the opening portion 2011a as illustrated by the one-dot chain line in FIG. 39. In this manner, the entire pointer 2070 is covered by the case 2010 and becomes invisible.

In short, the rotation range of the pointer 2070 includes the indication range, in which a physical quantity is indicated by the scale being pointed at, and the hiding range other than the indication range. The part of the case 2010 that covers the pointer 2070 in the hiding range and hides it from sight is corresponding to a hiding member 2010b.

The present embodiment has a configuration in which a decorative ring 2420 is placed between the liquid crystal panel 2020 and the backlight 2030 and the pointer 2070 is placed on the visible side of the liquid crystal panel 2020, which is its side (near side) opposite to the backlight 2030 with respect to the liquid crystal panel 2020. In addition, the present embodiment has a configuration in which the light source 2082 illuminating the pointer 2070 is provided. Accordingly, the pointer 2070 is directly visible to a viewer and the visibility of the pointer 2070 is improved. A depth-provided appearance is given to a display device D by a real object other than the pointer being placed between the liquid crystal panel 2020 and the backlight 2030.

The rotation range of the pointer 2070 according to the present embodiment includes the indication range, in which the physical quantity is indicated by the scale being pointed at, and the hiding range other than the indication range. In addition, the hiding member 2010b is provided that covers the pointer 2070 in the hiding range and hides it from sight.

Accordingly, when the pointer 2070 has been rotated and moved into the hiding range on the back face of the hiding member 2010b, a part of the display on the liquid crystal panel 2020 being blocked by the pointer 2070 and becoming invisible can be avoided. Specifically, in a case where the display is performed in the real object hidden mode, the pointer 2070 is rotated and accommodated in the hiding range and the entire pointer 2070 is covered by the case 2010 and becomes invisible. Accordingly, a part of the display on the liquid crystal panel 2020 in the real object hidden mode being blocked by the pointer 2070 and becoming invisible can be avoided. Accordingly, the entire display surface 2020a of the liquid crystal panel 2020 can be effectively used while a sense of depth is given by the liquid crystal panel 2020 being combined with the real object.

(Thirteenth Embodiment)

Figure 42:
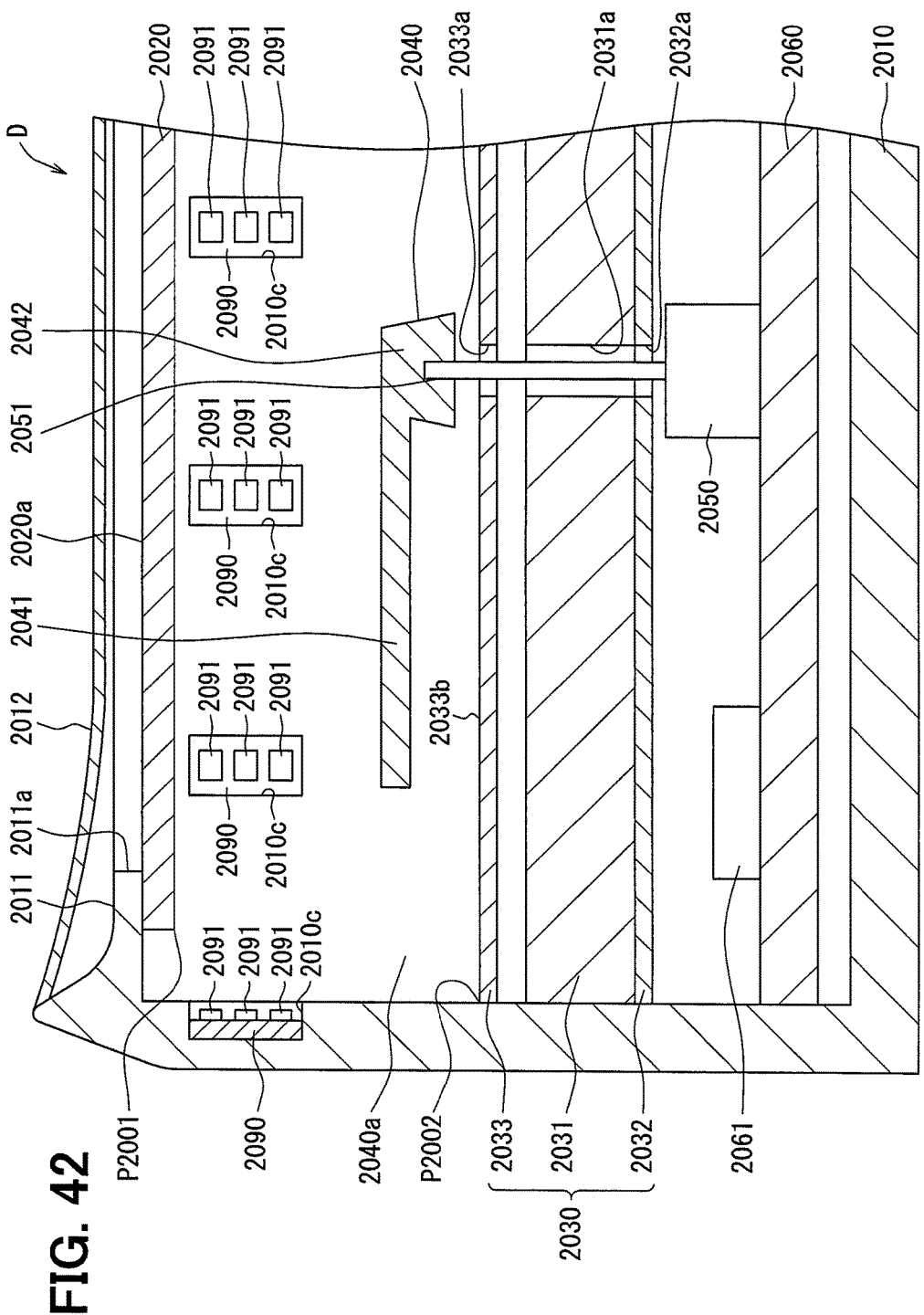
FIG. 42 is a cross-sectional view illustrating a part of a display device according to a thirteenth embodiment of the present disclosure.

Pointer-illuminating light sources 2091 are disposed in the present embodiment that is illustrated in FIG. 42. The light sources 2091 are mounted on substrates 2090, the substrates 2090 are connected to a circuit board 2060, and operations of the light sources 2091 are controlled by a microcomputer 2061. Concave portions 2010c, which are recessed in a vertical direction with respect to a viewing direction, are provided in a case 2010. The substrates 2090, on which the light sources 2091 are mounted, are placed in the concave portions 2010c.

The multiple light sources 2091 are placed in a ring shape along the trajectory of rotation of a pointer 2040. Specifically, the multiple light sources 2091 and the multiple substrates 2090 on which the light sources 2091 are mounted are placed with a predetermined gap in the rotational direction of the pointer 2040.

In the present embodiment, the visibility of the pointer 2040 is improved even if the pointer 2040 is placed between a backlight 2030 and a liquid crystal panel 2020 because the pointer-illuminating light sources 2091 are provided as described above.

The invention is not at all limited to the preferred embodiments of the invention described above and can be carried out in various modified forms, examples of which will be described below. Not only combination between the parts explicitly specified in each of the embodiments to be capable of being combined with each other but also partial combination between the embodiments can be conducted even without explicit expression insofar as the combination is not particularly hindered.

It is desirable that the light emitting surface 2033b of the backlight 2030 is larger than the display surface 2020a of the liquid crystal panel 2020. According to this configuration, the possibility of a part P2002 (refer to FIG. 18) of the backlight 2030 outside the light emitting surface 2033b being visually recognized through the liquid crystal panel 2020 in a case where the entire surface of the display surface 2020a is given a low transmittance can be reduced. Accordingly, the possibility of an impaired appearance of the display device D can be reduced.

In the fifth embodiment described above, the electric motor 2050 and the rotating shaft 2051 rotating the pointer 2040 are fixed at predetermined positions. The rotating shaft 2051 and the electric motor 2050 may also be configured such that the rotating shaft 2051 and the electric motor 2050 can be moved along with the pointer 2040.

Although the scale images G2011 are displayed in the specific pixel region G2010 in the embodiment that is illustrated in FIG. 17, the scale images G2011 may be displayed in the other pixel region G2020 as well.

In the embodiment that is illustrated in FIG. 23, the part of the number image G2013 overlapped with the pointer 2040 is hidden. Likewise, the part of the scale image G2011 overlapped with the pointer 2040 may not be displayed.

The light sources 2423 according to the embodiments that are illustrated in FIGS. 28 and 33 may be discarded although the light sources 2423 are attached to the decorative ring 2420 in the embodiments that are illustrated in FIGS. 28 and 33. In the embodiment that is illustrated in FIG. 17, a light source may be attached to the pointer 2040 and the light source may illuminate the pointer 2040.

The specific pixel regions G2010, G2100, and G2300 may be set such that the real objects are visible in their entirety or may be set such that the real objects are visible in part. In each of the embodiments, switching may be performed to a display mode in which the real objects are invisible in their entirety as in the example that is illustrated in FIG. 30.

It is desirable that boundaries between the specific pixel regions G2010, G2100, G2300, G2050, G2060, G2070, and G2071 and the other pixel regions G2020 and G2400 take the form of a gradation display image with a gradually changing luminance.

The display device D may be provided with any form of combination between the real objects according to the respective embodiments described above. For example, the display device D may be provided with both the decorative rings 2420, 2440, and 2450 and the pointer 2040, and the decorative boss member 2430 and the wall member 2400 may be combined with each other in any form.

Although the wall member 2400 according to the embodiment that is illustrated in FIG. 24 is annular in shape, the shape of the wall member 2400 is not limited to the annular shape. Although the real object according to each of the embodiments is formed of transparent resin, colored resin may be adopted instead. The reflecting plate 2032 may be allowed to function as a character plate with printing or a concave portion representing a character or a figure provided in the reflecting plate 2032 of the backlight 2030.

Although the decorative member according to the fourth and ninth embodiments described above is the ring-shaped decorative ring 2420, the decorative members according to the present disclosure are not limited to ring-shaped ones and may be, for example, arc-shaped ones extending in the directions of rotation of the pointer image G2014 and the pointer 2040.

Although the background image that is displayed in the other pixel region G2020 is controlled such that the background image is black in each of the embodiments described above, the color of the background image is not limited to black, and any color and luminance may be set as the color and the luminance of the background image insofar as its transmittance is lower than that of the specific pixel region G2010.

In the fifth embodiment described above, the entire range in which the pointer 2040 is movable is set as the specific pixel region G2010. Instead, the part of the entire range in which the pointer 2040 is movable where the pointer 2040 is present may be set as the specific pixel region G2010 and the part of the range in which the pointer 2040 is movable where the pointer 2040 is not present may be set as the other pixel region G2020 and be given a low transmittance.

When the pointer 2040 is controlled in the real object hidden mode according to the embodiment illustrated in FIG. 20 such that the pointer 2040 is rotated to the position deviating from the position facing the display surface 2020a, a part of the pointer 2040 is at the deviating position. The entire pointer 2040 may be at the deviating position instead.

A monochrome-type liquid crystal panel may take the place of the full color-type liquid crystal panel 2020 according to each of the embodiments. The present disclosure can also be applied to a segment liquid crystal panel that is provided with a segment electrode which has a predetermined shape instead of the matrix-type electrode provided with the row electrode and the column electrode and displays an image resulting from a pixel corresponding thereto.

Although lighting according to the thirteenth embodiment described above is performed by the light from the light sources 2091 being emitted from the viewer side of the pointer 2040, transmitted illumination may be performed instead by the light from the light sources 2091 being guided into the pointer 2040.

Although the present disclosure is applied to the display device D that is assembled in the instrument panel in the vehicle in each of the embodiments described above, the present disclosure is not limited to that application and may be applied to, for example, an electron mirror mounted in a vehicle. The electron mirror is a mirror that is attached to a front windshield and a door trim, displays an image imitating an image reflected in the mirror, and displays an image showing a space behind the vehicle. The present disclosure is not limited to a display device mounted in a vehicle and may be applied to, for example, display devices mounted on game machines and home appliances such as pachinko machines and throttles.

(Fourteenth Embodiment)

Figure 43:
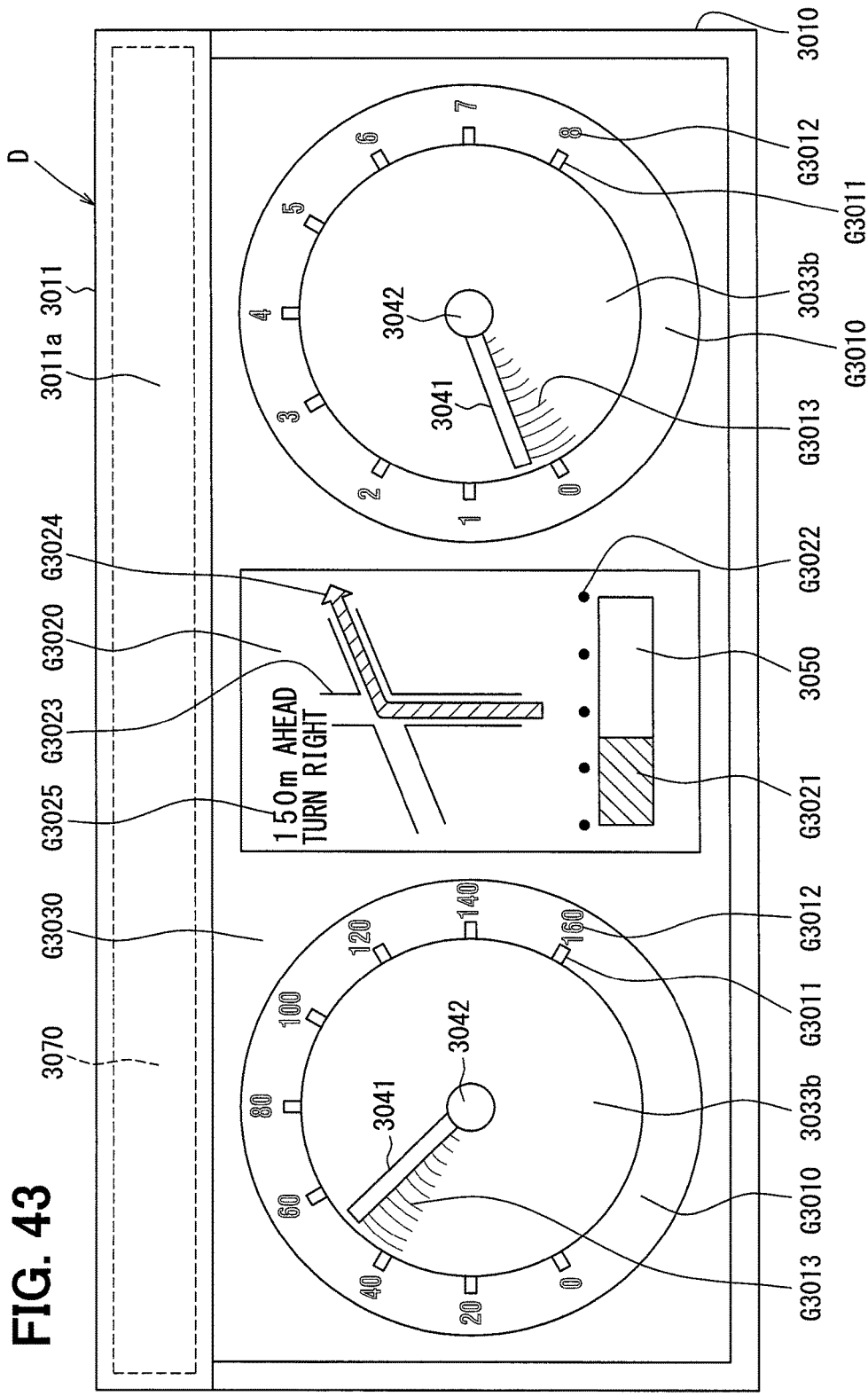
FIG. 43 is a front view of a display device according to a fourteenth embodiment of the present disclosure, in which content displayed in a real object display mode is illustrated.

A display device D illustrated in FIG. 43 is a vehicular display device assembled in an instrument panel in a vehicle. The display device D displays changes in various physical quantities showing states of the vehicle, such as a traveling speed of the vehicle and electric power remaining in an automotive battery, displays the occurrence of various abnormalities in the case of such abnormalities, and displays an effect image.

Figure 44:
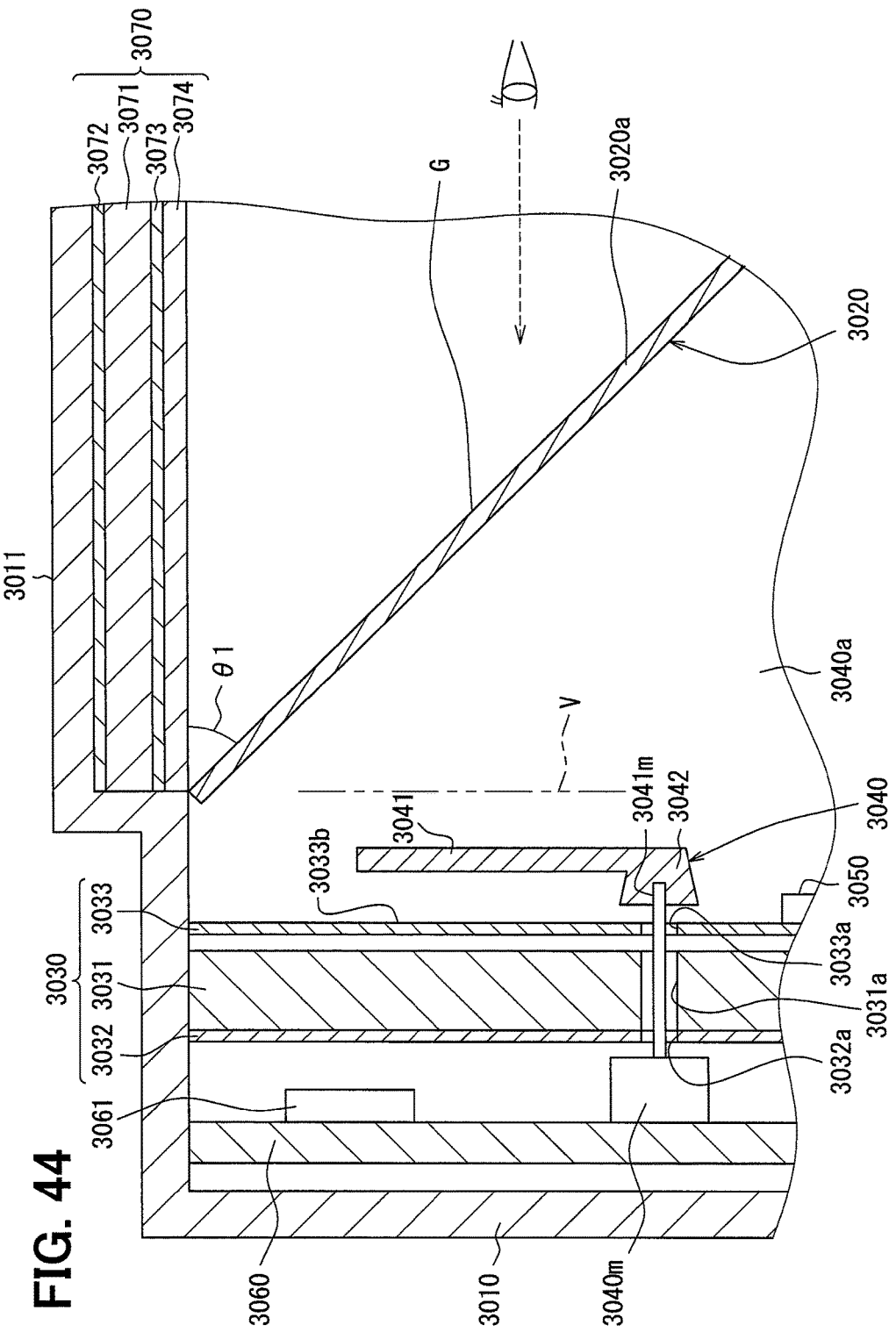
FIG. 44 is a cross-sectional view illustrating a part of the display device according to the fourteenth embodiment.

As illustrated in FIG. 44, the display device D is configured to be mainly provided with a case 3010, a liquid crystal panel 3020, a backlight 3030, a pointer 3040, an electric motor 3040m, a displayed object 3050, a circuit board 3060, a virtual image display unit 3070, and so on. The liquid crystal panel 3020, the backlight 3030, the circuit board 3060, the virtual image display unit 3070, and the like are accommodated and held in the case 3010, which is a resinous case that has a light shielding property. A cover (not illustrated) that covers an object accommodated in the case 3010 from the front face side is attached to the case 3010. This cover is a resinous cover that has a light transmissive property.

The liquid crystal panel 3020 is a TFT liquid crystal panel that is configured to have a liquid crystal layer in which a liquid crystal is held, a pair of electrodes placed on both sides of the liquid crystal layer, a color filter substrate, and a pair of polarizing films. The electrode is a matrix electrode in which a row electrode and a column electrode are combined with each other and is configured as a transparent electrode disposed for each pixel, and a voltage applied to the electrode is controlled by a thin film transistor. The color filter substrate has a red filter, a green filter, and a blue filter, and each of the filters is placed for each pixel (for each electrode). A thin film transistor (TFT, not illustrated) turning ON and OFF each pixel is provided as well. The polarizing film is a filter through which light vibrating in a predetermined direction is transmitted to be given a predetermined regulated vibration direction. The pair of polarizing films are placed such that the vibration directions have a deviation of 90°.

Figure 45:
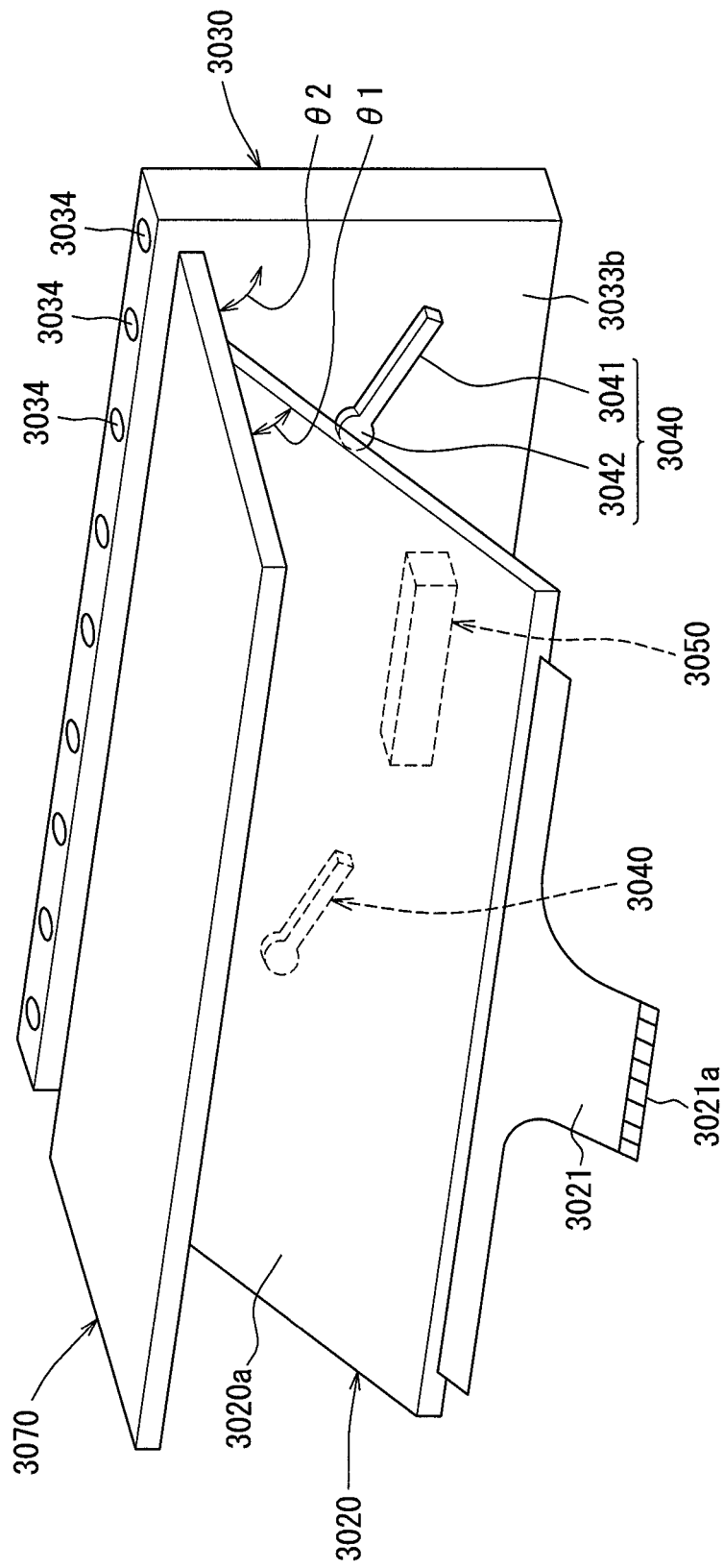
FIG. 45 is a perspective view schematically showing the display device according to the fourteenth embodiment with a case of the display device omitted.

The backlight 3030 is configured to have a light guide plate 3031, a reflecting plate 3032, a diffusion plate 3033, and light sources 3034 (refer to FIG. 45). The light source 3034 emits white light with a light emitting diode adopted, and the multiple light sources 3034 are placed at positions facing a side surface of the light guide plate 3031. The light that is emitted from the light sources 3034 is incident upon the light guide plate 3031 from the side surface, moves into the light guide plate 3031 while being reflected by the reflecting plate 3032, and then is emitted from the front face side of the light guide plate 3031 (right side in FIG. 44). The light emitted from the light guide plate 3031 is transmitted while being diffuse-reflected by the diffusion plate 3033. This results in a state where the entire diffusion plate 3033 performs surface emission, and light that is uniform and has little unevenness with respect to the entire surface of the liquid crystal panel 3020 is emitted from the backlight 3030 to the liquid crystal panel 3020.

The diffusion plate 3033 is placed such that a predetermined gap is formed between the diffusion plate 3033 and the front face side of the light guide plate 3031 whereas the reflecting plate 3032 is placed in close contact with the back side of the light guide plate 3031 (left side in FIG. 44). This gap is optional though. The liquid crystal panel 3020 is placed such that a predetermined gap 3040a is formed between the front face side of the diffusion plate 3033 and the liquid crystal panel 3020. The pointer 3040 as a movable real object and the displayed object 3050 as a non-movable real object are placed in this gap 3040a. The liquid crystal panel 3020 is placed at a predetermined angle (such as 45°) to a viewing direction whereas the backlight 3030 is placed in parallel to the direction that is illustrated by the dotted-line arrow in FIG. 44 (viewing direction).

The pointer 3040 has a pointer portion 3041 and a boss portion 3042. The pointer portion 3041 and the boss portion 3042 are integrally formed of light transmissive resin. A rotating shaft 3041m is fixed to the boss portion 3042. The rotating shaft 3041m is placed to be inserted into through holes 3031a, 3032a, and 3033a, which are provided in the light guide plate 3031, the reflecting plate 3032, and the diffusion plate 3033, and is rotated by the electric motor 3040m. The electric motor 3040m is attached to the circuit board 3060. The rotational position of the pointer 3040 is controlled by a microcomputer (microcomputer 3061), which is mounted on the circuit board 3060, controlling driving of the electric motor 3040m. The microcomputer 3061 has a central processing unit, a memory, and the like, and executes various types of calculation processing in accordance with a program stored in advance.

The liquid crystal panel 3020 has a flexible wiring board 3021, and a terminal 3021a provided at a tip of the flexible wiring board 3021 is connected to the circuit board 3060. An image signal that is output from the circuit board 3060 to the liquid crystal panel 3020 is transmitted to the electrode of the liquid crystal panel 3020 via the flexible wiring board 3021. In other words, content of images G that are displayed on the liquid crystal panel 3020 is controlled by the microcomputer 3061.

As illustrated in FIGS. 44 and 45, the virtual image display unit 3070 has a backlight for a virtual image that has a light guide plate 3071, a reflecting plate 3072, and a diffusion plate 3073 and a liquid crystal panel 3074 for a virtual image. The virtual image display unit 3070 is placed in the direction that is parallel to the viewing direction on the front face side of the liquid crystal panel 3020. In other words, an angle θ1 formed by the liquid crystal panel 3020 and the liquid crystal panel 3074 for a virtual image is 45°, and an angle θ2 formed by the liquid crystal panel 3074 for a virtual image and the backlight 3030 is 90° (refer to FIG. 45).

The virtual image display unit 3070 is accommodated in and fixed to an accommodation portion 3011 positioned in an upper portion of the case 3010 (refer to FIG. 44). A hiding portion 3011a, which covers the virtual image display unit 3070 from the front face side, is provided in the accommodation portion 3011. The virtual image display unit 3070 is placed to be covered by the hiding portion 3011a and invisible.

The circuit board 3060 acquires various types of information from electronic controllers mounted outside the display device D among electronic controllers mounted in the vehicle and controls the content displayed by the liquid crystal panel 3020 and the virtual image display unit 3070 and the rotational position of the pointer 3040 based on the acquired information. Specific examples of the information include information showing the changes in the various physical quantities that show the states of the vehicle, such as the traveling speed of the vehicle and the electric power remaining in the automotive battery, and information showing the occurrence of the various abnormalities.

Once the light source 3034 of the backlight 3030 is turned on, light is emitted to the liquid crystal panel 3020 from its back side. Specifically, the light that is emitted from the front face-side surface of the diffusion plate 3033 (light emitting surface 3033b) is transmitted through the liquid crystal panel 3020 and is emitted to the front face side of the display device D through the cover. As a result, the liquid crystal panel 3020 is subjected to transmitted illumination and the image G displayed on the liquid crystal panel 3020 is visually recognized by a user. Specifically, the transmittance (light transmission property) of the light with respect to each corresponding pixel changes in accordance with the applied voltage applied to the electrode placed for each pixel in the liquid crystal panel 3020.

When the applied voltage is controlled such that the transmittance is maximized for each of the electrodes corresponding to the red filter, the green filter, and the blue filter, for example, the luminance of the light transmitted through each of the filters is maximized. As a result, the corresponding pixel is visually recognized as a white pixel. In other words, the corresponding pixel is visually recognized in the luminescent color of the diffusion plate 3033. When the applied voltage is controlled such that the transmittance is minimized for each of the electrodes corresponding to the respective filters, the luminance of the light transmitted through each of the filters is minimized. As a result, the corresponding pixel is visually recognized as a black pixel.

Among the display region of the liquid crystal panel 3020, in the region where the transmittance is controlled such that the transmittance is high as described above (light-transmitting pixel region), the object that is positioned on the back side of the region, that is, the pointer 3040, the displayed object 3050, or the diffusion plate 3033, is visible through the liquid crystal panel 3020. In other words, the light (white light) that is emitted from the backlight 3030, reflected by a real object which is the pointer 3040 or the displayed object 3050, and directed toward the liquid crystal panel 3020 is transmitted through the light-transmitting pixel region and is visually recognized by the user.

On the other hand, among the display region of the liquid crystal panel 3020, in a region (non-light-transmitting pixel region) where the transmittance is controlled such that the transmittance is lower than that of the light-transmitting pixel region, an object that is positioned on the back side of the region cannot be visually recognized. In other words, the light that is reflected by a real object and directed toward the liquid crystal panel 3020 is not transmitted through the non-light-transmitting pixel region and thus is invisible to the user. In the example that is illustrated in FIG. 43, the parts of the display region of the liquid crystal panel 3020 that face the rotation range of the pointer 3040 and the displayed object 3050 are set as the light-transmitting pixel region and the rest of that display region is set as the non-light-transmitting pixel region.

As the transmittance is increased, the degree to which the reflected light from the real object is transmitted through the liquid crystal panel 3020 increases and the real object becomes more and more clearly visible. As the transmittance is reduced, the degree to which the reflected light from the real object is transmitted through the liquid crystal panel 3020 decreases and the real object becomes increasingly blurry during visual recognition.

Figure 50:
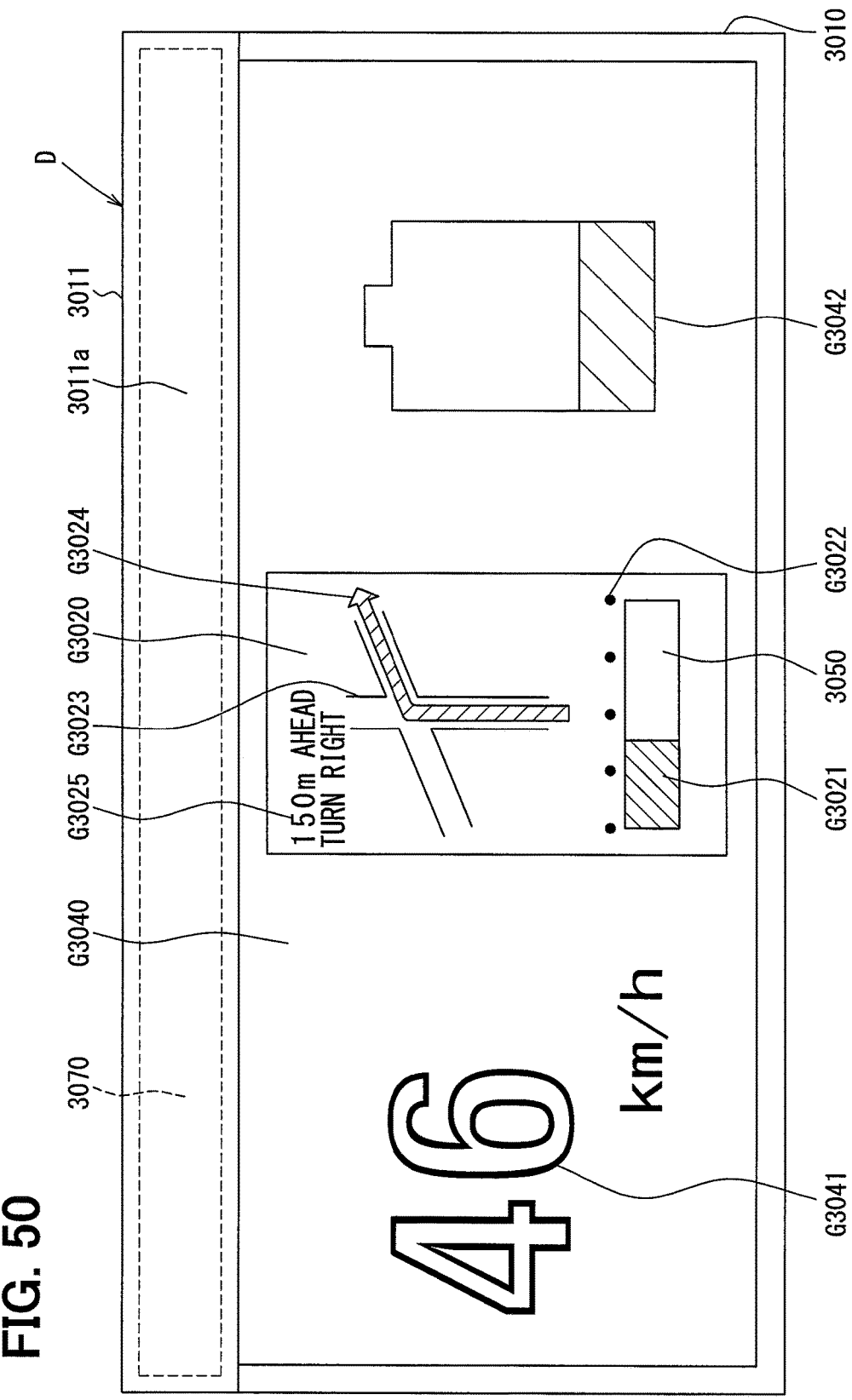
FIG. 50 is a front view of the display device according to the fourteenth embodiment, in which content displayed in a real object hidden mode is illustrated.

In other words, switching can be performed between a real object display mode in which the real object is visible (refer to FIG. 43) and a real object hidden mode in which the real object is completely or partially invisible (refer to FIG. 50) by the transmittance of the liquid crystal panel 3020 being controlled. In the example of the real object hidden mode that is illustrated in FIG. 50, the part of the display region of the liquid crystal panel 3020 that faces the displayed object 3050 is set as the light-transmitting pixel region and the rest of that display region is set as the non-light-transmitting pixel region. Accordingly, the displayed object 3050 is visible although the pointer 3040 is invisible.

Once a light source 3075 (refer to FIG. 46) of the backlight of the virtual image display unit 3070 is turned on, light is emitted to the liquid crystal panel 3074 for a virtual image from its back side and the emitted light is transmitted through the liquid crystal panel 3074 for a virtual image and becomes display light. Specifically, the display light is generated with the transmittance of the light with respect to each corresponding pixel being adjusted in accordance with an applied voltage applied to the electrode that is placed for each pixel in the liquid crystal panel 3074 for a virtual image as in the case of the liquid crystal panel 3020. This display light is reflected to a viewer side by a reflecting surface 3020a of the liquid crystal panel 3020. As a result, the display light that is emitted from the virtual image display unit 3070 is visually recognized as a virtual image V on the far side (back side) of the liquid crystal panel 3020. The real object is visually recognized further on the far side of the virtual image V and the light emitting surface 3033b of the diffusion plate 3033 is visually recognized further on the far side of the real object.

Figure 48:
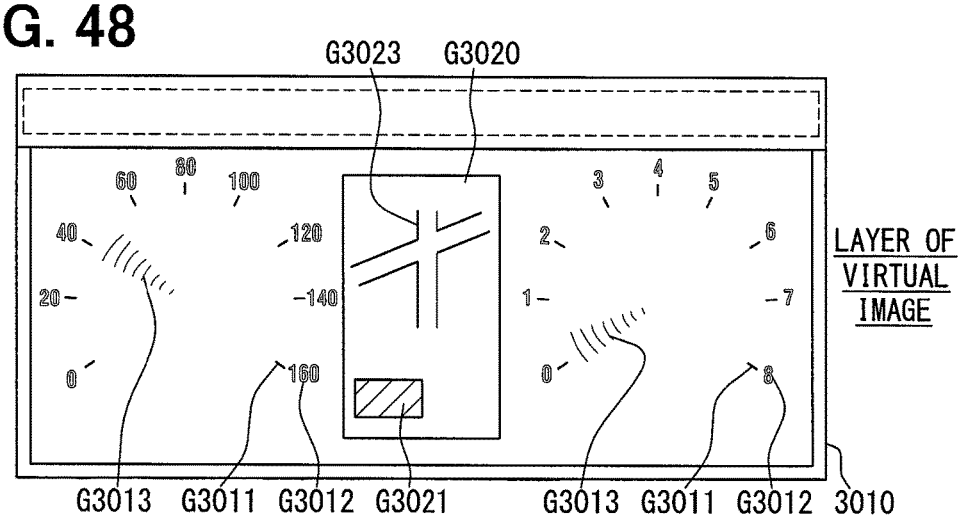
FIG. 48 is a diagram illustrating a virtual image layer in the real object display mode according to the fourteenth embodiment.
Figure 49:
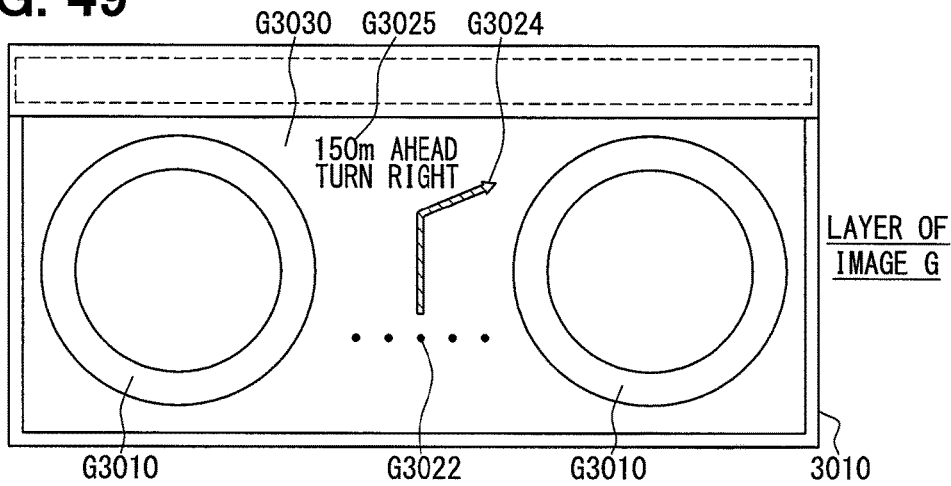
FIG. 49 is a diagram illustrating an image layer in the real object display mode according to the fourteenth embodiment.

In other words, four layers are visually recognized as an overlapped form of the four layers: the layer of the diffusion plate 3033; the layer of the real object (refer to FIG. 47); the layer of the virtual image V (refer to FIG. 48); and the layer of the image G (refer to FIG. 49). A sense of depth can be given to the display of the display device D because the layers have different focal lengths and the layers are visually recognized at different positions in the viewing direction.

As described above, the liquid crystal panel 3020 is at an angle of 45° to the liquid crystal panel 3074 for a virtual image and the liquid crystal panel 3074 for a virtual image is at an angle of 90° to the backlight 3030. Accordingly, the surface of the image G that is displayed by the liquid crystal panel 3020 is at an angle of 45° to the backlight 3030. In contrast, the surface of the virtual image V that is attributable to the display light from the virtual image display unit 3070 is parallel to the backlight 3030. The image G that is displayed on the liquid crystal panel 3020 has its distortion corrected in accordance with the inclination of the reflecting surface 3020a. For example, the characters and symbols that are included in the image G and are at a greater distance from a viewer are displayed in a larger size, and thus that part being visually recognized in a smaller size than the other part is restricted and the characters and symbols being visually recognized in a distorted form is restricted.

The viewer-side surface of the liquid crystal panel 3020 is coated with a material that has a reflectance which is equal to or higher than a predetermined reflectance. Accordingly, the surface of the liquid crystal panel 3020 functions as the reflecting surface 3020a illuminating a virtual image.

Figure 47:
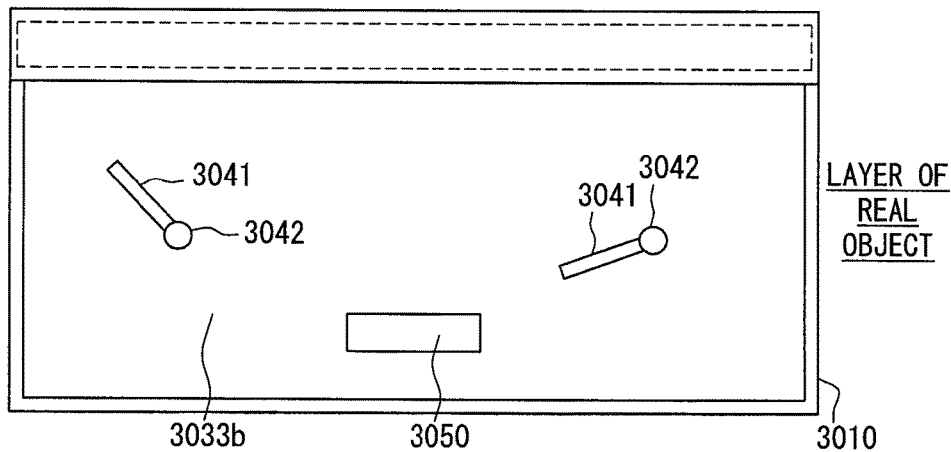
FIG. 47 is a diagram illustrating a real object layer in the real object display mode according to the fourteenth embodiment.

The content that is displayed in the real object display mode illustrated in FIG. 43 is based on a synthetic image in which the respective layers illustrated in FIGS. 47, 48, and 49 are overlapped with and combined with one another. In other words, the virtual image V that is attributable to the display light from the virtual image display unit 3070 includes scale images G3011 pointed at by the pointer 3040, number images G3012, and shadow images G3013. A vehicle speed and an engine rotation speed are displayed based on a combination between the pointer 3040 and the scale image G3011 by the rotational position of the pointer 3040 being controlled in accordance with the vehicle speed and the engine speed.

The shadow image G3013 is an image showing an after-image of a pointer in the form of imaged radar and is an image imitating a shadow that extends from the pointer portion 3041 to the side opposite in its rotational direction. Accordingly, the shadow image G3013 has a display position varying with the rotational position of the pointer 3040. The shadow image G3013 has a rotational-direction length set to increase as the rotation speed of the pointer 3040 increases.

The virtual image V includes a map background image G3020, a map image G3023 displayed with the map background image G3020 forming its background, and a bar image G3021 displayed with the displayed object 3050 overlapped therewith. The bar image G3021 is an image displayed in the form of a length corresponding to the traveling distance from a traveling start location of a host vehicle registered on a navigation apparatus. The estimated traveling distance from the traveling start location to a planned location of arrival is set as the length of the displayed object 3050, and the length (traveling distance) that corresponds to the length of the displayed object 3050 (estimated traveling distance) is corresponding to the length of the bar image G3021.

The images G that are displayed on the liquid crystal panel 3020 include decorative ring images G3010, an overall background image G3030, a scale image G3022, a guiding image G3024, and a guiding character image G3025, which will be described below. The decorative ring image G3010 is a ring-shaped image that surrounds the pointer 3040 and decorates the content which is displayed by a pointer image G3014. The scale images G3011 and the number images G3012 are displayed at positions overlapped with the decorative ring images G3010. The overall background image G3030 is a black image representing the background of the decorative ring images G3010 and the map background image G3020.

The scale image G3022 is an image representing the scales that form a pointer showing the length of the bar image G3021 and is displayed at a position overlapped with the map background image G3020. The guiding image G3024 is an image showing an arrow that shows the position and direction of a right or left turn and is displayed at a position overlapped with the map image G23. The guiding character image G3025 is an image that represents characters for supplementary description regarding the guiding image G3024 and is displayed at a position overlapped with the map background image G3020.

In the real object hidden mode that is illustrated in FIG. 50, the pointer 3040 is hidden whereas the displayed object 3050 is displayed among the real objects. In addition, a vehicle speed image G3041 showing the vehicle speed in the form of a number and a remaining electric power image G3042 showing a remaining automotive battery storage amount are displayed instead of the pointer 3040. The vehicle speed image G3041 and the remaining electric power image G3042 are images included in the virtual image V. In the overall background image G3030 illustrated in FIG. 43, the region in the rotation range of the pointer 3040 is set as a light-transmitting pixel region and shows a high-transmittance image. In an overall background image G3040 illustrated in FIG. 50, in contrast, the region in the rotation range of the pointer 3040 is set as a non-light-transmitting pixel region and shows a low-transmittance image. In this manner, the displayed content is switched such that the pointer 3040 becomes invisible once switching is carried out from the real object display mode to the real object hidden mode.

The region at the part that faces the displayed object 3050 is set as the light-transmitting pixel region and shows a high-transmittance image in the overall background images G3030 and G3040 of both modes alike. Accordingly, the displayed object 3050 is visible displayed content in both modes. In addition, the diffusion plate 3033 is visually recognized in the region of the light-transmitting pixel region where the pointer 3040 is not present. When this region has a transmittance of 100%, the diffusion plate 3033 in that case is visually recognized as performing surface emission in the color of the light sources 3034. In other words, the pointer 3040 is visually recognized with the diffusion plate 3033 forming the background.

Figure 46:
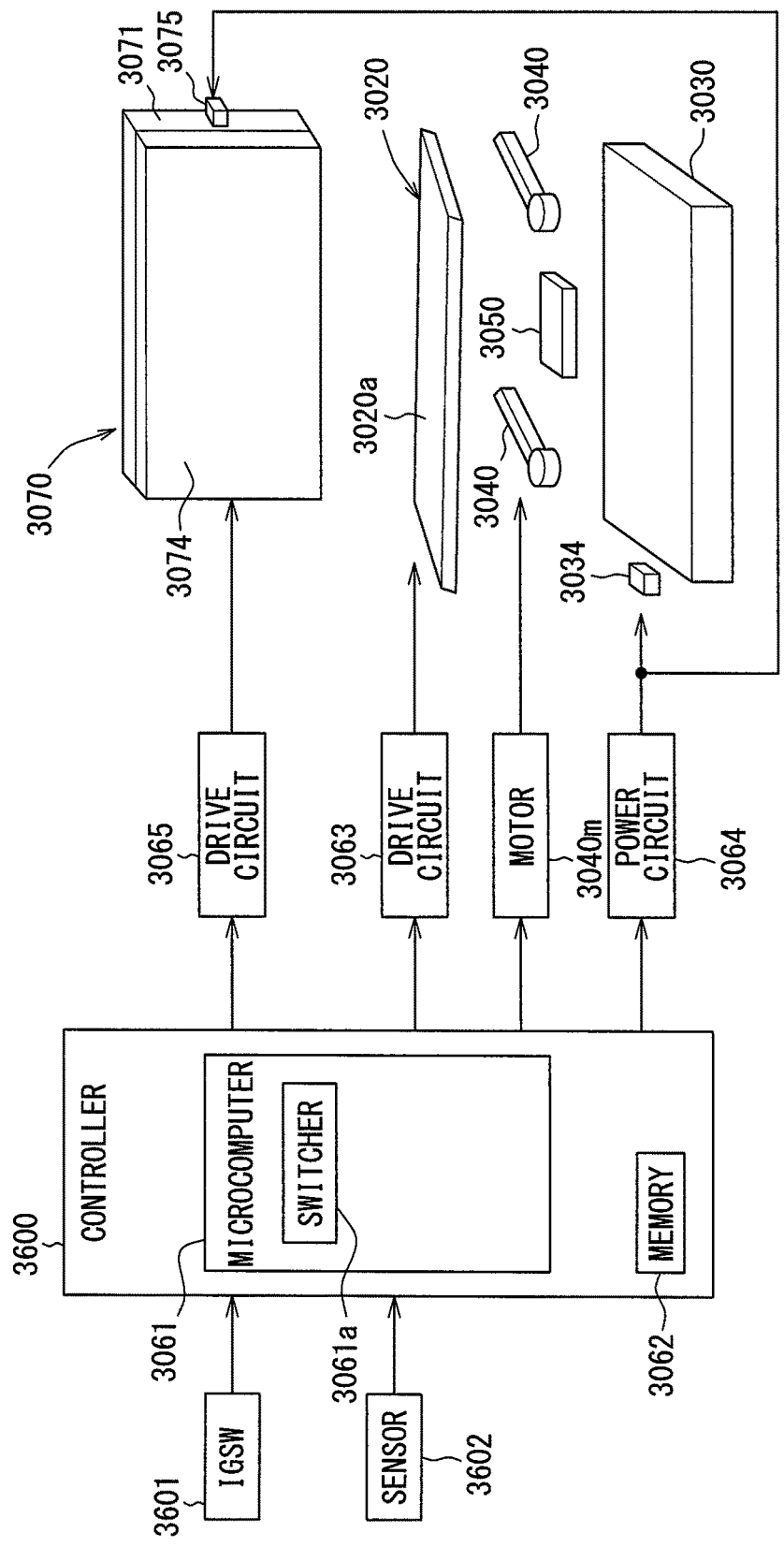
FIG. 46 is a schematic diagram illustrating a microcomputer of the display device and a control target of the microcomputer according to the fourteenth embodiment.

Drive circuits 3063 and 3065 illustrated in FIG. 46, which are mounted on the circuit board 3060, control driving of the thin film transistors of the liquid crystal panel 3020 and the liquid crystal panel 3074 for a virtual image described above in accordance with a command signal output from the microcomputer 3061. A power circuit 3064, which is mounted on the circuit board 3060, controls the amount of electric power supply to the light sources 3034 and 3075 in accordance with a command signal output from the microcomputer 3061. Specifically, the power circuit 3064 controls ON and OFF of the electric power supply to the light sources 3034 and 3075.

The microcomputer 3061, a memory 3062, an input processing circuit, an output processing circuit, and the like are mounted on the circuit board 3060 and constitute a controller 3600. It can be said that this controller 3600 controls the display images on the liquid crystal panel 3020 and the liquid crystal panel 3074 for a virtual image by controlling the drive circuits 3063 and 3065 and controls ON and OFF of the light sources 3034 and 3075 by controlling the power circuit 3064. In addition, the controller 3600 controls the rotational position of the pointer 3040 by controlling the electric motor 3040m.

Image data representing various images displayed by the liquid crystal panel 3020 and the liquid crystal panel 3074 for a virtual image is stored in the memory 3062. The microcomputer 3061 functions also as a switcher 3061*a* that performs display mode switching in response to the states of the vehicle. Once an ignition switch (IGSW 3601) is operated to be turned ON, for example, the electric power supply to the light sources 3034 and 3075 is initiated and the liquid crystal panel 3020 is controlled such that a low transmittance is given for the pointer 3040 and the displayed object 3050 to be invisible. Then, an initiation effect image is displayed on the liquid crystal panel 3020 with the low-transmittance display being maintained. In a case where the IGSW 3601 is operated to be turned OFF, the liquid crystal panel 3020 is also controlled such that a low transmittance is given for the pointer 3040 and the displayed object 3050 to be invisible. Then, a termination effect image is displayed on the liquid crystal panel 3020 with the low-transmittance display being maintained, and then the electric power supply to the light sources 3034 and 3075 is terminated.

In a period between the termination of the display of the initiation effect image and an OFF operation of the IGSW 3601, the rotational position of the pointer 3040 is usually controlled based on the physical quantity such as the vehicle speed and the engine speed detected by a sensor 3602 and such that the physical quantity is pointed at. In addition, the liquid crystal panel 3020 is caused to perform displaying in the real object display mode illustrated in FIG. 43. Switching from the real object display mode to the real object hidden mode illustrated in FIG. 50 occurs when an event satisfying a predetermined condition occurs, examples thereof including a case where the amount of the electric power remaining in the automotive battery is less than a predetermined value and a case where the display switching is requested by the user.

Examples in which the real object hidden mode in which the pointer 3040 is not allowed to be visually recognized by the user is requested include a case where a focus is laid on the image displayed on the liquid crystal panel 3020. Specifically, those examples include a case where a focus is laid on the remaining electric power image G3042 illustrated in FIG. 43, an opening image displayed when the display device D is started, an ending image displayed at the termination of the operation of the display device D, and the like.

According to the present embodiment described above, the pointer 3040 and the displayed object 3050 as real objects are placed between the liquid crystal panel 3020 and the backlight 3030. Accordingly, a problem in the form of "a part of the image on the liquid crystal panel 3020 being blocked by the pointer and becoming invisible", which occurs in a case where the real object is placed on the front face side of the liquid crystal panel 3020, can be avoided. Accordingly, the entire display region of the liquid crystal panel 3020 can be effectively used while the sense of depth is given to the display device D by the liquid crystal panel 3020 being combined with the real object.

According to the present embodiment, not only the real object but also the virtual image V is visually recognized on the far side of the image G displayed by the liquid crystal panel 3020, and thus the display mode by the display device D can be enriched in terms of variation. When a synthetic image is provided by the pointer 3040 being combined with an image, for example, that image can be provided based on a combination between the image G on the liquid crystal panel 3020 and the virtual image V displayed by the virtual image display unit 3070, and thus the combination pattern is enriched.

In addition, the reflecting surface 3020*a* for the display of the virtual image V is provided on the surface of the liquid crystal panel 3020, and thus a reflecting surface separate from the liquid crystal panel 3020 does not have to be provided and the display device D can be compact in size.

According to the present embodiment, the reflecting surface 3020*a* is at an angle to the line-of-sight direction toward the real object. Accordingly, placement of the virtual image display unit 3070 at a position invisible to the viewer can be realized with ease. The image G that is displayed on the liquid crystal panel 3020 has its distortion corrected in accordance with the inclination of the reflecting surface 3020*a*. Accordingly, an image representing the character and symbol on the image layer illustrated in FIG. 49, examples of which include the guiding character image G3025 and the guiding image G3024, becoming a distorted image can be restricted despite the inclined placement of the liquid crystal panel 3020 described above.

The virtual image V according to the present embodiment includes the part that is displayed at a position visually recognized as being overlapped with the real object. Accordingly, an optical illusion can be created as if the real object itself were the content that is displayed by the virtual image V. For example, an optical illusion is created as if the real object itself had the color and pattern of the virtual image V overlapped with the real object. In the case of the present embodiment, the bar image G3021 is displayed at a position overlapped with the displayed object 3050. Accordingly, an optical illusion can be created as if a part of the displayed object 3050 had the color and pattern of the bar image G3021, the bar image G3021 can be expressed in a three-dimensional form, and the display by the display device D can be given a three-dimensional appearance.

According to the present embodiment, notification of predetermined information is performed with the synthetic image that is visually recognized based on a combination between the real object or the image G and the virtual image V. For example, synthetic images of a vehicle speedometer and a tachometer are provided based on a combination among the scale images G3011, the number images G3012, and the shadow images G3013 on the liquid crystal panel 3020, the decorative ring images G3010 based on the virtual image V, and the pointer 3040 as a real object. Accordingly, the vehicle speedometer, the tachometer, and the like can be given a depth-provided appearance.

According to the present embodiment, the virtual image V has a focal length set in the middle between the image G and the real object. Accordingly, the virtual image V is visually recognized on the far side of the image G on the liquid crystal panel 3020, the real object is visually recognized on the far side of the virtual image V, and the diffusion plate 3033 is visually recognized on the far side of the real object. Accordingly, a layer display that has at least four layers can be realized and the depth-provided appearance can be improved.

According to the present embodiment, the region at the part of the liquid crystal panel 3020 where the pointer 3040 is positioned on its back side (light-transmitting pixel region) has a transmittance set to be higher than that of the other region (non-light-transmitting pixel region). Accordingly, the pointer 3040 is easily visible through the light-transmitting pixel region. On the other hand, in the non-light-transmitting pixel region, the object (diffusion plate 3033) that is present on the back side of the liquid crystal panel 3020 is hardly visible. Accordingly, the pointer 3040 visually recognized through the light-transmitting pixel region stands out and attraction of attention to the pointer 3040 can be promoted. In other words, the visual attractiveness of the pointer 3040 can be improved.

According to the present embodiment, the switcher 3061a is provided that performs switching between the real object display mode (refer to FIG. 43) in which the transmittance of the light-transmitting pixel region is increased to the degree that the real object (pointer 3040) is visible and the real object hidden mode (refer to FIG. 50) in which the transmittance of the light-transmitting pixel region is lowered to the degree that the real object is invisible. Accordingly, display in the form of the real object appearing and disappearing can be realized with ease by the display that is conducted on the liquid crystal panel 3020 being switched.

(Fifteenth Embodiment)

Figure 51:
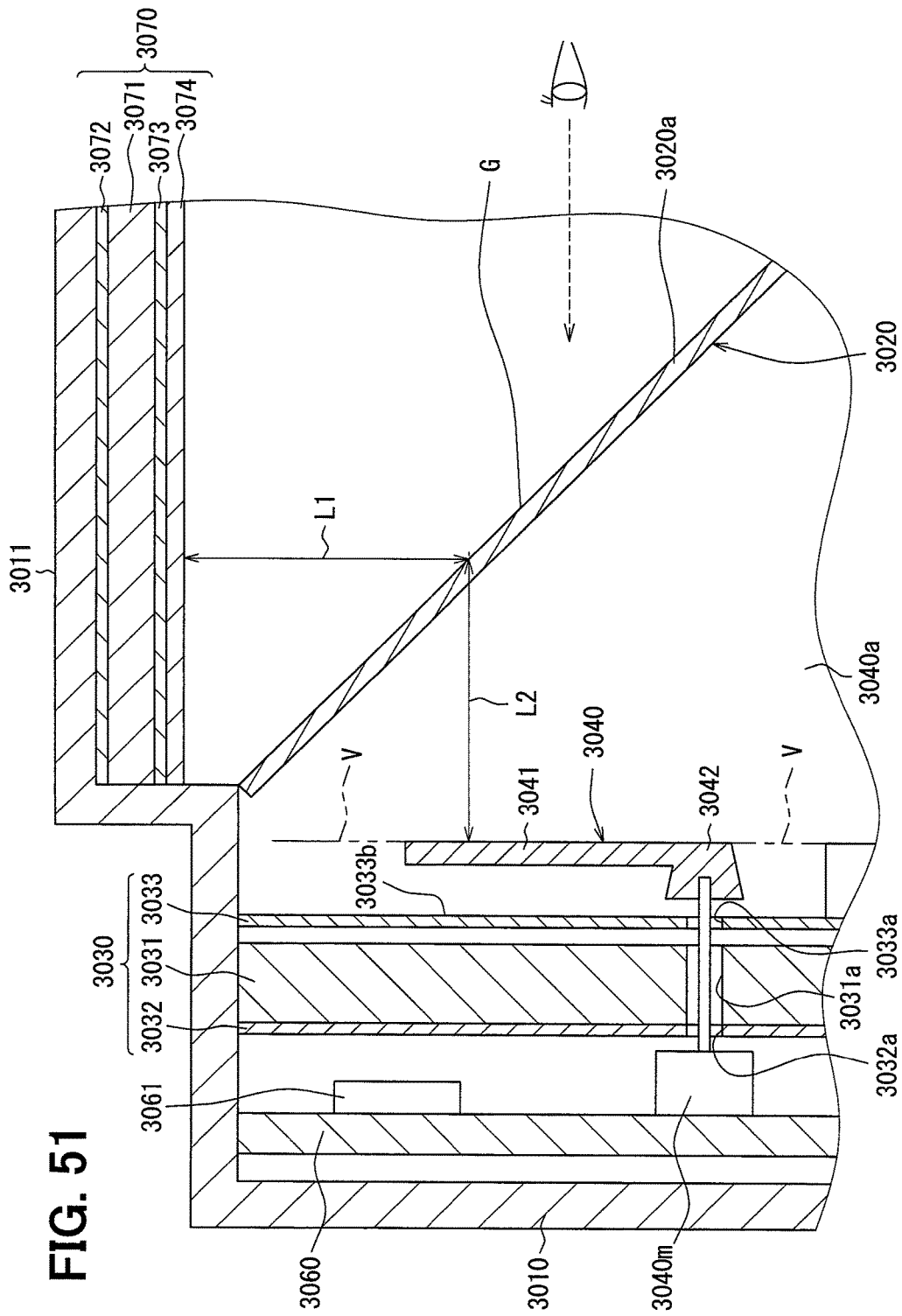
FIG. 51 is a cross-sectional view illustrating a part of a display device according to a fifteenth embodiment of the present disclosure.

In the fourteenth embodiment described above, the virtual image V has a focal length set at a position between the real object and the liquid crystal panel 3020 as illustrated in FIG. 44. Accordingly, in a case where the viewer watches the real object with his or her focus laid on it, the virtual image V displayed with the real object overlapped with it appears in a blurry form and an appearance that is vague and has a sense of floating can be obtained. In a fifteenth embodiment, in contrast, the focal length of a virtual image V is allowed to be equal to the focal lengths of a pointer 3040 and a displayed object 3050, which are real objects, as illustrated in FIG. 51. Accordingly, in a case where a viewer watches the real object with his or her focus laid on it, the virtual image V displayed with the real object overlapped with it is clearly visible as well. Accordingly, an optical illusion as if the color and pattern of the virtual image V overlapped with the real object were the color and pattern of the real object itself being created can be improved.

For example, an illusion can be created as if the color and pattern of a bar image G3021 displayed with the displayed object 3050 overlapped with it were the color and pattern of the displayed object 3050 itself. In addition, an illusion can be created as if the color and pattern of the virtual image V were the color and pattern of the pointer 3040 itself by the virtual image V being overlapped with the pointer 3040. Furthermore, an illusion can be created as if the displayed object 3050 and the pointer 3040 were changed by the virtual image V being changed.

A distance L1 from a liquid crystal panel 3074 for a virtual image to a reflecting surface 3020a and a distance L2 from the reflecting surface 3020a to the virtual image V are equal to each other. Accordingly, the focal length of the virtual image V can be adjusted by the distance L1 being adjusted based on the adjustment of the position of the liquid crystal panel 3074 for a virtual image. The surface of the pointer 3040 that is on a liquid crystal panel 3020 side and the surface of the displayed object 3050 that is on the liquid crystal panel 3020 side are placed at the same position in a viewing direction. Accordingly, the virtual image V has the same focal length with respect to both the displayed object 3050 and the pointer 3040.

In a case where the focal lengths differ from each other as illustrated in FIG. 44 and unlike in the present embodiment, the real object appears in a blurry form when the viewer focuses on the virtual image V and the virtual image V appears in a blurry form when the viewer focuses on the real object. In the present embodiment, in contrast, the focal length of the virtual image V is allowed to be equal to the focal length of the real object. Accordingly, the viewer can focus on the virtual image V and the real object at the same time, and thus the effect of the fourteenth embodiment regarding the optical illusion as if the real object itself were the content displayed by the virtual image V can be promoted.

For example, an optical illusion is created as if the real object itself had the color and pattern of the virtual image V overlapped with the real object. Specifically, an optical illusion can be created as if the pointer 3040 itself had the color and pattern of the virtual image V by the virtual image V being displayed with the pointer 3040 overlapped with it. In addition, an optical illusion can be created as if the pointer 3040 itself were changed by the content displayed by the virtual image V being changed.

Likewise, an optical illusion can be created as if the pointer 3040 itself had the color and pattern of the bar image G3021 by the bar image G3021 included in the virtual image V being displayed with the displayed object 3050 overlapped with it. In addition, an optical illusion can be created as if the pointer 3040 itself were changed by the content displayed by the bar image G3021 being changed.

The invention is not at all limited to the preferred embodiments of the invention described above and can be carried out in various modified forms, examples of which will be described below. Not only combination between the parts explicitly specified in each of the embodiments to be capable of being combined with each other but also partial combination between the embodiments can be conducted even without explicit expression insofar as the combination is not particularly hindered.

In the fourteenth embodiment described above, the electric motor 3040m and the rotating shaft 3041m rotating the pointer 3040 are fixed at predetermined positions. The rotating shaft 3041m and the electric motor 3040m may also be configured such that the rotating shaft 3041m and the electric motor 3040m can be moved along with the pointer 3040.

Although the scale images G3011, the number images G3012, the map background image G3020, the bar image G3021, and the map image G3023 are displayed as the virtual images V in the fourteenth embodiment described above, these may be displayed as the images G on the liquid crystal panel 3020 as well. Although the decorative ring images G3010, the scale image G3022, the guiding image G3024, the guiding character image G3025, and the overall background image G3030 are displayed as the images G on the liquid crystal panel 3020 in the fourteenth embodiment described above, these may be displayed as the virtual images V as well. A decorative ring as a real object may be placed, instead of the decorative ring image G3010, between the backlight 3030 and the liquid crystal panel 3020. The pointer 3040 as a real object may be discarded to be replaced with the image G or the virtual image V, and the displayed object 3050 may be discarded to be replaced with the image G or the virtual image V.

A light source that illuminates the pointer 3040 or the displayed object 3050 may be provided in addition to the backlight 3030. It is desirable that a boundary between the light-transmitting pixel region and the non-light-transmitting pixel region described above takes the form of a gradation display image with a gradually changing luminance.

The shape of the decorative ring image G3010 is not limited to the ring shape and may be, for example, an arc shape extending in the direction of rotation of the pointer 3040. The color of the overall background image G3030 is not limited to black, and another color may be adopted instead insofar as its transmittance is lower than that of the light-transmitting pixel region and is low to the degree that the real object is invisible.

In the fourteenth embodiment described above, the entire range in which the pointer 3040 is movable is set as the light-transmitting pixel region. Instead, the part of the entire range in which the pointer 3040 is movable where the pointer 3040 is present may be set as the light-transmitting pixel region and the part of the range in which the pointer 3040 is movable where the pointer 3040 is not present may be set as the non-light-transmitting pixel region and be given a low transmittance.

In each of the embodiments described above, the reflecting surface 3020a is provided with a high reflectance given to the surface of the liquid crystal panel 3020 itself by glossing being performed on the surface of the liquid crystal panel 3020. Alternatively, the liquid crystal panel 3020 may be provided by a sheet that is higher in reflectance than the surface of the liquid crystal panel 3020 being attached to the reflecting surface 3020a of the liquid crystal panel 3020.

In the real object display mode, the display device D can be visually recognized in the following manner as well. Since the definition of the pointer 3040 (degree of the blur) can be controlled in accordance with the degree of transmittance of the liquid crystal panel 3020, the degree to which the pointer 3040 is visually recognized in a blurry form may be adjusted by its transmittance being adjusted. In addition, the image G on the liquid crystal panel 3020 and the pointer 3040 may be visually recognized as an overlapped form.

A monochrome-type liquid crystal panel may take the place of the full color-type liquid crystal panel 3020 according to each of the embodiments. The present disclosure can also be applied to a segment liquid crystal panel that is provided with a segment electrode which has a predetermined shape instead of the matrix-type electrode provided with the row electrode and the column electrode and displays an image resulting from a pixel corresponding thereto.

Although the present disclosure is applied to the display device D that is assembled in the instrument panel in the vehicle in each of the embodiments described above, the present disclosure is not limited to that application and may be applied to, for example, an electron mirror mounted in a vehicle. The electron mirror is a mirror that is attached to a front windshield and a door trim, displays an image imitating an image reflected in the mirror, and displays an image showing a space behind the vehicle. The present disclosure is not limited to a display device mounted in a vehicle and may be applied to, for example, display devices mounted on game machines and home appliances such as pachinko machines and throttles.

(Sixteenth Embodiment)

Figure 52:
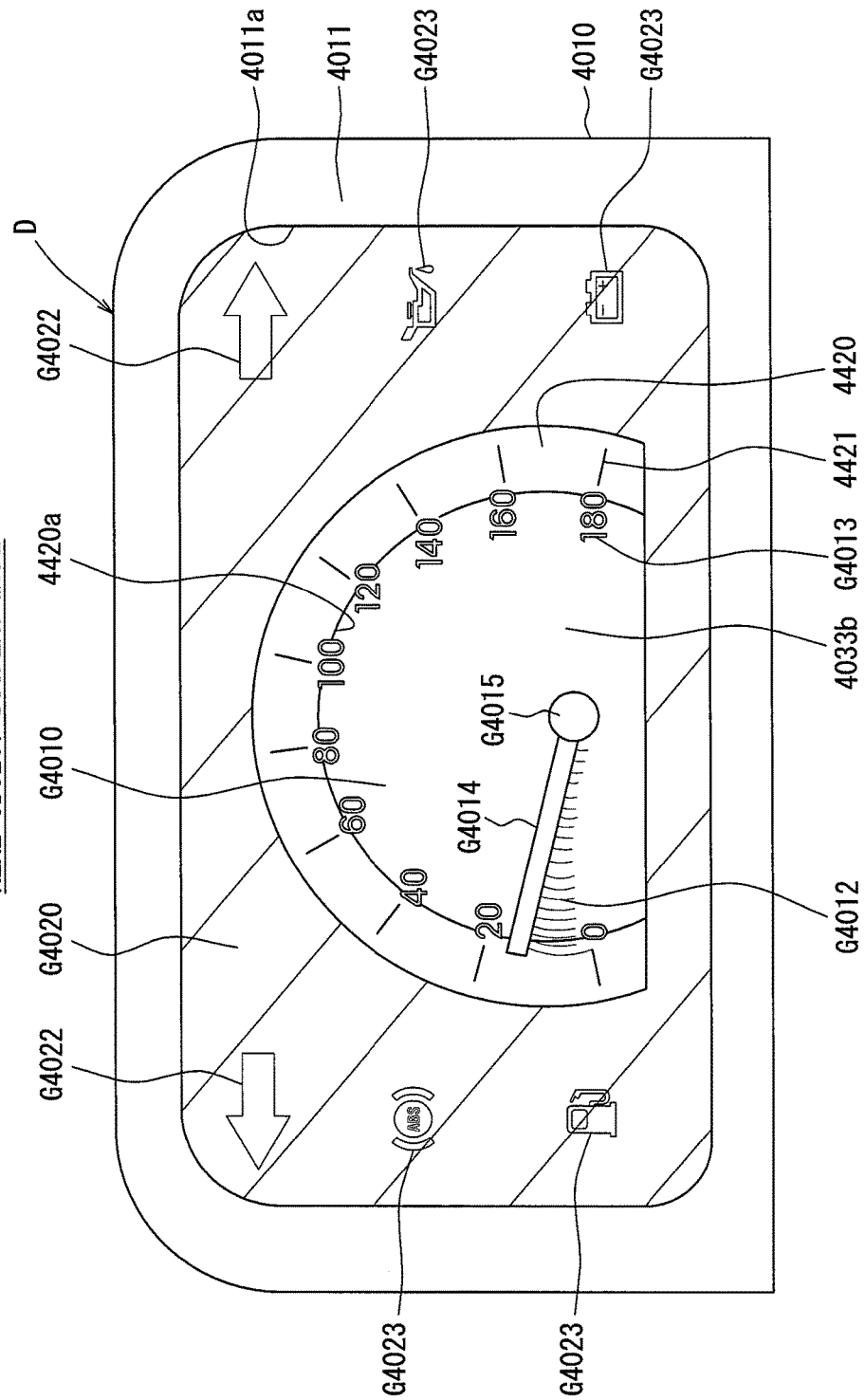
FIG. 52 is a front view of a display device according to a sixteenth embodiment of the present disclosure, in which content displayed in a real object display mode is illustrated.

A display device D illustrated in FIG. 52 is a vehicular display device assembled in an instrument panel in a vehicle. The display device D displays changes in various physical quantities showing states of the vehicle, such as a traveling speed of the vehicle and electric power remaining in an automotive battery, displays the occurrence of various abnormalities in the case of such abnormalities, and displays an effect image.

Figure 53:
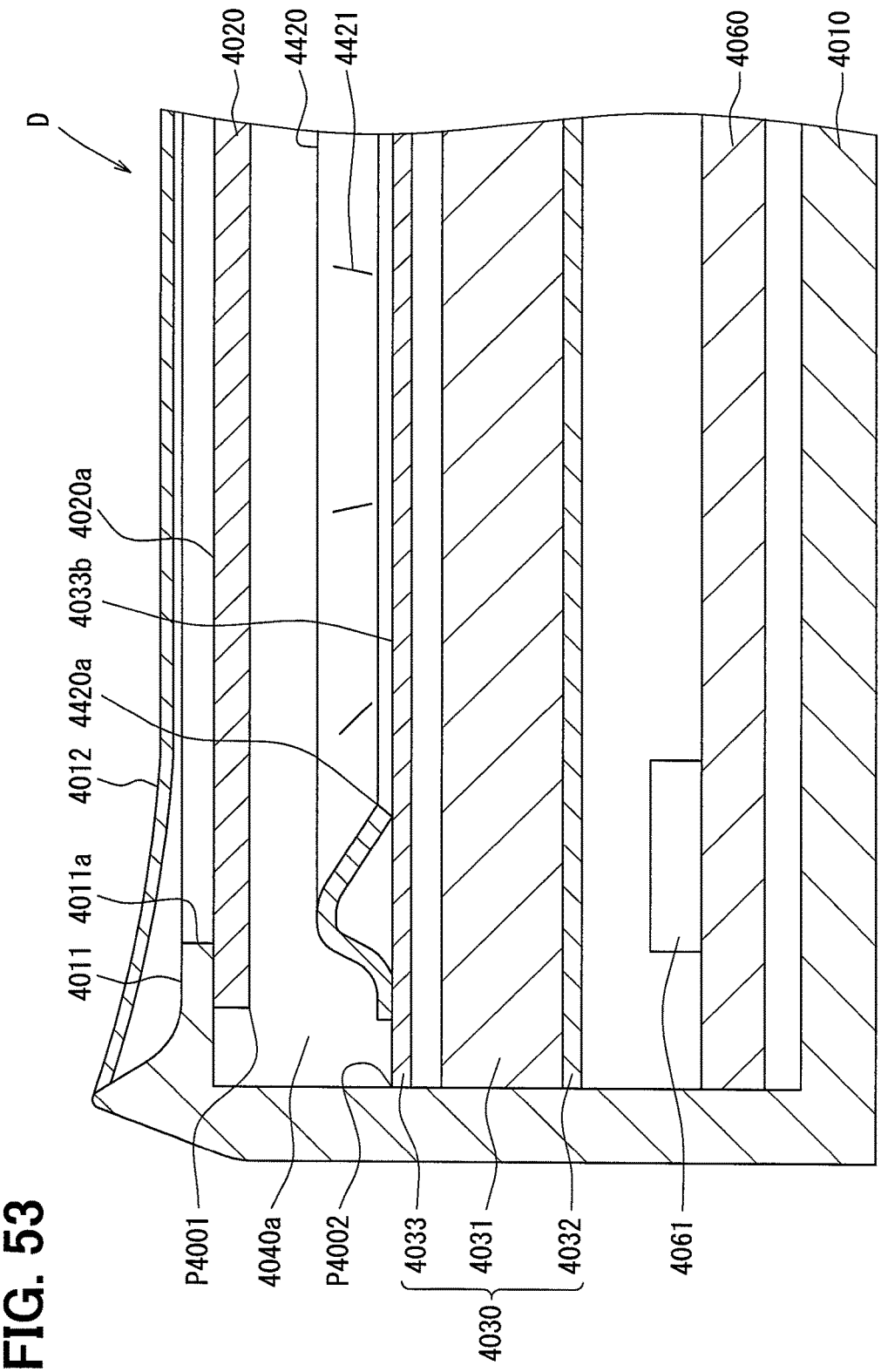
FIG. 53 is a cross-sectional view illustrating a part of the display device according to the sixteenth embodiment.

As illustrated in FIG. 53, the display device D is configured to be mainly provided with a case 4010, a liquid crystal panel 4020, a backlight 4030, a decorative ring 4420, an actuator (electric motor 4424), and a circuit board 4060. The liquid crystal panel 4020, the backlight 4030, the circuit board 4060, and the like are accommodated and held in the case 4010, which is a resinous case that has a light shielding property.

The liquid crystal panel 4020 is a TFT liquid crystal panel that is configured to have a liquid crystal layer in which a liquid crystal is held, a pair of electrodes placed on both sides of the liquid crystal layer, a color filter substrate, and a pair of polarizing films. The electrode is a matrix electrode in which a row electrode and a column electrode are combined with each other and is configured as a transparent electrode disposed for each pixel, and a voltage applied to the electrode is controlled by a thin film transistor. The color filter substrate has a red filter, a green filter, and a blue filter, and each of the filters is placed for each pixel (for each electrode). A thin film transistor (TFT, not illustrated) turning ON and OFF each pixel is provided as well. The polarizing film is a filter through which light vibrating in a predetermined direction is transmitted to be given a predetermined regulated vibration direction. The pair of polarizing films are placed such that the vibration directions have a deviation of 90°.

Figure 54:
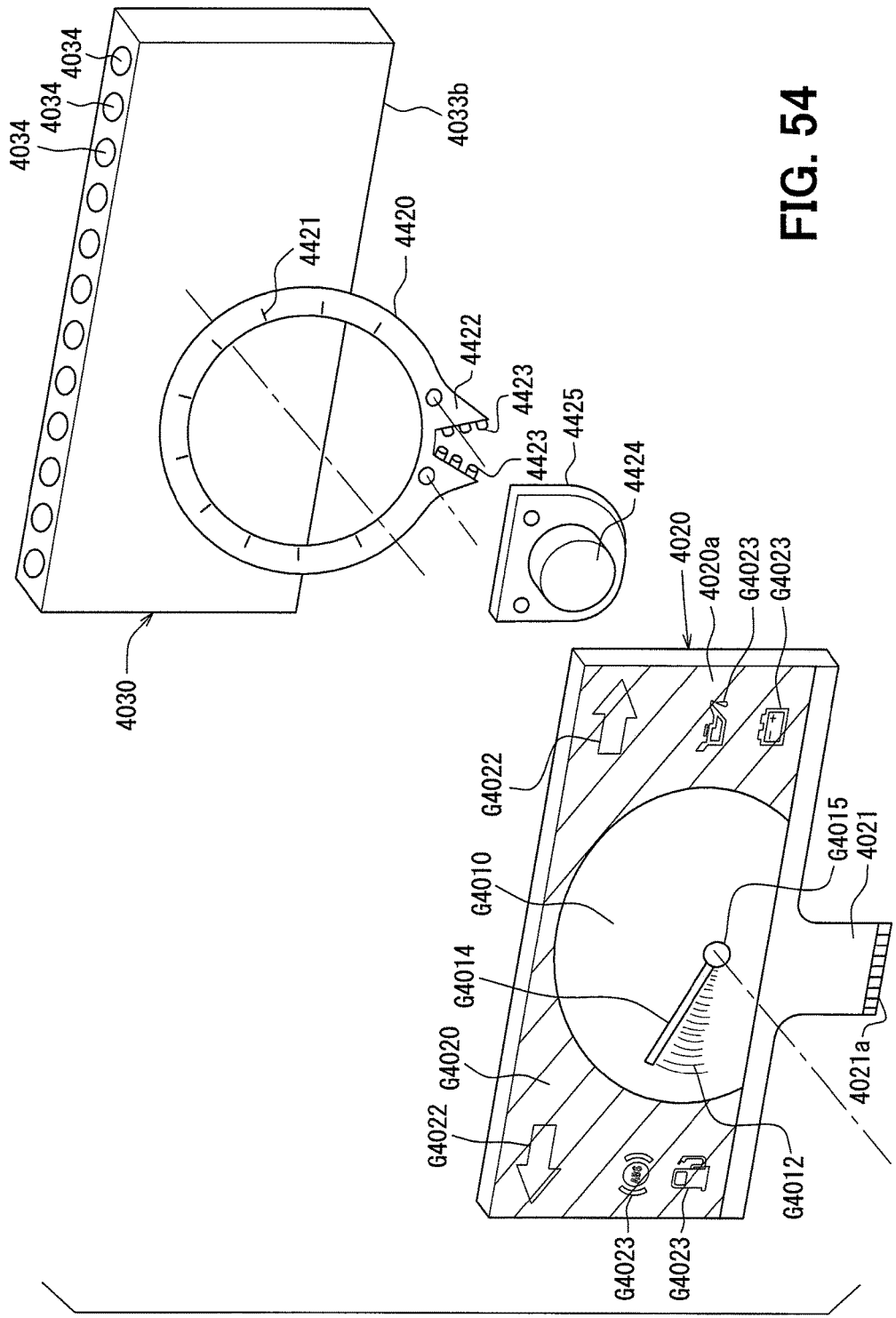
FIG. 54 is an exploded view of the display device according to the sixteenth embodiment.

The backlight 4030 is configured to have a light guide plate 4031, a reflecting plate 4032, a diffusion plate 4033, and light sources 4034 (refer to FIG. 54). The light source 4034 emits white light with a light emitting diode adopted, and the multiple light sources 4034 are placed at positions facing a side surface of the light guide plate 4031. The light that is emitted from the light sources 4034 is incident upon the light guide plate 4031 from the side surface, moves into the light guide plate 4031 while being reflected by the reflecting plate 4032, and then is emitted from the front face side of the light guide plate 4031 (upper side in FIG. 53). The light emitted from the light guide plate 4031 is transmitted while being diffuse-reflected by the diffusion plate 4033. This results in a state where the entire diffusion plate 4033 performs surface emission, and light that is uniform and has little unevenness with respect to the entire surface of the liquid crystal panel 4020 is emitted from the backlight 4030 to the liquid crystal panel 4020.

The diffusion plate 4033 is placed such that a predetermined gap is formed between the diffusion plate 4033 and the front face side of the light guide plate 4031 whereas the reflecting plate 4032 is placed in close contact with the back side of the light guide plate 4031. This gap is optional though. The liquid crystal panel 4020 is placed such that a predetermined gap 4040a is formed between the front face side of the diffusion plate 4033 and the liquid crystal panel 4020, and the decorative ring 4420, which is a real object, is placed in this gap 4040a.

As illustrated in FIG. 54, the decorative ring 4420 is formed of light transmissive resin and has a ring shape (annular shape), and the decorative ring 4420 according to the present embodiment has a circular ring shape. The decorative ring 4420 is shaped such that the decorative ring 4420 is raised toward the liquid crystal panel 4020 side from the diffusion plate 4033 side. Multiple grooves are provided in the front face-side surface of the decorative ring 4420, and these grooves, which have a stripe shape and extend in the radial direction of the decorative ring 4420, function as scales 4421 pointed at by a pointer image G4014.

The decorative ring 4420 has a light guide portion 4422, and the decorative ring 4420 and the light guide portion 4422 are integrally formed of resin. Light emitting diode-based light sources 4423 are attached to a side surface of the light guide portion 4422. Light emitted from the light sources 4423 is incident from the side surface of the light guide portion 4422, moves into the light guide portion 4422 and the decorative ring 4420, is reflected by the grooves forming the scales 4421, and then is emitted from the front face side of the decorative ring 4420 (upper side in FIG. 53). The light reflected by the scales 4421 is transmitted through a specific pixel region G4010 (described later) of the liquid crystal panel 4020 and is visually recognized by a user.

Accordingly, the scale 4421 parts appear to be shining once the light sources 4423 are turned on. The light sources 4423 consist of three types of light sources, red, green, and blue to be specific, and the color of the light that is emitted from the decorative ring 4420 can be adjusted by a microcomputer 4061 controlling the luminance of each of the light sources 4423. In other words, the scales 4421 can be visually recognized in a desired color.

The liquid crystal panel 4020 has a flexible wiring board 4021, and a terminal 4021a provided at a tip of the flexible wiring board 4021 is connected to the circuit board 4060 on which a microcomputer (microcomputer 4061) is mounted. The microcomputer 4061 has a central processing unit, a memory, and the like, and executes various types of calculation processing in accordance with a program stored in advance. An image signal that is output from the circuit board 4060 to the liquid crystal panel 4020 is transmitted to the electrode of the liquid crystal panel 4020 via the flexible wiring board 4021. In other words, content of an image that is displayed on a display surface 4020a of the liquid crystal panel 4020 is controlled by the microcomputer 4061.

The circuit board 4060 acquires various types of information from electronic controllers mounted outside the display device D among electronic controllers mounted in the vehicle and controls the content displayed on the liquid crystal panel 4020 and the rotational position of the decorative ring 4420 based on the acquired information. Specific examples of the information include information showing the changes in the various physical quantities that show the states of the vehicle, such as the traveling speed of the vehicle and the electric power remaining in the automotive battery, and information showing the occurrence of the various abnormalities.

As illustrated in FIG. 53, the case 4010 has a facing plate 4011 that is positioned on the front face side of the liquid crystal panel 4020, and an opening portion 4011a is provided in the facing plate 4011. As a result, the part of the display surface 4020a of the liquid crystal panel 4020 that is positioned inside the opening portion 4011a becomes a visible region, and this visible region is identified by being partitioned by the facing plate 4011. An outer edge part P4001 (refer to FIG. 53) of the liquid crystal panel 4020 is covered and hidden by the facing plate 4011. A cover 4012, which covers the facing plate 4011 from the front face side, is attached to the case 4010. The cover 4012 is a resinous cover that has a light transmissive property.

Once the light source 4034 of the backlight 4030 is turned on, the light that is emitted from the front face-side surface of the diffusion plate 4033 (light emitting surface 4033b) is transmitted through the liquid crystal panel 4020 and is emitted to the front face side of the display device D through the opening portion 4011a and the cover 4012. As a result, the liquid crystal panel 4020 is subjected to transmitted illumination and the image displayed on the display surface 4020a is visually recognized by the user. Specifically, the transmittance (light transmission property) of the light with respect to each corresponding pixel changes in accordance with the applied voltage applied to the electrode placed for each pixel in the liquid crystal panel 4020.

When the applied voltage is controlled such that the transmittance is maximized for each of the electrodes corresponding to the red filter, the green filter, and the blue filter, for example, the luminance of the light transmitted through each of the filters is maximized. As a result, the corresponding pixel is visually recognized as a white pixel. In other words, the corresponding pixel is visually recognized in the luminescent color of the diffusion plate 4033.

When the applied voltage is controlled such that the transmittance is minimized for each of the electrodes corresponding to the respective filters, the luminance of the light transmitted through each of the filters is minimized. As a result, the corresponding pixel is visually recognized as a black pixel.

Among the display surface 4020a, in the region where the transmittance is increased as described above (specific pixel region G4010), the object that is positioned on the back side of the region, that is, the decorative ring 4420 or the diffusion plate 4033, is visible through the liquid crystal panel 4020. Specifically, the light that is emitted from the backlight 4030 and emitted from an inner peripheral side edge 4420a of the decorative ring 4420 is transmitted through the specific pixel region G4010 and is visually recognized by the user. In addition, the light that is emitted from the light sources 4423 and reflected by the scales 4421 is transmitted through the specific pixel region G4010 and is visually recognized. Furthermore, the light that is emitted from the part of the backlight 4030 which is positioned on the inner peripheral side of the decorative ring 4420 is transmitted through the specific pixel region G4010 and is visually recognized by the user as a background image.

In a region (another pixel region G4020) of the display surface 4020a where the transmittance is controlled such that the transmittance is lower than that of the specific pixel region G4010, an object that is positioned on the back side of the region cannot be visually recognized. In other words, the light that is directed toward the liquid crystal panel 4020 from the decorative ring 4420, which is a real object, is not transmitted through the other pixel region G4020 and thus is invisible to the user. The oblique lines that are illustrated in FIGS. 52, 54, 55, and 56 mean the range of the other pixel region G4020 or a second pixel region G4040 and do not mean cross-sectional hatching.

As the transmittance is increased, the degree to which the light from the real object is transmitted through the liquid crystal panel 4020 increases and the inner peripheral side edge 4420a and the scales 4421 of the decorative ring 4420 become more and more clearly visible. As the transmittance is reduced, the degree to which the light from the inner peripheral side edge 4420a and the scales 4421 is transmitted through the liquid crystal panel 4020 decreases and the inner peripheral side edge 4420a and the scales 4421 become increasingly blurry during visual recognition.

In other words, switching can be performed between a real object display mode in which the real object is visually recognized (refer to FIGS. 52 and 55) and a real object hidden mode in which the real object is invisible (refer to FIG. 56) by the transmittance of the liquid crystal panel 4020 being controlled. In the real object display mode, the display device D can be visually recognized in the following manner as well. For example, the degree to which the real object is visually recognized in a blurry form can be adjusted based on transmittance adjustment because the definition of the real object (degree of the blur) can be controlled in accordance with the degree of transmittance of the liquid crystal panel 4020. In addition, an image displayed in the specific pixel region G4010 and the real object can be visually recognized with the image and the real object overlapped with each other. Furthermore, when the part of the specific pixel region G4010 with which the real object is overlapped is displayed in a different color from the other part, an illusion can be created as if the real object had that display color.

The decorative ring 4420 moves back and forth between a position facing the display surface 4020a of the liquid crystal panel 4020 (refer to FIG. 55) and a position deviating from the facing position (refer to FIG. 56) by a controller 4600 (refer to FIG. 57), which will be described later, controlling the electric motor 4424. A bracket 4425 is placed, along with light sources 4423, at the position deviating from the position facing the display surface 4020a (refer to FIGS. 55 and 56). Accordingly, the bracket 4425, the electric motor 4424, and the light sources 4423 are placed to be hidden on the back side of an instrument panel, and thus are invisible as illustrated in FIG. 52.

Figure 55:
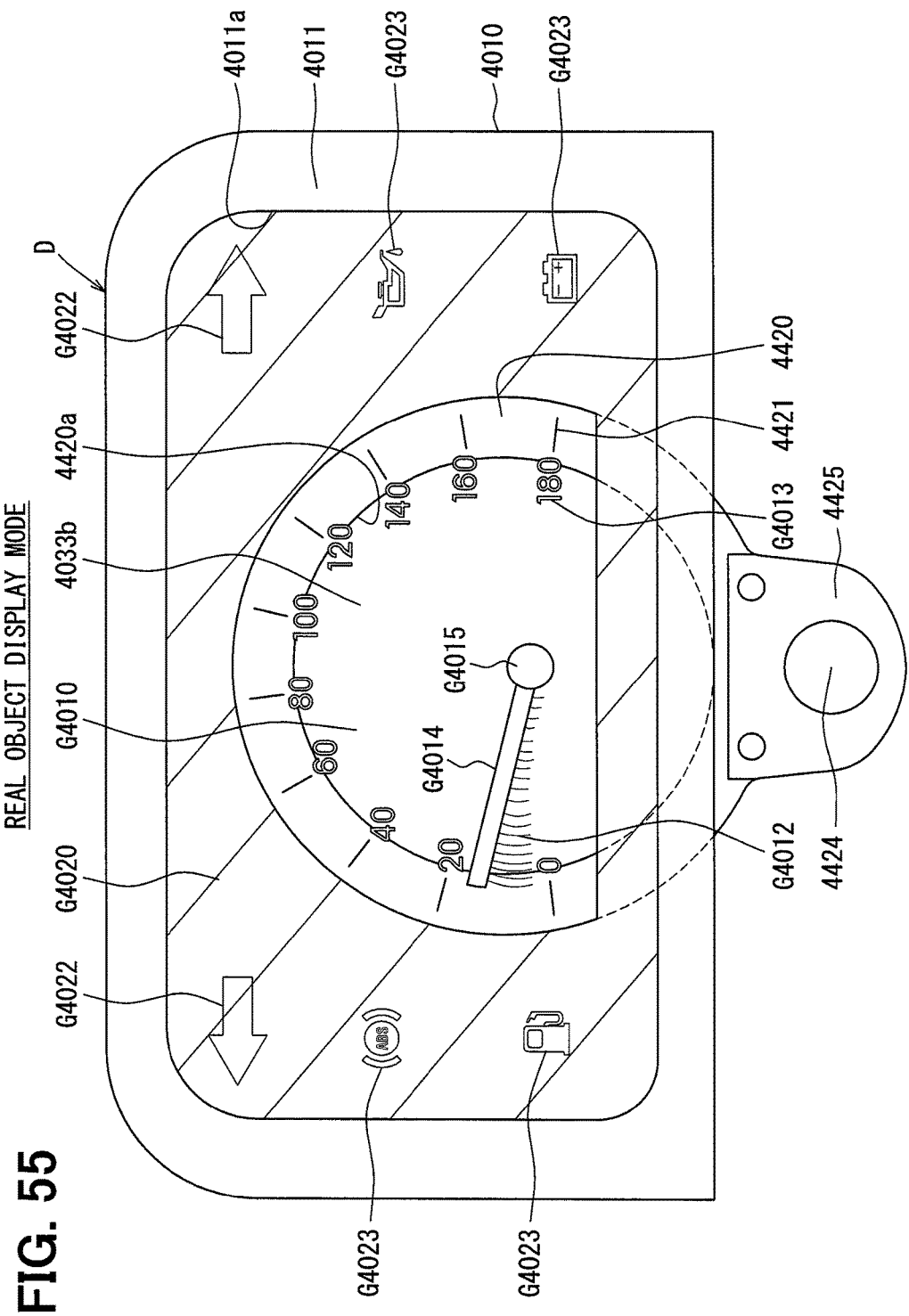
FIG. 55 is a diagram illustrating a state where an actuator of the display device according to the sixteenth embodiment has moved a real object to a position facing a liquid crystal panel.
Figure 56:
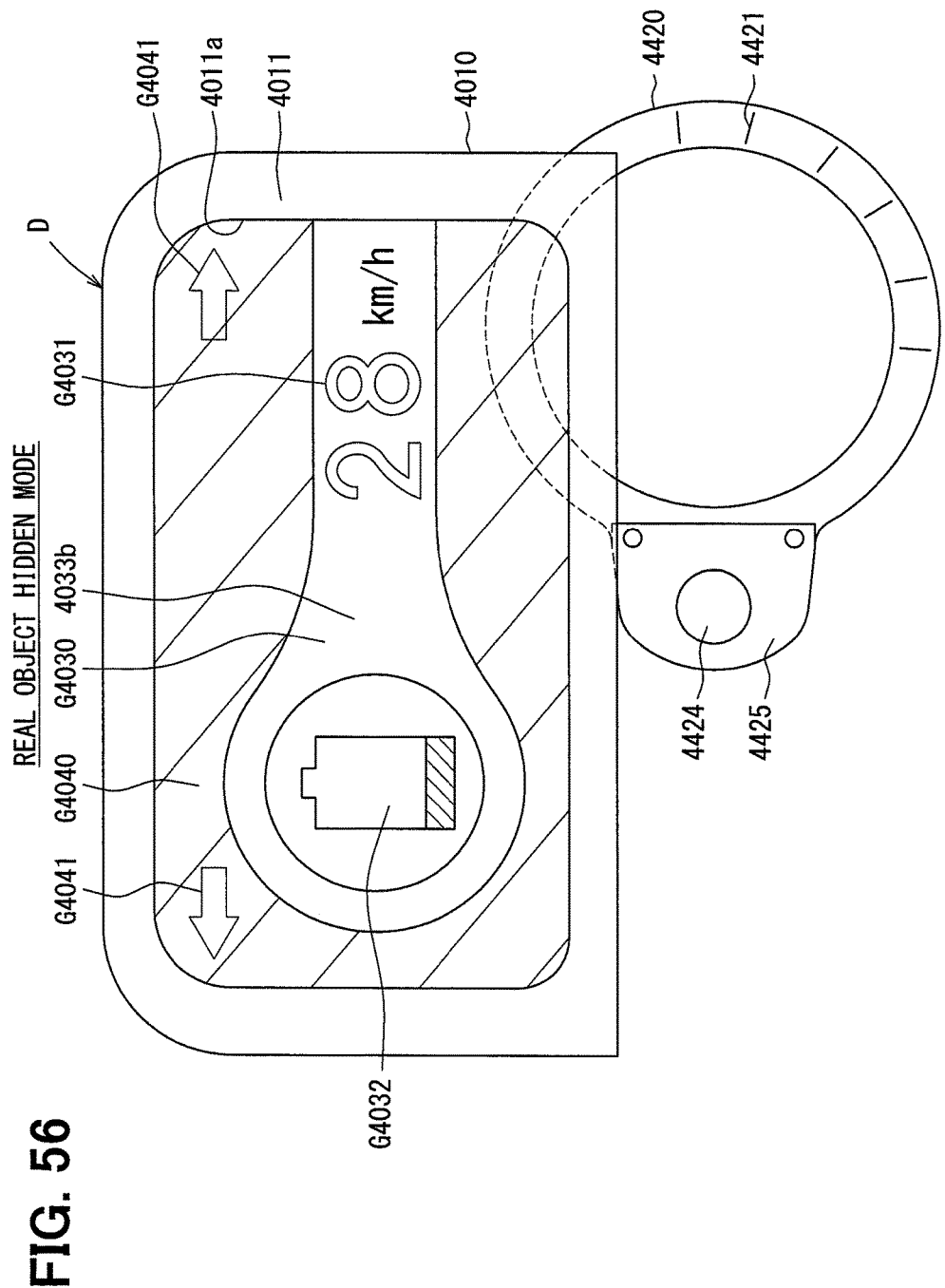
FIG. 56 is a diagram illustrating a state where the actuator of the display device according to the sixteenth embodiment has moved the real object to a position deviating from the position facing the liquid crystal panel.

Although the case 4010 being assembled in the instrument panel is as described above, the illustration of the instrument panel present around the case 4010 is omitted in FIG. 52. In FIGS. 55 and 56, a state is illustrated where the display device D has been removed from the instrument panel.

In the real object display mode that is illustrated in FIG. 55, a part of the decorative ring 4420 positioned in the specific pixel region G4010 is visually recognized through the liquid crystal panel 4020. In the real object hidden mode that is illustrated in FIG. 56, the decorative ring 4420 is hidden by the second pixel region G4040 and is invisible. The area of the part of the decorative ring 4420 that is present at the position facing the display surface 4020a is smaller in the real object hidden mode than in the real object display mode when the decorative ring 4420 is movable.

In the real object display mode that is illustrated in FIGS. 52 and 55, the region of the display surface 4020a that includes the entire decorative ring 4420 is set as the specific pixel region G4010 and the entire outside of the specific pixel region G4010 is set as the other pixel region G4020. The pointer image G4014 pointing at the scales 4421, a boss image G4015 positioned at the center of rotation of the pointer image G4014 and imitating a boss portion holding a pointer, number images G4013 showing numerical values corresponding to the scales 4421, and a shadow image G4012 are displayed in the specific pixel region G4010. The shadow image G4012 is an image showing an afterimage of the pointer in the form of imaged radar.

The shadow image G4012 is an image imitating a shadow that extends from the pointer image G4014 to the side opposite in its rotational direction. Accordingly, the shadow image G4012 has a display position varying with the display position of the pointer image G4014. The shadow image G4012 has a rotational-direction length set to increase as the rotation speed of the pointer image G4014 increases. A vehicle speed is displayed based on a combination between the pointer image G4014 and the scale 4421 by the display position of the pointer image G4014 being controlled in accordance with the vehicle speed.

In the real object display mode that is illustrated in FIGS. 52 and 55, a black image displayed in the other pixel region G4020 is a background and the diffusion plate 4033, the decorative ring 4420, the pointer image G4014, the number images G4013, the boss image G4015, and the shadow image G4012 are visually recognized in combination. In addition, parallax attributable to a difference in focal length occurs among the display surface 4020a, the real object, and the diffusion plate 4033 because of a difference in optical path length in a viewing direction. In other words, the real object is visually recognized as being present on the viewing direction far side (back side) of the display surface 4020a and the diffusion plate 4033 is visually recognized as being present further on the far side of the real object.

The black background image is displayed in the other pixel region G4020. In addition, direction indication images G4022 displaying a blinker operation direction and warning images G4023 for display of warning against the various abnormalities are displayed in the other pixel region G4020 with the background image forming the background. Each of the images that are displayed in the other pixel region G4020, that is, the direction indication images G4022, the warning images G4023, and the black background image, has a transmittance set such that the images are non-transmissive (RGB being OFF without exception). A white background image displayed in the specific pixel region G4010 has a transmittance set such that the image is fully transmissive (RGB being ON without exception).

In the real object hidden mode that is illustrated in FIG. 56, the display surface 4020a is divided into a first pixel region G4030 and the second pixel region G4040 that is a region outside the entire first pixel region G4030. The second pixel region G4040 has a transmittance which is set to be so low that the decorative ring 4420 cannot be visually recognized, and the rotational position of the decorative ring 4420 is controlled such that the rotational position of the decorative ring 4420 is outside a position corresponding to the first pixel region G4030. Specifically, a part of the decorative ring 4420 is present at a position facing the second pixel region G4040 and the other part is present outside the position facing the display surface 4020a. Accordingly, the decorative ring 4420 is invisible to the user. In addition, direction indication images G4041 are displayed in the second pixel region G4040 with a black background image forming their background.

A vehicle speed image G4031 showing the vehicle speed in the form of a numerical value and a remaining electric power image G4032 showing the electric power remaining in the automotive battery are displayed in the first pixel region G4030. The background image of the first pixel region G4030 that represents the background of the vehicle speed image G4031 and the remaining electric power image G4032 has a high transmittance set to be higher than the transmittance of the background image of the second pixel region G4040.

Figure 57:
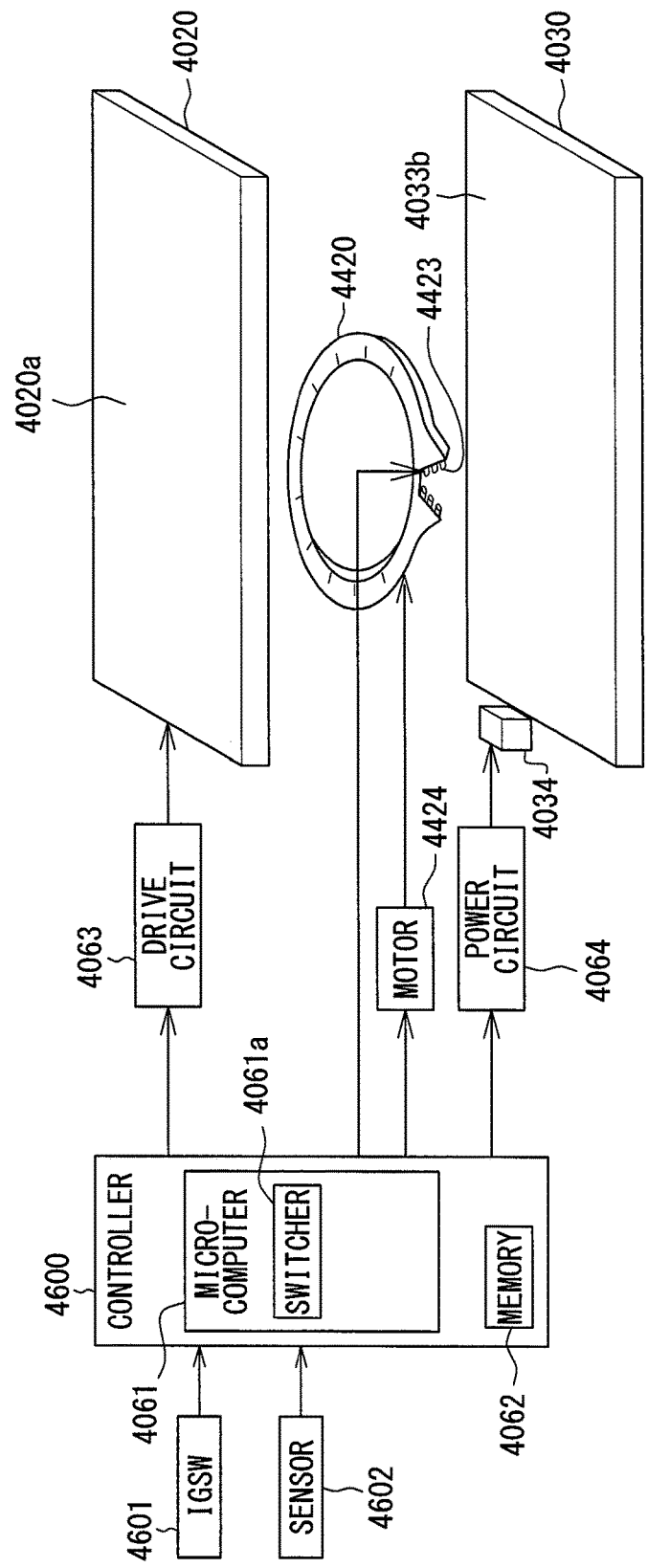
FIG. 57 is a schematic diagram illustrating a microcomputer of the display device and a control target of the microcomputer according to the sixteenth embodiment.

A drive circuit 4063 illustrated in FIG. 57, which is mounted on the circuit board 4060, controls driving of the thin film transistor of the liquid crystal panel 4020 described above in accordance with a command signal output from the microcomputer 4061. A power circuit 4064, which is mounted on the circuit board 4060, controls the amount of electric power supply to the light sources 4034 of the backlight 4030 in accordance with a command signal output from the microcomputer 4061. Specifically, the power circuit 4064 controls ON and OFF of the electric power supply to the light sources 4034.

The microcomputer 4061, a memory 4062, an input processing circuit, an output processing circuit, and the like are mounted on the circuit board 4060 and constitute the controller 4600. It can be said that this controller 4600 controls the display image on the liquid crystal panel 4020 by controlling the drive circuit 4063 and controls ON and OFF of the backlight 4030 by controlling the power circuit 4064.

Image data representing various images displayed on the liquid crystal panel 4020 is stored in the memory 4062. The microcomputer 4061 functions also as a switcher 4061a that performs display mode switching in response to the states of the vehicle. Once an ignition switch (IGSW 4601) is operated to be turned ON, for example, the electric power supply to the backlight 4030 is initiated and the liquid crystal panel 4020 is caused to perform displaying in an initiation effect mode, in which the effect image is displayed with visual recognition of the real object blocked. In a case where the IGSW 4601 is operated to be turned OFF, the liquid crystal panel 4020 is caused to perform displaying in a termination effect mode, in which the effect image is displayed with visual recognition of the real object blocked, and then the electric power supply to the backlight 4030 is terminated.

In a period between initiation effect mode termination and an OFF operation of the IGSW 4601, the display position of the pointer image G4014 is usually controlled based on the physical quantity such as the vehicle speed detected by a sensor 4602 and such that the physical quantity is pointed at.

Specifically, the liquid crystal panel 4020 is caused to perform displaying in the real object display mode illustrated in FIGS. 52 and 55. In this case, the user can change a display layout of the liquid crystal panel 4020 to suit his or her preference. Still, the transmittance of the other pixel region G4020 is lower than a predetermined value.

Switching from the real object display mode to the real object hidden mode illustrated in FIG. 56 occurs when an event satisfying a predetermined condition occurs, examples thereof including a case where the amount of the electric power remaining in the automotive battery is less than a predetermined value and a case where the display switching is requested by the user. In the example that is illustrated in FIG. 56, the rotational position of the decorative ring 4420 is controlled such that a part of the decorative ring 4420 is at the position deviating from the position facing the liquid crystal panel 4020. The part of the display surface 4020a of the liquid crystal panel 4020 where the decorative ring 4420 is positioned on its back side is subjected to display control to become the second pixel region G4040 so that the decorative ring 4420 becomes invisible. The vehicle speed image G4031 is controlled to become an image showing the vehicle speed detected by the sensor 4602.

Figure 58:
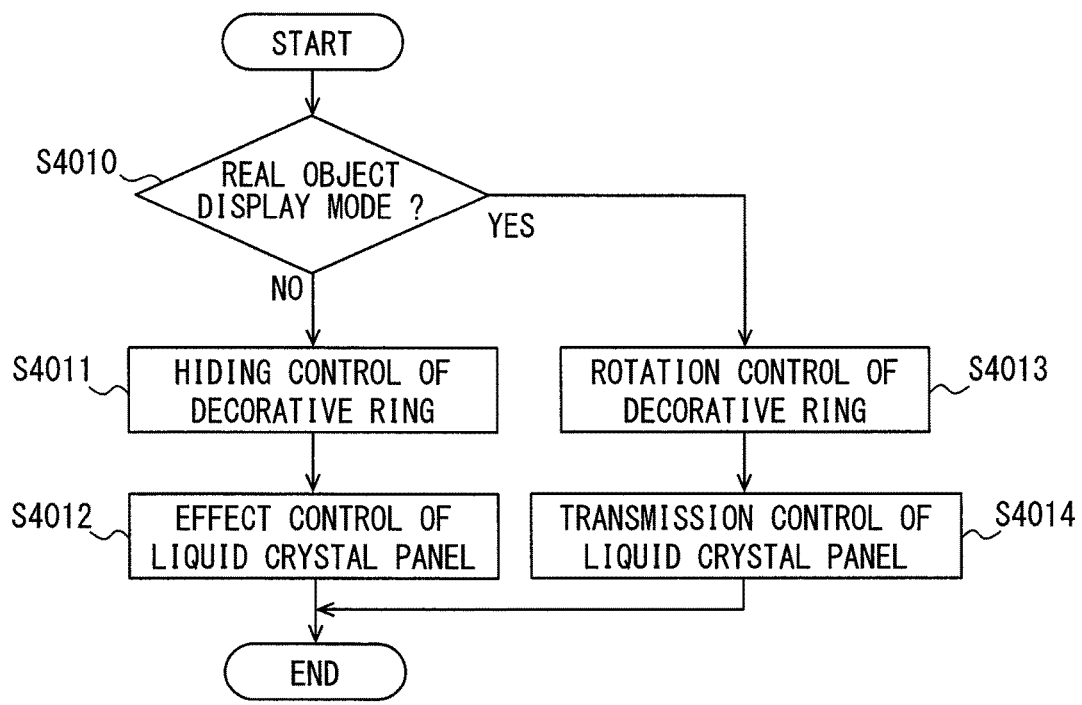
FIG. 58 is a flowchart illustrating a procedure of display control that is executed by the microcomputer of the display device according to the sixteenth embodiment.

FIG. 58 is a flowchart illustrating a procedure of processing that is repeatedly executed at a predetermined cycle by the central processing unit of the microcomputer 4061, in which it is first determined in Step S4010 whether or not the real object display mode has been requested. Examples in which the real object display mode in which the decorative ring 4420 is allowed to be visually recognized by the user is requested include a case where the physical quantity is displayed by the scale 4421 of the decorative ring 4420 being pointed at by the pointer image G4014 and, specifically, those examples include a case where the vehicle speed is displayed as illustrated in FIG. 52. Examples in which the real object hidden mode in which the decorative ring 4420 is not allowed to be visually recognized by the user is requested include a case where a focus is laid on the image displayed on the liquid crystal panel 4020. Specifically, those examples include a case where a focus is laid on the remaining electric power image G4032 illustrated in FIG. 55, an opening image displayed when the display device D is started, an ending image displayed at the termination of the operation of the display device D, and the like.

In a case where it is determined in Step S4010 that the requested display mode is the hidden mode, the processing proceeds to the following Step S4011, in which hiding control is executed for the decorative ring 4420 to be hidden to the back side of the second pixel region G4040 as illustrated by the dotted line in FIG. 55. Then, in Step S4012, effect control is executed for the decorative ring 4420 to become invisible by the liquid crystal panel 4020 being caused to perform displaying as follows. During the effect control, an image that has a transmittance which is so low that the decorative ring 4420 cannot be visually recognized is displayed in the second pixel region G4040. Images for the notification of the physical quantities such as the vehicle speed image G4031 and the remaining electric power image G4032 are displayed in the first pixel region G4030.

The transmittance of the first pixel region G4030 in the hidden mode does not have to be lowered to the degree that the diffusion plate 4033, which is an object positioned on the back side of the liquid crystal panel 4020, is invisible. Even if the first pixel region G4030 is given a high transmittance, for example, the decorative ring 4420 is still subjected to the hiding control and thus is invisible, and the diffusion plate 4033 positioned on the back side of the decorative ring 4420 is visually recognized. Assuming a transmittance of 100%, the diffusion plate 4033 in that case is visually recognized as performing surface emission in the color of the light sources 4034.

In a case where it is determined in Step S4010 that the requested display mode is the display mode, the processing proceeds to the following Step S4013, in which the electric motor 4424 is controlled such that the electric motor 4424 moves the decorative ring 4420 to a position pointed at by the pointer image G4014 as illustrated in FIG. 52. Then, in Step S4014, the transmittance of the specific pixel region G4010 is controlled such that at least a part of the decorative ring 4420 is visually recognized by the liquid crystal panel 4020 being caused to perform displaying as follows. The specific pixel region G4010 is set to include the decorative ring 4420. In addition, the pointer image G4014, the number images G4013, the boss image G4015, and the shadow image G4012 are displayed in the specific pixel region G4010. As a result, the pointer image G4014 points at the scale 4421 and the physical quantity such as the vehicle speed is displayed.

The diffusion plate 4033 is visually recognized in the region of the specific pixel region G4010 where the real object is not present and the pointer image G4014, the number images G4013, the boss image G4015, and the shadow image G4012 are hidden. When this region has a transmittance of 100%, the diffusion plate 4033 in that case is visually recognized as performing surface emission in the color of the light sources 4034. In other words, the real object, the pointer image G4014, the number images G4013, the boss image G4015, and the shadow image G4012 are visually recognized with the diffusion plate 4033 forming the background. The other pixel region G4020 is controlled such that its transmittance is lower than that of the specific pixel region G4010. The microcomputer 4061 during the execution of the processing of Step S4010 is corresponding to a "switcher" that performs switching between the real object display mode and the real object hidden mode.

According to the present embodiment described above, the decorative ring 4420 as a decorative member (real object) decorating the image displayed on the liquid crystal panel 4020 is placed between the liquid crystal panel 4020 and the backlight 4030. Accordingly, a problem in the form of "a part of the image on the liquid crystal panel 4020 being blocked by the real object and becoming invisible", which occurs in a case where the real object is placed on the front face side of the liquid crystal panel 4020, can be avoided. Accordingly, the entire display surface 4020a of the liquid crystal panel 4020 can be effectively used while a sense of depth is given to the display device D by the liquid crystal panel 4020 being combined with the decorative ring 4420 as a real object.

According to the present embodiment, the real object is visually recognized on the far side of the image on the liquid crystal panel 4020 and the diffusion plate 4033 is visually recognized on the far side of the real object. Accordingly, a layer display that has at least three layers can be realized and a depth-provided appearance can be improved.

According to the present embodiment, the specific pixel region G4010 at the part where the real object is positioned on its back side is higher in transmittance than the other pixel region G4020, and thus the real object is easily visible through the specific pixel region G4010. On the other hand, in the other pixel region G4020, the object (diffusion plate 4033) that is present on the back side of the liquid crystal panel 4020 is hardly visible. Accordingly, the real object visually recognized through the specific pixel region G4010 stands out and attraction of attention to the real object can be promoted.

In the present embodiment, the light sources 4423, which illuminate the decorative ring 4420, are provided in addition to the backlight 4030. Accordingly, the scales 4421 can be clearly visible when a sense of floating is generated based on the parallax between the scales 4421 of the decorative ring 4420 and the various images displayed on the liquid crystal panel 4020, and thus the sense of floating can be improved with the parallax highlighted.

According to the present embodiment, the scale 4421 as a real object is pointed at by the pointer image G4014. Accordingly, the scale 4421 is visually recognized on the far side of the pointer image G4014 and the depth-provided appearance can be improved. In addition, the sense of depth can be improved since the diffusion plate 4033, which is the background of the pointer image G4014, is visually recognized on the far side of the scale 4421.

According to the present embodiment, the liquid crystal panel 4020 is controlled such that the other pixel region G4020 becomes a black image. Accordingly, the diffusion plate 4033 is invisible in the other pixel region G4020, and the visual attractiveness of the decorative ring 4420 can be further improved since the luminance of the specific pixel region G4010 is higher than the luminance of the other pixel region G4020.

According to the present embodiment, the switcher (Step S4010) is provided that performs switching between the real object display mode in which the transmittance of the specific pixel region G4010 is increased to the degree that the real object (decorative ring 4420) is visible and the real object hidden mode in which the transmittance of the specific pixel region G4010 is lowered to the degree that the real object is invisible. Accordingly, display in the form of the real object appearing and disappearing can be realized with ease by the display that is conducted on the liquid crystal panel 4020 being switched.

According to the present embodiment, the electric motor 4424 moves the real object in parallel to the display surface 4020a. Accordingly, the real object can be moved while an increase in the size of the display device D in a viewing direction is avoided. The electric motor 4424 allows the real object to move back and forth between the position facing the display surface 4020a of the liquid crystal panel 4020 and the position deviating from the facing position. Accordingly, the area of the part of the real object that faces the display surface 4020a can be reduced in the real object hidden mode. Accordingly, the area of the second pixel region G4040 in the real object hidden mode, that is, a pixel region for hiding the real object, can be reduced. Accordingly, the area requiring a low luminance can be reduced and the degree of freedom of content displayed in the real object hidden mode can be improved.

(Seventeenth Embodiment)

Figure 59:
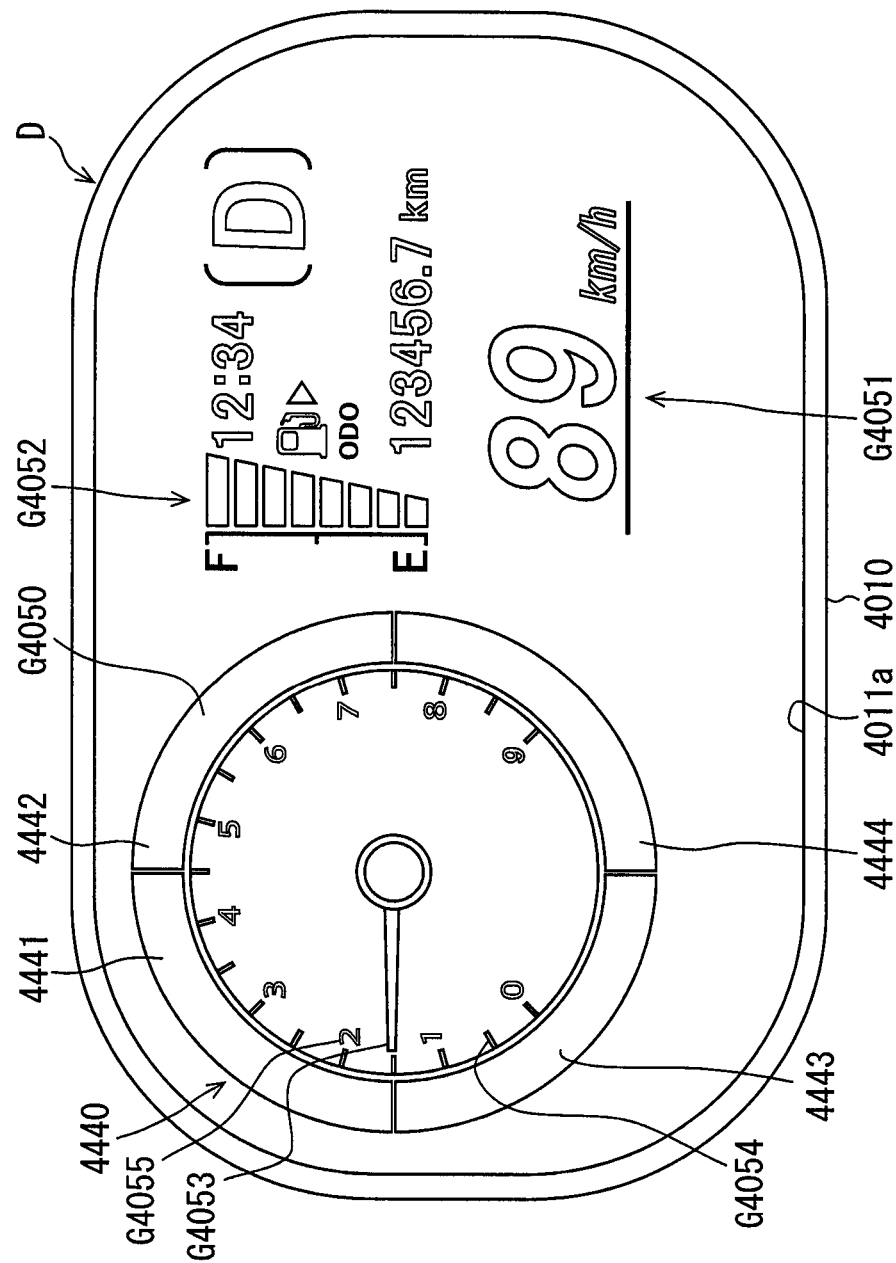
FIG. 59 is a front view of a display device according to a seventeenth embodiment of the present disclosure, in which content displayed in a real object display mode is illustrated.
Figure 60:
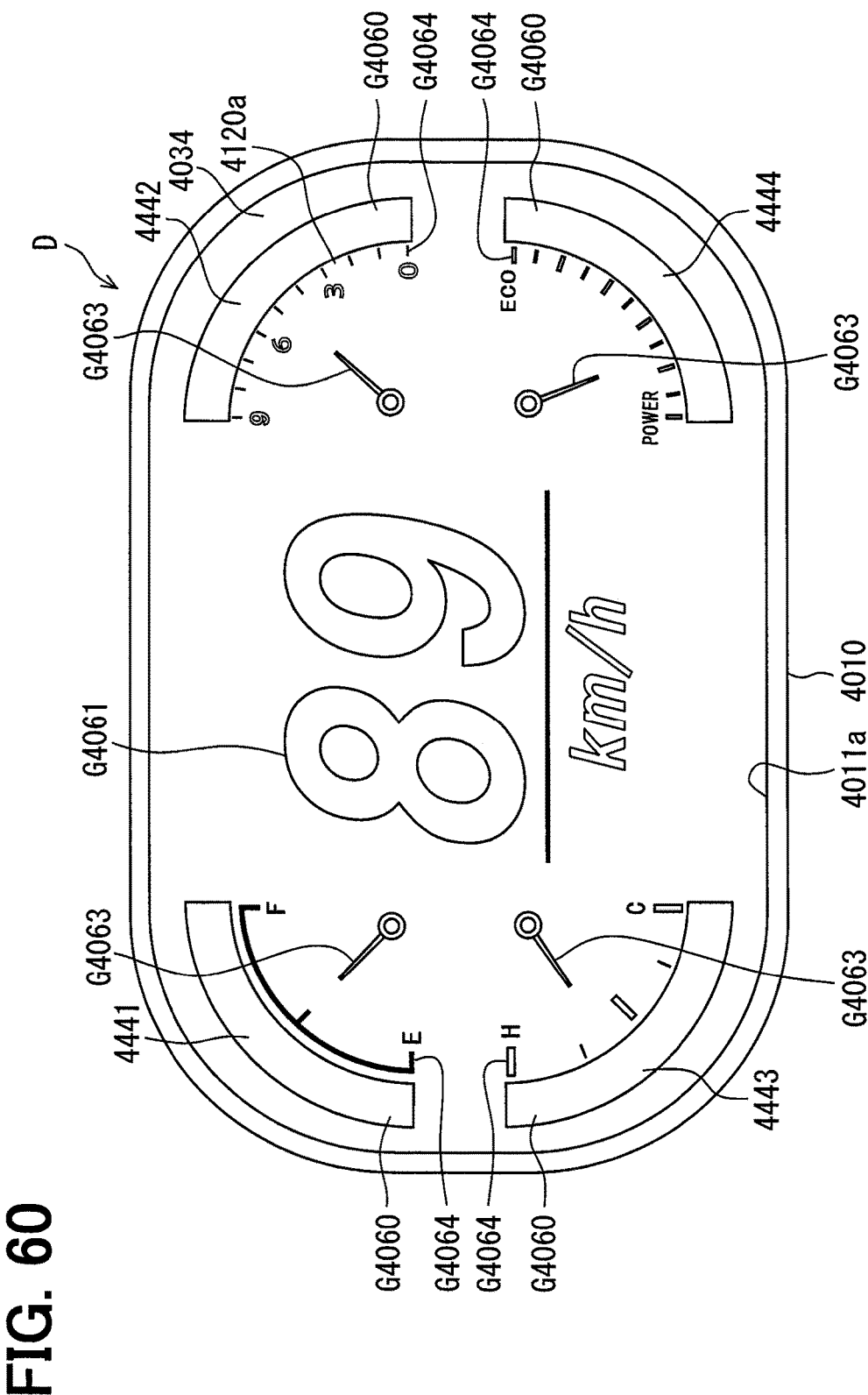
FIG. 60 is a diagram illustrating a state where a real object has been divided and moved according to the seventeenth embodiment.

In the sixteenth embodiment described above, the decorative ring 4420, which is a real object, is moved in a rotating manner. In a seventeenth embodiment, in contrast, a decorative ring 4440 is moved in parallel to a display surface 4020a without a change in direction. In addition, switching is performed between an integration mode illustrated in FIG. 59 (described later) and a separation mode illustrated in FIG. 60 (described later) based on a parallel movement of multiple divided pieces 4441, 4442, 4443, and 4444.

In the integration mode, the multiple divided pieces 4441 to 4444 are moved and combined such that the single decorative ring 4440 is provided. A decorative ring image G4050 is displayed at the part of a liquid crystal panel 4020 that faces the decorative ring 4440. A vehicle speed image G4051 showing a vehicle speed in the form of a numerical value and a remaining fuel level image G4052 showing the amount of remaining fuel are displayed at outside parts of the decorative ring image G4050. The pointer image G4053, scale images G4054, and numerical value images G4055 are displayed at inside parts of the decorative ring image G4050.

In the integration mode, the region of the liquid crystal panel 4020 where the decorative ring image G4050 is displayed is corresponding to a "specific pixel region". The region where none of the images G4050 to G4055 is displayed is corresponding to "another pixel region" where a background image is displayed. In other words, the decorative ring image G4050 is displayed at a position overlapped with the decorative ring 4440 and the light transmittance of the decorative ring image G4050 is set to be higher than the light transmittance of the background image. Accordingly, the decorative ring 4440 is visually recognized through the liquid crystal panel 4020. Accordingly, the decorative ring image G4050 is visually recognized as being overlapped with the decorative ring 4440, and an optical illusion can be created as if the decorative ring 4440 were a real object provided in, for example, the color of the decorative ring image G4050.

In the separation mode, the multiple divided pieces 4441 to 4444 are placed apart from one another. The divided pieces 4441 to 4444 decorate respective pointer images G4063 and scale images G4064, which will be described below. The four sets of the pointer images G4063 and the scale images G4064, which are positioned at the four corners of the liquid crystal panel 4020, display the amount of the remaining fuel level, an engine speed, an engine coolant temperature, and a fuel consumption pointer, respectively. A vehicle speed image G4061 showing the vehicle speed in the form of a numerical value is displayed at the central part of the liquid crystal panel 4020.

In the separation mode, the region of the liquid crystal panel 4020 where a decorative ring image G4060 is displayed is corresponding to a "specific pixel region" and the region where none of the images G4060 to G4064 is displayed is corresponding to "another pixel region" and is a background image. In other words, the decorative ring image G4060 has a light transmittance that is set to be higher than that of the background image, and the divided pieces 4441 to 4444 are visually recognized through the liquid crystal panel 4020. Accordingly, the decorative ring image G4060 is visually recognized as being overlapped with the divided pieces 4441 to 4444, and an optical illusion can be created as if the divided pieces 4441 to 4444 were real objects provided in, for example, the color of the decorative ring image G4060.

In short, it can be said that the liquid crystal panel 4020 is controlled such that the divided pieces 4441 to 4444 are moved based on switching between the integration mode and the separation mode and the position or shape of the specific pixel region changes as a result of the movement.

The divided pieces 4441 to 4444 according to the present embodiment have a range of movement limited to a range facing the display surface 4020a (inside) whereas the decorative ring 4420 according to the sixteenth embodiment described above has a range of rotating movement expanded to cover even the outside of the display surface 4020a.

Effects similar to those achieved by the sixteenth embodiment described above are achieved in the case of the parallel movement of the decorative ring 4440 according to the present embodiment described above. In addition, the degree of freedom in terms of the position of the specific pixel region is higher than in a case where the decorative ring 4420 is rotated since the decorative ring 4440 is moved after being separated into the multiple divided pieces 4441 to 4444. Accordingly, the degree of freedom of displayed content can be improved in a real object display mode and a real object hidden mode alike.

(Eighteenth Embodiment)

Figure 61:
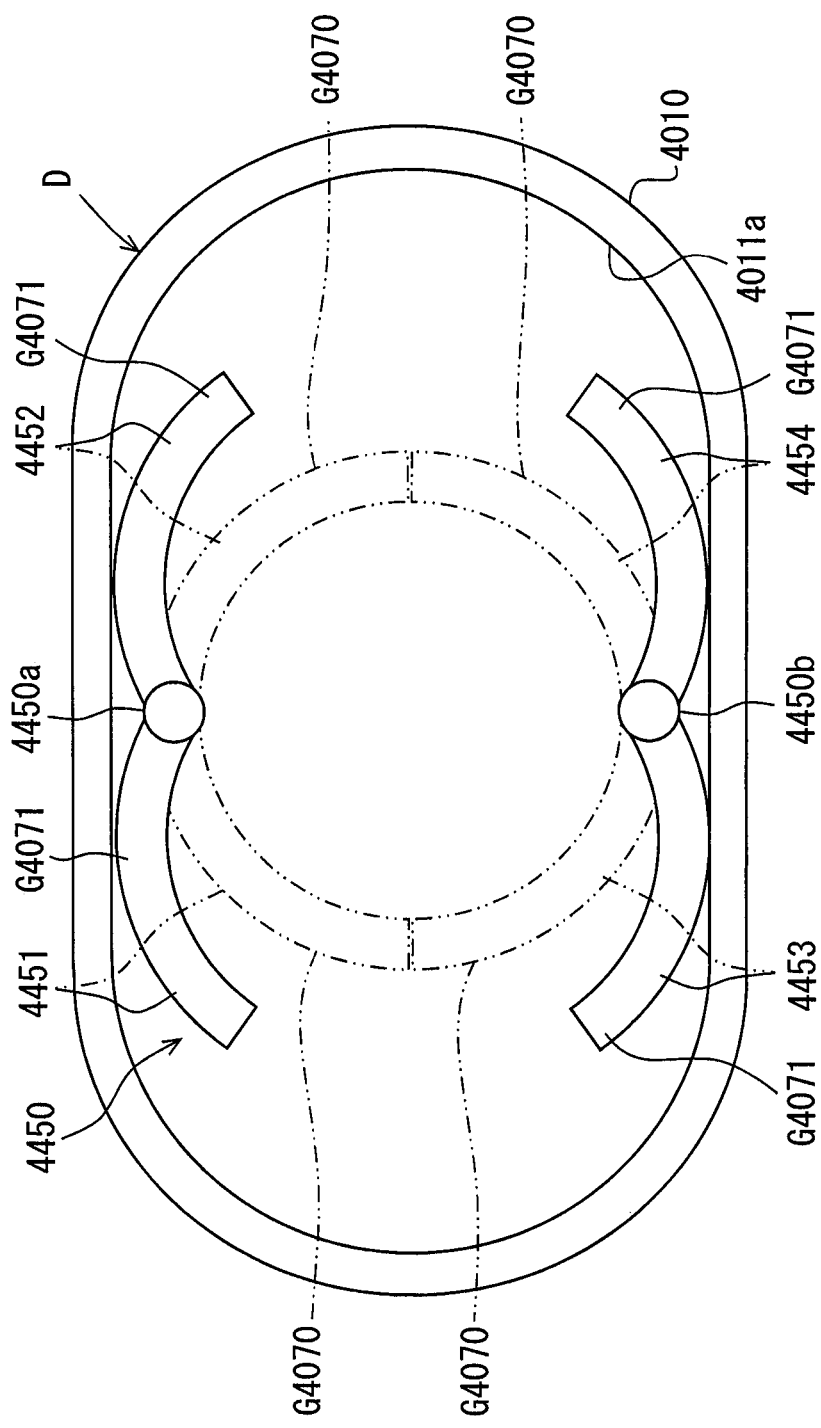
FIG. 61 is a diagram showing a state where a real object moves according to an eighteenth embodiment of the present disclosure.

In the seventeenth embodiment described above, the multiple divided pieces 4441 to 4444 are subjected to a parallel movement without a change in direction. In an eighteenth embodiment illustrated in FIG. 61, in contrast, multiple divided pieces 4451 and 4452 and multiple divided pieces 4453 and 4454 that constitute a decorative ring 4450 are configured to rotate about multiple rotating shafts 4450a and 4450b, respectively. The two-dot chain lines that are illustrated in FIG. 61 represent an integration mode, in which the multiple divided pieces 4451 to 4454 have been moved to provide the single decorative ring 4450 in combination.

In the integration mode and a separation mode, the region of a liquid crystal panel 4020 where decorative ring images G4070 and G4071 are displayed is corresponding to a "specific pixel region". The region where the decorative ring images G4070 and G4071 are hidden is corresponding to "another pixel region" where a background image is displayed. In other words, the light transmittance of the decorative ring images G4070 and G4071 is set to be higher than the light transmittance of the background image, and the decorative ring 4450 or the divided pieces 4451 to 4454 are visually recognized through the liquid crystal panel 4020. Accordingly, the decorative ring images G4070 and G4071 are visually recognized as being overlapped with the divided pieces 4451 to 4454, and an optical illusion can be created as if the decorative ring 4450 were a real object provided in, for example, the color of the decorative ring images G4070 and G4071.

In short, it can be said that the liquid crystal panel 4020 is controlled such that the divided pieces 4451 to 4454 are moved based on switching between the integration mode and the separation mode and the position or shape of the specific pixel region changes as a result of the movement.

According to the present embodiment described above, a decorative ring 4440 is moved after being separated into the multiple divided pieces 4451 to 4454, and thus the degree of freedom in terms of the position of the specific pixel region is higher than in the case of the sixteenth embodiment, which lacks that type of separation. With the structure of the present embodiment, in which the divided pieces 4451 to 4454 are rotated, a mechanism rotating the divided pieces 4451 to 4454 can be simpler and more compact than in the above-described seventeenth embodiment, in which the respective divided pieces 4441 to 4444 are subjected to a parallel movement.

The invention is not at all limited to the preferred embodiments of the invention described above and can be carried out in various modified forms, examples of which will be described below. Not only combination between the parts explicitly specified in each of the embodiments to be capable of being combined with each other but also partial combination between the embodiments can be conducted even without explicit expression insofar as the combination is not particularly hindered.

It is desirable that the light emitting surface 4033b of the backlight 4030 is larger than the display surface 4020a of the liquid crystal panel 4020. According to this configuration, the possibility of a part P4002 (refer to FIG. 53) of the backlight 4030 outside the light emitting surface 4033b being visually recognized through the liquid crystal panel 4020 in a case where the entire surface of the display surface 4020a is given a low transmittance can be reduced. Accordingly, the possibility of an impaired appearance of the display device D can be reduced.

Although a scale image G4011 is displayed in the specific pixel region G4010 in the embodiment that is illustrated in FIG. 52, the scale image G4011 may be displayed in the other pixel region G4020 as well.

In the embodiment that is illustrated in FIG. 54, the electric motor 4424 rotating the decorative ring 4420 is fixed at a predetermined position. The electric motor 4424 may also be configured such that the electric motor 4424 can be moved along with the decorative ring 4420.

The light sources 4423 according to the embodiment that is illustrated in FIG. 54 may be discarded although the light sources 4423 are attached to the decorative ring 4420 in the embodiment that is illustrated in FIG. 54. The specific pixel regions G4010, G4050, G4060, G4070, and G4071 may be set such that the real objects are visible in their entirety or may be set such that the real objects are visible in part.

It is desirable that boundaries between the specific pixel regions G4010, G4050, G4060, G4070, and G4071 and the other pixel region G4020 take the form of a gradation display image with a gradually changing luminance.

Although the decorative member according to the sixteenth embodiment described above is the ring-shaped decorative ring 4420, the decorative members according to the present disclosure are not limited to ring-shaped ones and may be, for example, arc-shaped ones extending in the direction of rotation of the pointer image G4014.

Although the background image that is displayed in the other pixel region G4020 is controlled such that the background image is black in each of the embodiments described above, the color of the background image is not limited to black, and any color and luminance may be set as the color and the luminance of the background image insofar as its transmittance is lower than that of the specific pixel region G4010.

When the decorative ring 4420 is controlled in the real object hidden mode according to the embodiment illustrated in FIG. 56 such that the decorative ring 4420 is rotated to the position deviating from the position facing the display surface 4020a, a part of the decorative ring 4420 is at the deviating position. The entire decorative ring 4420 may be at the deviating position instead.

A monochrome-type liquid crystal panel may take the place of the full color-type liquid crystal panel 4020 according to each of the embodiments. The present disclosure can also be applied to a segment liquid crystal panel that is provided with a segment electrode which has a predetermined shape instead of the matrix-type electrode provided with the row electrode and the column electrode and displays an image resulting from a pixel corresponding thereto.

Although the present disclosure is applied to the display device D that is assembled in the instrument panel in the vehicle in each of the embodiments described above, the present disclosure is not limited to that application and may be applied to, for example, an electron mirror mounted in a vehicle. The electron mirror is a mirror that is attached to a front windshield and a door trim, displays an image imitating an image reflected in the mirror, and displays an image showing a space behind the vehicle. The present disclosure is not limited to a display device mounted in a vehicle and may be applied to, for example, display devices mounted on game machines and home appliances such as pachinko machines and throttles.

(Nineteenth Embodiment)

Figure 62:
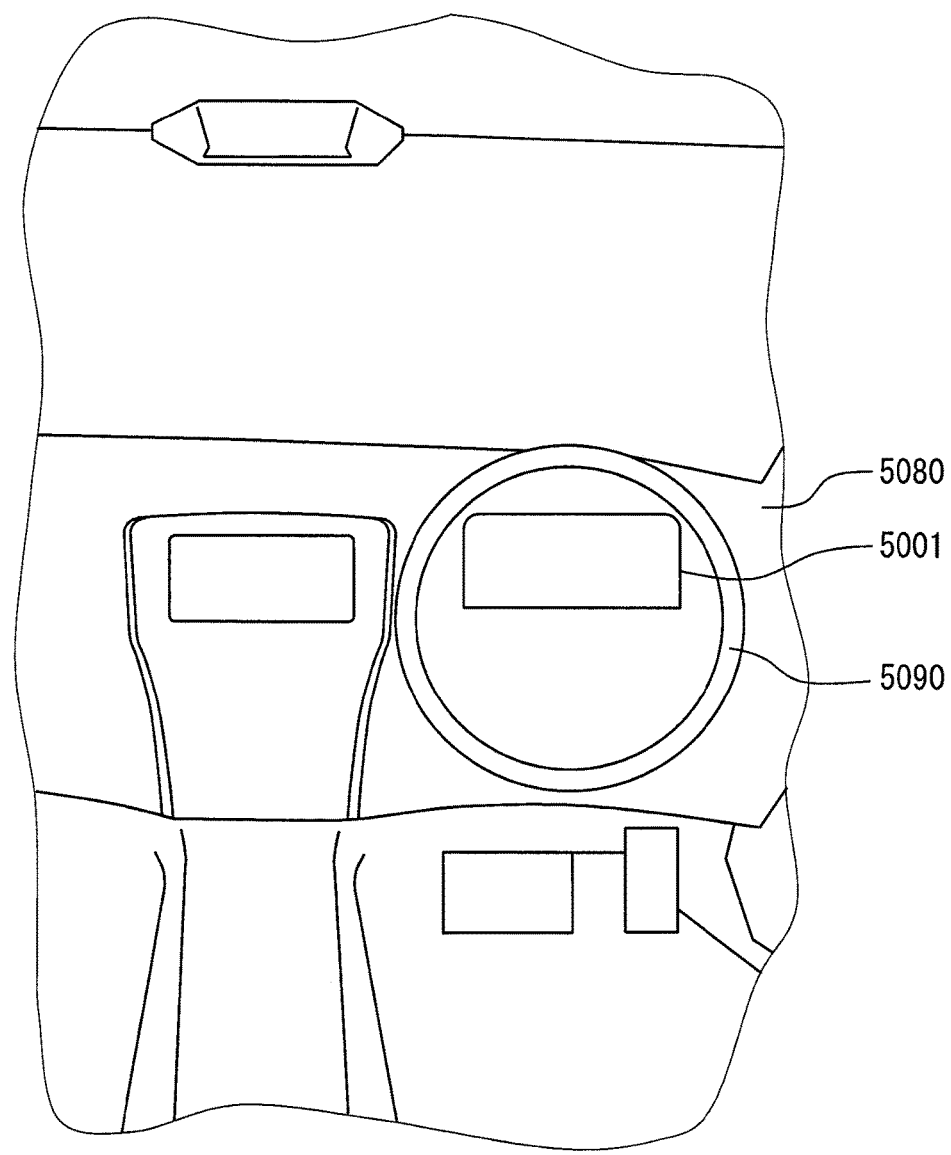
FIG. 62 is a schematic diagram illustrating a display device placed in a vehicle according to a nineteenth embodiment of the present disclosure.

As illustrated in FIG. 62, a meter 5001, which is a display device for a vehicle according to the present embodiment, is disposed between a dashboard 5080 and a steering wheel 5090.

Figure 63:
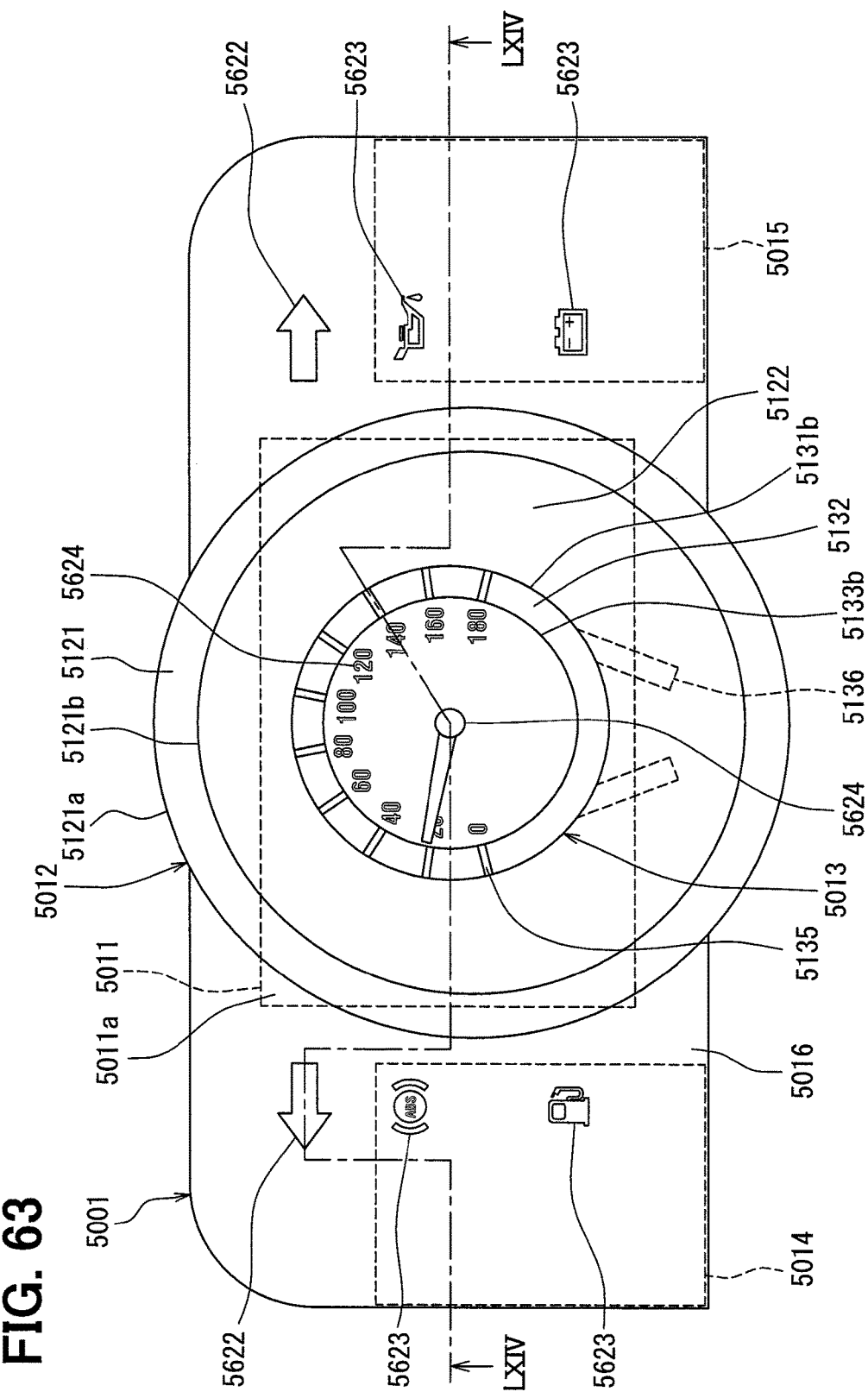
FIG. 63 is a front view illustrating the display device according to the nineteenth embodiment.

FIG. 63 is a diagram in which the meter 5001 is viewed from a driver's side, that is, the front side. The meter 5001 is broadly divided into three display regions, which are on left, central, and right sides, respectively. In a dial 5016 that corresponds to the left-side and right-side display regions, liquid crystal displays 5014 and 5015 (hereinafter, referred to as LCDs 5014 and 5015) are disposed on the back side, which is the side opposite from the front side. Liquid crystal panels, backlights, and so on constitute the LCD 5014 and the LCD 5015. In the present embodiment, the front side will be referred to as a near direction and the back side will be referred to as a far direction. In the present embodiment, a side that is close to the center of the dial 5016 will be referred to as an inner side and a side that is close to an end portion of the dial 5016 will be referred to as an outer side in a square section that the dial 5016 is along.

A liquid crystal panel 5011 is disposed on the back side of the dial 5016 that corresponds to the central-side display region. A backlight 5021 is disposed at a predetermined distance from the back side of the liquid crystal panel 5011. A back-side ring member 5013 is disposed between the liquid crystal panel 5011 and the backlight 5021.

The liquid crystal panel 5011 is a TFT liquid crystal panel that is configured to have a liquid crystal layer in which a liquid crystal is held, a pair of electrodes placed on both sides of the liquid crystal layer, a color filter substrate, and a pair of polarizing films. The electrode is a matrix electrode in which a row electrode and a column electrode are combined with each other and is configured as a transparent electrode disposed for each pixel, and a voltage applied to the electrode is controlled by a thin film transistor. The color filter substrate has a red filter, a green filter, and a blue filter, and each of the filters is placed for each pixel (for each electrode). A thin film transistor (TFT, not illustrated) turning ON and OFF each pixel is provided as well. The polarizing film is a filter through which light vibrating in a predetermined direction is transmitted to be given a predetermined regulated vibration direction. The pair of polarizing films are placed such that the vibration directions have a deviation of 90°.

Once the backlight 5021 is turned on, light is emitted from the back side to the liquid crystal panel 5011. As a result, the liquid crystal panel 5011 is subjected to transmitted illumination and the image that is displayed on the liquid crystal panel 5011 is visually recognized by the driver. Specifically, the transmittance (light transmission property) of the light with respect to each corresponding pixel changes in accordance with the applied voltage applied to the electrode placed for each pixel in the liquid crystal panel 5011.

When the applied voltage is controlled such that the transmittance is maximized for each of the electrodes corresponding to the red filter, the green filter, and the blue filter, for example, the luminance of the light transmitted through each of the filters is maximized. As a result, the corresponding pixel is visually recognized as a white pixel. When the applied voltage is controlled such that the transmittance is minimized for each of the electrodes corresponding to the respective filters, the luminance of the light transmitted through each of the filters is minimized. As a result, the corresponding pixel is visually recognized as a black pixel.

Among the liquid crystal panel 5011, in the region where the transmittance is controlled such that the transmittance is high as described above, the object that is positioned on the back side of the region, that is, the back-side ring member 5013, is visible through the liquid crystal panel 5011.

The back-side ring member 5013 is disposed between the liquid crystal panel 5011 and the backlight 5021. The back-side ring member 5013 is a light guide member in which light is reflected. Acrylic resin or the like constitutes the back-side ring member 5013. The back-side ring member 5013 is a cylindrical member that has a cavity at its center. The back-side ring member 5013 will be described in detail later. The back-side ring member 5013 is a back-side real member and a back-side light guide member according to the present embodiment.

The back-side ring member 5013 has two light receiving portions 5136. The light receiving portions 5136 face each other in their positional relationship. The back-side ring member 5013 has multiple groove portions 5135 as well.

A display surface ring member 5012 is disposed on a region of the dial 5016 which corresponds to an image-displaying display surface 5011a of the liquid crystal panel 5011. The display surface ring member 5012 is a cylindrical member that has a cavity at its center. The display surface ring member 5012 is a light guide member in which light can be guided. Acryl or the like constitutes the display surface ring member 5012. The display surface ring member 5012 is a display surface real member and a display surface transmission member according to the present embodiment. The display surface ring member 5012 will be described in detail later.

The dial 5016 is disposed on the front sides of the LCD 5014, the LCD 5015, and the liquid crystal panel 5011. A transmissive member constitutes the dial 5016. Accordingly, the driver can visually recognize various members present on the far side of the dial 5016. A specific region of the dial 5016 is printed in black. Various members present on the far side of the region of the dial 5016 that is printed in black cannot be visually recognized. Specifically, in the present embodiment, the regions of the dial 5016 that correspond to the LCD 5014, the LCD 5015, and the liquid crystal panel 5011 are not subjected to printing. In addition, dial printing is performed such that transparent arrows 5622 are provided. In the other parts, the dial 5016 is subjected to printing. Accordingly, the driver can visually recognize images 5623 displayed on the LCD 5014 via the dial 5016 as well. In addition, the driver can visually recognize images 5623 displayed on the LCD 5015 via the dial 5016 as well. Furthermore, the driver can visually recognize images 5624 displayed on the liquid crystal panel 5011 via the dial 5016 as well. The arrows 5622 are visually recognized by the driver by light being emitted from the back side.

Figure 64:
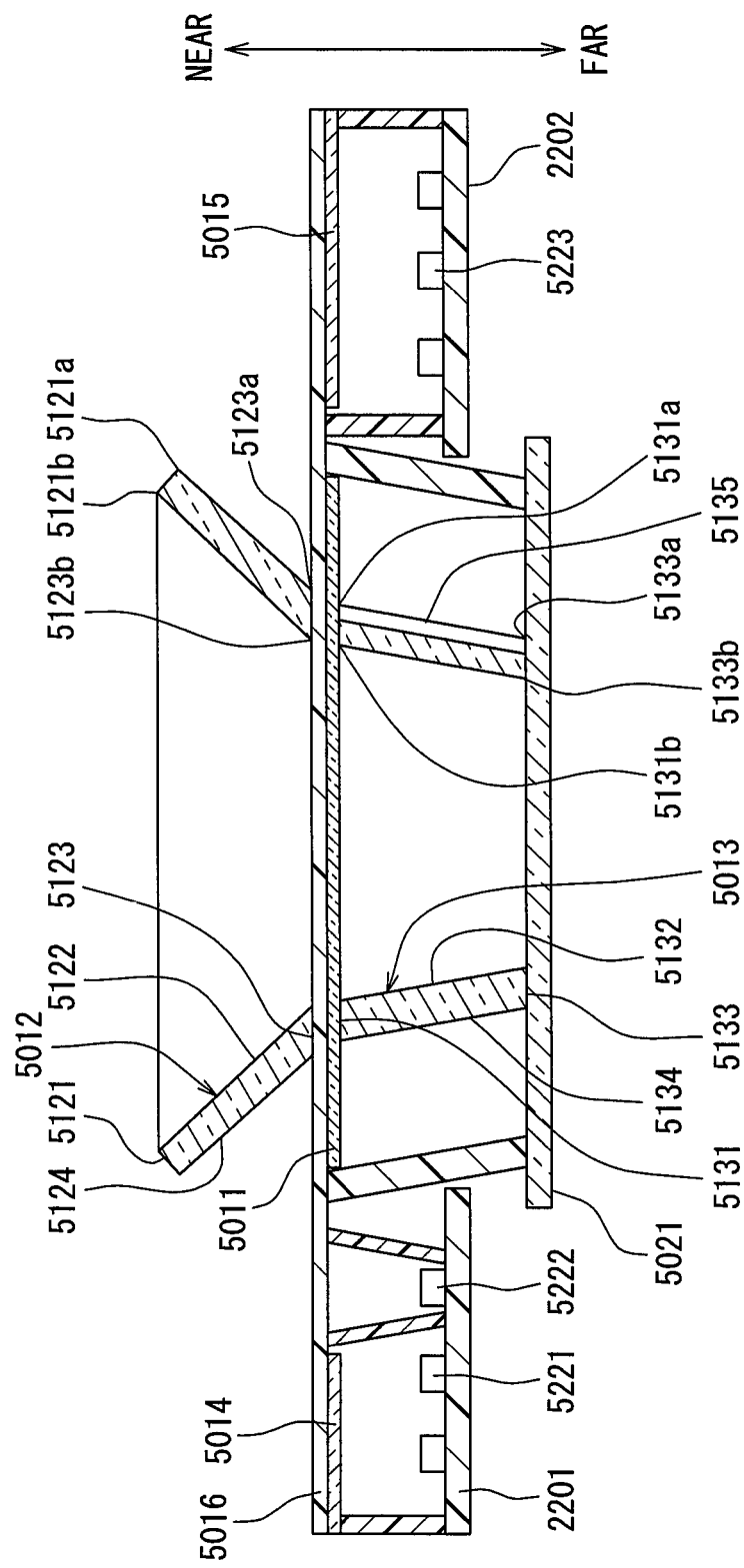
FIG. 64 is a cross-sectional view illustrating the display device according to the nineteenth embodiment.

FIG. 64 is a cross-sectional view in which the meter 5001 illustrated in FIG. 63 is cut in the direction of the one-dot chain line and is viewed in the direction of the arrow LXIV illustrated in FIG. 63. In other words, FIG. 64 is a cross-sectional view of the meter 5001 seen from below a vehicle.

As illustrated in FIG. 64, light emitting diodes (LEDs) 5221 and 5222 are disposed on a substrate 2201 on the left side of the meter 5001. Accordingly, a character such as the arrow 5622 provided in the dial 5016 is illuminated once the dial 5016 is illuminated with light by the LED 5221 and the LED 5222. Then, the driver can visually recognize the character provided in the dial 5016.

Likewise, a LED 5223 is disposed on a substrate 2202 on the right side of the meter 5001. Accordingly, a character such as the arrow 5622 provided in the dial 5016 can be illuminated once the dial 5016 is illuminated with light by the LED 5223. Then, the driver can visually recognize the character provided in the dial 5016.

The display surface ring member 5012 is disposed on the region of the dial 5016 that corresponds to the liquid crystal panel 5011. An inside surface 5122 that provides a cavity and an outer surface 5124 constitute the display surface ring member 5012, and the length of the diameter of the outer surface 5124 exceeds the length of the diameter of the inside surface 5122. The inside surface 5122 and the outer surface 5124 are parallel to each other.

A far-side inner peripheral portion 5123b, which is one end of the inside surface 5122, is in contact with the dial 5016. The inside surface 5122 is provided by its surface extending in the near direction from the far-side inner peripheral portion 5123b.

A far-side outer peripheral portion 5123a, which is one end of the outer surface 5124, is in contact with the dial 5016. The outer surface 5124 is provided by its surface extending in the near direction from the far-side outer peripheral portion 5123a.

A front surface 5121 is disposed on the near side and between the inside surface 5122 and the outer surface 5124. A back surface 5123 is disposed on the side opposite to the front surface 5121 and between the inside surface 5122 and the outer surface 5124. In other words, the back surface 5123 is disposed on the far side and between the inside surface 5122 and the outer surface 5124.

The back surface 5123, which is one of the surfaces of the display surface ring member 5012 that is in contact with the dial 5016, is a light transmissive surface. The front surface 5121, which faces the driver, is a light transmissive surface. The inside surface 5122, which is disposed between the front surface 5121 and the back surface 5123, is covered by a cover (not illustrated) or the like and does not transmit light. Likewise, the outer surface 5124, which is disposed between the front surface 5121 and the back surface 5123, is covered by a cover or the like and does not transmit light. Accordingly, the light that is emitted from the liquid crystal panel 5011 to the back surface 5123 is emitted from the front surface 5121 after being reflected in the display surface ring member 5012.

Accordingly, the driver can visually recognize various colors, which depend on the transmittance of the liquid crystal panel 5011, on the front surface 5121 of the display surface ring member 5012.

The diameter of the far-side inner peripheral portion 5123b as one far-direction end of the inside surface 5122 is smaller in length than the diameter of a near-side inner peripheral portion 5121b, which is one near-direction end of the inside surface 5122. Likewise, the diameter of the far-side outer peripheral portion 5123a as one far-direction end of the outer surface 5124 is smaller in length than the diameter of a near-side outer peripheral portion 5121a, which is one near-direction end of the outer surface 5124.

The back-side ring member 5013 is disposed at a position that faces the display surface ring member 5012 via the dial 5016 and the liquid crystal panel 5011. The back-side ring member 5013 is disposed between the liquid crystal panel 5011 and the backlight 5021.

An inside surface 5132 that provides a cavity and an outer surface 5134 constitute the back-side ring member 5013, and the length of the diameter of the outer surface 5134 exceeds the length of the diameter of the inside surface 5132.

A far-side inner peripheral portion 5133b, which is one end of the inside surface 5132, is in contact with the backlight 5021. The inside surface 5132 is provided by its surface extending in the near direction from the far-side inner peripheral portion 5133b.

A far-side outer peripheral portion 5133a, which is one end of the outer surface 5134, is in contact with the backlight 5021. The outer surface 5134 is provided by its surface extending in the near direction from the far-side outer peripheral portion 5133a.

A front surface 5131 is disposed on the near side and between the inside surface 5132 and the outer surface 5134. A back surface 5133 is disposed on the side opposite to the front surface 5131 and between the inside surface 5132 and the outer surface 5134. In other words, the back surface 5133 is disposed on the far side and between the inside surface 5132 and the outer surface 5134.

The front surface 5131, which is one of the surfaces of the back-side ring member 5013, is a light transmissive surface in contact with the liquid crystal panel 5011. The back surface 5133, which is in contact with the backlight 5021, is a light transmissive surface. The inside surface 5132, which is disposed between the front surface 5131 and the back surface 5133, transmits light. Likewise, the outer surface 5134, which is disposed between the front surface 5131 and the back surface 5133, transmits light.

The diameter of the far-side inner peripheral portion 5133b as one far-direction end of the inside surface 5132 is smaller in length than the diameter of a near-side inner peripheral portion 5131b, which is one near-direction end of the inside surface 5132. Likewise, the diameter of the far-side outer peripheral portion 5133a as one far-direction end of the outer surface 5134 is smaller in length than the diameter of a near-side outer peripheral portion 5131a, which is one near-direction end of the outer surface 5134.

As described above, the back-side ring member 5013 is disposed at the position that faces the display surface ring member 5012 via the dial 5016 and the liquid crystal panel 5011. More specifically, the back surface 5123 of the display surface ring member 5012 and the front surface 5131 of the back-side ring member 5013 directly face each other via the dial 5016 and the liquid crystal panel 5011.

The far-side outer peripheral portion 5123a of the display surface ring member 5012 and the near-side outer peripheral portion 5131a of the back-side ring member 5013 are present at the same position in the direction along the liquid crystal panel 5011. The far-side inner peripheral portion 5123b of the display surface ring member 5012 and the near-side inner peripheral portion 5131b of the back-side ring member 5013 are present at the same position in the direction along the liquid crystal panel 5011.

Accordingly, the light that is emitted from the backlight 5021 is first emitted into the back-side ring member 5013 via the back surface 5133 of the back-side ring member 5013. Then, the light is reflected in the back-side ring member 5013. After being reflected in the back-side ring member 5013, the light is emitted from the front surface 5131 of the back-side ring member 5013. After being emitted from the front surface 5131, the light is emitted to the back surface 5123 of the display surface ring member 5012 via the liquid crystal panel 5011 and the dial 5016. After being emitted from the back surface 5123, the light is reflected in the display surface ring member 5012 and then emitted from the front surface 5121. Lastly, the light emitted from the front surface 5121 is visually recognized by the driver.

In addition, the backlight 5021 emits the light toward the liquid crystal panel 5011, which is at a predetermined distance from the backlight 5021. Accordingly, the driver can visually recognize the image that is displayed on the liquid crystal panel 5011.

The light that is emitted from the backlight 5021 and is guided to the display surface ring member 5012 is relatively less attenuated than the light that is directly emitted to the liquid crystal panel 5011. Accordingly, the luminance of the light that is emitted from the front surface 5131 of the display surface ring member 5012 is higher than the luminance of the image displayed on the liquid crystal panel 5011.

Figure 65:
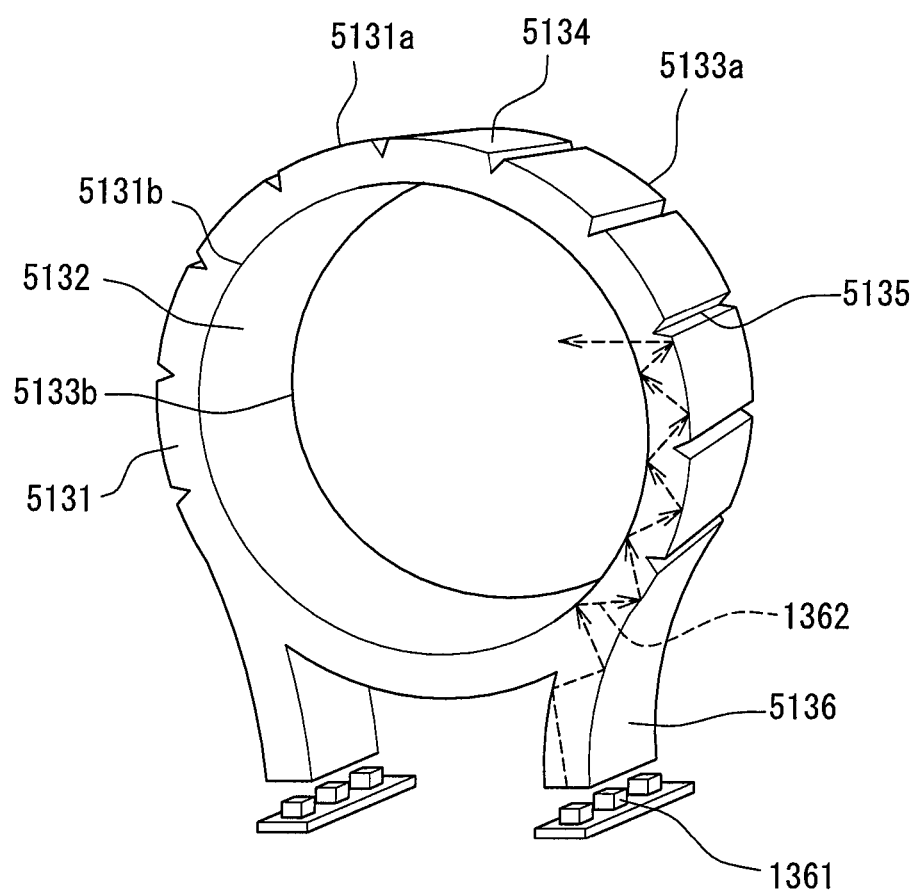
FIG. 65 is a perspective view illustrating a back-side real member according to the nineteenth embodiment.

Hereinafter, the back-side ring member 5013 will be described in further detail with reference to FIG. 65. The back-side ring member 5013 is provided with the two light receiving portions 5136 extending from the outer surface 5134. End faces of the light receiving portions 5136 in the direction in which the light receiving portions 5136 extend from the outer surface 5134 are irradiated with light 1362 from LEDs 1361 that have RGB light emitting devices. Accordingly, the light 1362 emitted by the LEDs 1361 is emitted into the light receiving portions 5136. Then, the light 1362 moves through the light receiving portions 5136 while being reflected and is transmitted into the back-side ring member 5013. Then, the light 1362 is repeatedly reflected with respect to the outer surface 5134 and the inside surface 5132 of the back-side ring member 5013. Then, some of the light 1362 reflected in the back-side ring member 5013 is reflected by the groove portions 5135. Then, this beam of the light 1362 that is reflected by the groove portions 5135 is emitted from the inside to the outside of the back-side ring member 5013 via the inside surface 5132. Then, this emitted light 1362 is visually recognized by the driver. Accordingly, the driver can visually recognize the groove portions 5135.

Two surfaces disposed on the outer surface 5134 provide the groove portion 5135. Specifically, the two surfaces are disposed by being carved in the system direction from the outer surface 5134 toward the inside surface 5132. The groove portion 5135 is provided in a V shape by the two surfaces. The two surfaces form an angle of 45°. The multiple groove portions 5135 are disposed at regular intervals in the outer surface 5134 of the back-side ring member 5013.

The groove portions 5135 are disposed such that the light 1362 is totally reflected by the groove portions 5135.

An example of use of the meter 5001 will be described below with reference back to FIG. 63. According to FIG. 63, the liquid crystal panel 5011 displays the pointer image 5624. The multiple groove portions 5135 are illuminated by the respective LEDs 1361 and visually recognized by the driver in the form of scales. In addition, the speed images 5624 are displayed on the liquid crystal panel 5011 to be visually recognized by the driver at positions adjacent to the groove portions 5135. Accordingly, a speedometer is visually recognized as being displayed.

The driver visually recognizes the display surface ring member 5012 on a side nearer to the driver than the display surface 5011a is. The liquid crystal panel 5011 is positioned on a side farther from the driver than the display surface ring member 5012 is. Accordingly, the image that is displayed on the liquid crystal panel 5011 is positioned on a side farther from the driver than the display surface ring member 5012 is.

The back-side ring member 5013 is positioned on a side farther from the driver than the liquid crystal panel 5011 is. The near-side inner peripheral portion 5131b of the back-side ring member 5013 is positioned on a side nearer to the driver than the far-side inner peripheral portion 5133b of the back-side ring member 5013 is. In other words, an inclination is generated from the near-side inner peripheral portion 5131b toward the far-side inner peripheral portion 5133b.

As described above, the display surface ring member 5012, the liquid crystal panel 5011, and the back-side ring member 5013 are positioned at different positions in the far direction. Accordingly, a sense of depth can be given when the driver visually recognizes the display surface ring member 5012, the liquid crystal panel 5011, and the back-side ring member 5013. More specifically, the sense of depth can be given when the driver visually recognizes the display surface ring member 5012, the image displayed on the liquid crystal panel 5011, and the near-side inner peripheral portion 5131b, the far-side inner peripheral portion 5133b, and the groove portions 5135 of the back-side ring member 5013.

Hereinafter, effects of the meter 5001 according to the present embodiment will be described.

The meter 5001 is provided with the liquid crystal panel 5011, the backlight 5021, the back-side ring member 5013, and the display surface ring member 5012. The liquid crystal panel 5011 provides the display surface 5011a that displays the images 5624. The backlight 5021 emits light toward the liquid crystal panel 5011 from the back side, which is the side opposite from the display surface 5011a. The back-side ring member 5013 is placed between the liquid crystal panel 5011 and the backlight 5021, and the display surface ring member 5012 visually recognized through the liquid crystal panel 5011 is visually recognized on the front side of the display surface 5011a of the liquid crystal panel 5011.

According to this configuration, a sense of depth can be given by three types of members and images, that is, the display surface ring member 5012, the images 5624 displayed on the liquid crystal panel 5011, and the back-side ring member 5013. Accordingly, the meter 5001 has an enhanced three-dimensional appearance.

Light is guided into the back-side ring member 5013. The display surface ring member 5012 transmits the light. The back-side ring member 5013 guides the light that is emitted by the backlight 5021 to the display surface ring member 5012 via the liquid crystal panel 5011.

According to this configuration, the light guided to the display surface ring member 5012 is first emitted from the backlight 5021 and is moved into the back-side ring member 5013. After being moved into the back-side ring member 5013, the light is guided to the display surface ring member 5012 via the liquid crystal panel 5011. The light that is directly emitted to the liquid crystal panel 5011, in the meantime, reaches the liquid crystal panel 5011 at a predetermined distance from the backlight 5021. Accordingly, the amount of attenuation of the light that is guided to the display surface ring member 5012 is smaller than the amount of attenuation of the light that is directly emitted to the liquid crystal panel 5011. The amount of attenuation of the light that is directly emitted to the liquid crystal panel 5011 exceeds the amount of attenuation of the light that is guided to the display surface ring member 5012. Accordingly, the luminance of the display surface ring member 5012 is higher than the luminance of the images 5624 displayed on the liquid crystal panel 5011. Accordingly, the display surface ring member 5012 is highlighted with respect to the images 5624 displayed on the liquid crystal panel 5011.

(Twentieth Embodiment)

In the nineteenth embodiment described above, the display surface ring member 5012 is used as a display surface real member. In the present embodiment, a magnifying lens unit 5321 is used as a display surface real member. The magnifying lens unit 5321 is disposed at the region of a dial 5016 that corresponds to a display surface 5011a.

Figure 66:
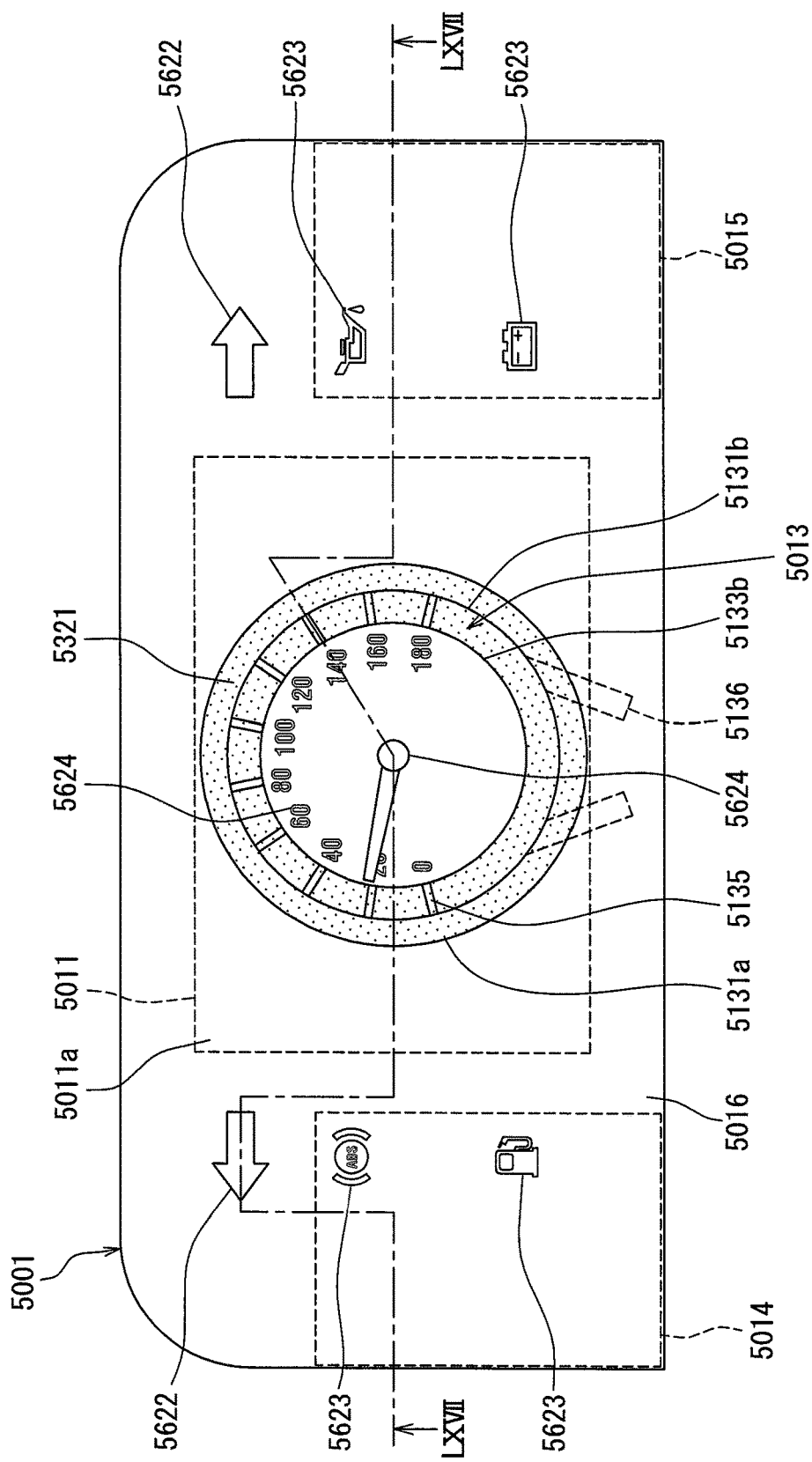
FIG. 66 is a front view illustrating a display device according to a twentieth embodiment.

As illustrated in FIG. 66, a back-side ring member 5013 is visually recognized in an expanded form because of the magnifying lens unit 5321. The magnifying lens unit 5321 is disposed on the dial 5016. Specifically, the magnifying lens unit 5321 has an end portion in contact with the dial 5016. The magnifying lens unit 5321 is shaped to protrude from the dial 5016 in the near direction. The magnifying lens unit 5321 has a ring shape. The magnifying lens unit 5321 is disposed in the dotted region that is illustrated in FIG. 66.

The light that is emitted from the inside of the back-side ring member 5013 is emitted to the magnifying lens unit 5321 via a liquid crystal panel 5011.

Figure 67:
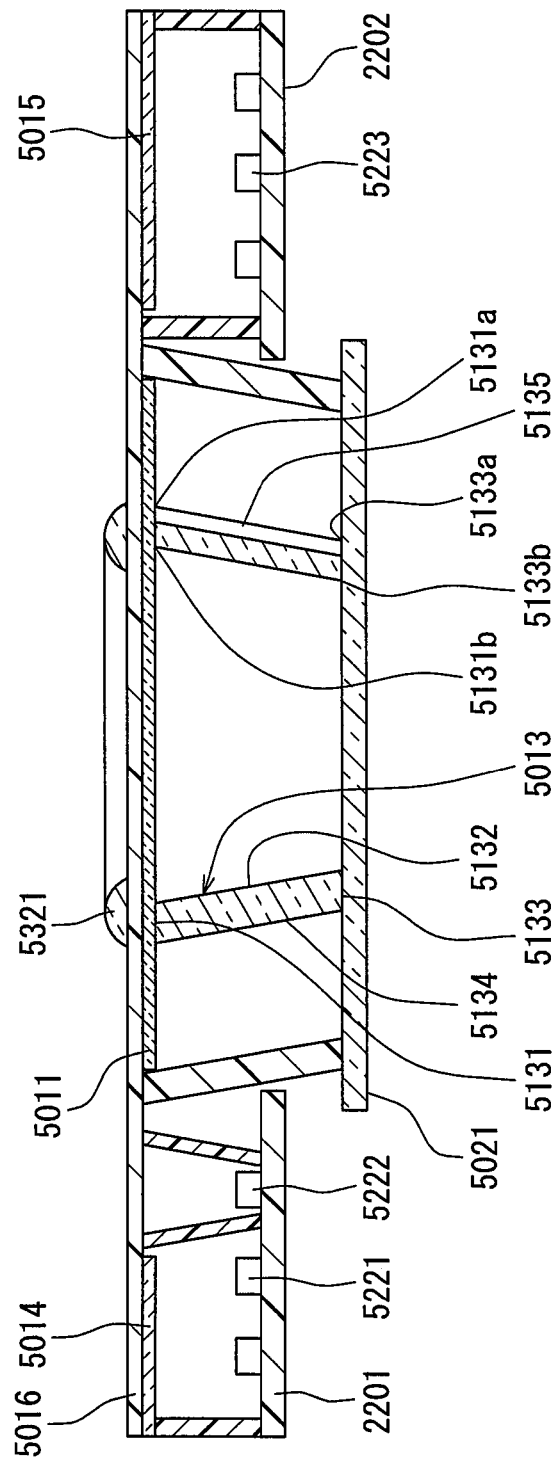
FIG. 67 is a cross-sectional view illustrating the display device according to the twentieth embodiment of the present disclosure.

FIG. 67 is a diagram in which FIG. 66 is cut along the one-dot chain line in it and is viewed in the direction of the arrow LXVII.

The magnifying lens unit 5321 is disposed such that the magnifying lens unit 5321 faces the back-side ring member 5013 via the liquid crystal panel 5011 and the dial 5016. Specifically, the magnifying lens unit 5321 is disposed such that the back-side ring member 5013 is covered by the magnifying lens unit 5321 in the direction along the liquid crystal panel 5011. More specifically, the magnifying lens unit 5321 is disposed such that the magnifying lens unit 5321 covers a near-side outer peripheral portion 5131a, a near-side inner peripheral portion 5131b, and a far-side inner peripheral portion 5133b in the direction along the liquid crystal panel 5011. In other words, an outer surface 5134 is positioned inside an outside end portion of the magnifying lens unit 5321 in the direction along the liquid crystal panel 5011. Likewise, an inside surface 5132 is positioned outside an inside end portion of the magnifying lens unit 5321.

Accordingly, the back-side ring member 5013 is visually recognized by a driver in an expanded form. Specifically, the near-side outer peripheral portion 5131a, the near-side inner peripheral portion 5131b, the far-side inner peripheral portion 5133b, and a groove portion 5135 are expanded by the magnifying lens unit 5321 and visually recognized by the driver.

The magnifying lens unit 5321 is not disposed in the region that does not face the back-side ring member 5013.

An example of use of a meter 5001 according to the present embodiment will be described below with reference back to FIG. 66. Description of the parts that show the same example of use as in the nineteenth embodiment will be omitted. The meter 5001 displays a green image in the region of the liquid crystal panel 5011 that corresponds to the magnifying lens unit 5321. In other words, a green ring image is displayed on the liquid crystal panel 5011.

Then, the color of the ring image displayed on the liquid crystal panel 5011 is visually recognized by the driver as sticking to the magnifying lens unit 5321.

Hereinafter, effects of the meter 5001 according to the present embodiment will be described.

The meter 5001 is provided with the liquid crystal panel 5011, a backlight 5021, the back-side ring member 5013, and the magnifying lens unit 5321. The liquid crystal panel 5011 provides the display surface 5011a that displays an image. The backlight 5021 emits light toward the liquid crystal panel 5011 from the back side, which is the side opposite from the display surface 5011a. The back-side ring member 5013 is placed between the liquid crystal panel 5011 and the backlight 5021 and is visually recognized through the liquid crystal panel 5011. The magnifying lens unit 5321 is disposed on the front side of the display surface 5011a of the liquid crystal panel 5011. The magnifying lens unit 5321 is disposed such that the back-side ring member 5013 is expanded via the liquid crystal panel 5011.

According to this configuration, the back-side ring member 5013 is expanded by the magnifying lens unit 5321. As a result, an increased far-direction distance is visually recognized between the back-side ring member 5013 and images 5624 displayed on the liquid crystal panel 5011. Accordingly, a sense of depth can be enhanced and the meter 5001 has an enhanced three-dimensional appearance.

As described above, the magnifying lens unit 5321 is colored in the color of the image that is displayed on the liquid crystal panel 5011. Accordingly, the driver visually recognizes the magnifying lens unit 5321 as a colored real object.

Accordingly, the magnifying lens unit 5321, the image displayed on the liquid crystal panel 5011, and the back-side ring member 5013 are visually recognized by the driver at different far-direction positions. Accordingly, a sense of depth can be given.

The back-side ring member 5013 is a back-side light guide member into which light is guided. The back-side ring member 5013 guides the light emitted by the backlight 5021 to the magnifying lens unit 5321 via the liquid crystal panel 5011.

According to this configuration, the light guided to the magnifying lens unit 5321 is first emitted from the backlight 5021, moved into the back-side ring member 5013, and guided via the liquid crystal panel 5011. The light that is directly emitted to the liquid crystal panel 5011, in the meantime, reaches the liquid crystal panel 5011 at a predetermined distance from the backlight 5021. Accordingly, the amount of attenuation of the light that is guided to the magnifying lens unit 5321 is smaller than the amount of attenuation of the light that is directly emitted to the liquid crystal panel 5011. The amount of attenuation of the light that is directly emitted to the liquid crystal panel 5011 exceeds the amount of attenuation of the light that is guided to the magnifying lens unit 5321. Accordingly, the luminance of the magnifying lens unit 5321 is higher than the luminance of the images 5624 displayed on the liquid crystal panel 5011. Accordingly, the magnifying lens unit 5321 is highlighted with respect to the images 5624 displayed on the liquid crystal panel 5011.

The invention is not at all limited to the preferred embodiments of the invention described above and can be carried out in various modified forms, examples of which will be described below. Not only combination between the parts explicitly specified in each of the embodiments to be capable of being combined with each other but also partial combination between the embodiments can be conducted even without explicit expression insofar as the combination is not particularly hindered.

For example, the display surface real member is the display surface ring member 5012 in the nineteenth embodiment described above, but the present disclosure is not limited thereto. For example, a pointer or the like may be disposed as well.

Likewise, the back-side real member is the back-side ring member 5013 in the nineteenth embodiment described above, but the present disclosure is not limited thereto. A pointer may be disposed as well.

The display surface ring member 5012 is a display surface transmission member in the nineteenth embodiment described above, but the present disclosure is not limited thereto. The display surface ring member 5012 may also be a non-transmissive ring-shaped member The back-side ring member 5013 is a back-side light guide member in the nineteenth embodiment described above, but the present disclosure is not limited thereto. The back-side ring member 5013 may also be a ring-shaped member that is not a light guide member.

Figure 68:
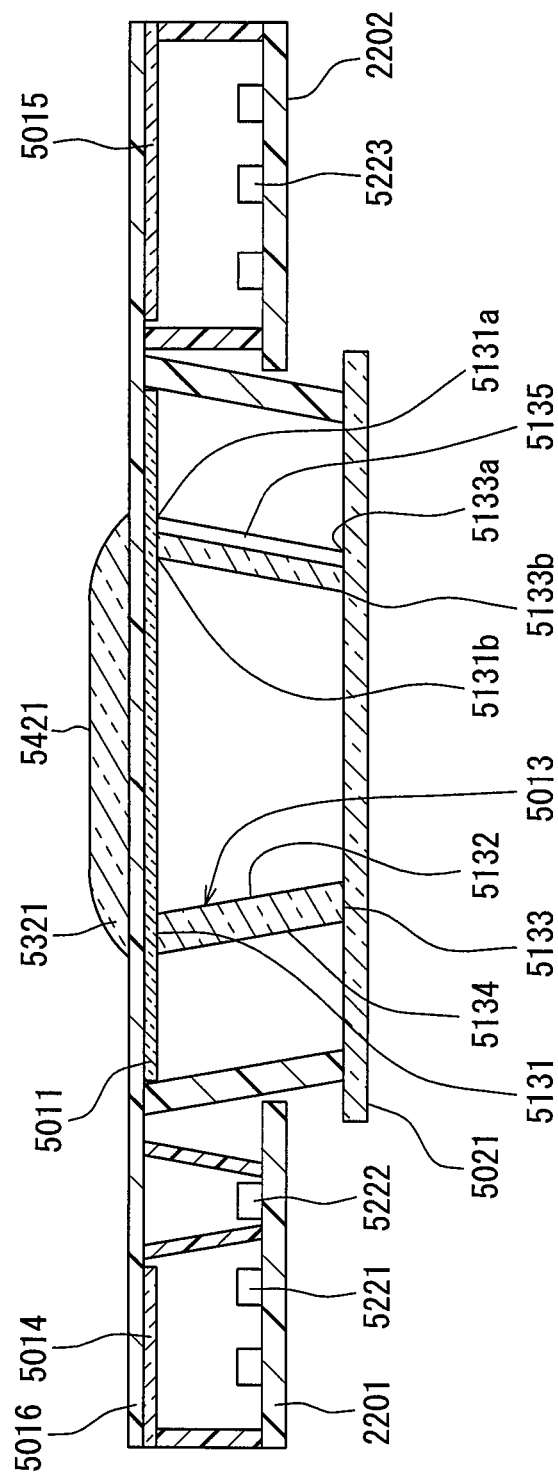
FIG. 68 is a cross-sectional view illustrating a display device according to another embodiment of the present disclosure.

In the twentieth embodiment described above, the magnifying lens unit 5321 is disposed in the region that faces the back-side ring member 5013 and a lens such as the magnifying lens unit 5321 is not disposed in the region that does not face the back-side ring member 5013. The present disclosure is not limited thereto, and a lens in which the magnifying lens unit 5321 and a flat portion 5421 are integrated with each other may be disposed on the dial 5016 as illustrated in FIG. 68.

In this case, the back-side ring member 5013 facing the magnifying lens unit 5321 is expanded and visually recognized by the driver. Specifically, the near-side outer peripheral portion 5131*a*, the near-side inner peripheral portion 5131*b*, the far-side inner peripheral portion 5133*b*, and the groove portion 5135 are expanded and visually recognized by the driver.

Meanwhile, the image that is displayed on the liquid crystal panel 5011 facing the flat portion 5421 is not expanded.

In the nineteenth embodiment, the cover is disposed on the display surface ring member 5012, the inside surface 5122, and the outer surface 5124, but the cover may not be disposed, either.

In the embodiment described above, the display surface ring member 5012 and the magnifying lens unit 5321 are disposed on the dial 5016, but the present disclosure is not limited thereto. The display surface ring member 5012 and the magnifying lens unit 5321 may be disposed on the liquid crystal panel 5011 as well. In this case, it is desirable that the display surface ring member 5012 and the magnifying lens unit 5321 are in contact with the liquid crystal panel 5011.

The display device is the meter 5001 in the embodiment described above, but the meter 5001 may be replaced with a navigation apparatus. In other words, any device can be adopted insofar as the device displays an image.

Figure 69:
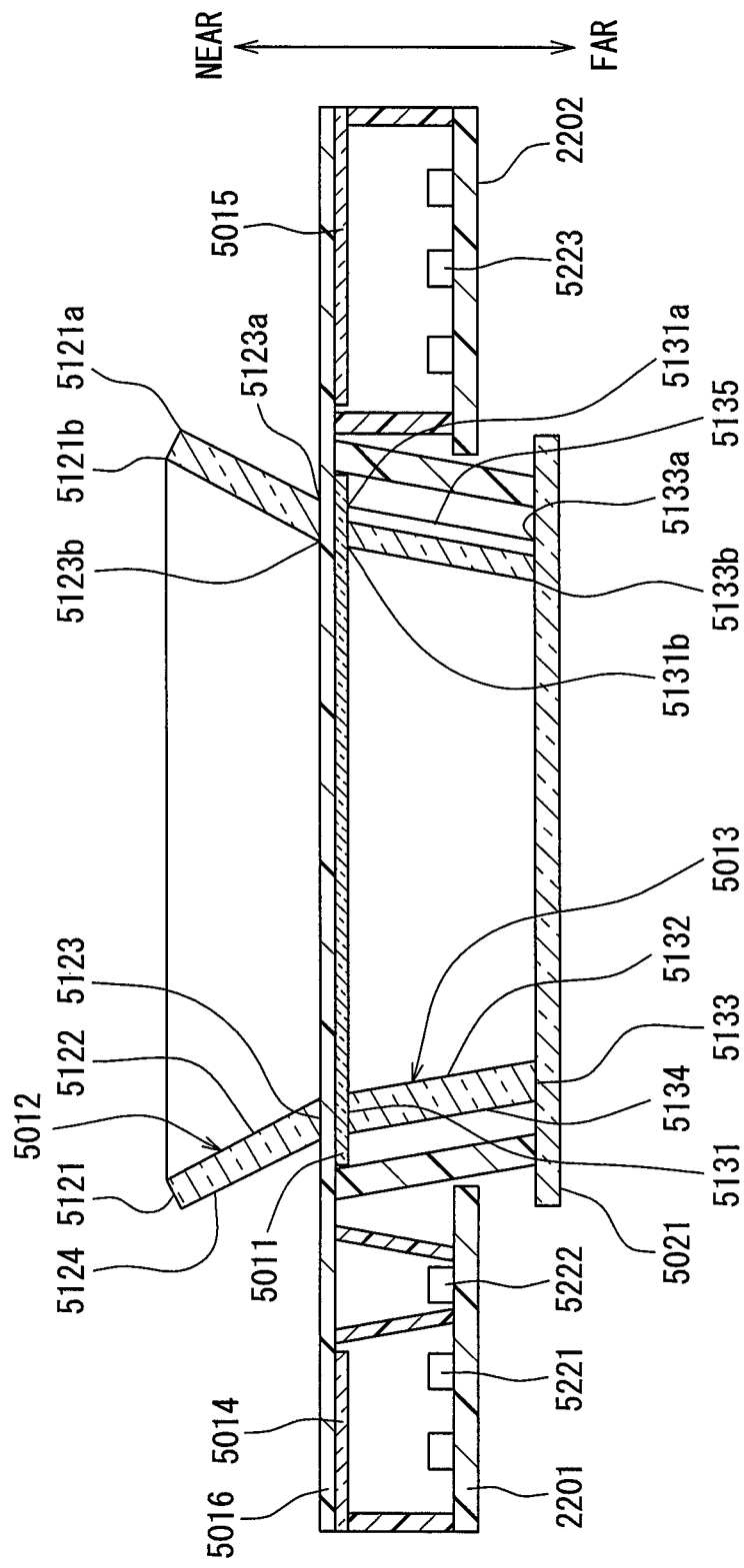
FIG. 69 is a cross-sectional view illustrating a display device according to another embodiment of the present disclosure.

The display surface ring member 5012 may be placed in the vicinity of the end portion of the liquid crystal panel 5011 in the direction along the liquid crystal panel 5011 as illustrated in FIG. 69. Specifically, the back surface 5123 is placed inside the end portion of the liquid crystal panel 5011 and the front surface 5121 is placed outside the end portion of the liquid crystal panel 5011 in the direction along the liquid crystal panel 5011.

In the direction along the liquid crystal panel 5011, the front surface 5121 is placed further on the outside than the back surface 5123. In addition, the back-side ring member 5013 is also placed in the vicinity of the end portion of the liquid crystal panel 5011 since the display surface ring member 5012 is placed in the vicinity of the end portion of the liquid crystal panel 5011 in the direction along the liquid crystal panel 5011. Both the near-side outer peripheral portion 5121*a* and the near-side inner peripheral portion 5121*b* may be positioned further on the outside than the end portion of the liquid crystal panel 5011, and only the near-side outer peripheral portion 5121*a* may be positioned further on the outside than the end portion of the liquid crystal panel 5011.

In the embodiment described above, the groove portion 5135 is disposed in the entire region that reaches the back surface 5133 from the front surface 5131. The present disclosure is not limited thereto, and the groove portion 5135 may also be provided by a part between the front surface 5131 and the back surface 5133 being carved.

The present disclosure has been described with reference to the embodiments, but it should be noted that the present disclosure is not limited to the embodiments and the structures. The present disclosure includes various modification examples and modifications within the ranges equivalent to the embodiments. In addition, the scope and technical range of the present disclosure include certain various combinations or forms, and also other combinations or forms including such certain various combinations or forms combined with a single element only, something more than that, or something less than that.

What is claimed is:

1. A display device comprising:
    a liquid crystal panel providing a display surface where an image is displayed;
    a backlight emitting light to the liquid crystal panel from behind;
    a controller setting a first pixel region and a second pixel region on the display surface, and controlling the liquid crystal panel such that the first pixel region becomes higher in light transmittance than the second pixel region; and
    a real object being placed between the liquid crystal panel and the backlight and visible through the first pixel region; wherein
    the second pixel region encloses the first pixel region on the display surface, and
    the first pixel region has a part facing a light emitting surface of the backlight.

2. The display device according to claim 1, wherein the real object includes a pointer actuated to rotate, and the image displayed on the liquid crystal panel includes a plurality of scale images pointed at by the pointer.

3. The display device according to claim 2, wherein the image includes a shadow image representing a shadow of the pointer in the first pixel region, a display position of the shadow moving in accordance with a rotating actuation of the pointer.

4. The display device according to claim 2, wherein the image includes a number image representing a numerical value corresponding to the scale images in the first pixel region, and
    when the number image partially overlaps the pointer, a part of the number image overlapped with the pointer is displayed at a higher transmittance than another part of the number image non-overlapped with the pointer or is not displayed.

5. The display device according to claim 1, further comprising
    a pointer placed on a side of the liquid crystal panel opposite from the backlight and actuated to rotate.

6. The display device according to claim 5, wherein
    a rotation range of the pointer includes an indication range in which a physical quantity is indicated by pointing a scale, and a hiding range different from the indication range, and the display device further comprising a hiding member covering and hiding the pointer positioned in the hiding range.

7. The display device according to claim 1, wherein the real object includes a wall member extending along an outer edge of a visible region of the display surface.

8. The display device according to claim 1, further comprising
a switcher switching between a real object display mode in which the transmittance of the first pixel region is increased to a degree that the real object is visible and a real object hidden mode in which the transmittance of the first pixel region is reduced to a degree that the real object is invisible.

9. The display device according to claim 1, wherein the controller controls the liquid crystal panel to display a black background image in the second pixel region.

10. A display device comprising:
a liquid crystal panel providing a display surface where an image is displayed;
a backlight emitting light to the liquid crystal panel from behind;
a decorative member decorating the image, the decorative member being a real object placed between the liquid crystal panel and the backlight and visible through the liquid crystal panel; and
a controller controlling the liquid crystal panel such that a first pixel region of the display surface behind which the decorative member is positioned is higher in light transmittance than a second pixel region of the display surface, wherein
the backlight is defined as a first backlight,
the display device further comprising a second backlight different from the first backlight, the second backlight being placed between the liquid crystal panel and the decorative member and emitting light to the liquid crystal panel from behind, wherein
the decorative member includes a decorative plate subjected to transmitted illumination by the first backlight, and
the second backlight has a light guide plate provided with a reflecting surface reflecting the light introduced into the second backlight toward the liquid crystal panel.

11. The display device according to claim 10, further comprising
a light source being different from the backlight and illuminating the decorative member.

12. The display device according to claim 10, wherein the decorative member displays a scale to be pointed by a pointer.

13. The display device according to claim 12, wherein the image displayed on the liquid crystal panel includes the pointer.

14. The display device according to claim 10, further comprising
a switcher switching between a real object display mode in which the transmittance of the first pixel region is increased to a degree that the real object is visible and a real object hidden mode in which the transmittance of the first pixel region is reduced to a degree that the real object is invisible.

15. The display device according to claim 10, wherein the controller controls the liquid crystal panel to display a black background image in the second pixel region.

16. The display device according to claim 10, further comprising
a lighting controller controlling operations of the first backlight and the second backlight so as to turn on the first backlight when the second backlight is turned off and to turn off the first backlight when the second backlight is turned on.

17. The display device according to claim 10, further comprising
a lighting controller controlling operations of the first backlight and the second backlight so as to turn on the first backlight in both cases of turning on and off of the second backlight.

18. The display device according to claim 10, wherein
the decorative plate includes a light transmissive region transmitting the light from the first backlight, and a shade region blocking the light from the first backlight,
the light transmissive region has a gradation region being located adjacent to the shade region and having a light transmittance gradually changing in a direction toward the shade region, and
the controller controls the liquid crystal panel such that a display luminance in a pixel region of the display surface facing the gradation region gradually changes in a direction toward the shade region.

19. A display device comprising:
a liquid crystal panel having a display surface displaying an image;
a backlight emitting light to the liquid crystal panel from behind;
a real object being placed between the liquid crystal panel and the backlight and visible through the display surface; and
a virtual image display unit generating a display light for displaying a virtual image, wherein
the display surface includes a reflecting surface that visualizes the virtual image at a position overlapped with the display surface by reflecting the display light.

20. The display device according to claim 19, wherein the reflecting surface is at an angle to a line-of-sight direction toward the real object.

21. The display device according to claim 19, wherein the virtual image includes a part displayed at a position that is visible as being overlapped with the real object.

22. The display device according to claim 19, wherein the reflecting surface is placed such that a focal length of the virtual image is equal to a focal length of the real object.

23. The display device according to claim 19, wherein notification of predetermined information is performed with a synthetic image that is visible as a combination of the real object or the image and the virtual image.

24. A display device comprising:
a liquid crystal panel providing a display surface where an image is displayed;
a backlight emitting light to the liquid crystal panel from behind;
a real object being placed between the liquid crystal panel and the backlight and visible through the liquid crystal panel;
an actuator moving the real object between the liquid crystal panel and the backlight; and
a controller controlling the liquid crystal panel such that a first pixel region of the display surface behind which the real object is positioned is higher in light transmittance than a second pixel region of the display surface, wherein
the actuator moves at least a part of the real object out of the display surface.

25. The display device according to claim 24, further comprising
a light source being different from the backlight and illuminating the real object.

26. The display device according to claim 24, wherein the real object includes a scale pointed by a pointer.

27. The display device according to claim 26, wherein the image displayed on the liquid crystal panel includes the pointer.

28. The display device according to claim 24, further comprising
a switcher switching between a real object display mode in which the transmittance of the first pixel region is increased to a degree that the real object is visible and a real object hidden mode in which the transmittance of the first pixel region is reduced to a degree that the real object becoming invisible.

29. The display device according to claim 24, wherein the actuator moves the real object parallel to the display surface.

30. The display device according to claim 29, wherein the actuator moves the real object back and forth between a position of the liquid crystal panel facing the display surface and a position deviating from the facing position.

31. The display device according to claim 24, wherein the controller controls the liquid crystal panel to display a black background image in the second pixel region.

32. A display device comprising:
a liquid crystal panel providing a display surface where an image is displayed;
a backlight emitting light to the liquid crystal panel from its back side that is an opposite side from the display surface;
a back-side real member being placed between the liquid crystal panel and the backlight and visible through the liquid crystal panel; and
a display surface real member being visible on a front side of the display surface of the liquid crystal panel, wherein
the back-side real member includes a back-side light guide member into which light is introduced,
the display surface real member includes a display surface transmission member through which light transmits, and
the back-side light guide member guides the light emitted by the backlight to the display surface transmission member through the liquid crystal panel.

33. The display device according to claim 32, wherein an end surface of the display surface transmission member toward the liquid crystal panel and an end surface of the back-side light guide member toward the liquid crystal panel face each other across the liquid crystal panel.

34. The display device according to claim 32, wherein the display surface transmission member extends in a direction away from the liquid crystal panel.

35. The display device according to claim 34, wherein the display surface transmission member has a ring shape extending radially outward in the direction away from the liquid crystal panel.

36. A display device comprising:
a liquid crystal panel providing a display surface where an image is displayed;
a backlight emitting light to the liquid crystal panel from its back side that is an opposite side from the display surface;
a back-side real member placed between the liquid crystal panel and the backlight and visible through the liquid crystal panel; and
a magnifying lens unit positioned on a front side of the display surface of the liquid crystal panel, wherein
the magnifying lens unit enlarges the back-side real member through the liquid crystal panel,
the back-side real member includes a back-side light guide member into which light is introduced, and
the back-side light guide member guides the light emitted by the backlight to the magnifying lens unit through the liquid crystal panel.

37. The display device according to claim 36, wherein an end surface of the magnifying lens unit toward the liquid crystal panel and an end surface of the back-side light guide member toward the liquid crystal panel face each other across the liquid crystal panel.

38. The display device according to claim 37, wherein the magnifying lens unit has a circular shape, and
an outer circumferential edge part of the magnifying lens unit faces the end surface of the back-side light guide member across the liquid crystal panel.

39. A display device comprising:
a liquid crystal panel providing a display surface where an image is displayed;
a backlight emitting light to the liquid crystal panel from behind;
a real object being placed between the liquid crystal panel and the backlight and visible through the liquid crystal panel;
an actuator moving the real object between the liquid crystal panel and the backlight; and
a controller controlling the liquid crystal panel such that a first pixel region of the display surface behind which the real object is positioned is higher in light transmittance than a second pixel region of the display surface, wherein
the real object includes multiple divided pieces combined with each other, and
the actuator moves the multiple divided pieces between a state in which the multiple divided pieces are separated from each other and a state in which the multiple divided pieces are combined with each other.

40. A display device comprising:
a liquid crystal panel providing a display surface where an image is displayed;
a backlight emitting light to the liquid crystal panel from behind;
a real object being placed between the liquid crystal panel and the backlight and visible through the liquid crystal panel;
an actuator moving the real object between the liquid crystal panel and the backlight; and
a controller controlling the liquid crystal panel such that a first pixel region of the display surface behind which the real object is positioned is higher in light transmittance than a second pixel region of the display surface, wherein
the controller switches a display mode of the liquid crystal panel between a real object display mode and a real object hidden mode, the controller increases the light transmittance of the first pixel region to an extent of the real object being visible in the real object display mode, and the controller decreases the light transmittance of the first pixel region to an extent of the real object being invisible in the real object hidden mode, the actuator, in the real object hidden mode, moves the real object such that a part of the real object is out of an area facing the display surface while another part of the real object is within the area facing the display surface.

* * * * *